United States Patent [19]

Withgott et al.

[11] Patent Number: 5,369,714
[45] Date of Patent: Nov. 29, 1994

[54] METHOD AND APPARATUS FOR DETERMINING THE FREQUENCY OF PHRASES IN A DOCUMENT WITHOUT DOCUMENT IMAGE DECODING

[75] Inventors: M. Margaret Withgott, Los Altos; Ramana R. Rao, San Francisco, both of Calif.

[73] Assignee: Xerox Corporation, Stamford, Conn.

[21] Appl. No.: 794,555

[22] Filed: Nov. 19, 1991

[51] Int. Cl.⁵ .......................... G06K 9/36; G06K 9/72
[52] U.S. Cl. .......................................... 382/9; 382/36; 382/40
[58] Field of Search .................. 382/9, 40, 36, 18, 25; 381/43

[56] References Cited

U.S. PATENT DOCUMENTS

| | | | |
|---|---|---|---|
| 2,905,927 | 9/1959 | Reed | 382/40 |
| 4,594,732 | 6/1986 | Tsuji | 382/9 |
| 4,610,025 | 9/1986 | Blum et al. | 382/9 |
| 5,093,868 | 3/1992 | Tanaka et al. | 382/9 |
| 5,253,307 | 10/1993 | Wayner et al. | 382/25 |

FOREIGN PATENT DOCUMENTS 0402064 12/1990 European Pat. Off. .

OTHER PUBLICATIONS

"Multidisciplinary Research Thrusts From Co-Word Analysis" Kostoff, R. N. Conference on Technology Management IEEE Cat. No. 91CH3048-6 27-31 Oct. 1991, Abstract Only.

D. S. Bloomberg, "Multiresolution Morphological Approach to Document Image Analysis," 30 Sep.-2 Oct. 1991, pp. 963-971, First International Conference on Document Analysis and Recognition ICDAR, St. Malo, FR.

J. M. Carroll et al., "Computer Selection of Keywords Using Word-Frequency Analysis," Jul. 1969, vol. 20, No. 3, pp. 227-233, Washington, D.C.

R. G. Casey et al., "Unsupervised Construction of Decision Networks for Pattern Classification," 30 Jul.-2 Aug. 1984, vol. 2, pp. 1256-1258, Proceedings 7th International Conference on Pattern Recognition.

Primary Examiner—Leo H. Boudreau
Assistant Examiner—Larry J. Prikockis
Attorney, Agent, or Firm—Oliff & Berridge

[57] ABSTRACT

Methods and apparatus for determining phrase frequency in an undecoded document text image without first converting the document to character codes. The method includes segmenting of the document image into word units without document image decoding, and morphological image processing to determine word unit characteristics for placement into equivalence classes utilizing non-content based information. All of the possible sequences of selected word units in reading order in the document constituting phrases are mapped into a list of corresponding sequences of the associated equivalence class labels for each selected image unit in the phrase, and the corresponding equivalence class sequences are analyzed to determine the frequency of the phrases.

19 Claims, 38 Drawing Sheets

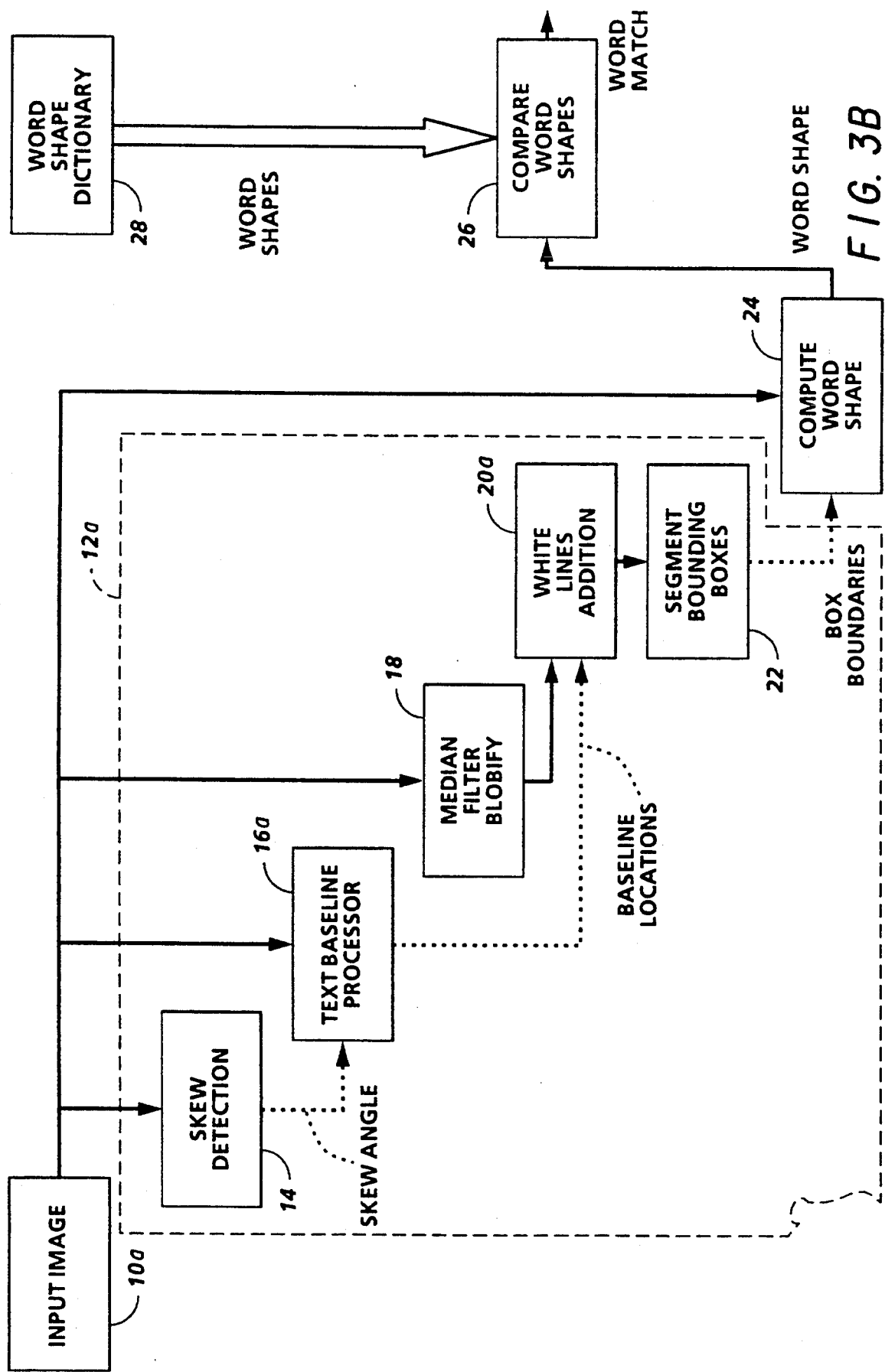

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 4

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 5

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 6B

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 6C

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 16

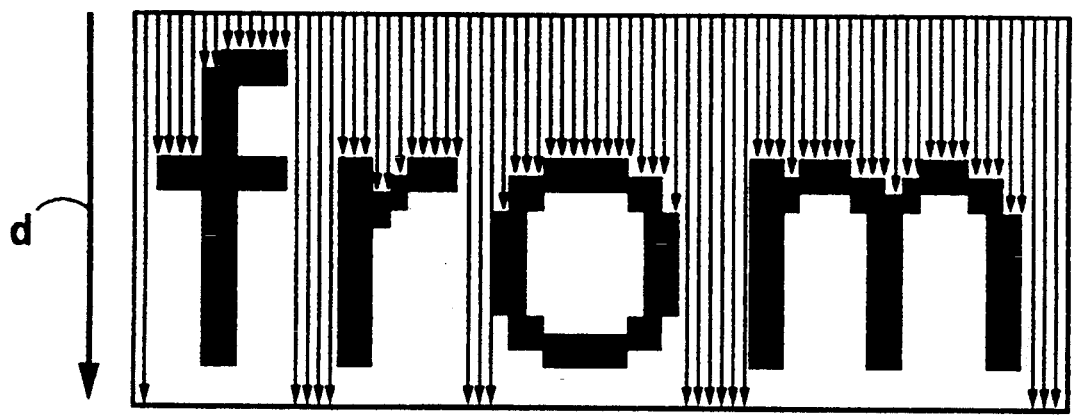
F I G. 17A
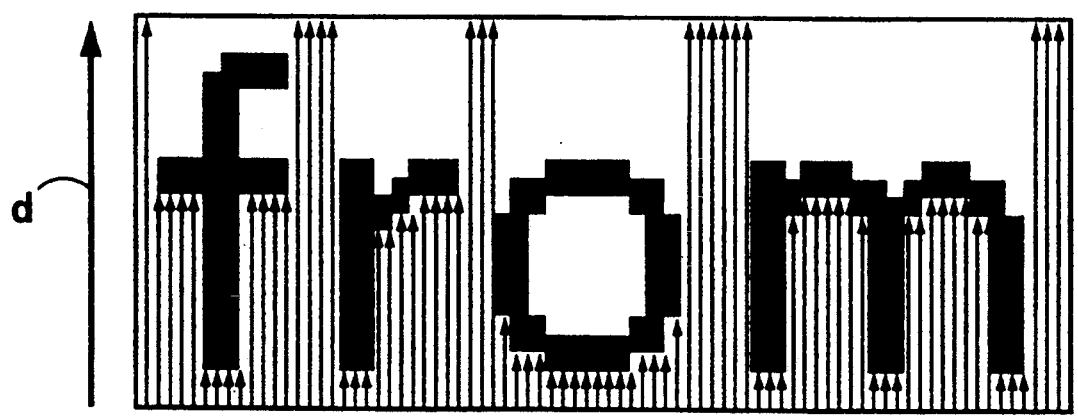
F I G. 17B

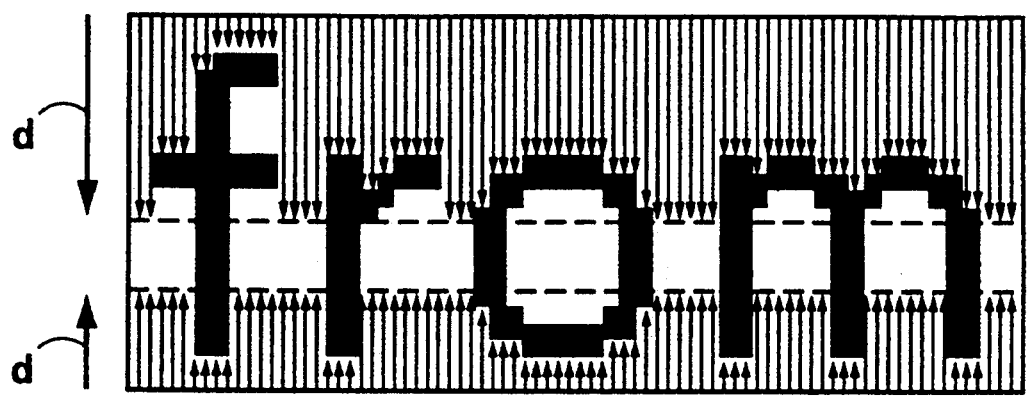
FIG. 20A
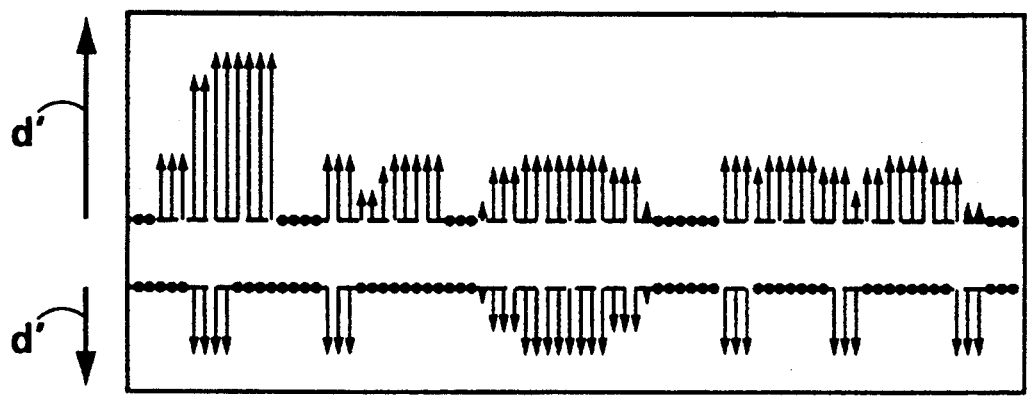
FIG. 20B
FIG. 20C
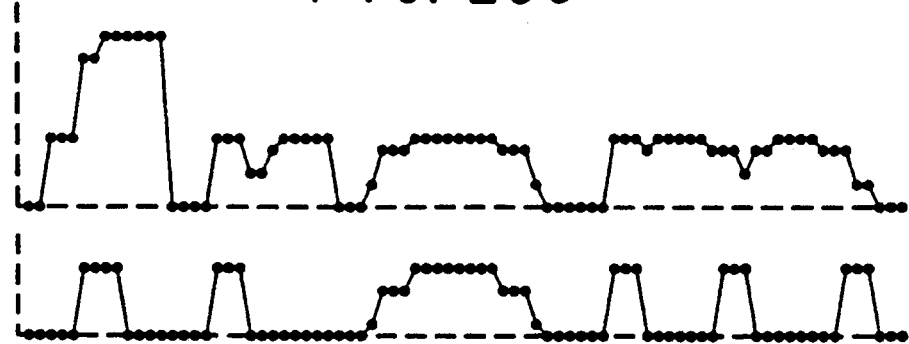
FIG. 20D

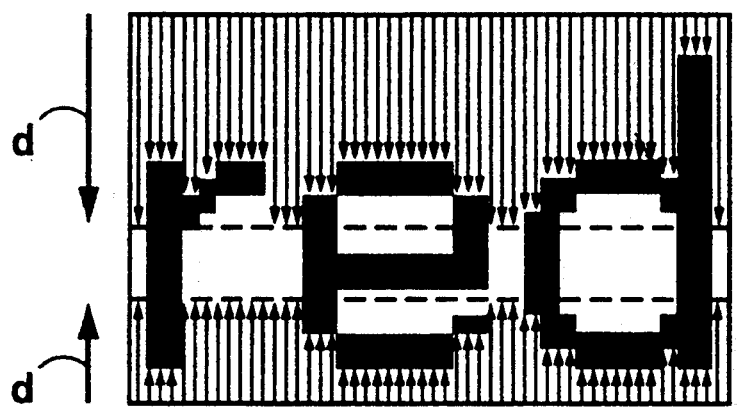
FIG. 21A
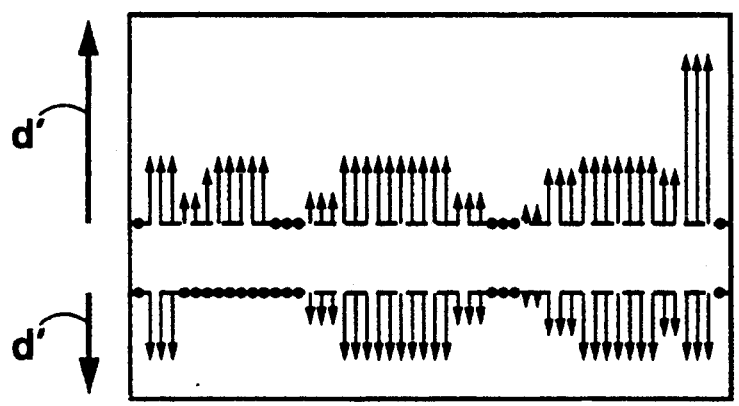
FIG. 21B
FIG. 21C
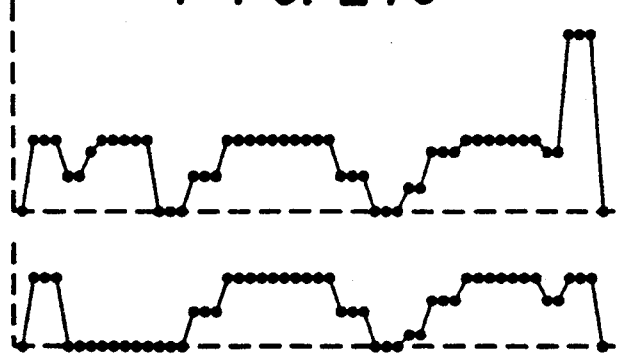
FIG. 21D

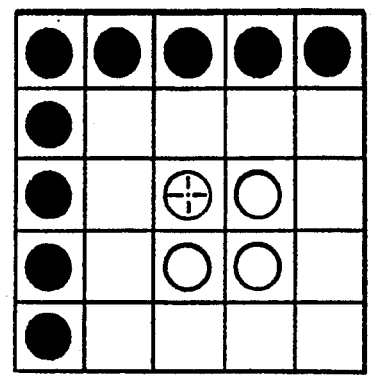
FIG. 30C-1
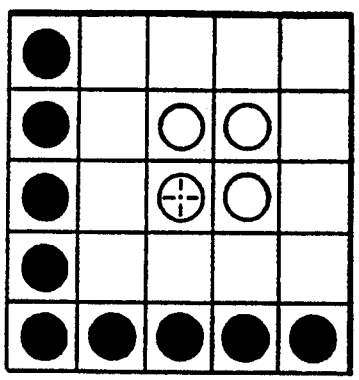
FIG. 30C-2
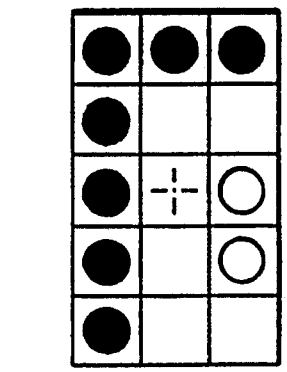
FIG. 30B-1
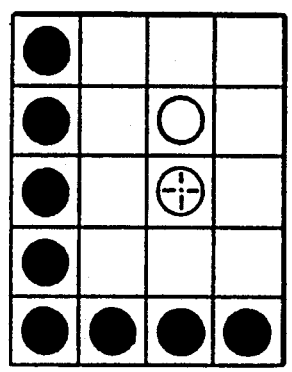
FIG. 30B-2
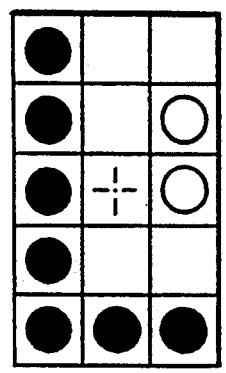
FIG. 30A-1
FIG. 30A-2

METHOD AND APPARATUS FOR DETERMINING THE FREQUENCY OF PHRASES IN A DOCUMENT WITHOUT DOCUMENT IMAGE DECODING

A portion of the disclosure of this patent document contains material that is subject to copyright protection. The copyright owner has no objection to the facsimile reproduction by anyone of the patent document or the patent disclosure, as it appears in the U.S. Patent Trademark Office records, but otherwise reserves all copyright rights whatsoever.

CROSS-REFERENCE TO RELATED APPLICATIONS

The following concurrently filed and related U.S. applications having a common assignee are hereby cross referenced and incorporated by reference in their entirety.

"Method for Determining Boundaries of Words in Text" to Huttenlocher et al., U.S. patent application Ser. No. 07/794,392.

"Detecting Function Words Without Converting a Document to Character Codes" to Bloomberg et al., U.S. patent application Ser. No. 07/794,190.

"A Method of Deriving Wordshapes for Subsequent Comparison" to Huttenlocher et al., U.S. patent application Ser. No. 07/794,391.

"Method and Apparatus for Determining the Frequency of Words in a Document Without Document Image Decoding" to Cass et al., U.S. patent application Ser. No. 07/795,173 now U.S. Pat. No. 5,325,444.

"Optical Word Recognition by Examination of Word Shape" to Huttenlocher et al., U.S. patent application Ser. No. 07/796,119, Published European Application No. 0543592, published May 26, 1993.

"Method for Comparing Word Shapes" to Huttenlocher et al., U.S. patent application Ser. No. 07/795,169.

BACKGROUND OF THE INVENTION

1. Field of the Invention

The invention relates to improvements in methods and apparatuses for document image processing, and more particularly to improvements for recognizing and determining the frequency of phrases in a document without first decoding the words or images or referring to an external lexical reference.

2. Background

In computer based electronic document processing, an attribute of the document(s) being processed which the operator often desires to know is the frequency with which some or all of the words occur. For example, Salton & McGill, *Introduction to Modern Information Retrieval*, Chapter 2, pp. 30, 36, McGraw-Hill, Inc., 1983, indicates that in information retrieval contexts, the frequency of use of a given term may correlate with the importance of that term relative to the information content of the document. Word frequency information can thus be useful for automatic document summarization and/or annotation. Word frequency information can also be used in locating, indexing, filing, sorting, or retrieving documents.

Another use for knowledge of word frequency is in text editing. For example, one text processing device has been proposed for preventing the frequent use of the same words in a text by categorizing and displaying frequently occurring words of the document. A list of selected words and the number of occurrences of each word is formulated for a given text location in a portion of the text, and the designated word and its location is displayed on a CRT.

An extension of this thesis is that knowledge of the frequency of sequences of words in reading order in a document, i.e., phrases, also is useful, for example, for automatic document summarization. Phrase frequency information can also be used in locating, indexing, filing, sorting, or retrieving documents.

Heretofore, though, word frequency determinations have been performed on electronic texts in which the contents have been converted to a machine readable form, such as by decoding using some form of optical character recognition (OCR) in which bit mapped word unit images, or in some cases a number of characters within the word unit images, are deciphered and converted to coded representations of the images based on reference to an external character library. The decoded words or character strings are then compared with dictionary terms in an associated lexicon. Disadvantages of such optical character recognition techniques are that the intermediate optical character recognition step introduces a greater possibility of computational error and requires substantial time for processing, slowing the overall word unit identification process.

REFERENCES

European Patent Application No. 0-402-064 to Sakai et al. describes a text processing device in a computer system for counting the occurrence of words in a text and displaying a list of repetitive words on a CRT. The list includes the selected words together with their number of occurrences and their locations in the text. In a case where word repetition is undesirable, an operator may substitute synonyms or otherwise alter the text by using search, display, and editing actions.

European Patent Application No. 0-364-179 to Hawley describes a method and apparatus for extracting key words from text stored in a machine-readable format. The frequency of occurrence of each word in a file, as compared to the frequency of occurrence of other words in the file, is calculated. If the calculated frequency exceeds by a predetermined threshold the frequency of occurrence of that same word in a reference domain appropriate to the file, then the word is selected as a key word for that file.

European Patent Application No. 0-364-180 to Hawley describes a method and apparatus for automatically indexing and retrieving files in a large computer file system. Key words are automatically extracted from files to be indexed and used as the entries in an index file. Each file having one of the index entries as a key word is associated in the index with that key word. If a file is to be retrieved, and its content, but not its name or location, is known, its key words are entered and its identifying information will be displayed (along with that of other files having that key word), facilitating its retrieval.

Concurrently filed U.S. patent application Ser. No. 07/795,173, now U.S. Pat. No. 5,325,444 to Cass et al., and entitled "Method and Apparatus for Determining the Frequency of Words in a Document Without Document Image Decoding," which application is incorporated herein by reference, describes methods and apparatus for determining word frequency in an undecoded document image based on segmentation of the document image into image units and comparing image characteristics of selected image units with image characteristics of other selected image units to determine equivalence classes of image units. The invention described herein extends this image based word frequency methodology to determination of phrase frequencies without document image decoding.

SUMMARY OF THE INVENTION

Accordingly, an object of the invention is to provide methods and apparatus for determining the frequency of occurrence of similar phrases in an undecoded document image without document image decoding.

It is another object of the invention to provide methods and apparatus of the type described that reduces or eliminates the possible introduction of unnecessary errors due to intermediate interpretation processes, and is more efficient than optical character recognition algorithms or bitmap correlation methods.

It is another object of the invention to provide methods and apparatus of the type described that may be performed in a short time, and are parallelizable.

In accordance with one aspect of the invention, a method for determining a frequency of occurrence of phrases in an undecoded document image is presented. According to the method, the document image is input and segmented into image units having undecoded information content. At least one significant morphological structural image characteristic for each of selected ones of the image units is determined, and equivalence classes of the selected image units are identified by clustering image units with similar morphological image characteristics. The sequences of equivalence class labels corresponding to all possible sequences of the selected units arranged in the order in which the selected image units appear in the document image are determined; and the equivalence class label sequences are then evaluated to identify the numbers of recurring subsequences, and thereby determine the frequency of each equivalence class label sequence.

In accordance with another aspect of the invention, the image units may be word units in a textual document, and a word unit is preferably evaluated by deriving a word shape representation of the word unit, which is either at least one, one-dimensional signal characterizing the shape of the word unit; or an image function defining a boundary enclosing the word unit, which image function has been augmented so that an edge function representing edges of the character string detected within the boundary is defined over its entire domain by a single independent variable within the closed boundary, without individually detecting and/or identifying the character or characters making up the word unit.

The equivalence classes preferably are determined by comparing selected morphological characteristics or combinations of characteristics, or the derived representations of the image unit shapes, with each other. The morphological characteristics can include image unit length, width, font, typeface, typeface cross-section, number of ascenders, number of descenders, or the like. In a particularly efficient comparison according to the invention, only the height and width dimensions of the aforesaid word shape representations are compared. The image units in each equivalence class are linked together, and mapped to enable the frequency of each to be determined.

In accordance with still another aspect of the invention, an apparatus for processing an undecoded scanned document image to determine the frequency of phrases in the document image is presented. The apparatus includes phrase frequency determining means for computing frequencies of phrases by utilizing non-content based word unit morphological image characteristics, and an output device. The word and phrase frequency determining means may be a programmed digital computer.

The present invention provides methods and apparatus for determining the frequency of phrases in a document directly from a stored image of the document, without first converting the document to optical character codes. The invention utilizes non-content image recognition techniques that compare morphological image properties of word image units without the need to correlate bitmaps.

The invention is not limited to systems utilizing document scanning. Rather, other systems such as a bitmap workstation (i.e., a workstation with a bitmap display) or a system using both bitmapping and scanning would work equally well for the implementation of the methods and apparatus described herein.

The major advances of the claimed invention include being parallelizable, enabling performance in a short time, and providing for extracting word sequence frequency information without first converting a document to character codes, such as ASCII codes. Also, the invention eliminates the possible introduction of errors due to intermediate interpretation processes, such as optical character recognition. The method is more time and cost efficient than OCR algorithms or methods based on bitmap correlation.

These and other objects, features and advantages of the invention will be apparent to those skilled in the art from the following detailed description, when read in conjunction with the accompanying drawings and appended claims.

BRIEF DESCRIPTION OF THE DRAWINGS

The invention is illustrated in the accompanying drawings, in which:

FIG. 3B shows a block system diagram of the arrangement of system components forming one embodiment of the inventive word shape recognition system;

FIG. 4 shows an image sample of example text over which the inventive process will be demonstrated;

FIG. 5 is a copy of a scanned image of the example text;

FIGS. 6A, 6B and 6C graphically illustrate the process used to determine the angle at which the example text is oriented in the image sample prior for further processing, while

FIG. 16 shows the sample text with bounding boxes placed around each word group in a manner which uniquely identifies a subset of image pixels containing each character string;

FIGS. 17A and 17B illustrate derivation of a single independent value signal, using the example word "from", which appears in the sample image of example text;

FIGS. 20A, 20B, 20C and 20D illustrate derivation of a single independent value signal, using the example word "from";

FIGS. 21A, 21B, 21C and 21D illustrate derivation of a single independent value signal, using the example word "red", which does not appear in the sample image of example text;

FIGS. 29A-1–29C-2 show three sets of character ascender structuring elements where: FIGS. 29A-1 and 29A-2 show a set of character ascender structuring elements of height 3 and length 5 where FIG. 29A-1 shows a structuring element with ON pixels along the bottom row and along the rightmost column and one or more OFF pixels in a remaining location preferably separated from the ON pixels, and FIG. 29A-2 shows a structuring element with ON pixels along the bottom row and along the leftmost column and one or more OFF pixels in a remaining location preferably separated from the ON pixels; FIGS. 29B-1 and 29B-2 show a set of character ascender structuring elements of height 4 and length 5 where FIG. 29B-1 shows a structuring element with ON pixels along the bottom row and along the rightmost column and one or more OFF pixels in a remaining location preferably separated from the ON pixels, and FIG. 29B-2 shows a structuring element with ON pixels along the bottom row and along the leftmost column and one or more OFF pixels in a remaining location preferably separated from the ON pixels; FIGS. 29C-1 and 29C-2 show a set of character ascender structuring elements of height 5 and length 5 where FIG. 29C-1 shows a structuring element with ON pixels along the bottom row and along the rightmost column and one or more OFF pixels in a remaining location preferably separated from the ON pixels, and FIG. 29C-2 shows a structuring element with ON pixels along the bottom row and along the leftmost column and one or more OFF pixels in a remaining location preferably separated from the ON pixels.

FIGS. 30A-1–30C-2 show three sets of character descender structuring elements where: FIGS. 30A-1 and 30A-2 show a set of character descender structuring elements of height 3 and length 5 where FIG. 30A-1 shows a structuring element with ON pixels along the top row and along the rightmost column and one or more OFF pixels in a remaining location preferably separated from the ON pixels, and FIG. 30A-2 shows a structuring element with ON pixels along the top row and along the leftmost column and one or more OFF pixels in a remaining location preferably separated from the ON pixels; FIGS. 30B-1 and 30B-2 show a set of character descender structuring elements of height 4 and length 5 where FIG. 30B-1 shows a structuring element with ON pixels along the top row and along the rightmost column and one or more OFF pixels in a remaining location preferably separated from the ON pixels, and FIG. 30B-2 shows a structuring element with ON pixels along the top row and along the leftmost column and one or more OFF pixels in a remaining location preferably separated from the ON pixels; and FIGS. 30C-1 and 30C-2 show a set of character descender structuring elements of height 5 and length 5 where FIG. 30C-1 shows a structuring element with ON pixels along the top row and along the rightmost column and one or more OFF pixels in a remaining location preferably separated from the ON pixels, and FIG. 30C-2 shows a structuring element with ON pixels along the top row and along the leftmost column and one or more OFF pixels in a remaining location preferably separated from the ON pixels.

The Appendix contains source code listings for a series of image manipulation and signal processing routines which have been implemented to demonstrate the functionality of the present invention. Included in the Appendix are four sections which are organized as follows:

Section A, beginning at page 1, comprises the declarative or "include" files which are commonly shared among the functional code modules;

Section B, beginning at page 26, includes the listings for a series of library type functions used for management of the images, error reporting, argument parsing, etc.;

Section C, beginning at page 42, comprises numerous variations of the word shape comparison code, and further includes code illustrating alternative comparison techniques than those specifically cited in the following description;

Section D, beginning at page 145, comprises various functions for the word shape extraction operations that are further described in the following description.

DETAILED DESCRIPTION OF THE PREFERRED EMBODIMENT

Figure 1:
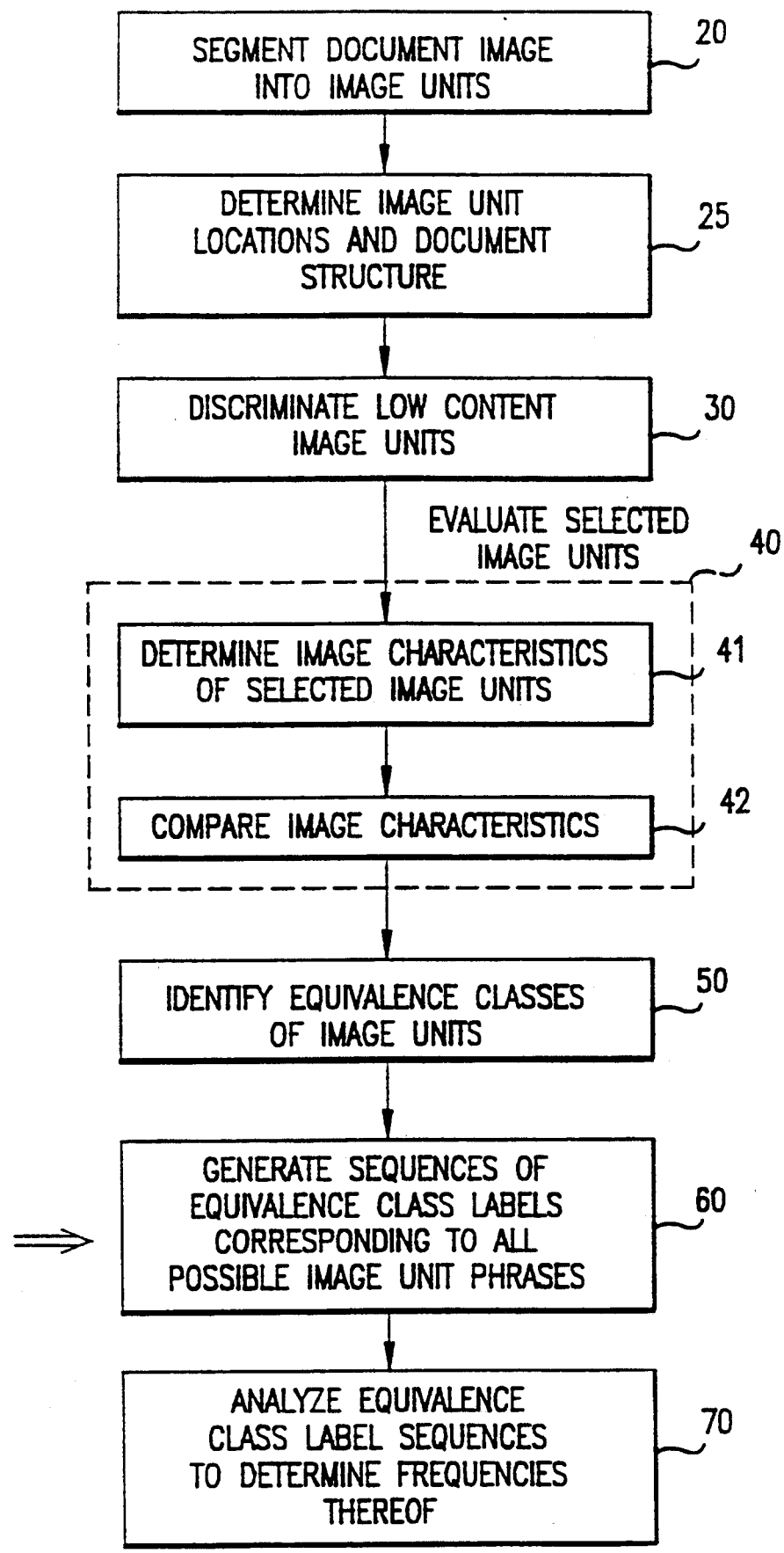
FIG. 1 shows a flow chart of a method according to a preferred embodiment of the invention for determining phrase frequencies in text of a document without first converting the text of the document to character codes.
Figure 2:
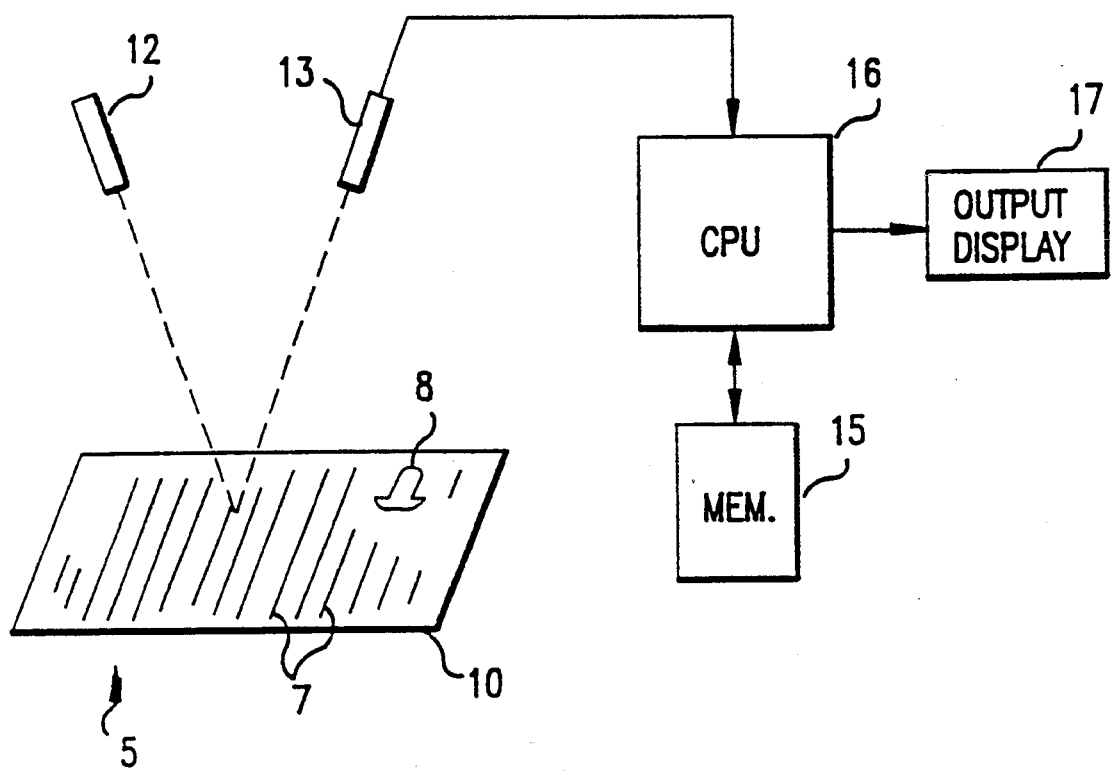
FIG. 2 shows an apparatus according to a preferred embodiment of the invention for determining phrase frequencies in a text of a document without first decoding the image units or text or converting the image units or text in the document to character codes.

A preferred embodiment of the method of the invention is illustrated in the flow chart of FIG. 1, and apparatus for performing the method of FIG. 1 is shown in FIG. 2. For the sake of clarity, the invention will be described with reference to the processing of a single document. However, it will be appreciated that the invention is applicable to the processing of a corpus of documents containing a plurality of documents.

Figure 8A:
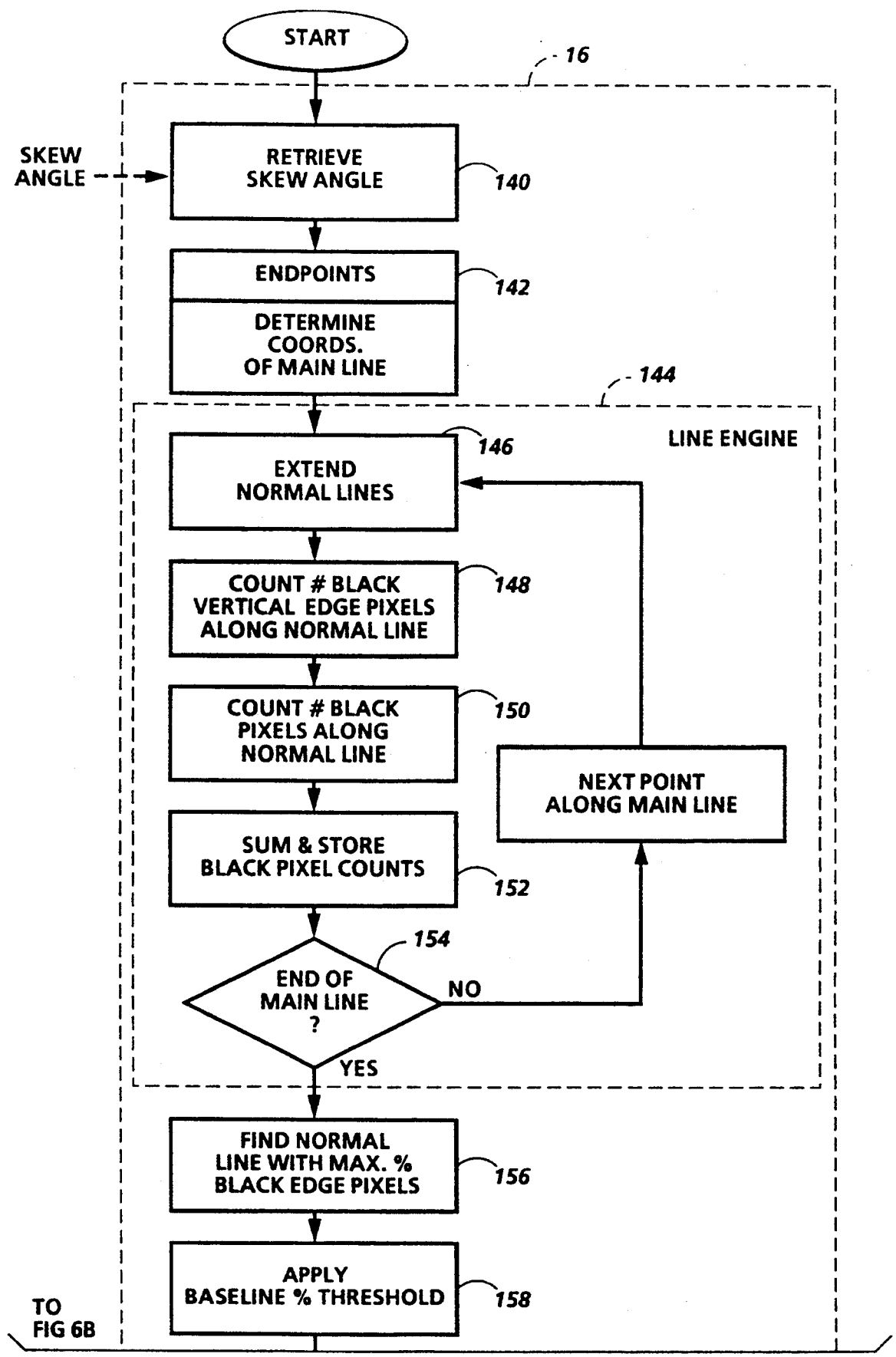
FIGS. 8A and 8B are flowcharts illustrating the procedures executed to determine the baselines shown in FIG. 7A.
Figure 8B:
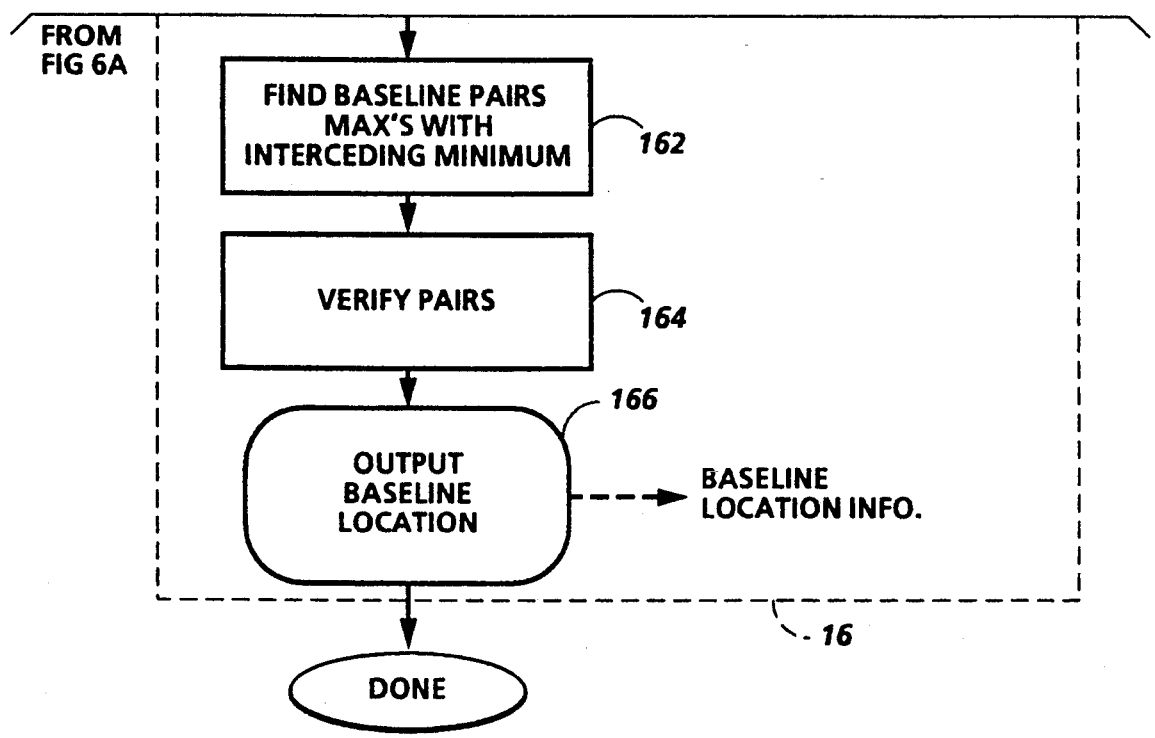

With reference first to FIG. 2, the method is performed on an electronic image of an original document 5, which may include lines of text 7, titles, drawings, FIGS. 8, or the like, contained in one or more sheets or pages of paper 10 or other tangible form. The electronic document image to be processed is created in any conventional manner, for example, by an input means, such as an optical scanner 12 and sensor 13 as shown, a copier machine scanner, a Braille reading machine scanner, a bitmap workstation, an electronic beam scanner or the like. Such means are well known in the art, and thus are not described in detail herein. An output derived from for example, a scanner sensor 13 is digitized to produce bit mapped image data representing the document image for each page of the document, which data is stored, for example, in a memory 15 of a special or general purpose digital computer 16. The digital computer 16 can be of the type that performs data driven processing in a data processing system which comprises execution processing means for performing functions by executing program instructions in a predetermined manner, such computers now being well known in the art. The output from the computer 16 is delivered to an output device, such as, for example, a memory or other form of storage unit, or an output display 17 as illustrated, which may be, for instance, a photocopier, CRT display, printer, facsimile machine, or the like.

In accordance with the invention, the frequency of selected image units is first determined as set forth in the aforesaid copending application of Cass et al. which is incorporated herein by reference. Thus, with reference now to FIG. 1, the first phase of the image processing technique of the invention involves a low level document image analysis in which the document image for each page is segmented into undecoded information containing image units (step 20) using conventional image analysis techniques; or, in the case of text documents, preferably using the bounding box method described in copending U.S. patent application Ser. No. 07/794,392 now U.S. Pat. No. 5,321,770, filed concurrently herewith by Huttenlocher and Hopcroft, and entitled "Method and Apparatus for Determining Boundaries of Words in Text". The locations of and spatial relationships between the image units on a page are then determined (step 25). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted. Advantageously, for purposes of document review and evaluation, the document image is segmented into sets of signs, symbols or other elements, such as words, which together form a single unit of understanding. Such single units of understanding are characterized in an image as being separated by a spacing greater than that which separates the elements forming a unit. Such image units representing single units of understanding will be referred to hereinafter as "word units."

Advantageously, a discrimination step 30 is next performed to identify the image units which have insufficient information content to be useful in evaluating the subject matter content of the document being processed. Such image units include stop or function words, i.e., prepositions, articles and other words that play a largely grammatical role, as opposed to nouns and verbs that convey topic information. One preferred method is to use the morphological function word detection techniques disclosed in the copending U.S. patent application Ser. No. 07/794,190 filed concurrently herewith by Bloomberg et al., and entitled "Detecting Function Words Without Converting a Document to Character Codes".

This application discusses binary images. In this context, the term "image" refers to a representation of a two-dimensional data structure composed of pixels. A binary image is an image where a given pixel is either ON or OFF. Binary images are manipulated according to a number of operations wherein one or more source images are mapped onto a destination image. The results of such operations are generally referred to as images. The image that is the starting point of processing will sometimes be referred to as the original image or source image.

A morphological operation refers to an operation on a pixelmap image (a source image), that uses a local rule at each pixel to create another pixelmap image, the destination image. This rule depends both on the type of the desired operation to perform as well as on the chosen structuring element.

Pixels are defined to be ON if they are black and OFF if they are white. It should be noted that the designation of black as ON and white as OFF reflects the fact that most documents of interest have a black foreground and a white background. The techniques of the present invention could be applied to negative images as well. The discussion will be in terms of black on white, but the references to ON or OFF apply equally well to images which have been inverted and, therefore, the roles of these two states are reversed. In some cases the discussion makes reference to a "don't care" pixel which may be either an ON or an OFF pixel.

A structuring element (SE) refers to an image object of typically (but not necessarily) small size and simple shape that probes the source image and extracts various types of information from it via the chosen morphological operation. In the attached figures that show SEs, a solid circle is a hit, and an open circle is a miss. The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A solid SE refers to an SE having a periphery within which all pixels are ON. For example, a solid $2 \times 2$ SE is a $2 \times 2$ square of ON pixels. A solid SE need not be rectangular. A horizontal SE is generally one row of ON pixels and a vertical SE is generally one column of ON pixels of selected size. A hit-miss SE refers to an SE that specifies at least one ON pixel and at least one OFF pixel.

AND, OR and XOR are logical operations carried out between two images on a pixel-by-pixel basis.

NOT is a logical operation carried out on a single image on a pixel-by-pixel basis.

EXPANSION is scale operation characterized by a scale factor N, wherein each pixel in a source image becomes an $N \times N$ square of pixels, all having the same value as the original pixel.

REDUCTION is a scale operation characterized by a scale factor N in a threshold level M. REDUCTION with scale=N entails dividing the source image into $N \times N$ squares of pixels, mapping each such square in the source image to a single pixel on the destination image. The value for the pixel in the destination image is determined by the threshold level M, which is a number between 1 and $N^2$. If the number of ON pixels in the pixel square is greater or equal to M, the destination pixel is ON, otherwise it is OFF.

EROSION is a morphological operation wherein a given pixel in the destination image is turned ON if and only if the result of superimposing the SE center on the corresponding pixel location in the source image results in a match between all ON and OFF pixels in the SE and the underlying pixels in the source image. An EROSION will give one pixel in the destination image for every match. That is, at each pixel, it outputs 1 if the SE (shifted and centered at that pixel) is totally contained inside the original image foreground, and outputs 0 otherwise. Note that EROSION usually refers to operations using a SE with only hits and more generally matching operations with both hits and misses (often called a hit-miss transform). The term EROSION is used herein to include matching operations with both hits and misses, thus the hit-miss transform is the particular type of EROSION used herein.

DILATION is a morphological operation wherein a given pixel in the source image being ON causes the SE to be written into the destination image with the SE center at the corresponding location in the destination image. The SEs used for DILATION typically have no OFF pixels. The DILATION draws the SE as a set of pixels in the destination image for each pixel in the source image. Thus, the output image is the union of all shifted versions of the SE translated at all 1-pixels of the original image.

FillClip is a morphological operation where one image is used as a seed and is grown morphologically, clipping it at each growth step to the second image. For example, a fillClip could include a DILATION followed by logically ANDing the DILATION result with another image.

OPENING is a morphological operation that uses an image and a structuring element and consists of an EROSION followed by a DILATION. The result is to replicate the structuring element in the destination image for each match in the source image.

CLOSING is a morphological operation using an image and a structuring element. It includes a DILATION followed by an EROSION of the image by a structuring element. A CLOSE of an image is equivalent to the bit inverse of an OPEN on the (bit inverse) background.

UNION is a bitwise OR between two images. An intersection is a bitwise AND between two images.

Blurring is a DILATION of an image by a structuring element(s) consisting of two or more hits.

A mask refers to an image, normally derived from an original or source image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to DILATION (noun form) may be in terms of DILATING the image or the image being DILATED (verb forms) or the image being subjected to a DILATION operation (adjective form). No difference in meaning is intended.

Morphological operations have several specific properties that simplify their use in the design of appropriate procedures. First, they are translationally invariant. A sideway shift of the image before transforming does not change the result, except to shift the result as well. Operations that are translationally invariant can be implemented with a high degree of parallelism, in that each point in the image is treated using the same rule. In addition, morphological operations satisfy two properties that make it easy to visualize their geometrical behavior. First, EROSION, DILATION, OPEN and CLOSE are increasing, which means that if image 1 is contained in image 2, then any of these morphological operations on image 1 will also be contained in the morphological operation on image 2. Second, a CLOSE is extensive and OPEN is antiextensive. This means that the original image is contained in the image transformed by CLOSE and the image transformed by OPEN is contained in the original image. The DILATION and EROSION operations are also extensive and antiextensive, respectively, if the center of the structuring element is located on a hit.

The OPEN and CLOSE operations also satisfy two more morphological properties:
  (1) The result of the operation is independent of the position of the center of the structuring element.
  (2) The operation is idempotent, which means that reapplying the OPEN or CLOSE to the resulting image will not change it.

An image unit means an identifiable segment of an image such as a word, number, character, glyph or other units that can be extracted reliably and have an underlying linguistic structure.

The term significant and its derivatives are used in this description to indicate the importance of particular characteristics of an image unit. An image unit with significant characteristics becomes a significant image unit in that it contains high value information which can be used for further processing of the document image. Significant characteristics of image units include a variety of classifiers such as length, width, location on a page of the document image, font, typeface and measurement by other parameters including, but not limited to:
  one or more cross-sections of a box (a cross-section being a sequence of ON or OFF pixels);
  a number of ascenders associated with an image unit;
  a number of descenders associated with an image unit;
  average pixel density in an image unit;
  a length of a topline contour of an image unit, including peaks and troughs;
  a length of a base contouring of the image units, including peaks and troughs; and
  the location of image units with respect to neighboring image units, e.g., vertical position and horizontal inter-image unit spacing.

Figure 27:
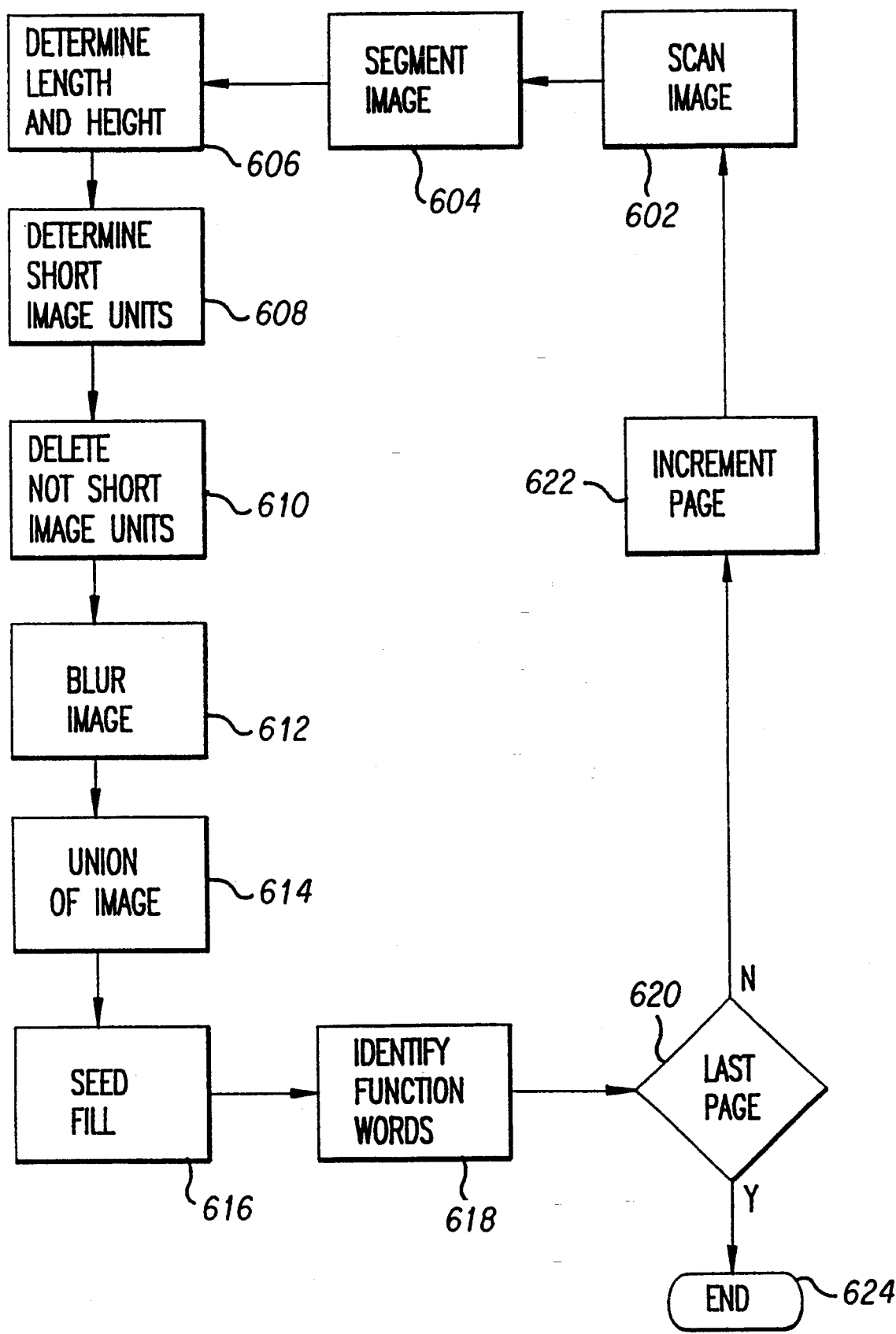
FIG. 27 is a flow chart of a preferred embodiment of a method according to the invention for detecting function words in a scanned document image without first converting the document image to character codes.

FIG. 27 is a flow chart of a preferred embodiment of a method according to the invention for detecting function words in a scanned document image without first converting the document image to character codes. An image of a page of a document is scanned in step 602 and the image is segmented into image units in step 604. The segmentation can be accomplished, for instance, by using first a technique to determine baselines of image units and then second a technique for providing bounding boxes around image units as described in the above incorporated concurrently filed U.S. Patent Application entitled "A Method of Deriving Wordshapes for Subsequent Comparison" by Huttenlocher et al., U.S. patent application Ser. No. 07/794,391. In step 606, a length and height of each image unit in the image is determined, and short image units are determined in step 608 as image units of no more than a predetermined number of characters, preferably three characters or less in length. In step 610, image units which are not short image units are deleted from the image. In step 612, the image is blurred or smeared in a horizontal direction although the image units are not smeared together. This can be accomplished for example by CLOSING the image with a horizontal structuring element such as the structuring element of length 5 (i.e., 5 pixels) as shown in FIG. 5. The length of the horizontal structuring element used to blur the x-height characters in the image is dependent upon the width of the character type being used. Furthermore, other configurations of structuring elements may be used in the CLOSING operation to obtain the same smearing effect. However, the most efficient and effective way to smear characters of x-height is to use a horizontal structuring element as described above.

A UNION of erosions is taken in step 614 of the image using a set of ascender matching structuring elements such as those shown in FIGS. 29A-1, 29A-2, 29B-1, 29B-2, and 29C-1, 29C-2, and, a set of descender matching structuring elements such as those shown in FIGS. 30A-1, 30A-2, 30B-1, 30B-2, 30C-1 and 30C-2. The UNION taken in step 614 provides optional noise elimination filtering, and the UNION will provide a seed from which to fill short image unit masks in a subsequent seed filling operation such as the fillClip operation of step 616. The UNION of step 614 acts on all image units remaining in the image (i.e., only short image units in this case) and since the UNION of erosions was taken using a set of ascender matching structuring elements and a set of descender matching structuring elements, the image units that will be filled are those containing ascender and/or descender characters, i.e., function words. The function words are identified in step 18 as those image units which are filled short image unit masks. In step 620 a test occurs to determine whether a last page of the document has been scanned. If the last page has been scanned, then the method terminates at step 624, otherwise the page is incremented in step 622 and the incremented (next) page is scanned in step 602 whereupon the image (next page) is scanned and the previously described steps of the method are reiterated. Of course, all pages could be scanned and stored as bit map images in a memory prior to performing the function word identification procedures described above. Moreover, the image segmentation step can also be performed prior to practicing the present invention (and the segmented image stored in memory) since segmentation has utility for procedures other than with the present invention.

Figure 28:
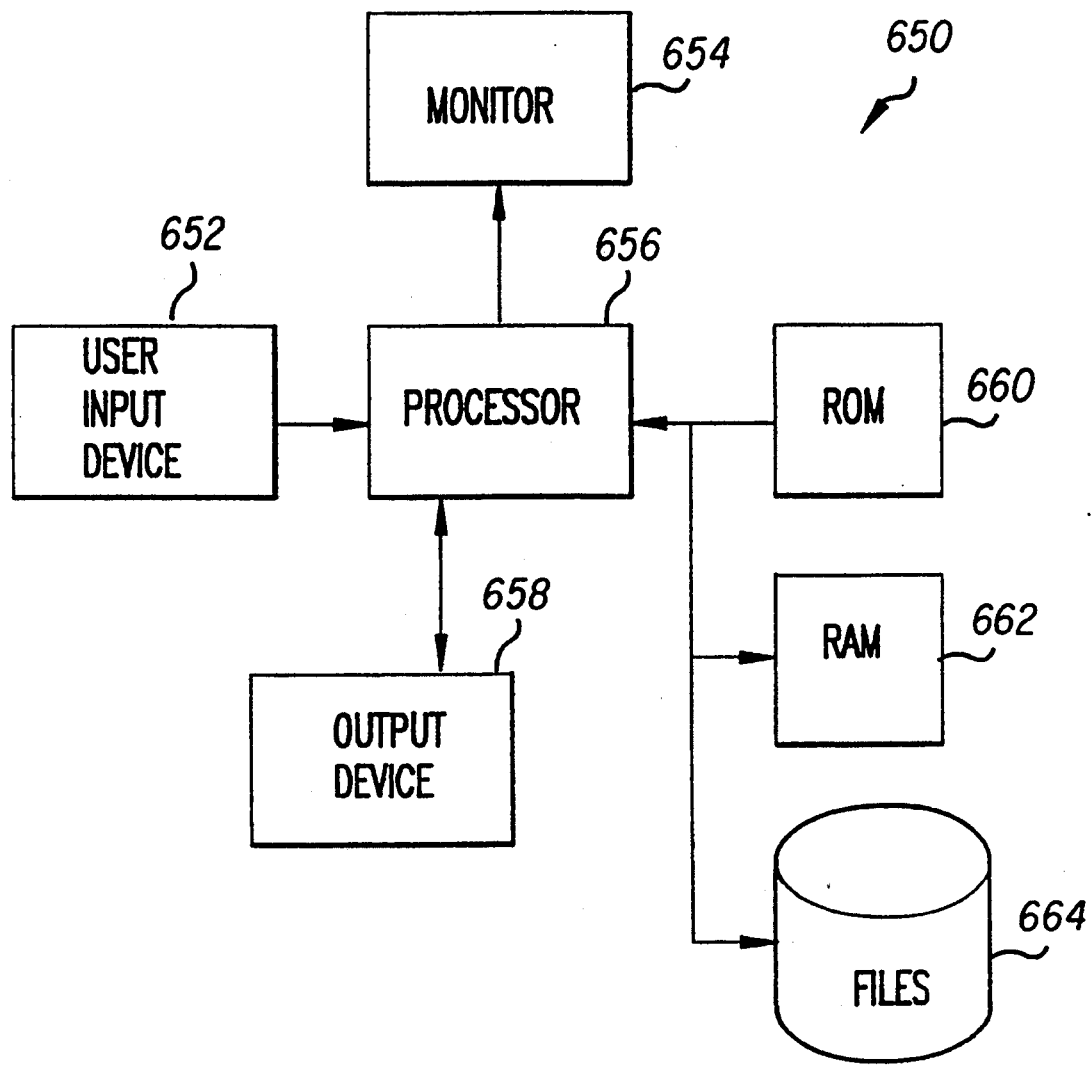
FIG. 28 is a block diagram of a preferred embodiment of an apparatus according to the invention for detecting function words in a scanned document image without first converting the document image to character codes.
Figures 1, 29C:
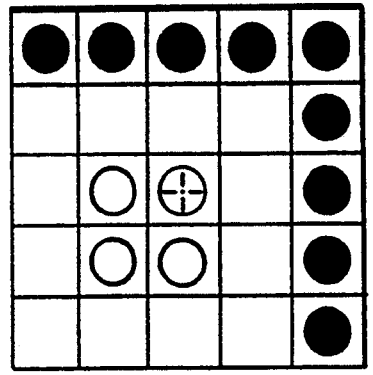
Figures 2, 29C:
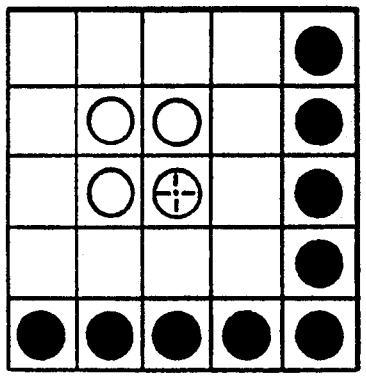
Figures 1, 29B:
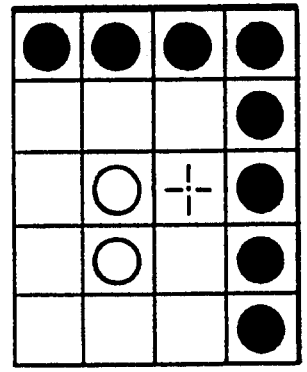
Figures 2, 29B:
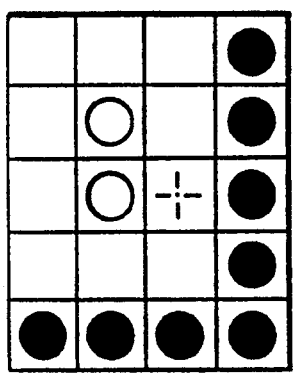
Figures 1, 29A:
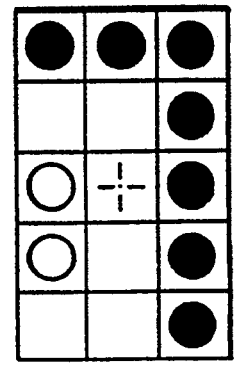
Figures 2, 29A:
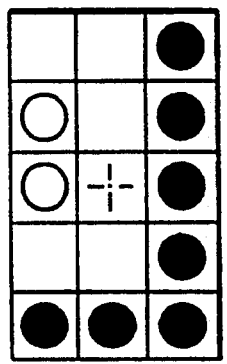
Figure 31:
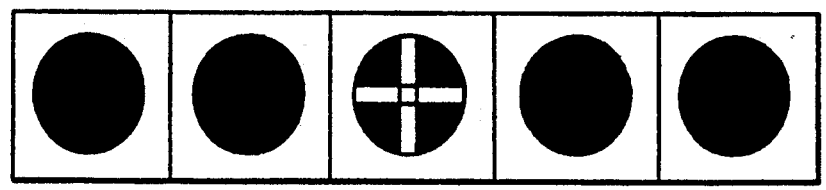
FIG. 31 shows a horizontal structuring element of length 5.

FIG. 28 is a block diagram of a preferred embodiment according to the invention of an apparatus 650 for detecting function words in a scanned document image without first converting the document image to character codes. The apparatus 650 includes a user input device 652 which includes, for example, one or more of an image scanner (optical or electronic) a keyboard, a touchscreen, a mouse, etc. The image scanner can be a stand-alone device, or part of a facsimile machine or document reproducing machine (copier). A processor 656 is connected to the input device 652 for processing the document image to segment the document image into image units, determine a length and height of each image unit, determine short image units as image units of preferably three characters or less in length, delete image units from the image that are not short image units, blur the image in a horizontal direction, take a UNION of erosions of the image using a set of ascender and descender matching structuring elements, fillClipping the image to provide short image unit masks filled for short image units with at least one ascender and short image unit masks filled for short image units with at least one descender, and identifying function words as those image units which are filled short image unit masks. Processor 656 operates to perform these functions in accordance with operating programs read from read only memory (ROM) 660, and by using random access memory (RAM) 662. Documents can be stored or retrieved from files 664, and processing results and user input information can be monitored on a CRT display monitor 654.

Next, in step 40, selected image units, e.g., the image units not discriminated in step 30, are evaluated, without decoding the image units being classified or reference to decoded image data, based on an evaluation of predetermined image characteristics of the image units. The evaluation entails a determination (step 41) of the image characteristics and a comparison (step 42) of the determined image characteristics for each image unit with the determined image characteristics of the other image units.

One preferred method for defining the image unit image characteristics to be evaluated is to use the word shape derivation techniques disclosed in copending U.S. patent application Ser. No. 07/794,391 filed concurrently herewith by Huttenlocher and Hopcroft, and entitled "A Method for Deriving Wordshapes for Subsequent Comparison," Published European Application No. 0543594, published May 26, 1993. As described in that application, at least one, one-dimensional signal characterizing the shape of the word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit. As part of this process, baselines of the text on a page are determined (a baseline is a line extending under the non-descending characters on a text line). It will be appreciated that the ordering of the word units along the baselines, and the ordering of the baselines on each document image page provides the reading order of word units in the document image.

Figure 3A:
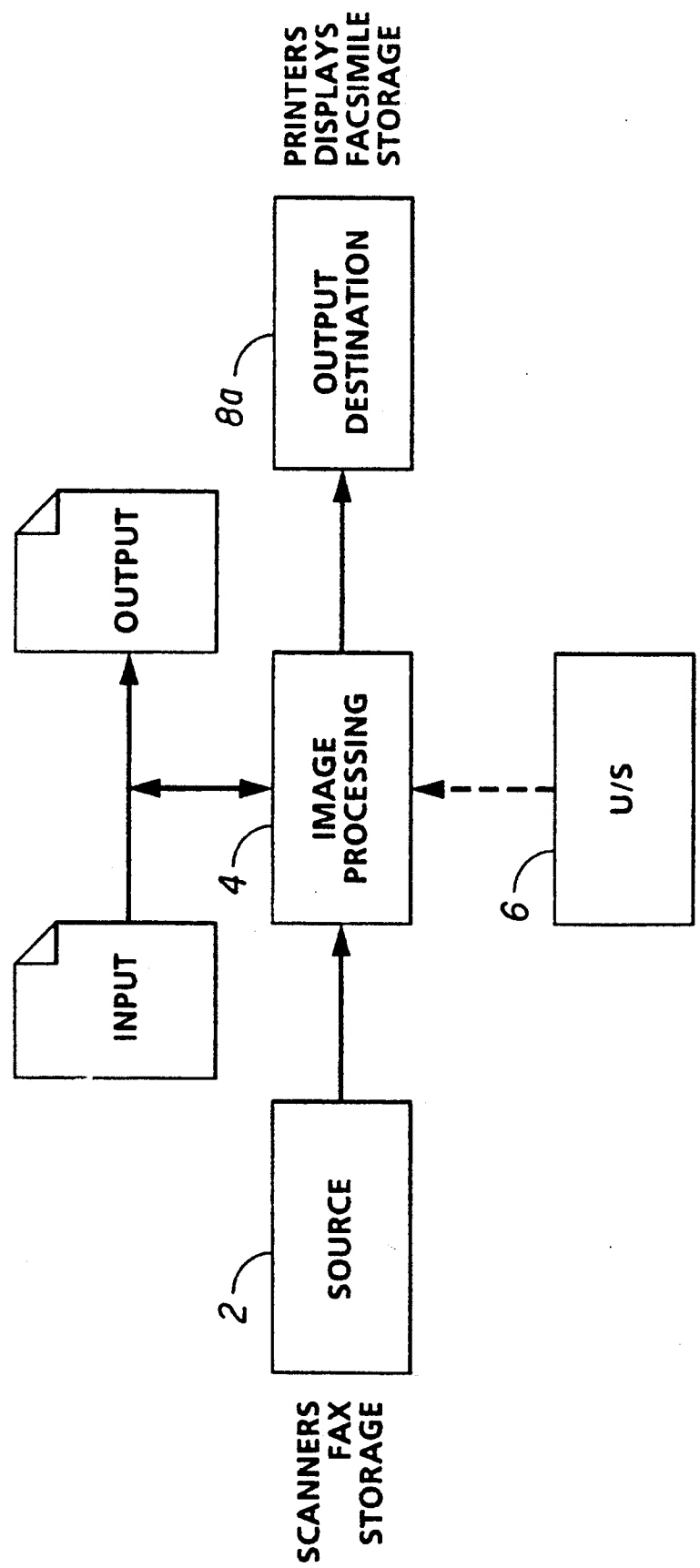
FIG. 3A shows a generalized system diagram of an image processing system in which the present invention would find use.

More specifically, this application discloses as illustrated in FIG. 3A, a generalized image processing system, which covers numerous situations in which the present invention may find advantageous use. Generally, a source image may be derived from a source image derivation system 2, which may be a scanner, facsimile device, or storage system. The source image is forwarded to a computer processing device 4 which may be any of several well known devices including the inventive device described herein. In response to commands entered at user interface 6, processing device 4 produces an output at an output device 8a, which may be a printer, display, facsimile device or other storage device. In essence, as is shown in the upper portion of FIG. 3A and 3B, an input document is directed into a system and an output document is retrieved from it.

In the following description, an image is generally described as an image bitmap, where an image is represented as a plurality of image signals. These signals, commonly referred to as pixels, are typically denoted as black when intended to represent a corresponding mark or active position on a document from which they were produced. However, these constructs have been used to enable the description of the present invention, and are in no way intended to limit the domain of such to that of black-and-white or binary images. Rather, the present invention is generally applicable across a broad range of image representation techniques.

FIG. 3B, shows a system which embodies the present invention for deriving, defining, and comparing words in terms of their shapes. It will, of course, be recognized that each element of the system may be many devices, or may simply be a program operated within a single device. Beginning with an input bitmap 10a, whose source is indeterminate, and not part of the invention, a bitmap of an image is initially directed to a segmentation system 12a, in which words, or character strings, or other multi-character units of understanding, will be derived. Initially, the image bitmap passes through skew detector 14, which determines the angle of orientation of text in the image. Using information about the orientation of the image, and the image itself, at text baseline processor 16a, toplines and baselines of the text are determined, so that upper and lower boundaries of lines of text within the image are identified. At median filter 18, the function referred to as "blobify" is performed, which operates on the image so that each word group in a line may be treated as a single unit. As used herein, "word" "symbol string" or "character string" refers to a set of connected alphanumeric or punctuation elements, or more broadly, signs or symbols which together form a single unit of semantic understanding. It will be appreciated that these terms may also be used to refer to the images thereof. Such single units of understanding are characterized in an image as separated by a spacing greater than that which separates the elements, signs or symbols forming the unit. To the blobified image, a set of white lines are added at block 20a, to clearly separate adjacent lines of text. The white lines are based on baseline determinations provided by processor 16a. Using this information, i.e., the blobified words, which are clearly separated from adjacent words and words in adjacent lines, a bounding box is defined about the word at block 22, thereby identifying and enclosing the word.

Thereafter word shape signal computer 24 derives a word shape signal representing the individual words in the image, based on the original image and the bounding box determinations. This information is then available for use at a word shape comparator 26, for comparing word shape signals representative of known words from a word shape dictionary 28, with the as yet unidentified word shape signals. In an alternative embodiment word shape comparator 26 may be used to compare two or more word shapes determined from image 10a. More importantly, word shape comparator 26 is not limited to the comparison of word shapes from unrecognized strings of characters to known word shapes. In a simplified context, comparator 26 is merely an apparatus for comparing one word shape against another to produce a relative indication of the degree of similarity between the two shapes.

In general, a method accomplishing the invention includes the following steps. Once orientation of the image is established and line spacing and word group spacing is established, each word can be surrounded by a bounding box. A reference line is then created extending through the character string image. The reference line may be a block having a finite thickness ranging from two-thirds of the x height to one-third of the x height, or in fact it may have a zero width. At the resolution of the image, the distance from the reference line to the upper edge of the text contour or bounding box is measured in a direction perpendicular to the reference line. Similarly, measurements may be made from the reference line to the lower bounding box edge or to the text contour along the lower portion of the word, whichever is closer. Because the set of values derived computationally can be expressed in terms of position along the horizontal axis versus length, the signal can be considered a single independent variable or one dimensional signal. Either or both of these sets of values may be used to describe the word shape. Additionally, although possibly less desirable, it is well within the scope of the invention to measure the distance of a perpendicular line drawn from the top of the bounding box or the bottom of the bounding box, to the first contact with the word or the reference line, as desired.

With a system and process for word shape derivation given, the invention may also be considered mathematically. Considering image data i(x,y), which in one common case could be an array of image data in the form of a bitmap, a character set is identified in one of many methods, perhaps as described above, which defines a boundary enclosing the selected symbol string within a subset of the array of image data. From i(x,y), an edge signal e(x,y), which represents the edges of i(x,y) detected within the closed boundary, is derived. The edge signal is augmented by adding additional data to i(x,y) so that e(x,y) is a signal e'(x,y) defined over its entire domain with respect to a single dimension or variable within the closed boundary. One, two, or more signals may be derived from e'(x,y) which are each one dimensional signals g'(t), where g is a function of parameter t which is a reference frame dependent parameter.

Figure 18:
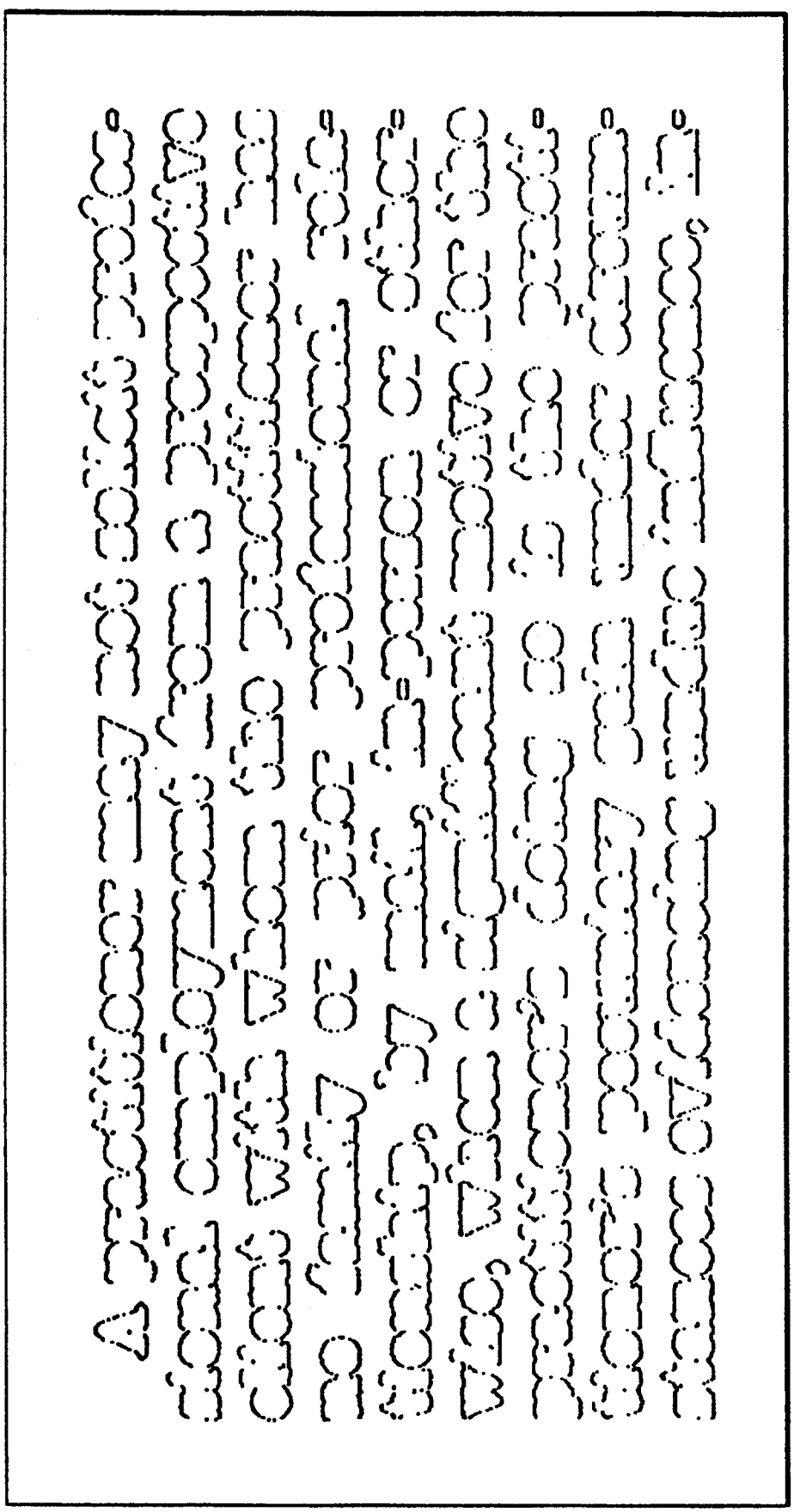
FIG. 18 illustrates the resulting contours formed by the derivation process illustrated in FIGS. 17A, B.

It is important to realize that the mathematical process used for the derivation of the one dimensional signal is essentially reversible up to the information it contains, e.g., a bitmap may be reconstructed from the upper and lower bitmap contours, as illustrated in FIG. 18. It will be noted that if the reference has a finite thickness and is therefore taken out of the image, that portion of the image is not identifiable, however, if it has a zero width the information still remains.

A recognition dictionary, or look up table of word shapes, can clearly be created through use of the described process. The process can be operated on using either scanned words as the source of the information, or in fact, they can be computer generated for a more "perfect" dictionary.

To demonstrate the process of the invention, at FIG. 4, a sample image, taken from a public domain source is shown, having several lines of text contained therein. FIG. 4 demonstrates approximately how the image would appear on the page of text, while FIG. 5, shows a scanned image of the page, which demonstrates an enlargement of the image of a bitmap that would present problems to known OCR methods. Looking at, for example, the image of the word 50a "practitioner" in the first line of the text image, it may be seen that several of the letters run together. Also, at the lower right hand portion of the image, circled and numbered 52, noise is present. Looking at the word "practitioner's", circled and numbered 54, the running together of a punctuation mark and a letter is further noted.

Figure 6A:
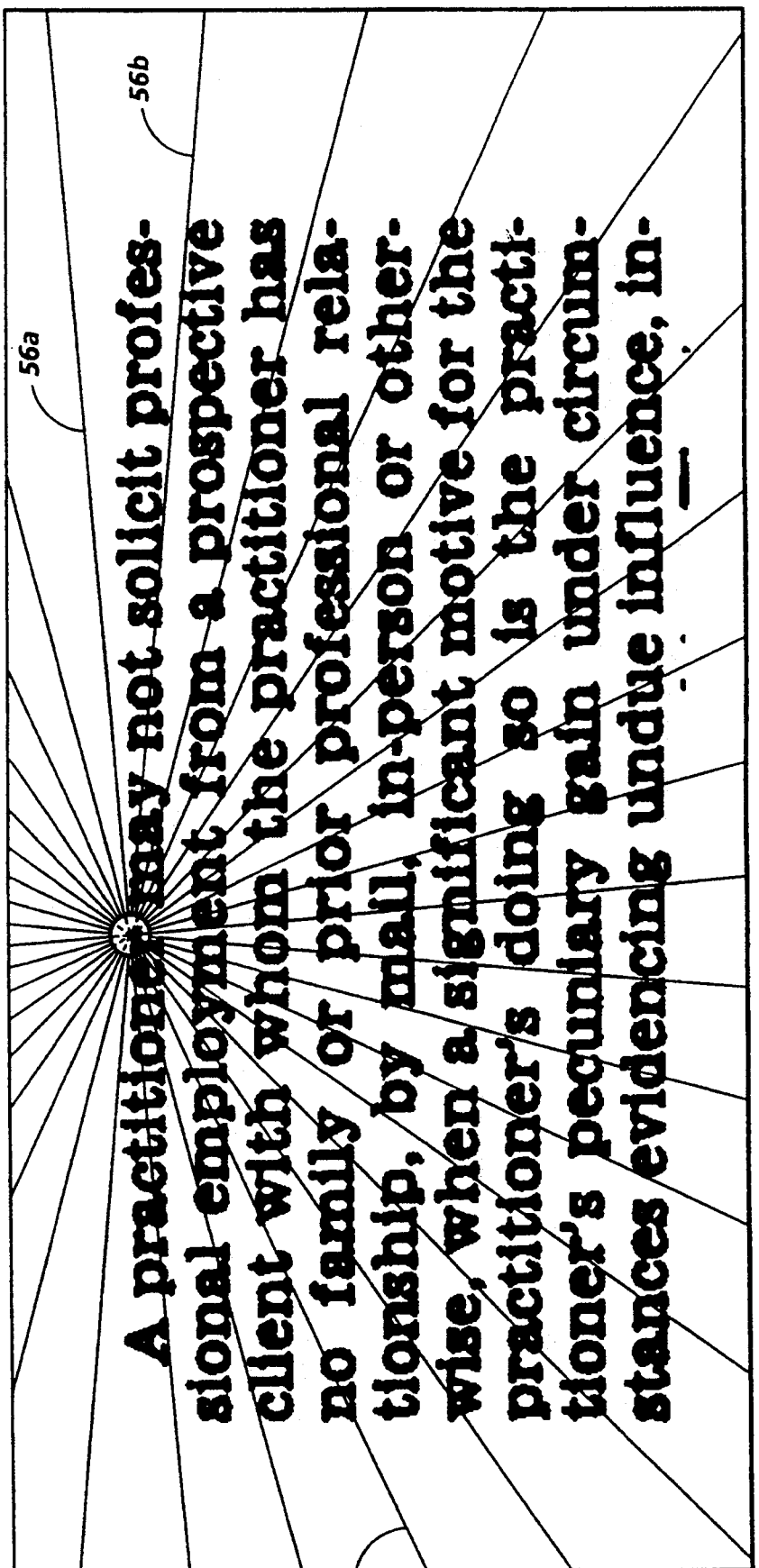
Figure 6D:
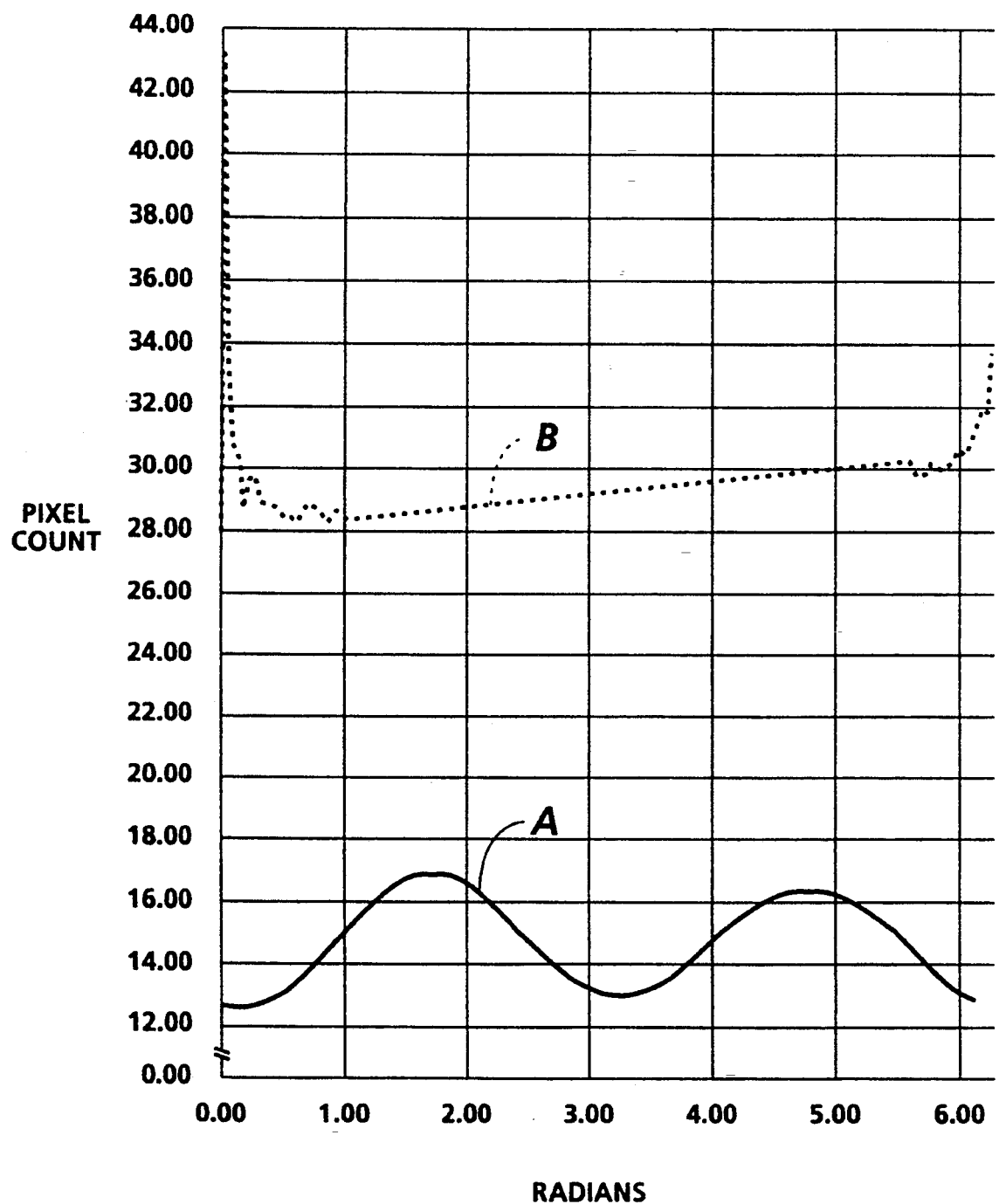
FIG. 6D shows graphs of the responses taken from the example text, which are used to determine the angle at which the example text is oriented in the image sample prior to further processing.

With reference again to FIG. 3B, in one possible embodiment of the invention, skew detector 14, may be implemented using a general method for determining the orientation of the text lines in the image. This method looks at a small number of randomly selected edge pixels (defined as a black pixel adjacent to at least one white pixel), and for each edge pixel considers, at FIG. 6A, a number of lines, 56a, 56b, 56c being examples, extending from the pixel at evenly spaced angular increments over a specified range of angles. The edge pixels are selected randomly from the set of all image pixels by the function RandomEdgePixel() (Appendix, page 243). FIGS. 6A (see lines 56a, 56b, 56c), 6B (see lines 58a, 58b, 58c) and 6C (see lines 60a, 60b, 60c) represent a series of increasingly smaller angular ranges over which the above mentioned technique is applied to illustrative edge pixels to accurately determine the angular orientation of the text within the image. Subsequent to finding edge pixels and defining the lines, skew detector 14 traces the path of each line, determining the lengths, in pixels, of strings of successive black pixels which are intersected by the line. Upon reaching the image boundary, an average black pixel string length is calculated by summing the lengths of the individual strings, and dividing the sum by the total number of distinct strings which were found. This operation is carried out for all the lines, thereby arriving at an average black pixel string length for each line extending from the selected edge pixel. These lengths are plotted on FIG. 6D as curve A, showing minima at approximately 0 and 3.14 radians. Curve A is a graphical representation of the summation/averaging function over each of a series of angled lines extending from the edge pixel, and spread over a range from 0 to $2\pi$ radians. Once a first minimum has been located, verification of the minimum (in the example, approximately 0 radians) is achieved by determining whether a second minimum exists at approximately $\pi$ radians from the first minimum. Upon verifying the existence of a second minima (in the example, approximately 3.14 or $\pi$ radians), a coarse skew angle is identified. Subsequently, it is necessary to more closely determine the skew angle of the text. This is accomplished by utilizing a number of lines which extend from a randomly selected edge pixel, where the lines differ by smaller angular increments, and the angular range is centered about the coarse skew angle. However, the fine skew angle may be determined by analyzing the total number of black pixels contained along a predetermined length of the lines. More specifically, the number of pixels over a unit distance are plotted as curve B on FIG. 6D, and the fine skew angle is determined by identifying the maxima of the curve. In other words, the point of the curve where the highest concentration of black pixels per unit line length exists, more accurately represents the angle of the text lines in the image. As shown by curve B, this results in a fine skew angle of approximately 0 radians, where the line intersects with the most black pixels along its length, and therefore is representative of the closest angle of orientation that needs to be determined.

Alternatively, the skew angle may be determined as indicated by the NewFine() function (Appendix, page 245), which determines the skew angle using multiple iterations of the procedure described with respect to the fine angle determination. As indicated by FIGS. 6A, 6B, and 6C, each iteration would also use lines covering an increasingly smaller angular range, until a desired skew angle accuracy is reached. In the implementation illustrated by FIGS. 6A, 6B, and 6C, the desired accuracy is achieved by a series of three iterations, each using a series of 180 distinct angles about the selected edge pixel.

Figure 7A:
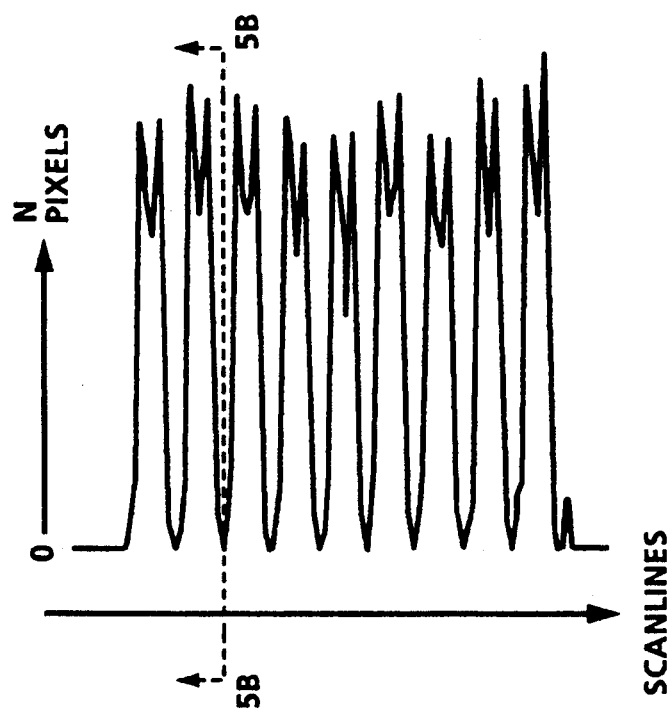
FIGS. 7A and 7B respectively show the derivation and use of a graph examining the sample image of the example text to determine baselines of text within the image.
Figure 7B:
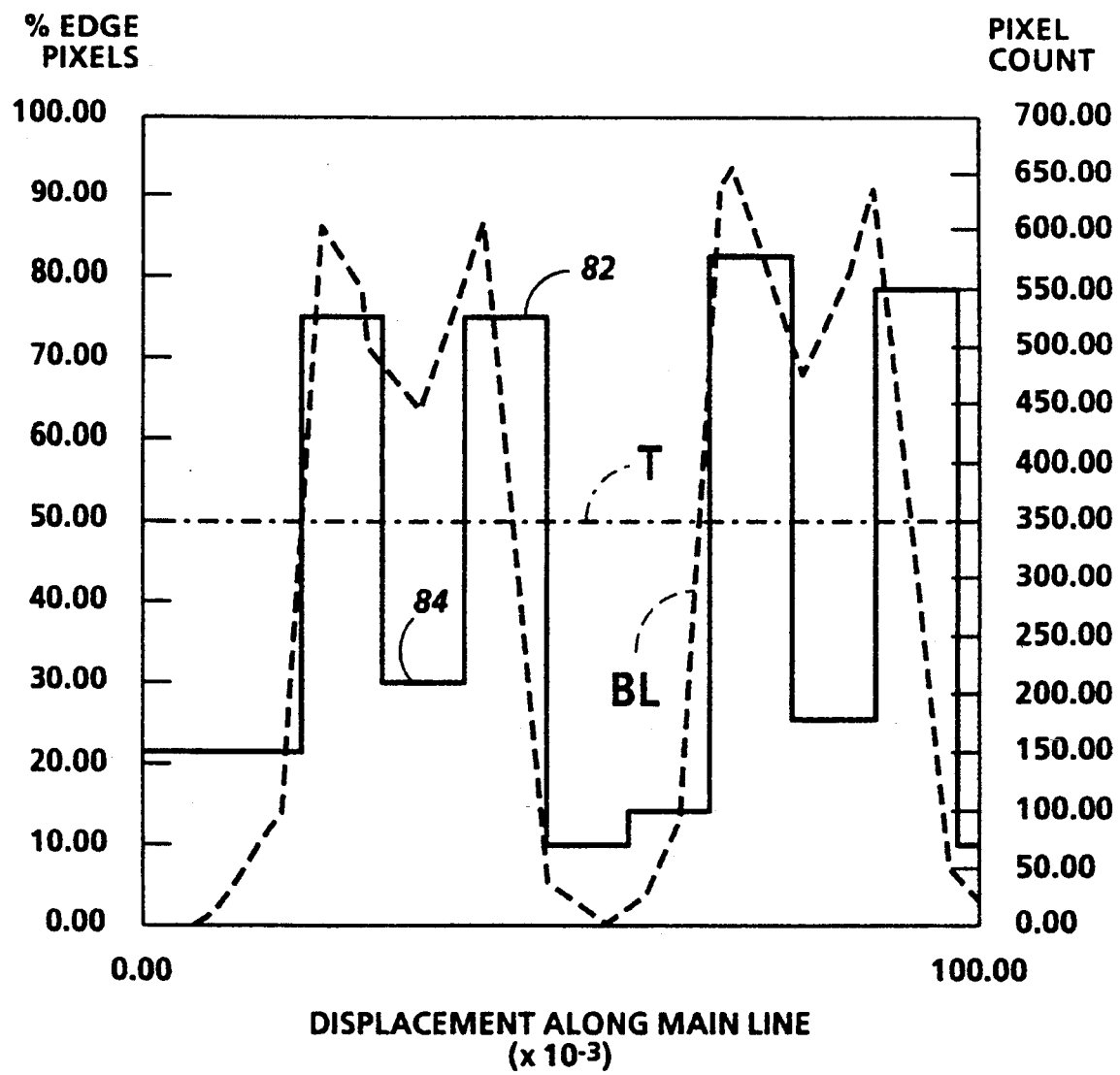

In the next process step, illustrated in the graphs of FIG. 7A and FIG. 7B, text baseline processor 16a identifies the characteristic lines, upper topline and lower baseline, of each line of text. The process steps executed by text baseline processor 16a are illustrated in detail in FIG. 8A and 8B. The histogram of FIG. 7A, shown to the left along the image, is derived by examining lines, at the resolution of the image, and oriented parallel to the skew orientation of the image, as defined by the previously determined skew angle. These parallel lines spanning the image are used to determine the number of black pixels intersected by each of the lines. Along lines passing through inter text line spaces, no black pixels should be intercepted, while along lines through the text, large numbers of black pixels should be intercepted.

More specifically, the function BaseLines(), (Appendix page 160), first finds the coordinates of a "main" line, block 142, constructed through the center of the image and perpendicular to the text lines, as determined by the skew angle passed to the function as shown by block 140. Next, Line Engine Procedure 144 is executed, where by proceeding along the main line from one end to the other, at a series of points along the main line, perpendicular branch lines are constructed which extend outwardly from the main line for a fixed distance, block 146. Along the branch lines, the number of black vertical edge pixels are counted, block 148, and the number of black pixels intersected by the lines are counted, block 150, and summed for the opposing pairs of lines, block 152. Black vertical edge pixels, as counted by block 148, are defined as black pixels having a white neighboring pixel at either the upper or lower neighboring pixel position. LineEngine()procedure 144 is repeated until all points, and associated branch lines, along the main line have been processed, as determined by decision block 154. An x-height value may be returned from this procedure, which will subsequently be used by the word shape computer 24.

Subsequently, the counts for all the branch lines are analyzed to determine the branch line pairs having the highest ratio of black vertical edge pixels to black pixels. In general, those lines having the highest percentages would correspond to lines passing along the upper and lower edges of the characters which form the text lines. As illustrated in the enlarged view of FIG. 7B, a definite distinction exists between those branch lines having a high vertical edge pixel ratio, line 82, and those having a low ratio, line 84. Application of a filter mask and comparison of the maximum peaks within the mask enables the identification of those lines which represent the text toplines and baselines, for example, line 82. The process is implemented in the maxFilter.c module, beginning at line 57, the code for which is also incorporated in the newBaselines.c module at line 274, page 214. Baseline determination is described in further detail in a copending U.S. Patent Application, for a "Method for Determining Boundaries of Words in Text", Huttenlocher et al., U.S. patent application Ser. No. 07/794,392, now U.S. Pat. No. 5,321,770 which has been previously incorporated herein by reference. An additional test may also be applied to the histogram operation of step 150. This added test, a boolean test, may be used to assure that a minimum run of black pixels was detected during the analysis of the line. For example, a flag, which is cleared at the start of each branch line analysis, may be set whenever a series of five sequential black pixels are detected along the line. This test would assure that small noise or image artifacts are not recognized as baselines due to a high vertical edge pixel ratio.

As an alternative method, it is possible to utilize the total number of black pixels lying along the branch lines to determine the locations of the baselines. Using histogram curve BL, which represents the number of black pixels counted along the branch lines, it is possible to determine which branch lines have the most black pixel intersections. Applying a threshold of the maximum allows the determination of the upper and lower characteristic line pairs for each text line. Hence, the rising and falling portions of the histogram curve BL, constitute the characteristic lines of the text, and the threshold would be used to specifically identify the localized maxima surrounding an intervening minima, thereby enabling identification of the baseline positions which would be used for further processing. More importantly, this alternative approach, illustrated as step 162, may be utilized to identify the upper and lower baselines of a baseline pair, based upon the slope of the BL histogram curve. It is important to note that there is little additional processing associated with the identification step as the histogram information was collected previously during step 150. Once the preliminary characteristic line or baseline pairs are identified, block 162, a verification step, block 164, is executed to verify that the baseline pairs are separated by more than a minimum distance, the minimum distance being established by calculating the average line pair separation for all line pairs in the image. After verification, the valid baseline information is stored by output block 166 for later use by the white line addition and segmentation blocks, 18 and 20a, respectively.

Figure 9:
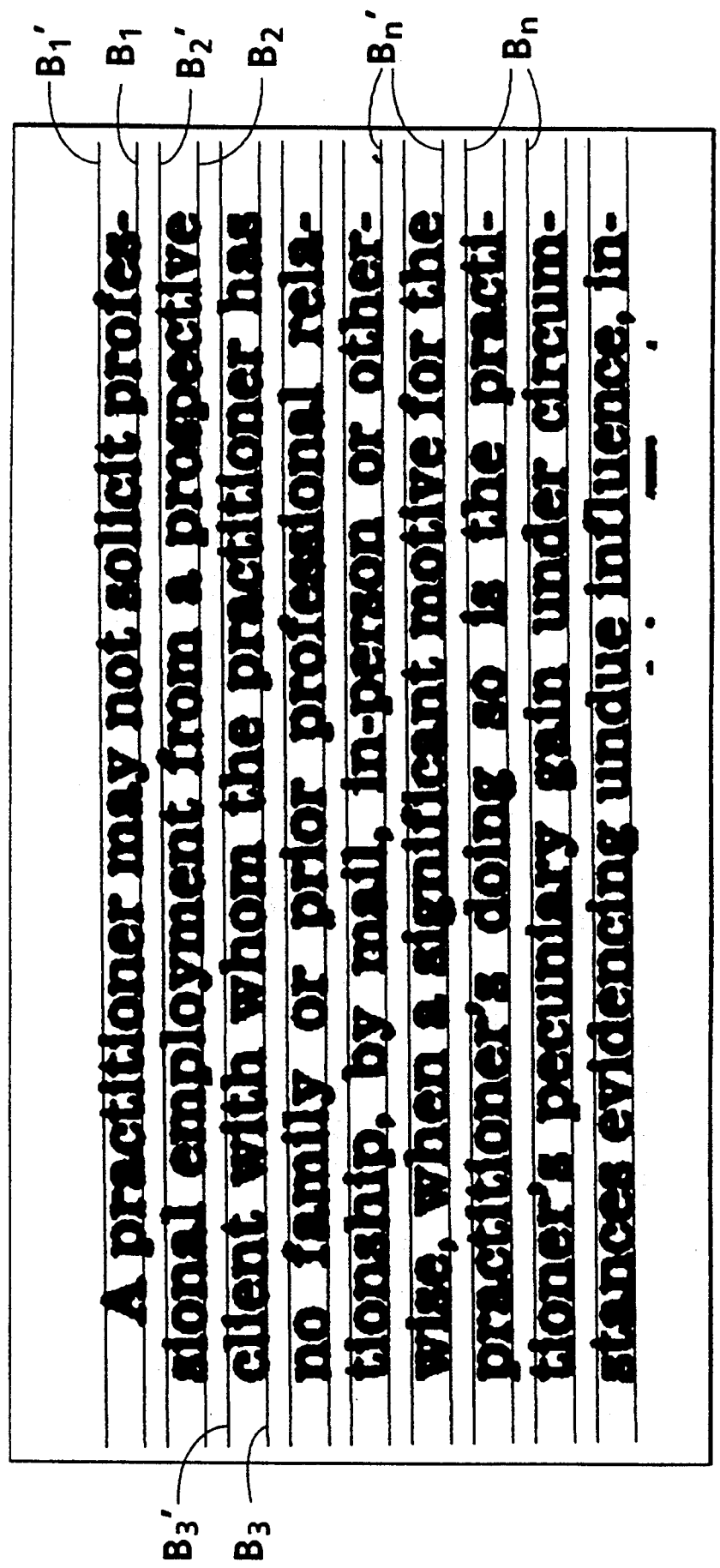
FIG. 9 shows the scanned image of the example text with baselines indicated thereon after derivation from the data shown in FIGS. 7A and 7B.

An important advantage of these baseline determination methods, are that they are highly insensitive to noise or extraneous marks in the interline space. FIG. 9 shows the result of the baseline determination on the example image of the sample text, showing that baseline pair, baseline and topline $B_n$ and $B_n'$, respectively, have been located on the image, indicating those portions of the image in which a predominant portion of the text occurs. While some portions of the character ascender strokes are outside the baselines, no detriment to the remainder of the process is noted. Of course, a smaller threshold value might enable the system to capture more of the ascending strokes.

Figure 10:
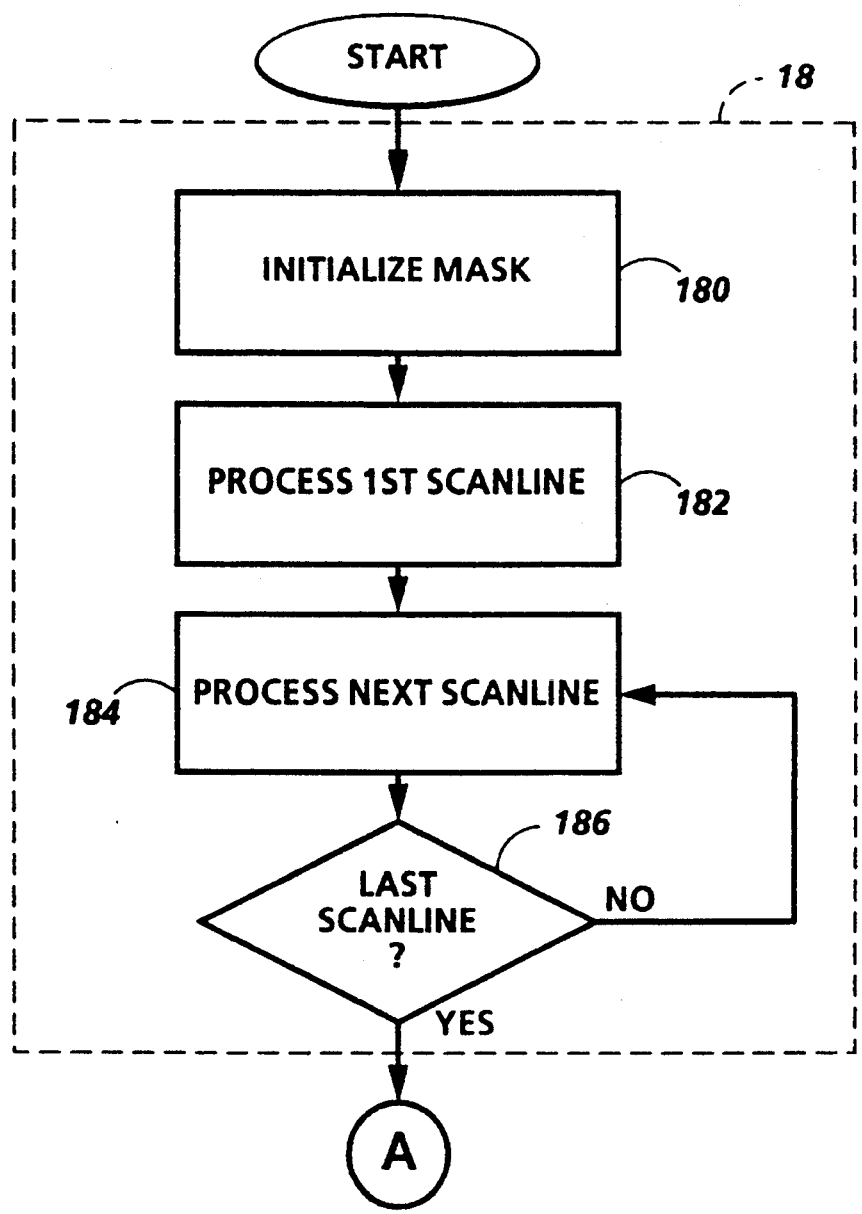
FIG. 10 is a flowchart illustrating the steps used in the application of a median filter to the image of FIG. 4.
Figure 11:
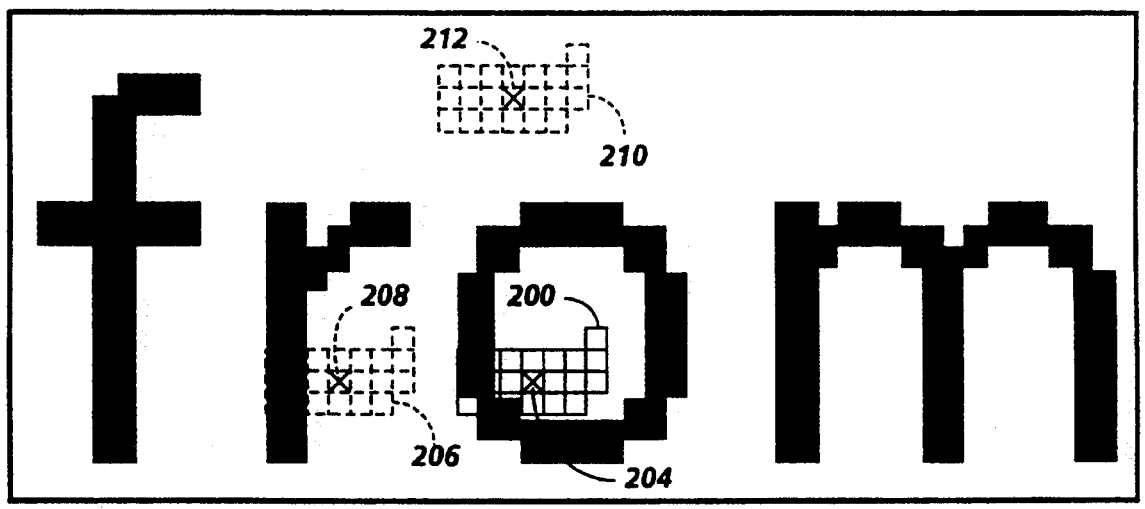
FIG. 11 is an enlarged pictorial representation of a portion of the image of FIG. 4, illustrating the application of the median filter.

With reference again to FIG. 3B in conjunction with FIGS. 10 and 11, the next process step is a word group isolation step. A filter 18 is applied to a copy of the image which results in an image that tends to render the word into blobs distinguishable from one another. The filter is applied with a small window, to each area, to render as black those areas that are partly black. As shown in FIG. 10, the blobify function (Appendix page 165) first initializes mask variables which establish the mask size and angle, block 180, and then processes the upper scanline to initialize the data array, block 182. Median filtering is accomplished by sequentially moving the mask window through the image, blocks 184 and 186, and whenever the number of black pixels appearing in the window exceeds a threshold value, the target pixel, about which the window is located, is set to black. FIG. 11, which illustrates some examples of the filter process, has a mask window 200 placed over a portion of the image. For example, with a twenty percent threshold and a generally rectangular mask having twenty-one pixels, arranged at an angel approximately equal to the skew determined for the text, the result of filtering in window 200 would be the setting of pixel 204 to black. Similarly, window 206, which primarily lies within the intercharacter spacing between the pixel representations of the letters "r" and "o", would cause pixel 208 to be set to black. On the other hand, window 210, which lies in the region between word groups, would not have a sufficient number of black pixels present within the window to cause pixel 212 to be set to black. The size, shape and orientation of mask window 200 is optimized to reduce the filling in between text lines, while maximizing the fill between letters common to a single word.

Figure 12:
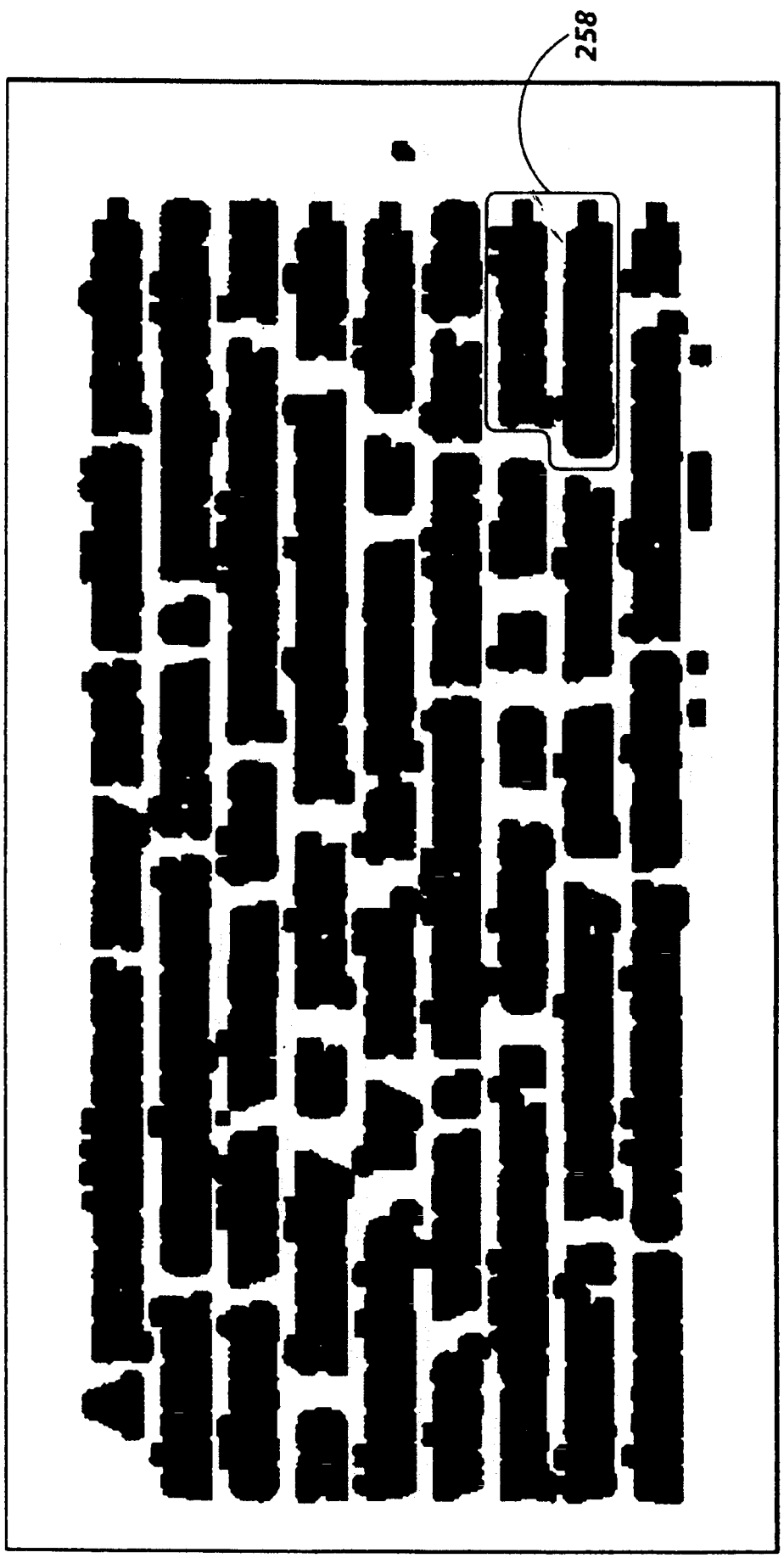
FIG. 12 demonstrates the resulting image after application of a median filter, a process known herein as blobifying, to the scanned image of the example text, which tends to render character strings as a single set of connected pixels.

As illustrated by FIG. 12, the result of the median filtering is that the relatively small spacing between characters in a word generally becomes inconsequential, and is filled with black pixels. Words become a single connected set of pixels, i.e., no white spaces completely separate characters in a single word. However, the relatively large spacing between character strings or between words, is a larger space outside of the ability of the filter to turn into black, and therefore serves to distinguish adjacent symbol strings. With reference now to FIGS. 9 and 12, it can be seen that the first two words of the sample text, "A" and "practitioner" have been "blobified", as this process is referred to, so that, for example, the "p" of "practitioner" is no longer separated from the "r" of that word. (Compare, FIG. 5). Once again, despite the blobifying or blurring of characters, "A" and "practitioner" remain as discrete blobs of connected symbols, or words.

Figure 13:
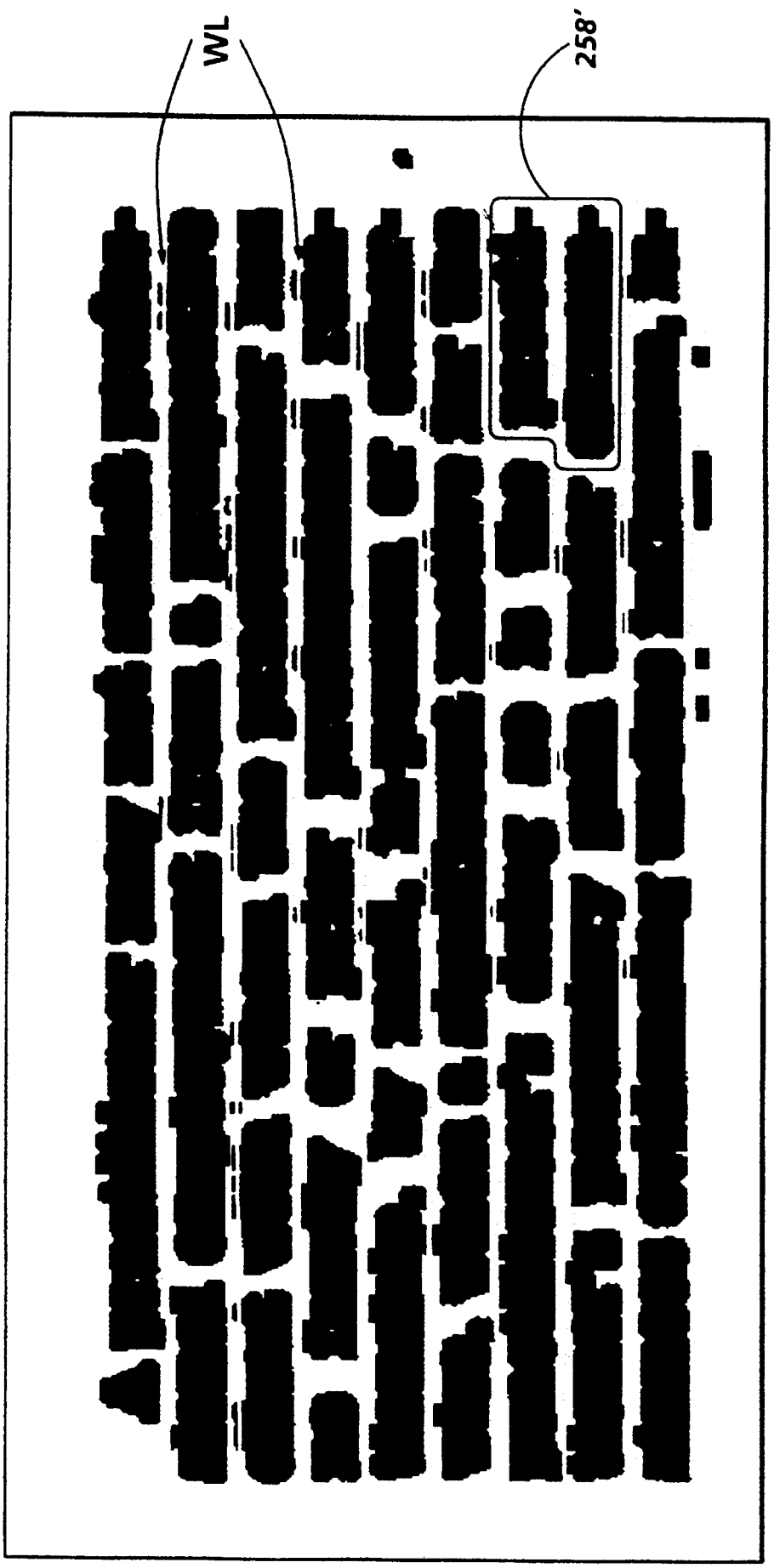
FIG. 13 shows a subsequent step in the process, in which lines of white pixels are added to the blurred image to clearly delineate a line of character strings from adjacent lines of character strings.

With reference again to FIG. 3B, as an adjunct to this step, white line addition 20a, superimposes upon the blobified image of FIG. 12 a series of white pixel lines to make certain that lines of text are maintained separately from adjacent lines of text (i.e., no overlapping of the filtered text lines). With reference to FIGS. 12 and 13, noting the circled areas 258 and 258', a combination of an ascender and descender has resulted in an interline merging of two words. The text line overlap illustrated in area 258 of FIG. 12 is exactly what is eliminated by superimposing the white lines on the blobified or filtered image.

Figure 14:
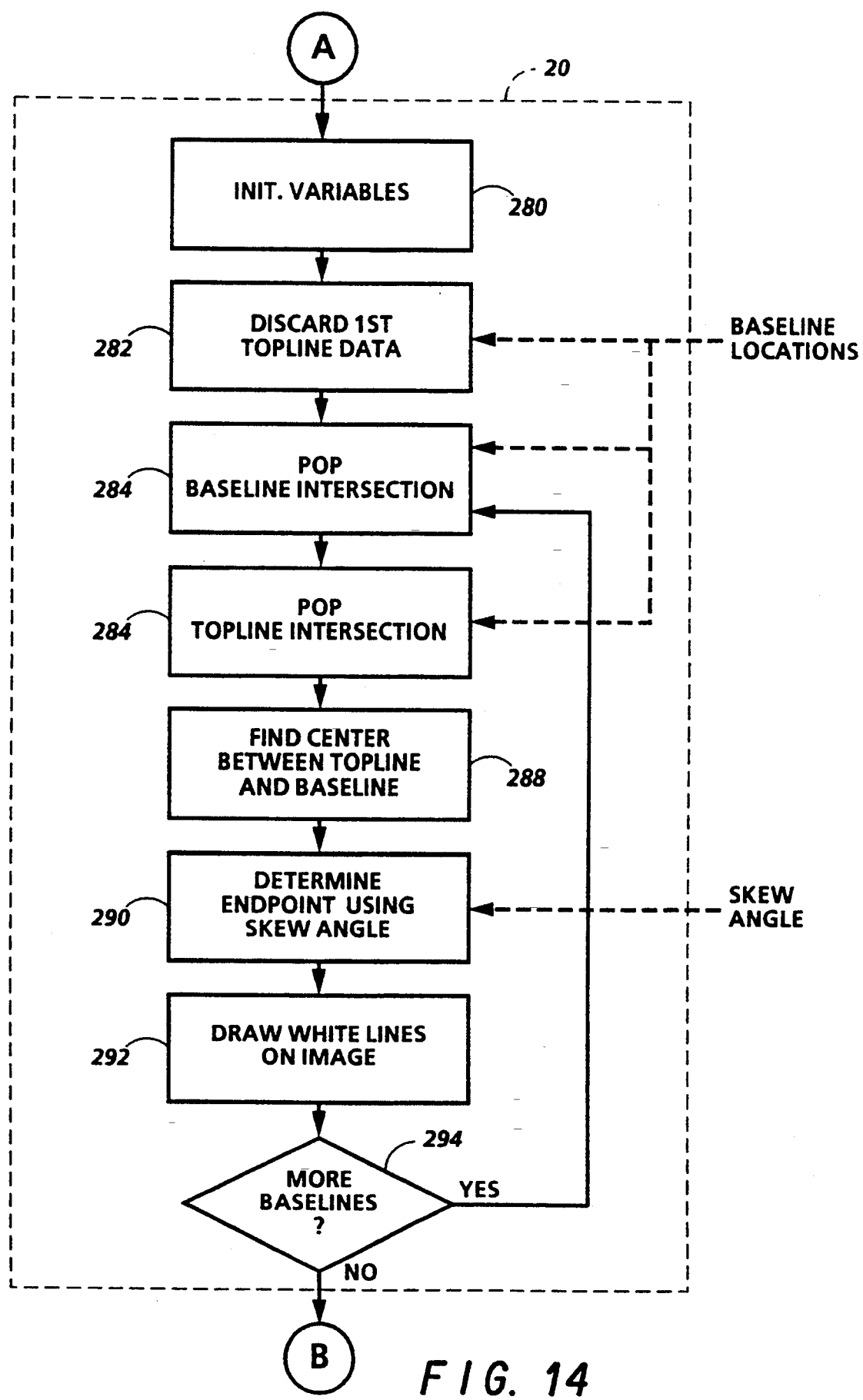
FIG. 14 is a flowchart illustrating the steps required to add the white lines of FIG. 13.

This superposition of white lines operation, the outcome of which is illustrated by FIG. 13, is carried out by the process illustrated in FIG. 14 as executed in the DrawMiddleLines() function (Appendix page 233). Generally, white lines WL are added to the image, approximately halfway between adjacent baseline and topline pairs, to assure that there is no cross-text line blobifying. Once again, FIG. 13 shows the result of white line addition to the blobified image of FIG. 12.

Referring now to FIG. 14, white line addition block 20a begins by initializing variables in step 280 and subsequently reads in the topline location from the baseline information of the first text line. The topline information is discarded, block 282, and the next baseline and topline locations are popped from the storage stack or list, blocks 284 and 286, respectively. With respect to the image, this baseline-topline pair respectively represents the bottom and top of adjacent text lines. Next, at step 288, the point lying at the center of the pair is located to provide a starting point for the white lines which are drawn from the center of the image in an outward direction. The endpoints of the white lines are calculated in step 290, using the skew angle determined by skew detector I 4 of FIG. 3B. White lines are drawn or superimposed on the blobified image at step 292, and the process is continued until all text lines have been effectively separated, as controlled by test block 294.

With reference again to FIG. 3B, as a result of the blobify or median filtering, the position of bounding boxes about each connected set of pixels formed in the blobify step may be determined. Bounding boxes are placed only about those connected components or words that are in a text line lying between the superimposed white lines. The bounding boxes are placed at the orientation of the text line, by identifying the extreme points of each group of connected pixels in the direction of the text line, and in the direction orthogonal to the text line, as opposed to the image coordinate system. This operation is performed by the function FindBorders(), (Appendix, page 172). Generally, the FindBorders function steps through all pixels within the image to find the bounding boxes of the connected characters (Paint Component), to determine the coordinates of the upper left corner of each box, as well as the length and width of the box.

Figure 15A:
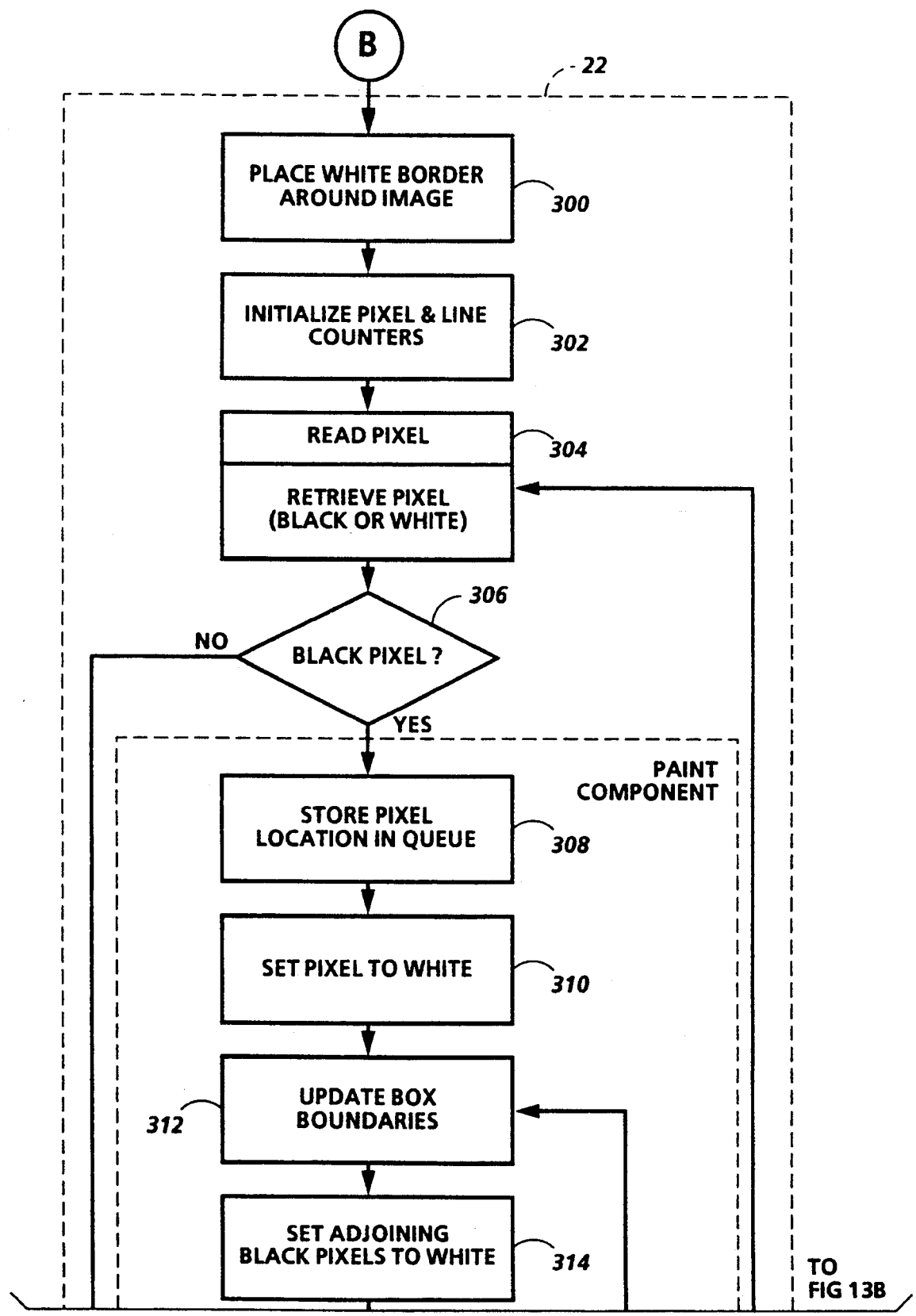
FIGS. 15A and 15B are flowcharts representing the procedure which is followed to segment the image data in accordance with the blurred image of FIG. 12.
Figure 15B:
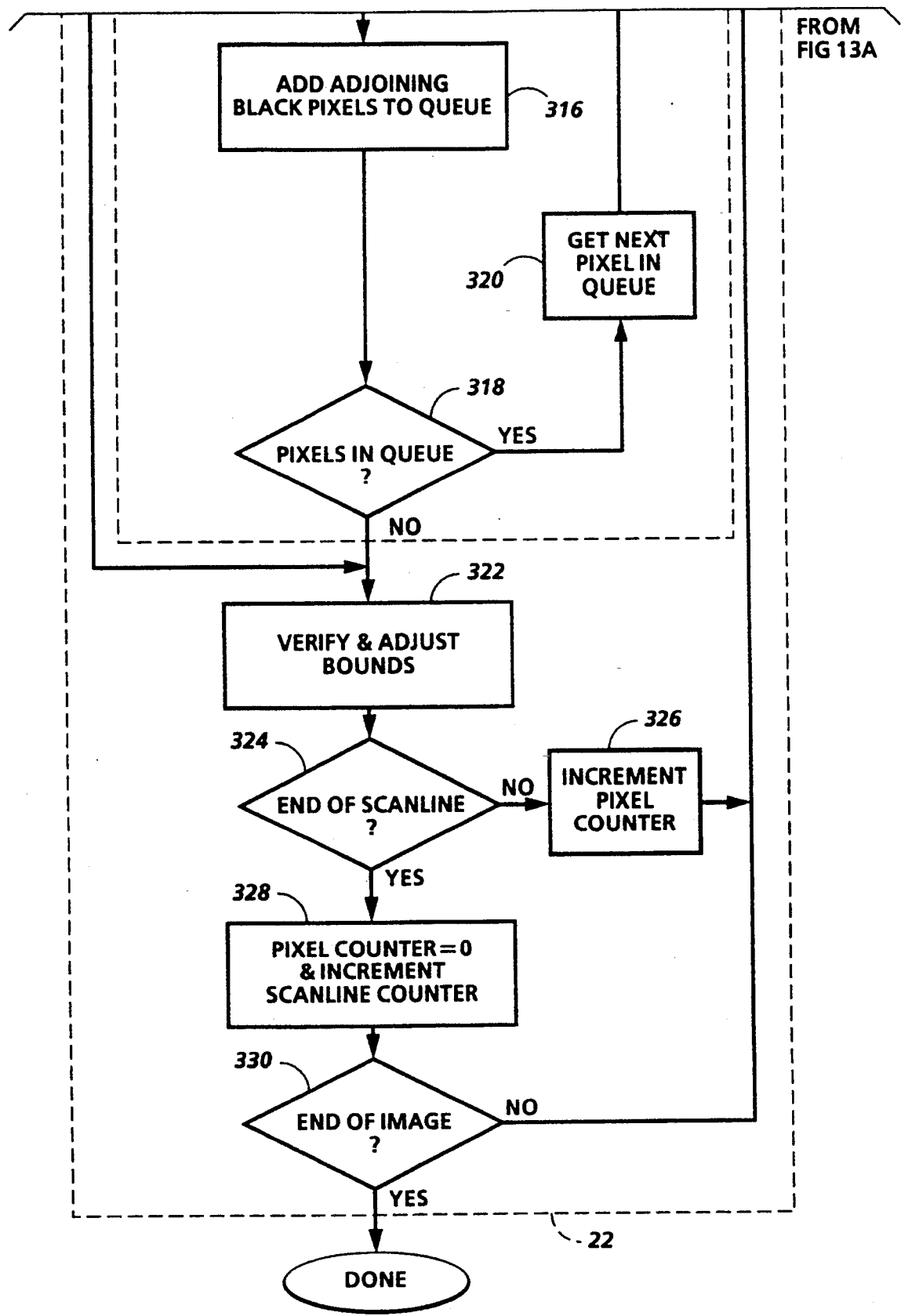

Referring now to FIGS. 15A and 15B, which detail the FindBorders() procedure, segmentation step 22 begins by placing a white border completely around the filtered image, step 300. This is done to avoid running outside the edge of the array of image pixels. Next, pixel and line counters, x and y, respectively, are initialized to the first pixel location inside the border. Calling the ReadPixel procedure, block 304, the pixel color (black or white) is returned and tested in block 306. If the pixel is white, no further processing is necessary and processing would continue at block 322. Otherwise, the PaintComponent() procedure (Appendix, page 171) is called and begins by storing the location of the black pixel in a queue, block 308. Subsequently, in a copy of the image, the pixel is set to white and the boundaries of the box, surrounding the connected pixels or components, are updated, blocks 310 and 312, respectively. Next, adjoining black pixels are set to white, block 314, and the locations of the black pixels are added to the end of the queue, block 316. At block 318 the queue pointers are tested to determine if the queue is empty. If not empty, the next pixel in the queue is retrieved, block 320, and processing continues at block 312. Otherwise, if the queue is empty, all of the connected black pixels will have been set to white and the box boundaries will reflect a box which encompasses the connected components. Subsequently, the boundaries of the box which encompasses the word segment are verified and may be adjusted to an orthogonal coordinate system oriented with respect to the skew of the text lines, block 322.

It will no doubt be apparent here that while finding each text line is an integral part of the described method, and serves to make the present embodiment more robust, other methods of deriving the information acquired by that step are possible. The primary use of the text line finding function is a) to determine x-height, and b) define the white line addition for separating interline blobs. Certainly this step may be removed, with a sacrifice in robustness, or other means of deriving the necessary information may be available.

The looping process continues at block 324 which checks pixel counter x to determine if the end of the scanline has been reached, and if not, increments the counter at block 326 before continuing the process at block 304. If the end of the scanline has been reached, pixel counter x is reset and scanline counter y is incremented at block 328. Subsequently, block 330 checks the value of scanline counter y to determine if the entire image has been processed. If so, processing is completed. Otherwise, processing continues at block 304 for the first pixel in the new scanline.

Thus, as shown in FIG. 16, for the word "practitioner" the extremities of the connected character image define the bounding box. Once bounding boxes have been established, it is then possible at this step, to eliminate noise marks from further consideration. Noise marks are determined: 1) if a bounding box corner is outside the array of image pixels (Appendix, page 171); 2) if a box spans multiple text lines in the array (Appendix 229), or lies completely outside a text line; 3) if boxes are too small compared to a reference ε, in either or both longitudinal or latitudinal directions, and accordingly are discarded. Noise marks 70a and 72 and others will not be considered words. The OnABaseline() function (Appendix, page 229) is an example of a function used to eliminate those boxes lying outside of the baseline boundaries.

With reference to FIG. 3B, at word shape computer 24, a signal representing the image of a word, or at least a portion thereof, now isolated from its neighbors, is derived. The derived signal is referred to as a word shape contour. The shape contour for each word is determined using the MakeShell() function (Appendix, page 228). As illustrated in FIG. 17A, this function first moves along the top of each bounding box, and starting with each pixel location along the top of the box, scans downward relative to the page orientation, until either a black pixel, or the bottom of the box, is reached. A record of the set of distances d between the top of the box and the black pixel or box bottom is maintained. The set of distances d, accumulated over the length of the box, constitutes the top raw contour of the word shape. Subsequently, a bottom raw contour is produced in a similar manner as illustrated in FIG. 17B, for the same word depicted in FIG. 17A, by sequentially moving across the bottom of the box, and looking in an upwards direction, for either the first black pixel or the top of the bounding box.

Figure 19:
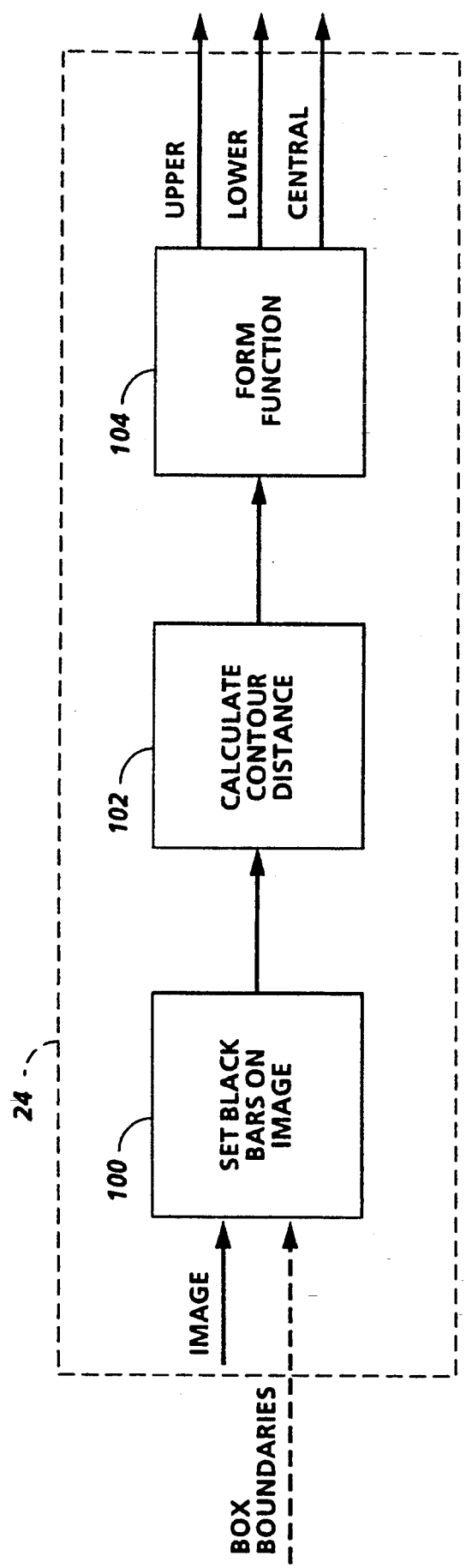
FIG. 19 illustrates the steps associated with deriving the word shape signals.

With reference now to FIG. 19, at block 100 which preferably operates on the actual image as opposed to the filtered image, which could be used in this step, one or more reference lines are established through each word. In other terms, the data representing the symbol string is augmented, so that it is defined over the range of the symbol string. In one embodiment, a blackout bar, which may have a finite thickness or a zero thickness is constructed through the word, preferably having an upper limit or reference line at approximately two thirds of the x height, and a lower limit or reference line at approximately one-third of the x height (which was determined at the baseline determination step). At contour calculation 102, a set of measurements is derived, for the distance d between the upper or lower edge of the bounding box, and the word, or the nearer of the reference line's closer edge of the black out bar. The calculation's measurements are made at the resolution of the image. With reference to FIG. 20A, where the calculation's measurements are illustrated pictorially, it can be seen that the reference lines serve to allow the signal that will ultimately be derived from this step to be defined at every sampling position over the length of the word. In a preferred embodiment, the calculation's measurements of d are actually generated from the contour data derived in accordance with FIGS. 17A, 17B previously collected, and are adjusted to limit the distance d with either the upper or lower edge of the blackout bar as indicated. In the embodiment shown in FIG. 20A, measurements are made from the upper line of the bounding box to the upper reference line of the word, although this is not a requirement. Thus, for example, the measurement could alternatively be made from the reference line to either the upper or lower bounding line, or the character. FIG. 20B better shows how the set of measurements is used to form the signal output from block 104. The contour is represented as a set of measurements distance d', relative to the reference line. Measurement d' is therefore derived from the measurements shown in FIG. 20A, which designate the stopping point of line d, and the known position of the black out bar. Calculating the distance relative to the reference line enables scaling of the word shape contours to a common x height, thereby facilitating any subsequent comparison of the shapes. Accordingly, the distances d' represent a measurement from the reference line or blackout bar to the outer limits of the letter, and in the absence of a letter, provide a zero measurement. These measurement might be derived directly, but the proposed indirect methods appear easier to implement. FIGS. 20C and 20D show that the sets of d' values can be plotted on a graph to form a one dimensional signal or curve representing the word shape. Details of the contour determination are contained in the function StoreOutlinePair() beginning in the Appendix at page 255. FIG. 18 is an image of the contour locations as established for the text sample of FIG. 4. It is important to note the informational content of FIG. 18, where, for the most part, it is relatively easy to recognize the words within the passage by their contours alone.

In studies of the information delivered by the appearance of English language words, it has been determined that in a majority of cases, words can be identified by viewing only approximately the top third of the image of the word. In other words, the upper portion of the word carries with it much of the information needed for identification thereof. In a significant portion of the remainder of cases, words that are unidentifiable by only the upper third of the image of the word, become identifiable when the identification effort includes the information carried by the lower third of the image of the word. A relatively small class of words requires information about the middle third of the word before identification can be made. It can thus be seen that a stepwise process might be used, which first will derive the upper word shape signal or contour, second will derive the lower word shape signal or contour, and thirdly derive a word shape signal central contour (from the reference line towards the word or bounding box), in a prioritized examination of word shape, as required. In the examples of FIG. 20A, 20B, and 20C, the word "from" is fairly uniquely identifiable from its upper portion only. In the examples of FIG. 21A, 21B, 21C and 21D, the word "red" is less uniquely identifiable from its upper portion, since it may be easily confused with the word "rod" and perhaps the word "rad". While the lower portion of the letter "a" may distinguish "red" and "rad", it is doubtful that the lower portion of the letter "o" will distinguish the words "red" from "rod". However, the central portions of "red", "rad", and "rod" are quite distinct.

The determined morphological characteristic(s) or derived image unit shape representations of each selected image unit are compared, as noted above (step 41), with the determined morphological characteristic(s) or derived image unit shape representations of the other selected image units for the purpose of identifying equivalence classes of image units (step 50), such that each equivalence class contains most or all of the instances of a given word in the document. The equivalence classes are thus formed by clustering the image units in the document based on the similarity of image unit classifiers, without actually decoding the contents of the image units, such as by conversion of the word images to character codes or other higher-level interpretation. Any of a number of different methods of comparison can be used. One technique that can be used, for example, is by correlating the raster images of the extracted image units using decision networks, such technique being described for characters in a Research Report entitled "Unsupervised Construction of Decision networks for Pattern Classification" by Casey et al., IBM Research Report, 1984, said Research Report being incorporated by reference herein.

Figure 22:
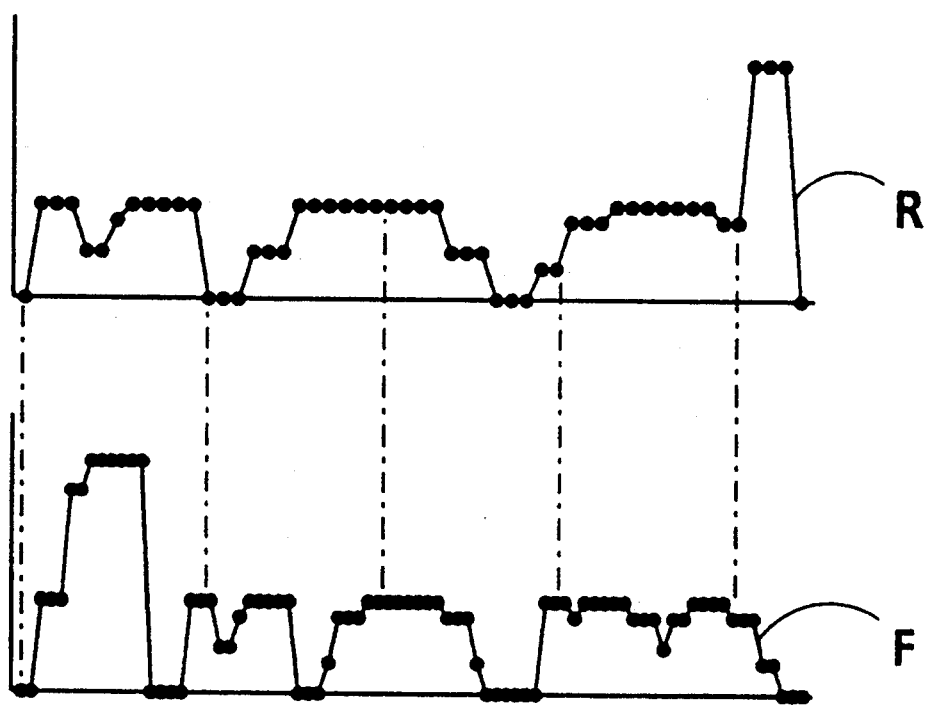
FIG. 22 shows a simple comparison of the signals derived for the words "red" and "from" using a signal normalization method.

Preferred techniques that can be used to identify equivalence classes of word units are the word shape comparison techniques disclosed in U.S. patent application Ser. Nos. 07/796,119 and 07/795,169, filed concurrently herewith by Huttenlocher and Hopcroft, and by Huttenlocher, Hopcroft and Wayner, respectively, and entitled, respectively, "Optical Word Recognition By Examination of Word Shape," Published European Application No. 0543592, published May 26, 1993 and "Method for Comparing Word Shapes". For example, U.S. patent application Ser. No. 07/795,169 discloses, with reference to FIG. 3B, one manner in which a comparison is performed at word shape comparator 26. In one embodiment, the comparison is actually several small steps, each of which will be described. With reference to FIG. 22, generally, the two word shape signals, one a known word, the other for an unknown string of characters are compared to find out whether they are similar. However, in this case, signal R is the upper contour of the word "red", while signal F is the upper contour of the word "from". Actually, relatively few signals could be expected to be exactly identical, given typical distinctions between character fonts, reproduction methods, and scanned image quality. However, the word shape signals to be compared may be scaled with respect to one another, so that they have the same x-heights. This is achieved by determining the x-height of the pair of word shape contours to be compared. Once determined, the ratios of the x-heights are used to determine a scale factor to be applied to one of the contours. As the x-height is a characteristic measurement for fonts, it is used to determine the scaling factor in both the horizontal and vertical directions. An example of the scaling operation is found in the fontNorm.c file beginning at line 172, where the StoreOutlinePair() function carries out the scaling operation in both the x and y, horizontal and vertical, directions. Alternatively, the shape signals may be compared without normalization and a weighing factor imposed upon the portion of the measured difference due to the unequal lengths. Furthermore, the amplitude or height of the signals has been normalized to further reduce the impact of the font size on the word shape comparison.

Figure 23A:
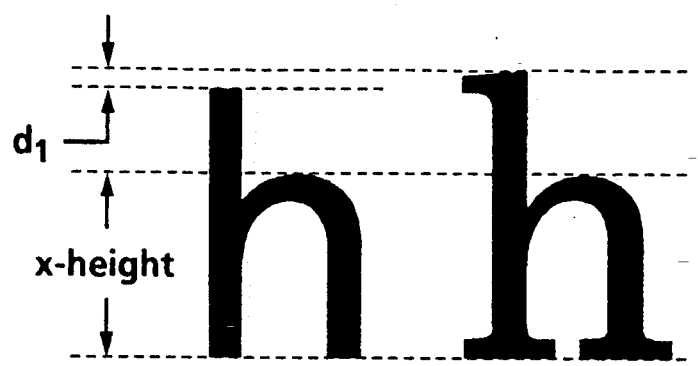
FIGS. 23A, 23B, and 23C illustrate the details of the discrepancy in font height, and the method for normalization of such discrepancies.
Figure 23B:
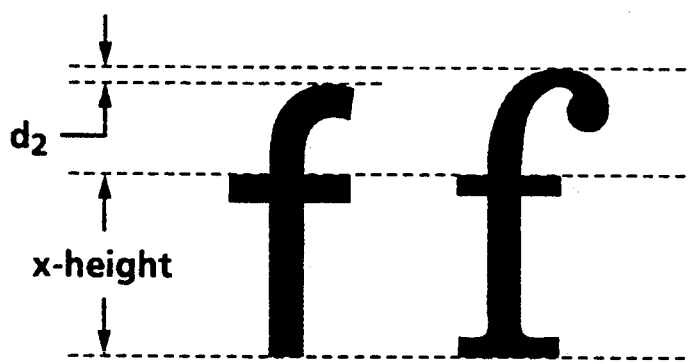
Figure 23C:

Referring next to FIGS. 23A-23C, which illustrate details of the ascender/descender normalization operation, each of the shape signals are normalized based upon a common relationship between the ascender and descender heights and the x-height of the text characters. As illustrated, the actual ascender heights of characters printed with supposedly similar font size, or what is now an appropriately scaled font size, may be slightly different. This occurs as a result of type faces or fonts which are small on body or large on body, implying that similar characters exhibit variations in height across fonts that are the same size, for example 24 point fonts. As an illustration, distance $d_1$ in FIG. 23A represents the difference in ascender height for two occurrences of the letter "h." Likewise, distance $d_2$ illustrates a similar difference between the heights of the letter "f" in FIG. 23B. As illustrated in FIG. 23C, the typical character may be broken into three sections, ascender portion 390, x-height portion 392, and descender portion 394. In addition, the relative heights of these sections are illustrated as c, a, and b, respectively. Again, the normalization operation applied to the shape contours is found in the fontNorm.c module, beginning at page 183 of the Appendix. Applying the operations described with respect to StoreOutlinePair() function, page 255 of the Appendix, the areas of the contour lying above the x-height are scaled as follows:

$$f(t) = \frac{1.5}{a + c} \cdot f(t)$$

Similarly, the descenders are scaled by the following equation:

$$f(t) = \frac{1.5}{a + b} \cdot f(t)$$

where, in both cases, the value used in the numerator (1.5) is arrived at based upon observation of the relationship between ascender or descender heights and the x-height. Also included within the StoreOutlinePair() function is an operation to remove the portions of the contours which do not represent portions of the text string. These regions lie at the ends of the bounding boxes illustrated in FIG. 16. For example, the box surrounding the word "practitioner" in FIG. 16 can be seen to extend beyond the actual word image. As further illustrated at the ends of the word "from" in FIGS. 20A-20D, the contour does not contain useful information. By removing these regions from the contour shape, less error will be introduced into the comparison operations.

Subsequent to the normalization operation, standard signal processing steps can be used to determine the similarity or dissimilarity of the two signals being compared. Alternatively, the following equation may be used:

$$\Delta_{string} = \sqrt{\int_0^1 (f(x) - g'(x))^2 dx}$$

where $\Delta_{string}$ is the difference value between the two signals;
f(x) is the known signal; and
g'(x) is the unknown signal.

In a simple determination, the difference could be examined and if it is close to zero, such would be indicated that there would be almost no difference between the two signals. However, the greater the amount of difference, the more likely that the word was not the same as the word to which it was being compared.

It is important to note that the embodiments described herein, as supported by the code listings of the Appendix, compare the word shape contours using the upper and lower contours for each word in conjunction with one another. This is an implementation specific decision, and is not intended to limit the invention to comparisons using only the top and bottom contours in conjunction with one another. In fact, sufficient information may be contained within the upper contours alone so as to significantly reduce the requirements for a comparison of the lower contours, thereby saving considerable processing effort.

Figure 24:
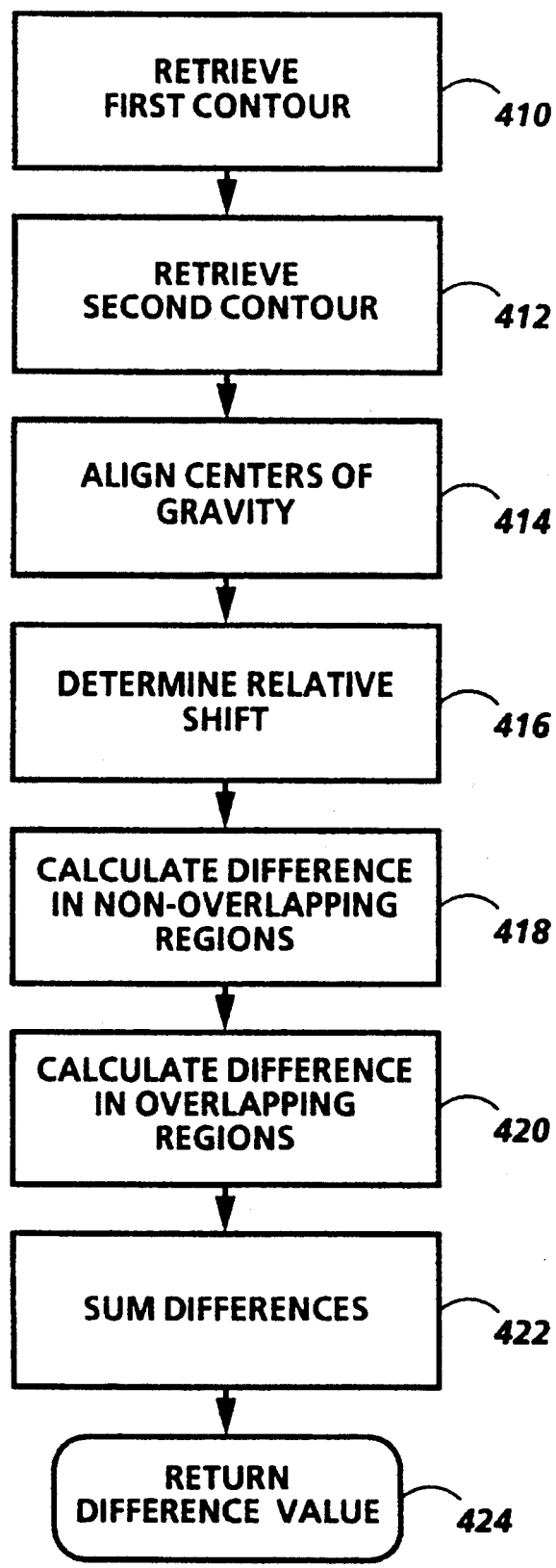
FIG. 24 is a flowchart detailing the steps used for one method of determining the relative difference between word shape contours.

The steps of this simplified comparison method, as first contemplated, are illustrated in FIG. 24. Beginning at step 410, the contour for the first word shape is retrieved from memory, and subsequently, the second word shape is retrieved by step 412. Next, the centers of gravity of the word shapes, defined by the upper and lower contours, are determined and aligned, step 414. The purpose of this step is to align the centers of the word contours to reduce the contour differences that would be attributable solely to any relative shift between the two sets of contours being compared. The center of gravity is determined by summing the areas under the curves (mass) and the distances between the contours (moments) which are then divided to give an indication of the center of gravity for the upper and lower contour pair. Once determined for both sets of contour pairs, the relative shift between the pairs is determined, step 416, and the contours are shifted prior to calculating the difference between the contours. The shifting of the contours is necessary to reduce any error associated with the establishment of the word shape boundaries and computation of the word shapes at block 24 of FIG. 3B. Step 418 handles those regions lying outside the overlapping range of the shifted contour pairs, determining the difference against a zero amplitude signal in the non-overlapping regions. This is done by summing the squared values of the upper and lower contours at the non-overlapping ends of the contours. Subsequently, the overlapping region of the contours are compared, step 420. The difference in this region is determined as the sum of the squared differences between the upper curves and the lower curves, as shown in the function L2Norm() on page 100 of the Appendix. Next, the values returned from steps 418 and 420 are added to determine a sum of the differences over the complete range defined by the shifted contours. This value may then be used as a relative indication of the similarity between the contour pairs for the two word shapes being compared.

An alternative to the center-of-gravity comparison method, uses a signal processing function known as time warping, as described in the article "Performance Tradeoffs in Dynamic Time Warping Algorithms for Isolated Word Recognition", by Myers, Rabiner, and Rosenberg, IEEE Transactions on Acoustics, Speech, and Signal Processing, Vol. ASSP-28, No. 6, December 1980, and the book, "Time Warps, String Edits, and Macromolecules: The Theory and Practice of Sequence Comparison", by Sankoff and Kruskal, Addison-Wesley Publishing Company, Inc., Reading, Mass., 1983, Chapters 1 and 4, and may be used to provide for compression and expansion of points along the contours until the best match is made. Then a score is derived based on the amount of difference between the contours being compared and the stretching required to make the contours match. Once again, the score provides a relative indication of the match between the two signals being compared.

Figure 25:
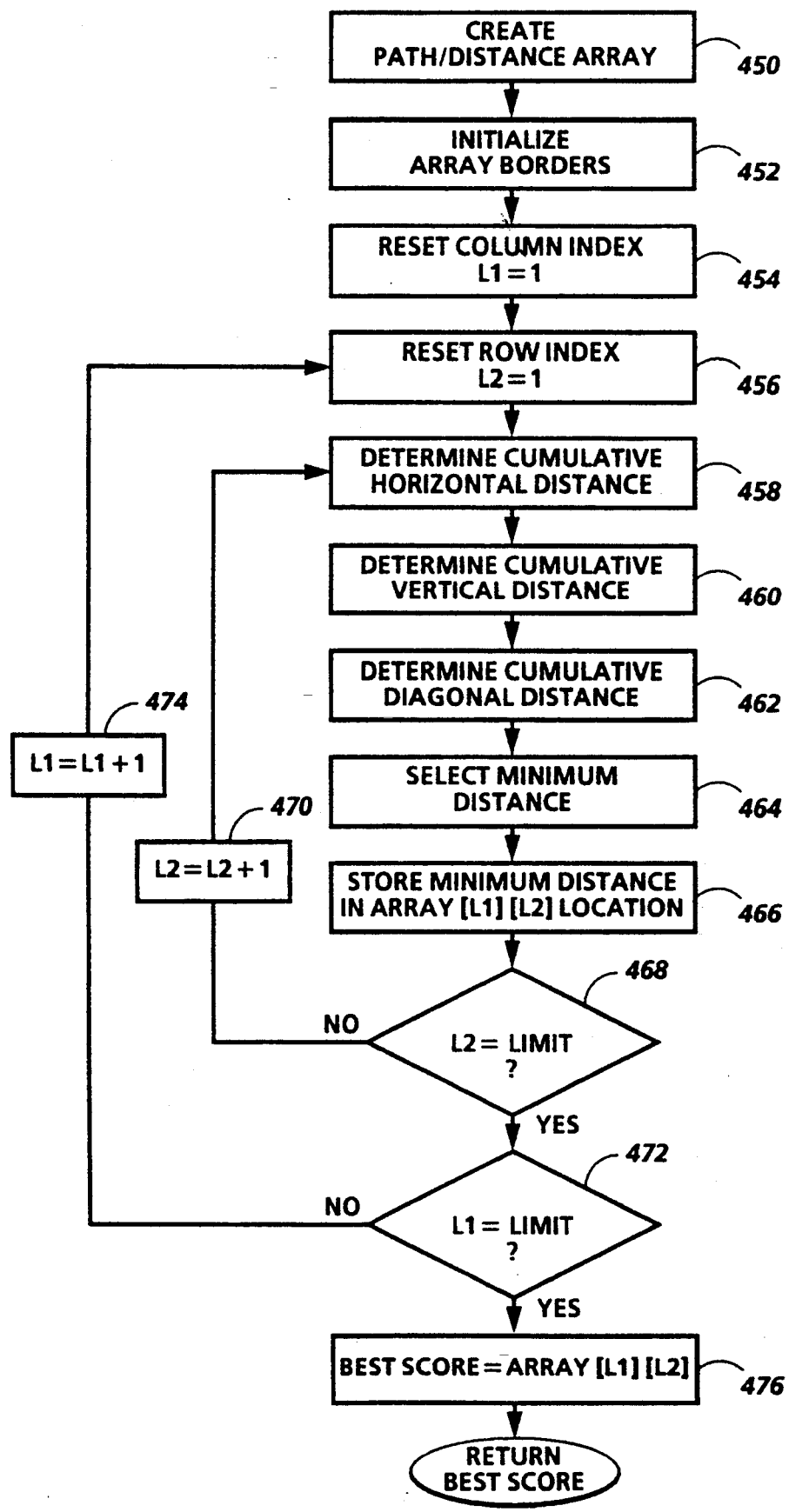
FIG. 25 is a flowchart detailing the steps of a second method for determining the relative difference between word shape contours.

Referring now to FIG. 25, which depicts the general steps of the dynamic warping method, the method relies on the use of a difference array or matrix to record the distances between each point of the first contour and points of the contour to which it is being compared. As illustrated in the figure, and detailed in the code listings contained in the Appendix, the process is similar for all of the measures which may be applied in the comparison.

First, the organization of the code is such that a data structure is used to dynamically control the operation of the various comparison functions. The structure DiffDescriptor, the declaration for which is found on page 9 of the Appendix (see diff.h), contains variables which define the measure to be applied to the contours, as well as, other factors that will be used to control the comparison. These factors include: normalization of the contour lengths before comparison; separate comparisons for the upper and lower contours; a centerWeight factor to direct the warping path; a bandwidth to constrain the warp path; a topToBottom ratio which enables the top contour comparison to be weighted more or less with respect to the bottom contour comparison; and a hillToValley ratio to selectively control weighing the contour differences when an unknown contour is being compared to a known or model word shape contour. Interpretation of the various factors is actually completed in the diff2.c module at page 56 of the Appendix, although descMain.c at page 49 provides an illustration of the interpretation of the factors.

In general, each measure implements a comparison technique, however, each is optimized for a specific type of dynamic comparison, for example, a slope limited dynamic warp having a non-unitary centerweight and a topToBottom weight greater than one. The first level of selection enables the use of a slope-constrained warping function for comparison, an unconstrained warp, or a simple, non-warped, comparison. Within both of the warp comparison methods, there are both separate comparison functions, where the top and bottom contours are warped independently, and parallel comparison functions, where the warp is applied to both the top and bottom contours simultaneously. Specific details of the comparison functions are generally contained within the newMatch.c file beginning at page 101 of the Appendix.

In the general embodiment, the dynamic warping process starts by allocating space for the path/distance array, step 450, which will hold the distance values generated during the comparison and warping of one word shape contour with respect to another. After allocating space, the border regions of the array must be initialized as the process used by all the warping measures is an iterative process using data previously stored in the array for the determination of the cumulative difference between the contours. At step 452, the array borders are initialized. Initialization of the first row of the array entails the determination of the square of the difference between a first point on the first contour and each point on the second contour. Subsequent to border initialization, the column and row index values, L1 and L2, respectively, are reset to 1 to begin processing the individual, non-border, points along the contours.

Figure 26A:
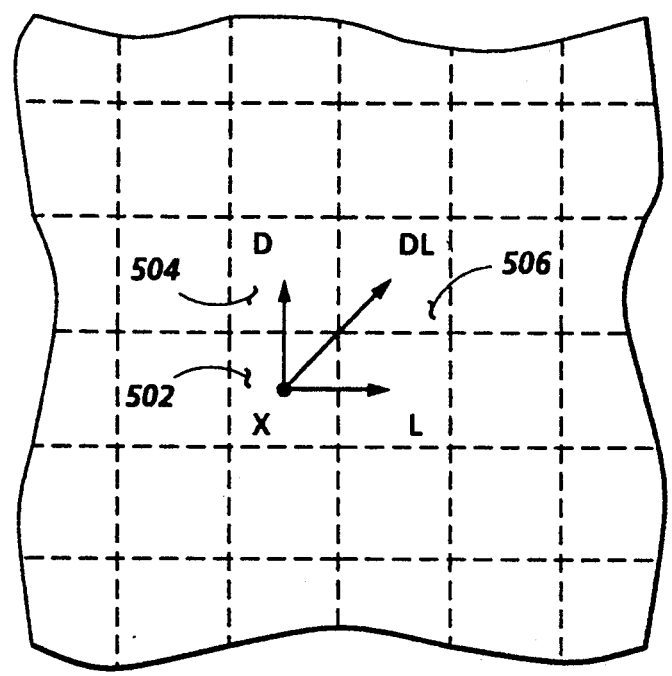
FIGS. 26A and 26B are respective illustrations of the relationship between the relative difference values calculated and stored in an array, for both a non-slope-constrained and a slope-constrained comparison.

Processing of the contours proceeds at steps 458 through 64, where the difference in distance between each point along the second contour, with respect to a point on the first contour is calculated. Moreover, this difference, or distance, is calculated and then summed with a previously determined difference value. In addition, some of the previously determined difference values may be weighted differently, for example, in one embodiment weights of the difference values along the array diagonal may be modified by a centerWeight weighing factor. As an illustration, the operation of the NewMatch() function, beginning at line 106 on page 103, at first, the distance (rest) is calculated as the sum of the squares of the differences between a point on the first contour and a point on the second contour, over the upper and lower contours, where the top contour difference is weighted by the topToBottom variable. This distance (rest) is used in subsequent iterations to determine the horizontal, vertical and diagonal difference values in the loop beginning at line 137 on page 103. To determine each of these values, the current distance value, represented by rest, would be added to the previous values in the down, left, and down-left array positions, the down-left position value being the diagonal position which is weighted by the centerWeight factor as previously described. Referring to FIG. 26A, which illustrates the positional relationship between a previously determined value X, at array location 502, and subsequent array locations, the value X might be added to the difference values of subsequent locations to accumulate the total difference. calculations is shown. When calculating the difference value for array location 504, the value in location 502 would be used as the down value. Similarly, when calculating the value in location 506, the value of location 502 would be used as the center-weighted down-left, or diagonal, value. After calculating the three difference values, steps 458, 460, and 462, the process continues by selecting the smallest of the three values, step 464, for insertion into the current array position, step 466. As illustrated in the Appendix at line 144 of page 103, the FMin() function from page 101 returns the minimum of the three values previously calculated, the value being inserted into the storage array pointed to by pointer dc.

Subsequently, the process illustrated in FIG. 25 continues by determining the differences between the point on the first contour, represented by L1, to points on the second contour, represented by L2. Decision step 468 controls the iterative processing of the points along the second contour by testing for the end of the contour, or swath. In the implementation shown in the Appendix, the index variables i and j are used in place of L1 and L2 to control the difference calculation loops. As indicated in the code for the NewMatch function beginning on page 102 of the Appendix, the swath is referred to as the bandwidth, and is determined by a desired bandwidth which is adjusted for the slope defined by the contour lengths (see page 102, lines 83-89). If no limit has been reached, processing for the next point would continue at step 458 after the value of L2 was incremented at step 470. Similarly, decision step 472 controls the processing of each point along the first contour, in conjunction with incrementing step 474. Once all the points have been processed with respect to one another, as evidenced by an affirmative response in step 472, the relative difference score, best score, is contained in the farthest diagonal position of the array (L1, L2). Subsequently, the value determined at step 476 is returned as an indication of the dynamically warped difference between the contours being compared.

The code implementation found in the NewMatch() function on page 103 of the Appendix has optimized the execution of the aforedescribed warping process by reducing the large two-dimensional array to a pair of linear arrays which are updated as necessary. Due to this modification, the minimum difference, or best score, for the warp comparison value is found in the last location of the one-dimensional array. Furthermore, the final difference value, dc, may be subsequently normalized to account for the length differences between the two sets of contours being compared. Finally, such a value might subsequently be compared against a threshold or a set of similarly obtained difference values to determine whether the contours are close enough to declare a match between the words, or to determine the best match from a series of word shape comparisons.

In yet another embodiment, the dynamic time warping process previously described may be altered to compare the difference values contained in the difference array to a threshold value on a periodic basis. Upon comparison, the process may be discontinued when it is determined that sufficient difference exists to determine that the contours being compared do not match one another, possibly saving valuable processing time. Moreover, the sequential operation of word shape comparator 26 might be done in conjunction with sequential output from word shape computer 24, thereby enabling the parallel processing of a textual image when searching for a keyword.

Having described a basic implementation of the dynamic warping comparison measures, the distinctions of the other dynamic warp comparison methods included in the Appendix and the application of the control factors previously mentioned will be briefly described to illustrate the numerous possible embodiments of the present invention. First, the method previously described may also be implemented with the slope of the warp path being constrained as it moves across the array. Details of the implementation are found in the SlopeCMatch() function beginning on page 111 of the Appendix. This measure is further illustrated graphically in FIG. 26B, where the value of array location 512, X, may be added to only the three subsequent array locations shown. For example, X may be added to array location 514, when considered as the d2L1 value for location 514. The nomenclature used for the variable names, and followed in the figure, is as follows: d2L1 refers to the array location which is down 2 rows and left one column, dlL1, refers to the lower left diagonal array location, and dlL2 refers to the array location that is down one column on left 2 rows from the current array location. In a similar manner, X may be added as the dlL2 value for the calculation of the cumulative difference value for array location 516.

Figure 26B:
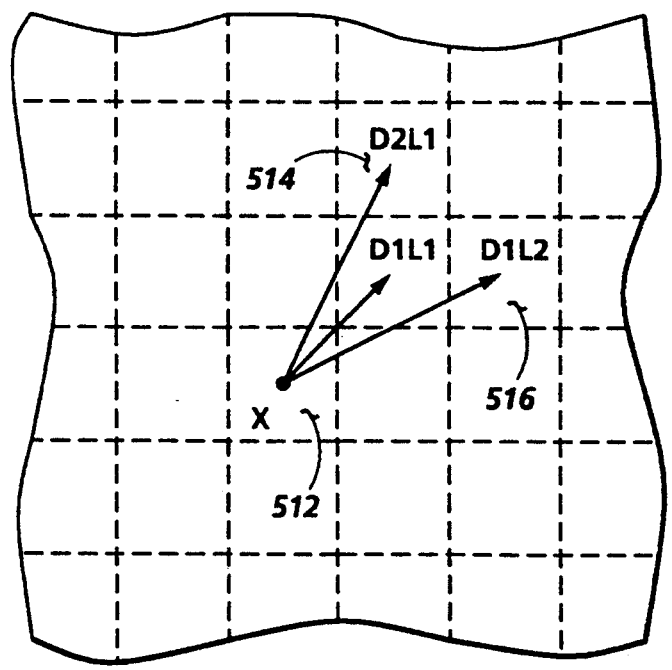

As is apparent from a comparison of FIGS. 26A and 26B, the slope constrained warping measure limits the warping path which can be followed during the generation of the cumulative difference value. The reason for implementing such a constraint is to prevent the warping process from removing, or compressing, a large area of one of the two contours being compared, without imposing a significant "cost" to such a compression.

Next, the method previously described with respect to the parallel warping process may also be implemented on only one pair of contours at a time, for example, the upper contours of two word shapes. The functions SepMatch() and SepCMatch(), as found in the Appendix on pages 104 and 113, respectively, implement the separate matching measure in both the non-slope-constrained and slope-constrained fashions previously described. In general, these measures separately calculate the difference between the top or bottom contours of a pair of wordshapes. The general implementation indicated for the measures in the code shows that these measures are typically used sequentially, first determining the warped difference for the top contours, and then adding to it the warped difference from the bottom contour comparison, resulting in a total difference for the wordshapes.

By carrying out the comparison methods described in a "piece-wise" cascaded fashion, further processing benefits may also be derived. More specifically, cascaded comparison would entail, first, utilizing the upper contours of the words being compared to identify a word, or at least narrow the set of possible alternatives and, second, using the lower contour comparison to provide complete identification. It is believed that such an approach to word shape comparison operation 26 would considerably reduce processing time spent on identifying unknown word shapes by comparison to a dictionary of known word shapes, 28, as illustrated in FIG. 3B. Important to the cascaded comparison, is the constraint that the top and bottom warps applied to the contours must be relatively equivalent. This requirement arises from the fact that the upper and lower curves have a relationship to a common word, and if this relationship is not maintained during the warp analysis, the accuracy of the comparison will be compromised.

Alternatively, the dynamic warping technique may be applied as described, with the addition of a function suitable for accumulating the relative warp applied to the upper and lower curves in achieving the best match. For example, when a known, non-italicized word shape is compared to an unknown word shape, a shift in the warp applied to the upper curve relative to the lower curve could be indicative of an italicized word, however, the length of the warped region will remain the same for the top and bottom warps. Such a technique may prove useful in the identification of important words within a larger body of text, as these words are occasionally italicized for emphasis.

One of the control factors which has not been previously described is the bandwidth factor. As implemented, the bandwidth factor controls the relative width of the signal band in which the warping signal will be constrained. More specifically, the band width limitation is implemented by defining a region about the array diagonal in which the warp path which traverses the array is constrained. The constraint is implemented by assigning large values to those areas outside of the band width, so as to make it highly unlikely that the path would exceed the constraint.

Another factor which was briefly mentioned is the topToBottom factor. When applied, the value of this variable is used to weight the difference value determined for the top contour warping process. Therefore, use of a number greater than one, will cause the upper contour difference to be weighted more heavily than the lower contour difference. A very large number would effectively eliminate the lower contour difference completely and, likewise, a zero value would eliminate the upper contour difference completely. This factor is generally considered important to enable the upper contour to be weighted in proportion to its information content, as it generally carries more information regarding the word than does the lower contour.

The hillToValley ratio is a variable which is usually applied in situations when a known, or model, set of word shape contours is being compared against a set of word shape contours from an unknown image. In exercising this option, the model set of contours is passed as the comparison measure functions, for example, NewMatch() on page 102 of the Appendix. When determining the difference between points on the contours, the comparison functions commonly call the function SquareDifference() on page 101 of the Appendix to determine the sum of the squared difference. SquareDifference() applies the hillToValley ratio to the squared difference whenever it determines that the value of the model contour is less than the contour being compared. The result of applying a hillToValley value greater than one is that the relative "cost" of the difference when the model contour is less than the target contour is smaller than the same difference when the model contour is greater than the target contour. The basis for this type of weighing is that when comparing against a model contour, the comparison should treat those areas of the target contour that are subject to being "filled in" during a scanning or similar digitizing operation with less weight than regions not likely to be filled in, as evidenced by contour positions below the model contour. For instance, the regions where ascenders and descenders meet the body of the character are likely to be filled in during scanning, thereby causing the target contour to have a gradual contour in those regions, whereas the model contour would most likely have a defined peak or valley in these regions. Hence, the contour value of the model would be less than the contour value of the target, even though the characters may have been identical. Therefore, the hillToValley variable attempts to minimize the impact to the calculated difference value over these regions.

It is important to note that the aforedescribed measures and control factors allow the comparison measures to be conducted in numerous permutations. However, the flexibility which these measures permit is intended to enhance the applicability of the comparison process, so that when information is known about a particular word shape contour, for example, a model contour generated from a computer generated character font, the measures may place reliance on that information to make the comparisons more robust.

The mathematical explanation of the word shape derivation process suggests that alternative methods of deriving the word shape signal exist. Some possible alternatives are the establishment of the one dimensional signal using an alternative coordinate scheme, for example polar coordinates. Another possibility is generation of signal g(t), where g(t) represents the direction from each contour point to the succeeding contour point, where t would represent the point number.

Depending on the particular application, and the relative importance of processing speed versus accuracy, for example, comparisons of different degrees of precision can be performed. For example, useful comparisons can be based on length, width (height) or some other measurement dimension of the image unit (or derived image unit shape representation, e.g., the largest figure in a document image); the location of the image unit in the document (including any selected figure or paragraph of a document image, e.g., headings, initial figures, one or more paragraphs or figures), font, typeface, cross-section being a sequence of pixels of similar state in an image unit); the number of ascenders; the number of descenders; the average pixel density; the length of a top line contour, including peaks and troughs; the length of a base contour, including peaks and troughs; and combinations of such classifiers. It has been found that an adequate comparison for purposes of determining phrase frequency is to compare only the length and height of the derived image unit shape representations. Such a comparison is particularly fast, resulting in a highly efficient phrase frequency analysis which has proven to be sufficiently robust to reliably extract significant phrases in many text document applications.

In instances in which multiple page documents are processed, each page is processed and the data held in the memory 15 (see FIG. 2), as described above. The entirety of the data can then be processed.

One way in which the image units can be conveniently compared and classified into equivalence classes is by comparing each image unit or image unit shape representation when it is formed with previously processed image units/shape representations, and if a match is obtained, the associated image unit is identified with the matching equivalence class. This can be done, for example, by providing a signal indicating a match and incrementing a counter or a register associated with the matching equivalence class. If the present image unit does not match with any previously processed image unit, then a new equivalence class is created for the present image unit.

Alternatively, as shown (step 50) the image units in each equivalence class can be linked together, and mapped to an equivalence class label that is determined for each equivalence class. The size of each equivalence class is indicative of the frequency with which the image units in the class occur in the document image.

Next (step 60), the sequences of equivalence class labels corresponding to all of the possible sequences of mapped image units in reading order (phrases) are analyzed to determine the frequency with which particular equivalence class label sequences, and hence the frequency with which the corresponding word unit phrases occur in the document. As used herein, a phrase is any sequence of adjacent word units which have been evaluated in reading order in the document. (It is not necessary that the stop or function words be discriminated prior to conducting the phrase frequency analysis.) Thus, the phrases include a master phrase consisting of the entire sequence of word units contained within a document image (or a portion thereof which has been selected for analysis), plus all of the subphrases contained within the master phrase.

Any conventional method for sorting symbol strings or sequences and determining recurring subsequences can be used to evaluate the equivalence label sequences. Exemplary methods are described in Knuth, *The Art of Computer Programming*, Sorting and Searching, (Addison-Wesley, 1973), Vol. 3 which is incorporated herein by reference. Advantageously, since the frequency of word units in a phrase will have a frequency at least as great as the frequency of the phrase, a useful preliminary sort of the equivalence label sequences is to eliminate any sequences containing word units which occur only once or twice. Similarly, an initial sort advantageously searches for sequences in which each of the word units in the sequence is a high frequency word.

The determination of what frequent phrases to identify as semantically significant phrases for purposes of further document processing, such as, for example, document summarization or categorization, depends on such variables as, for example, the length and style of the document, as well as the genre of its subject matter (e.g., technical literature versus fiction). Depending on all of the variables present in a particular situation, it may be advantageous either to select shorter length phrases having a relatively high frequency of occurrence, or longer length phrases having a lower frequency of occurrence. For example, in technical documents, it has been determined that two- or three-word phrases that occur at least about five times tend to be technical phrases indicative of the subject matter of the document. It will be appreciated that the choice of the most advantageous combination of frequent phrase selection parameters advantageously is determined empirically for a given application, and that the selection parameters are made settable so that they can be tuned for different applications.

A salient feature provided by the technique of the invention is the processing, identification, comparison, or manipulation of image unit sequences without an accompanying requirement that the content of the image units be decoded, even for output. More particularly, phrases are determined, processed and delivered for output without decoding, so that in essence, the actual content of the image units or recognition of the phrases is never required to be determined. Thus, for example, in such applications as copier machines or electronic printers that can print or reproduce images directly from one document to another without regard to ASCII or other encoding/decoding requirements, image unit phrases can be identified, and processed using one or more morphological image characteristic of the image units. In the comparison process described, for instance, selected image units, of undetermined content, in the area of the document image of interest are compared with other image units in the document also of undetermined content. Entire phrases, still of undetermined content, can then be optically or electronically delivered for output, for example, to an image reproducing apparatus of a copy machine, an electronic memory, a visual display, or the like, for example in producing a list of significant phrases in order of frequency of appearance in the document image.

The technique described above can be used to determine the significance of the phrases of a document, based upon the criterion of frequency of occurrence of a particular phrase. Thus, for example, the number of times a phrase appears can be used to construct a hierarchy of phrases, such hierarchy being useful for many purposes. It is noted, however, that the classifiers are determined without actually decoding the content of the image units; only the selected image classifiers of the image unit itself are used. The method can be applied, of course, to documents of multiple page length in a similar manner to that described above.

Although the invention has been described and illustrated with a certain degree of particularity, it is understood that the present disclosure has been made only by way of example, and that numerous changes in the combination and arrangement of parts or steps can be resorted to by those skilled in the art without departing from the spirit and scope of the invention, as hereinafter claimed.

APPENDIX

Section A

Jul 26 19:28 1991 args.h

```
1    /* Support for command line argument scanning.
2     *
3     * When a program is run from the shell, its name is followed by a number of
4     * required command line ARGUMENTS and then some optional command line OPTIONS.
5     * Each argument consists of a list of required PARAMETERS, each of which can
6     * be either an int, string, or float. Options are like arguments with the
7     * exception that their required parameters are predeced by a keyword denoting
8     * which option is being invoked.
9     *
10    * Required arguments are defined using the DefArg function. The format string
11    * consists of a list of data format specifiers (%d, %f, and %s for integer, float, and
12    * string, respectively) that specify the types of the parameters to the arguement.
13    * The documentation string should contain a one line description of the argument.
14    * It will be printed if the argument list cannot be scanned.
15    * The remaining arguments to DefArg are pointers to locations where the values of the
16    * command line arguments will be stored.
17    *
18    * Optional arguments are defined with the DefOption function. The format string
19    * is similar to the DefArg format string, but has a keyword before the format
20    * specifiers. The exists parameter is a pointer to BOOLEAN that is set to true
21    * iff an occurance of this option was successfully parsed from the command line.
22    * The remaining arguments are pointers to the locations where the values of the
23    * command line arguments will be stored.
24    *
25    * Short example:
26    * The following program expects one required command line argument that is a string
27    * and will be stored in s. In addition, it will accept three different optional
28    * keyword arguments. They are the keyword -int followed by an integer, with result
29    * stored in i; -float followed by a float stored in f; and -pair followed by a float
30    * and then an int, stored in f and i, respectively.
31    *
32    * Suppose the program is called foo. Here are some legal invocations:
33    * % foo hello
34    * % foo hello -int 1
35    * % foo hello -int 5 -float 10
36    * % foo hello -pair 1 2
37    *
38    * Here are some error invocations and responses
39    * % foo
40    * Usage:
41    *  scanArgs
42    *    filename
43    *    [-int <int>]
44    *    [-float <float>]
45    *    [-pair <float> <int>]
46    * % foo hello -int
47    * Option -int expects 1 parameters:
48    * -int <int>
49    *
50    *
51    *void main (int argc,char **argv)
```

```
52      *{
53      * int i;
54      * float f;
55      * char *s;
56      * BOOLEAN haveAString,haveAnInt,haveAFloat,haveAPair;
57      *
58      * DefArg("%s","filename",&s);
59      * DefOption("-int %d","-int <int> ",&haveAnInt,&i);
60      * DefOption("-float %f","-float <float> ",&haveAFloat,&f);
61      * DefOption("-pair %f %d","-pair <float> <int> ",&haveAPair,&f,&i);
62      *
63      * ScanArgs(argc,argv);
64      *
65      * printf("%s\n",s);
66      * if (haveAPair)
67      *   printf("%f %d\n",f,i);
68      * if (haveAnInt)
69      *   printf("%d\n",i);
70      * if (haveAFloat)
71      *   printf("%f\n",f);
72      * if (haveAString)
73      *   printf("%s\n",s);
74      *}
75      *
76      */
77
78      /* Possible additions:
79      *  1) Passing NULL pointers as exists variables.
80      *  2) Predicate calculus for error checking.
81      *  3) Only need one DefArg call.
82      *  4) Combine with error.c to save program name info.
83      */
84      void DefArg(char *format,char *documentation,...);
85      void DefOption(char *format,char *documentation,BOOLEAN *exists,...);
86      void ScanArgs(int argc,char **argv);
87
88
```

Jan 11 17:00 1991 baselines.h

```
1       List BaseLines(Picture pict,double angle,char *plotFile);
2       #ifdef foo
3       int *count,
4               int **returnCoordx, int **returnCoordy);
5       #endif
6       void DrawBaseLines(Picture pict, List pointList, double angle);
```

Aug 23 13:03 1991 blobify.h

```
1       Picture Blobify(Picture old,int half_mask_size,double threshold);
2       Picture NewBlobify(Picture old,int halfMaskWidth,double threshold,double angle);
```

Aug 1 02:59 1991 boolean.h

```
1       typedef int BOOLEAN;
2       #define FALSE 0
3       #define TRUE (!FALSE)
```

Jan 11 17:00 1991 boxes.h

```
1       List FindBorders(Picture pict,double theta);
2       void DrawBox(Picture pict,Box box);
3       void DrawColorBox(Picture pict,Box box,int color);
```

Jul 26 13:42 1991 descriptors.h

```
1       typedef unsigned char *Descriptor,DescriptorElement;
2
3       void PrintField(char *s,int w);
4       void PrintDescriptor(Descriptor d,int *starCount,int *correctCount);
5       void PrintWords(char **words,int numberOfWords);
6       Descriptor ComputeDescriptor(int modelIndex,Dictionary models,
7                       Dictionary thisFont,int numberOfWords,
8                       DiffDescriptor dd);
9
10      #define MAX_FONTS (20)
11      #define MAX_WORDS (100)
12
13
```

Jan 16 12:55 1991 dict.h

```
1       /* Dictionary file have the following format:
2        * int magic number = 1234567
3        * int numberOfEntries
4        * int infoStringLength (includes the \0 at the end)
5        * char infoString[infoStringLength]
6        * OutlinePairBody[numberOfEntries]
7        */
8
9       typedef struct {
10        Box box;
11        float blackoutHeight;
12        int numberOfLegs;
13        int offset;
14        int width;
15        float *x;
16        float *top;
17        float *bottom;
18      } *OutlinePair,OutlinePairBody;
19
20      typedef struct {
21        Box box;
22        int numberOfLegs;
23        int *x;
24        int *top;
25        int *bottom;
26      } *RawOutlinePair,RawOutlinePairBody;
27
28      typedef struct {
29        int numberOfEntries;
```

```
30        char *infoString;
31        RawOutlinePair *rawOutlines;
32        OutlinePair *outlines;
33     } *Dictionary,DictionaryBody;
34
35     void WriteDictionary(Dictionary dict, char *filename);
36     Dictionary ReadDictionary(char *filename);
37     Dictionary NewDict(int numberOfEntries);
38     char *ArgListToString(int argc, char **argv);
```

Jul 30 23:04 1991 diff.h

```
1      typedef enum {L2,CONSTRAINED,WARP} DiffType;
2
3      typedef struct {
4        DiffType diffType;
5        BOOLEAN lengthNormalize;
6        BOOLEAN separate;
7        float centerWeight;
8        int bandWidth;
9        float topToBottom;
10       float hillToValley;
11       FILE *pathFP;
12     } *DiffDescriptor,DiffDescriptorBody;
13
14     Picture CompareDictionaries(Dictionary dict1, Dictionary dict2,DiffDescriptor dd);
15     void WritePictureAsAscii(Picture pict, char *filename,
16                       char *info1, char *info2);
17     float DiffPair(OutlinePair one, OutlinePair two,DiffDescriptor dd);
18     #ifdef foo
19     float DiffPairAndPath(OutlinePair one, OutlinePair two,DiffDescriptor dd);
20     #endif
21
22
23
```

Jan 15 18:56 1991 diff2.h

```
1      #ifdef OWNER
2      #define EXTERN
3      #else
4      #define EXTERN extern
5      #endif OWNER
6
7      EXTERN int FileCountX;
8      EXTERN int FileCountY;
9
10     float DiffPair(OutlinePair one, OutlinePair two, char *matchtype,
11             char *pathFile);
12
```

Jul 26 19:29 1991 error.h

```
1       /* Possible additions:
2        *  1) Variable numbers of parameters to DoError().
3        *  2) Error recovery language.
4        */
5       void DoError(char *string1,char *string2);
```

Aug 15 06:37 1991 fontNorm.h

```
1       void StoreRawOutlinePair(Dictionary dict, int dictEntry,
2                       Box box,int *bothX,int *topY, int *baseY,
3                       int numberOfLegs);
4
5       #define HIT_THE_BOX (10000)
6
```

Jan 11 17:00 1991 lines.h

```
1       typedef BOOLEAN pistFunc(Picture pict, int x, int y, BOOLEAN test,
2                       UCHAR color);
3
4       pistFunc DrawPiston, CountPiston, DistancePiston, BaseLinePiston;
5
6       void LineEngine(Picture pict, int x1, int y1, int x2, int y2, UCHAR color,
7                       pistFunc PerPixel);
8       void DrawLine(Picture pict, int x1, int y1, int x2, int y2, UCHAR color);
9       float CountLine(Picture pict, int x1, int y1, int x2, int y2);
10      int DistanceLine(Picture pict, int x1, int y1, int x2, int y2);
```

Jan 11 17:00 1991 lists.h

```
1       typedef struct {
2         void *car;
3         void *cdr;
4       } cellBody,*cell;
5
6       typedef cell List;
7       typedef void *mapFun(void *);
8       typedef void collectFun(void *);
9
10      List cdr(List);
11      void *car(List);
12      void *popIntern(List *);
13      BOOLEAN endp(List);
14      List cons(void *,List);
15      void map(List,mapFun);
16      List collect(List,collectFun);
17      int ListLength(List l);
18
19      #define push(a,l) ((l) = cons((a),(l)))
20      #define pop(l) (popIntern(&(l)))
21      #define nil ((List)NULL)
```

Jan 15 18:39 1991 match.h

```
1       #ifdef OWNER
2       #define EXTERN
3       #else
4       #define EXTERN extern
5       #endif OWNER
6
7       EXTERN int debug;
8
9       typedef struct {
10        float cost;
11        int xptr;
12        int yptr;
13      } elt;
14
15      #define MAXSEQLENGTH 800
16
17      float DPDiffPair(OutlinePair one, OutlinePair two);
18      float matchvecs(float *Vec1, int lenVec1, float *Vec2, int lenVec2);
19      float sq_distance(float x1, float x2);
20      float best_score (elt *array[][MAXSEQLENGTH], int lenVec1, int lenVec2);
21      void print_best_path(elt *array[][MAXSEQLENGTH], int lenVec1, int lenVec2,
22                   char *pathFile);
23      void print_array_costs(elt *array[][MAXSEQLENGTH], int lenVec1, int lenVec2);
24      void print_array_dirs(elt *array[][MAXSEQLENGTH], int lenVec1, int lenVec2);
25
26      /*
27      #ifndef debug
28      #define debug FALSE
29      #endif
30      */
31      #ifndef horweight
32      #define horweight 1.5
33      #endif
34
35      #ifndef verweight
36      #define verweight 1.5
37      #endif
38
39      #ifndef diagweight
40      #define diagweight 1.0
41      #endif
```

Jan 15 18:47 1991 matchparallel.h

```
1       float pl_DPDiffPair(OutlinePair one, OutlinePair two, char *pathFile);
2       float pl_matchvecs(float *Vec1t, float *Vec1b, int lenVec1, float *Vec2t, float *Vec2b, int
lenVec2, char *pathFile);
3
4       float faster_pl_DPDiffPair(OutlinePair one, OutlinePair two, char *pathFile);
5       float faster_pl_matchvecs(float *Vec1t, float *Vec1b, int lenVec1, float *Vec2t, float *Vec2b,
int lenVec2, char *pathFile);
6
7       float simple_pl_DPDiffPair(OutlinePair one, OutlinePair two);
8       float simple_pl_matchvecs(float *Vec1t, float *Vec1b, int lenVec1, float *Vec2t, float
*Vec2b, int lenVec2);
```

Jul 9 16:01 1991 misc.h

```
1      /*
2       *
3       * misc.h - miscellaneous types and declarations
4       *
5       */
6
7      /* Some library routines that never seem to get declared */
8
9      /* Memory allocation functions */
10     extern void *malloc(unsigned size);
11     extern void *calloc(unsigned nelem, unsigned elsize);
12     extern void *realloc(void *p, unsigned size);
13     extern void free(void *p);
14
15     /* I don't feel like including setjmp.h */
16     /*
17     extern int _setjmp(jmp_buf env);
18     extern volatile void _longjmp(jmp_buf env, int val);
19     */
20
21     /* String-to-X functions */
22     extern int atoi(char *s);
23     extern double atof(char *s);
24
25     /* String functions */
26     extern int strcmp(char *s1, char *s2);
27     extern int strncmp(char *s1, char *s2, int n);
28     extern char *strcpy(char *d, char *s);
29     extern char *strncpy(char *d, char *s, int n);
30     int strlen(char *s);
31     extern char *strdup(char *);
32     extern char *strchr(char *s,char c);
33
34     /* stdio functions */
35     extern int fclose(FILE *stream);
36     extern int fread(char *ptr, int size, int nitems, FILE *stream);
37     extern int fwrite(char *ptr, int size, int nitems, FILE *stream);
38     /* these are necessary to avoid implicit declarations */
39     extern int _flsbuf();
40     extern int _filbuf();
41
42     /* Formatted I/O functions */
43     extern int printf(char *format, ...);
44     extern int scanf(char *format, ...);
45     extern int fprintf(FILE *stream, char *format, ...);
46     extern int fscanf(FILE *stream, char *format, ...);
47
48     /* and misc stuff */
49     extern volatile void exit(int val);
50
51     extern void perror(char *s);
52
```

Aug 1 02:59 1991 mylib.h

```
1    #include "error.h"
2    #include "boolean.h"
3    #include "lists.h"
4    #include "args.h"
5    #include "pict.h"
6    #include "read.h"
```

Aug 15 06:36 1991 newContour.h

```
1    void BoxToShell(Picture pict,Box box,List baseLinePoints,
2            Dictionary dict,int dictEntry,NormalizationDescriptor *nd);
3    void BarBoxList(Picture pict,List boxList,List baseLinePoints,
4            char *filename, char *infoString, NormalizationDescriptor *nd);
5
6
7
```

Jul 31 17:11 1991 newMatch.h

```
1    extern float hillToValley;
2    extern float L2Compare(OutlinePair o1,OutlinePair o2,float topToBottom);
3    extern float NewMatch(float *a1,float *a2,int aLength,float *b1,float *b2,int bLength,
4       float centerWeight,BOOLEAN lengthNormalize,int normalBandWidth,
5       float topToBottom);
6    extern float SepMatch(float *a1,int aLength,float *b1,int bLength,
7       float centerWeight,BOOLEAN lengthNormalize,int normalBandWidth);
8    extern float NewMatchAndPath(float *a1,float *a2,int aLength,float *b1,float *b2,
9       int bLength,float centerWeight,BOOLEAN lengthNormalize,int normalBandWidth,
10      float topToBottom,FILE *fp);
11   extern float SlopeCMatch(float *a1,float *a2,int aLength,float *b1,float *b2,int bLength,
12      float centerWeight,BOOLEAN lengthNormalize,float topToBottom);
13   extern float SepSlopeCMatch(float *a1,int aLength,float *b1,int bLength,
14      float centerWeight,BOOLEAN lengthNormalize);
15   extern float SlopeCMatchAndPath(float *a1,float *a2,int aLength,float *b1,float *b2,
16      int bLength,float centerWeight,BOOLEAN lengthNormalize,float topToBottom,
17      FILE *pathFP);
```

Jan 11 17:00 1991 numbers.h

```
1    void DrawNumber(Picture pict, int x, int y, int color, float scale, int n);
2
```

Jan 14 16:52 1991 orient.h

```
1    BOOLEAN Coarse(Picture pict, int coarseSamples, int coarseDirections,
2           float *orientation, char *plotFile);
3
4    float Fine(Picture pict,int fineSamples, int fineDirections,
5           int coarseDirections, float coarseAngle, char *plotFile);
6
7    float NewFine(Picture pict,int fineSamples, int fineDirections,
8           float angleStart,float angleEnd, char *plotFile);
```

Aug 23 19:19 1991 pict.h

```
1       typedef unsigned char UCHAR;
2
3       #define ROUND8(x) ((x%8)?(x+8-x%8):x)
4       #define ROUND16(x) ((x%16)?(x+16-x%16):x)
5       #define ROUND2(x) ((x%2)?(x+1):x)
6
7       typedef int Color;
8       #define COLOR_RED 0
9       #define COLOR_GREEN 1
10      #define COLOR_BLUE 2
11
12      typedef struct cmapstruct {
13        int numberOfEntries;
14        UCHAR *red;
15        UCHAR *green;
16        UCHAR *blue;
17      } ColorMapBody, *ColorMap;
18
19      typedef struct pstruct {
20        int width;
21        int height;
22        int depth;
23        int uchar_width;
24        ColorMap cmap;
25        UCHAR *data;
26      } PictureBody, *Picture;
27
28      void doerror(char *string1,char *string2);
29
30
31      ColorMap NewColorMap(int size);
32      void FreeColorMap(ColorMap cmap);
33      UCHAR ReadColorValue(ColorMap cmap, Color primary,int index);
34      UCHAR WriteColorValue(ColorMap cmap, int index, UCHAR red, UCHAR green,
35                    UCHAR blue);
36      Picture new_pict(int width,int height,int depth);
37      void free_pict(Picture pict);
38      Picture load_pict(char *filename);
39      Picture load_header(FILE *fp);
40      void write_pict(char *filename,Picture pict);
41      void write_header(FILE *fp, Picture pict);
42      /*int BytesPerScanline(Picture pict); */
43      #define BytesPerScanline(pict) (pict->uchar_width)
44
45      UCHAR ReadPixel(Picture pict,int x,int y);
46      void WritePixel(Picture pict,int x,int y,int color);
47      void WriteClippedPixel(Picture pict,int x,int y,int color);
48      void CopyPicture(Picture dest, Picture src);
49
```

Jul 26 13:09 1991 read.h

```
1       int ReadInt(FILE *fp);
2       int ReadFloat(FILE *fp);
3       char *ReadString(FILE *fp);
4
```

Aug 15 00:19 1991 types.h

```
1       typedef struct {
2        BOOLEAN noAscenderNormalize;
3        BOOLEAN noXHeightNormalize;
4       } NormalizationDescriptor;
5
6       typedef struct {
7        int x;
8        int y;
9        int width;
10       int height;
11       int pageX;
12       int pageY;
13       double angle;
14      } BoxBody, *Box;
15
16      typedef struct {
17       int x;
18       int y;
19      } PointBody,*Point;
20
21      Box MakeBox(int x,int y,int width,int height,double angle);
22      Point MakePoint(int x,int y);
```

Section B

Jul 26 13:25 1991 Makefile

```
1       CCFLAGS = -g -c -I/net/piglet/piglet-1c/hopcroft/new/include
2
3       INCLUDE = /net/piglet/piglet-1c/hopcroft/new/include/
4
5       ARGS = $(INCLUDE)args.h
6       BOOLEAN = $(INCLUDE)boolean.h
7       ERROR = $(INCLUDE)error.h
8       LISTS = $(INCLUDE)lists.h
9       MISC = $(INCLUDE)misc.h
10      PICT = $(INCLUDE)pict.h
11      READ = $(INCLUDE)read.h
12
13      OFUNS = args.o error.o pict.o lists.o read.o
14
15      mylib.a: $(OFUNS)
16          ld -r $(OFUNS) -o mylib.a
17
18      args.o:     args.c $(BOOLEAN) $(ERROR) $(MISC) $(ARGS)
19          gcc $(CCFLAGS) args.c
20
21      error.o:    error.c $(ERROR)
22          gcc $(CCFLAGS) error.c
23
24      pict.o:         pict.c $(BOOLEAN) $(ERROR) $(PICT)
25          gcc $(CCFLAGS) pict.c
26
```

```
27      lists.o:        lists.c $(BOOLEAN) $(LISTS)
28              gcc $(CCFLAGS) lists.c
29
30      read.o:         read.c $(MISC) $(READ)
31              gcc $(CCFLAGS) read.c
32
33
```

Jul 26 13:23 1991 args.c

```
1       #include <stdio.h>
2       #include <stdarg.h>
3       #include "error.h"
4       #include "boolean.h"
5       #include "misc.h"
6       #include "args.h"
7
8       #define MAX_NAME_LENGTH (50)
9       #define MAX_PARAMETERS (6)
10      #define MAX_OPTIONS (20)
11      #define MAX_ARGS (20)
12
13      typedef enum {INTEGER,FLOAT,STRING} ParamType;
14
15      typedef struct {
16        char *documentation;
17        int numberOfParameters;
18        ParamType types[MAX_PARAMETERS];
19        void *values[MAX_PARAMETERS];
20      } *Arg,ArgBody;
21
22      typedef struct {
23        char optionName[MAX_NAME_LENGTH+1];
24        char *documentation;
25        BOOLEAN *exists;
26        int numberOfParameters;
27        ParamType types[MAX_PARAMETERS];
28        void *values[MAX_PARAMETERS];
29      } *Option,OptionBody;
30
31      static BOOLEAN optionsRequired = TRUE;
32      static int numberOfArguments = 0;
33      static ArgBody args[MAX_ARGS];
34      static int numberOfOptions = 0;
35      static OptionBody options[MAX_OPTIONS];
36
37      void DefArg(char *format,char *documentation,...)
38      {
39        va_list ap;
40        char *p;
41        int i;
42        int parameterCounter;
43
44        if (numberOfArguments==MAX_ARGS)
45          DoError("Def Arg: too many command line options now:\"%s\".\n",format);
46
```

```
47      args[numberOfArguments].documentation = documentation;
48
49      /* now parse the format string */
50      /* get option parameters */
51      va_start(ap,documentation);
52      for (p=format,parameterCounter=0;*p;p++){
53        if (*p=='%'){
54          if (parameterCounter==MAX_PARAMETERS)
55             DoError("Def Arg: too many parameters in \"%s\".\n",format);
56          p++;
57          switch (*p) {
58          case 'd':
59             args[numberOfArguments].types[parameterCounter] = INTEGER;
60             args[numberOfArguments].values[parameterCounter] = va_arg(ap, void *);
61             parameterCounter++;
62             break;
63          case 'f':
64             args[numberOfArguments].types[parameterCounter] = FLOAT;
65             args[numberOfArguments].values[parameterCounter] = va_arg(ap, void *);
66             parameterCounter++;
67             break;
68          case 's':
69             args[numberOfArguments].types[parameterCounter] = STRING;
70             args[numberOfArguments].values[parameterCounter] = va_arg(ap, void *);
71             parameterCounter++;
72             break;
73          default:
74             DoError("DefArg: bad option in \"%s\".\n",format);
75          }
76        }
77      }
78      args[numberOfArguments].numberOfParameters = parameterCounter;
79      ++numberOfArguments;
80      va_end(ap);
81    }
82
83    void DefOption(char *format,char *documentation,BOOLEAN *exists,...)
84    {
85      va_list ap;
86      char *optionName;
87      char *p;
88      int i;
89      int parameterCounter;
90
91      if (numberOfOptions==MAX_OPTIONS)
92         DoError("DefOption: too many command line options now:\"%s\".\n",format);
93
94      /* record exists so that *exists will be TRUE if this option is scanned */
95      options[numberOfOptions].exists = exists;
96
97      options[numberOfOptions].documentation = documentation;
98
99      /* now parse the format string */
100     p=format;
101     /* skip leading spaces */
102     while (*p==' ' && *p!='\0')
103       p++;
104
105     /* get the option name */
106     optionName = options[numberOfOptions].optionName;
107     i=0;
```

```
108    while (*p != '\0' && *p != ' ' && *p != '\t') {
109      if (i<MAX_NAME_LENGTH)
110        optionName[i++] = *p;
111      else
112        DoError("DefOptions: option name too long in \"%s\".\n",format);
113      p++;
114    }
115    optionName[i] = '\0';
116
117    /* get option parameters */
118    va_start(ap,exists);
119    for (parameterCounter=0;*p;p++) {
120      if (*p=='%') {
121        if (parameterCounter == MAX_PARAMETERS)
122          DoError("DefOptions: too many parameters in \"%s\".\n",format);
123        p++;
124        switch (*p) {
125        case 'd':
126          options[numberOfOptions].types[parameterCounter] = INTEGER;
127          options[numberOfOptions].values[parameterCounter] = va_arg(ap, void *);
128          parameterCounter++;
129          break;
130        case 'f':
131          options[numberOfOptions].types[parameterCounter] = FLOAT;
132          options[numberOfOptions].values[parameterCounter] = va_arg(ap, void *);
133          parameterCounter++;
134          break;
135        case 's':
136          options[numberOfOptions].types[parameterCounter] = STRING;
137          options[numberOfOptions].values[parameterCounter] = va_arg(ap, void *);
138          parameterCounter++;
139          break;
140        default:
141          DoError("DefOptions: bad option in \"%s\".\n",format);
142        }
143      }
144    }
145    options[numberOfOptions].numberOfParameters = parameterCounter;
146    ++numberOfOptions;
147    va_end(ap);
148  }
149
150  void PrintHelp(char *name)
151  {
152    int i;
153    fprintf(stderr,"Usage:\n %s\n",name);
154    for (i=0;i<numberOfArguments;++i)
155      fprintf(stderr,"  %s\n",args[i].documentation);
156    for (i=0;i<numberOfOptions;++i)
157      fprintf(stderr,"  [%s]\n",options[i].documentation);
158    DoError("\n",NULL);
159  }
160
161  void ScanArgs(int argc,char **argv)
162  {
163    int i,j,k;
164
165    for (j=0;j<numberOfOptions;++j)
166      *(options[j].exists) = FALSE;
167
```

```
168     if (argc = = 1 && optionsRequired)
169       PrintHelp(argv[0]);
170
171     i=1;
172     for (j=0;j<numberOfArguments;++j) {
173       if (i+args[j].numberOfParameters > argc) {
174         fprintf(stderr,"Required argument expects %d parameters:\n %s\n",
175                 args[j].numberOfParameters,
176                 args[j].documentation);
177         DoError("\n",NULL);
178       }
179       for (k=0;k<args[j].numberOfParameters;++k)
180         switch (args[j].types[k]) {
181         case INTEGER:
182           *(int *)(args[j].values[k]) = atoi(argv[i++]);
183           break;
184         case FLOAT:
185           *(float *)(args[j].values[k]) = atof(argv[i++]);
186           break;
187         case STRING:
188           *(char **)(args[j].values[k]) = argv[i++];
189           break;
190         default:
191           DoError("ScanArgs: internal error - bad type.\n",NULL);
192         }
193     }
194
195     while (i<argc) {
196       for (j=0;j<numberOfOptions;++j)
197         if (!strcmp(options[j].optionName,argv[i])) {
198           if (i+options[j].numberOfParameters >= argc) {
199             fprintf(stderr,"Option %s expects %d parameters:\n %s\n",
200                     options[j].optionName,
201                     options[j].numberOfParameters,
202                     options[j].documentation);
203             DoError("\n",NULL);
204           }
205           *(options[j].exists) = TRUE;
206           ++i;
207           for (k=0;k<options[j].numberOfParameters;++k)
208             switch (options[j].types[k]) {
209             case INTEGER:
210               *(int *)(options[j].values[k]) = atoi(argv[i++]);
211               break;
212             case FLOAT:
213               *(float *)(options[j].values[k]) = atof(argv[i++]);
214               break;
215             case STRING:
216               *(char **)(options[j].values[k]) = argv[i++];
217               break;
218             default:
219               DoError("ScanArgs: internal error - bad type.\n",NULL);
220             }
221           break;
222         }
223       if (j = = numberOfOptions) {
224         fprintf(stderr,"Bad command line argument.\n");
225         PrintHelp(argv[0]);
226       }
227     }
```

```
228     }
229     #ifdef foo
230     void main (int argc,char **argv)
231     {
232      int i;
233      float f;
234      char *s;
235      BOOLEAN haveAString,haveAnInt,haveAFloat,haveAPair;
236
237      DefArg("%s","filename",&s);
238      DefOption("-int %d","-int <int> ",&haveAnInt,&i);
239      DefOption("-float %f","-float <float> ",&haveAFloat,&f);
240      DefOption("-pair %f %d","-pair <float> <int> ",&haveAPair,&f,&i);
241
242      ScanArgs(argc,argv);
243
244      printf("%s\n",s);
245      if (haveAPair)
246       printf("%f %d\n",f,i);
247      if (haveAnInt)
248       printf("%d\n",i);
249      if (haveAFloat)
250       printf("%f\n",f);
251      if (haveAString)
252       printf("%s\n",s);
253     }
254     #endif
```

Jul 26 12:57 1991  error.c

```
1       #include <stdio.h>
2       #include "error.h"
3
4       void DoError(char *string1,char *string2)
5       {
6        if (string2 == NULL)
7         printf(string1);
8        else
9         printf(string1,string2);
10       exit(-1);
11      }
12
```

Jul 26 12:57 1991  lists.c

```
1       #include "stdio.h"
2       #include "boolean.h"
3       #include "lists.h"
4
5       List cdr(List l)
6       {
7        if (l == NULL)
8         return l;
9        else
10        return l->cdr;
```

```
11    }
12
13    void *car(List l)
14    {
15     if (l = = NULL)
16      return l;
17     else
18      return l->car;
19    }
20
21    void *popIntern(List *l)
22    {
23     List temp;
24     if (*l = = NULL)
25      return *l;
26     else {
27      temp = (*l)->car;
28      *l = (*l)->cdr;
29      return temp;
30     }
31    }
32
33    BOOLEAN endp(List l)
34    {
35     return (l = = NULL);
36    }
37
38    List cons(void *theCar,List theCdr)
39    {
40     cell temp;
41     temp = (cell)calloc(1,sizeof(cellBody));
42     if (temp = = NULL) {
43      printf("Cons: out of memory\n");
44      exit(-1);
45     }
46     temp->car = theCar;
47     temp->cdr = theCdr;
48     return temp;
49    }
50
51    void map(List l,mapFun f)
52    {
53     while (l != NULL) {
54      (*f)(l->car);
55      l = l->cdr;
56     }
57    }
58
59    List collect(List l,collectFun c)
60    {
61     List temp;
62     while (l!=NULL) {
63      (*c)(l->car);
64      temp = l;
65      l = l->cdr;
66      free(temp);
67     }
68    }
69
70    int ListLength(List l)
```

```
71    {
72      int count=0;
73      while (l != NULL) {
74        ++count;
75        l = l->cdr;
76      }
77      return count;
78    }
```

Aug 23 19:20 1991 pict.c

```
1     #include <stdio.h>
2     #include <math.h>
3     #include <rasterfile.h>
4     #include "boolean.h"
5     #include "error.h"
6     #include "pict.h"
7
8     static UCHAR bitmasks[] = { 0x80,0x40,0x20,0x10,0x8,0x4,0x2,0x1 };
9
10    ColorMap NewColorMap(int size)
11    {
12      ColorMap cmap;
13      if (size > 256)
14        DoError("NewColorMap: size greater than 256.",NULL);
15      if (size < 1)
16        DoError("NewColorMap: size less than 1.",NULL);
17      if ((cmap = (ColorMap)calloc(1,sizeof(ColorMapBody))) == NULL)
18        DoError("NewColorMap: cannot allocate space.",NULL);
19      cmap->numberOfEntries = size;
20      cmap->red = (UCHAR *)calloc(size,sizeof(UCHAR));
21      cmap->green = (UCHAR *)calloc(size,sizeof(UCHAR));
22      cmap->blue = (UCHAR *)calloc(size,sizeof(UCHAR));
23      if ((cmap->red == NULL)||(cmap->green == NULL)||(cmap->blue == NULL))
24        DoError("NewColorMap: cannot allocate space.",NULL);
25      return cmap;
26    }
27
28    void FreeColorMap(ColorMap cmap)
29    {
30      if (cmap != NULL) {
31        if (cmap->red != NULL)
32          free(cmap->red);
33        if (cmap->green != NULL)
34          free(cmap->green);
35        if (cmap->blue != NULL)
36          free(cmap->blue);
37        free(cmap);
38      }
39    }
40
41    UCHAR ReadColorValue(ColorMap cmap, Color primary, int index)
42    {
43      if (index > cmap->numberOfEntries)
44        DoError("ReadColorValue: index too big.",NULL);
45      if (primary = COLOR_RED)
46        return *(cmap->red+index);
47      if (primary = COLOR_GREEN)
```

```
48        return *(cmap->green+index);
49      if (primary = COLOR_BLUE)
50        return *(cmap->blue+index);
51      DoError("ReadColorValue: bad primary color.",NULL);
52    }
53
54    UCHAR WriteColorValue(ColorMap cmap, int index, UCHAR red, UCHAR green,
55                    UCHAR blue)
56    {
57      if (index > cmap->numberOfEntries)
58        DoError("WriteColorValue: index too big.",NULL);
59      *(cmap->red+index)=red;
60      *(cmap->green+index)=green;
61      *(cmap->blue+index)=blue;
62    }
63
64    Picture new_pict(width,height,depth)
65    int width,height,depth;
66    {
67      Picture pict;
68      int uchar_width;
69
70      if ((pict = (Picture)calloc(1,sizeof(PictureBody))) == NULL)
71        DoError("new_pict: cannot allocate space",NULL);
72      pict->width = width;
73      pict->height = height;
74      pict->depth = depth;
75      pict->cmap = NULL;
76      if (pict->depth == 32)
77        uchar_width = pict->width*4;
78      else if (pict->depth == 8)
79        uchar_width = ROUND2(pict->width);
80      else if (pict->depth == 1)
81        uchar_width = ROUND16(pict->width) >> 3;
82      else
83        DoError("new_pict: only depths of 1 and 8 are supported\n",NULL);
84      pict->uchar_width = uchar_width;
85
86      pict->data = (UCHAR *) calloc(uchar_width * pict->height , sizeof(UCHAR));
87      if (pict->data == NULL)
88        DoError("new_pict: cannot allocate space\n",NULL);
89      return pict;
90    }
91
92    void free_pict(pict)
93    Picture pict;
94    {
95      if (pict->data != NULL)
96        free(pict->data);
97      FreeColorMap(pict->cmap);
98      free(pict);
99    }
100
101   Picture load_pict(fn)
102   char *fn;
103   {
104     FILE *fp;
105     Picture pict;
106     int uchar_width;
107     struct rasterfile header;
```

```
108
109        if ((pict = (Picture)calloc(1,sizeof(PictureBody))) == NULL)
110          DoError("load_pict: cannot allocate space",NULL);
111
112        if ((fp = fopen(fn, "r")) == NULL)
113          DoError("load_pict: error opening input file %s\n",fn);
114
115        /* WARNING - this fread is VERY unsafe! If assumes that the C compiler
116         * puts all fields of a structure adjacent. This is not always the case.
117         * It appears that it works with gcc on a sparcstation, but may not work
118         * on other systems. */
119        fread(&header,sizeof(struct rasterfile),1,fp);
120        if (header.ras_magic != RAS_MAGIC)
121          DoError("load_pict: only supports rasterfile format\n",NULL);
122        if ((header.ras_type != RT_STANDARD)||
123           (header.ras_maptype != RMT_NONE) ||
124           (header.ras_maplength != 0))
125          DoError("load_pict: unsupported rasterfile format\n",NULL);
126
127        pict->width = header.ras_width;
128        pict->height = header.ras_height;
129        pict->depth = header.ras_depth;
130
131        if (pict->depth == 32)
132          uchar_width = pict->width * 4;
133        else if (pict->depth == 8)
134          uchar_width = ROUND2(pict->width);
135        else if (pict->depth == 1)
136          uchar_width = ROUND16(pict->width) >> 3;
137        else
138          DoError("load_pict: only depths of 1, 8, and 32 are supported\n",NULL);
139        pict->uchar_width = uchar_width;
140
141        pict->data = (UCHAR *) calloc(uchar_width * pict->height , sizeof(UCHAR));
142        if (pict->data == NULL)
143          DoError("load_pict: cannot allocate space\n",NULL);
144
145        fread(pict->data, sizeof(UCHAR), uchar_width*pict->height, fp);
146        fclose(fp);
147        return pict;
148      }
149
150      Picture load_header(FILE *fp)
151      {
152        Picture pict;
153        int uchar_width;
154        struct rasterfile header;
155
156        if ((pict = (Picture)calloc(1,sizeof(PictureBody))) == NULL)
157          DoError("load_header: cannot allocate space",NULL);
158
159        /* WARNING - this fread is VERY unsafe! If assumes that the C compiler
160         * puts all fields of a structure adjacent. This is not always the case.
161         * It appears that it works with gcc on a sparcstation, but may not work
162         * on other systems. */
163        if (fread(&header,sizeof(struct rasterfile),1,fp) != 1)
164          DoError("load_header: error reading header",NULL);
165        if (header.ras_magic != RAS_MAGIC)
166          DoError("load_pict: only supports rasterfile format\n",NULL);
167        if ((header.ras_type != RT_STANDARD)||
```

```
168          (header.ras_maptype != RMT_NONE) ||
169          (header.ras_maplength != 0))
170         DoError("load_pict: unsupported rasterfile format\n",NULL);
171
172      pict->width = header.ras_width;
173      pict->height = header.ras_height;
174      pict->depth = header.ras_depth;
175
176      if (pict->depth == 32)
177        uchar_width = pict->width * 4;
178      else if (pict->depth == 8)
179        uchar_width = ROUND2(pict->width);
180      else if (pict->depth == 1)
181        uchar_width = ROUND16(pict->width) >> 3;
182      else
183        DoError("load_header: only depths of 1, 8, and 32 are supported\n",NULL);
184      pict->uchar_width = uchar_width;
185      pict->data = NULL;
186
187      return pict;
188    }
189
190    void write_pict(fn, pict)
191    char *fn;
192    Picture pict;
193    {
194      FILE *fp;
195      int uchar_width;
196      struct rasterfile header;
197
198      if ((fp = fopen(fn, "w")) == NULL)
199        DoError("write_pict: error opening output file %s\n",fn);
200
201      header.ras_magic = RAS_MAGIC;
202      header.ras_width = pict->width;
203      header.ras_height = pict->height;
204      header.ras_depth = pict->depth;
205      header.ras_length = pict->uchar_width*pict->height;
206      header.ras_type = RT_STANDARD;
207      if (pict->cmap == NULL) {
208        header.ras_maptype = RMT_NONE;
209        header.ras_maplength = 0;
210    /* WARNING - this fwrite is VERY unsafe! If assumes that the C compiler
211     * puts all fields of a structure adjacent. This is not always the case.
212     * It appears that it works with gcc on a sparcstation, but may not work
213     * on other systems. */
214        if (fwrite(&header,sizeof(struct rasterfile),1,fp) != 1)
215          DoError("write_pict: error writing header",NULL);
216      }
217      else {
218        header.ras_maptype = RMT_EQUAL_RGB;
219        header.ras_maplength = pict->cmap->numberOfEntries*3;
220    /* WARNING - this fwrite is VERY unsafe! If assumes that the C compiler
221     * puts all fields of a structure adjacent. This is not always the case.
222     * It appears that it works with gcc on a sparcstation, but may not work
223     * on other systems. */
224        if (fwrite(&header,sizeof(struct rasterfile),1,fp) != 1)
225          DoError("write_pict: error writing header",NULL);
226        fwrite(pict->cmap->red,sizeof(UCHAR),pict->cmap->numberOfEntries,fp);
227        fwrite(pict->cmap->green,sizeof(UCHAR),pict->cmap->numberOfEntries,fp);
```

```
228      fwrite(pict->cmap->blue,sizeof(UCHAR),pict->cmap->numberOfEntries,fp);
229    }
230
231    uchar_width = pict->uchar_width;
232    fwrite(pict->data, sizeof(UCHAR), uchar_width*pict->height, fp);
233    fclose(fp);
234  }
235
236  void write_header(FILE *fp, Picture pict)
237  {
238    struct rasterfile header;
239
240    header.ras_magic = RAS_MAGIC;
241    header.ras_width = pict->width;
242    header.ras_height = pict->height;
243    header.ras_depth = pict->depth;
244    header.ras_length = pict->uchar_width*pict->height;
245    header.ras_type = RT_STANDARD;
246    header.ras_maptype = RMT_NONE;
247    header.ras_maplength = 0;
248  /* WARNING - this fwrite is VERY unsafe! If assumes that the C compiler
249   * puts all fields of a structure adjacent. This is not always the case.
250   * It appears that it works with gcc on a sparcstation, but may not work
251   * on other systems. */
252    fwrite(&header,sizeof(struct rasterfile),1,fp);
253  }
254
255  #define BytesPerScanline(pict) (pict->uchar_width)
256
257  UCHAR ReadPixel(pict,x,y)
258  Picture pict;
259  int x,y;
260  {
261    if (pict->depth == 8)
262      return *(pict->data+y*BytesPerScanline(pict)+x);
263    else if (pict->depth == 1)
264      return ((*(pict->data+y*BytesPerScanline(pict)+(x>>3))) &
265            bitmasks[x%8])?1:0;
266    else
267      DoError("ReadPixel: only depths of 1 and 8 are supported\n",NULL);
268  }
269
270  void WritePixel(pict,x,y,color)
271  Picture pict;
272  int x,y;
273  UCHAR color;
274  {
275   if (x<0||x>=pict->width||y<0||y>=pict->height) {
276     char s[256];
277     sprintf(s,"%d %d",x,y);
278     DoError("WritePixel: Out of bounds: ",s);
279   }
280   if (pict->depth == 8)
281     *(pict->data+y*pict->uchar_width+x) = color;
282   else if (pict->depth == 1)
283     if (color)
284       *(pict->data+y*BytesPerScanline(pict)+(x>>3)) |= bitmasks[x%8];
285     else
286       *(pict->data+y*BytesPerScanline(pict)+(x>>3)) &= ~bitmasks[x%8];
287   else
```

```
288        DoError("WritePixel: only depths of 1 and 8 are supported\n",NULL);
289      }
290
291      void WriteClippedPixel(pict,x,y,color)
292      Picture pict;
293      int x,y;
294      UCHAR color;
295      {
296       if (x<0||x>=pict->width||y<0||y>=pict->height) {
297         return;
298       }
299       if (pict->depth == 8)
300         *(pict->data+y*pict->uchar_width+x) = color;
301       else if (pict->depth == 1)
302        if (color)
303         *(pict->data+y*BytesPerScanline(pict)+(x>>3)) |= bitmasks[x%8];
304        else
305         *(pict->data+y*BytesPerScanline(pict)+(x>>3)) &= ~bitmasks[x%8];
306       else
307        DoError("WritePixel: only depths of 1 and 8 are supported\n",NULL);
308      }
309
310      void CopyPicture(Picture dest, Picture src)
311      {
312       int uchar_width;
313       dest->width = src->width;
314       dest->height = src->height;
315       dest->depth = src->depth;
316       dest->uchar_width = BytesPerScanline(src);
317       uchar_width = BytesPerScanline(src);
318       memcpy(dest->data,src->data,uchar_width*src->height);
319      }
```

Jul 26 13:15 1991 read.c

```
1       #include <stdio.h>
2       #include "misc.h"
3       #include "read.h"
4
5       #define MAX_STRING_LEN (255)
6
7       int ReadInt(FILE *fp)
8       {
9        char s[MAX_STRING_LEN];
10       int x;
11
12       fgets(s,MAX_STRING_LEN,fp);
13       while (sscanf(s,"%d",&x)!=1)
14        fprintf(stderr,"ReadInt: integer expected - reenter.\n");
15       return x;
16      }
17
18      int ReadFloat(FILE *fp)
19      {
20       char s[MAX_STRING_LEN];
21       float x;
22
```

```
23      fgets(s,MAX_STRING_LEN,fp);
24      while (sscanf(s,"%f",&x)!=1)
25        fprintf(stderr,"ReadFloat: integer expected - reenter.\n");
26      return x;
27     }
28
29     char *ReadString(FILE *fp)
30     {
31      char s[MAX_STRING_LEN];
32      char *endPtr;
33
34      fgets(s,MAX_STRING_LEN,fp);
35      endPtr = strchr(s,'\n');
36      if (endPtr != NULL)
37        *endPtr = '\0';
38      return strdup(s);
39     }
40
```

Section C

Aug 13 00:13 1991 Makefile

```
1       CCFLAGS = -g -c -I/net/piglet/piglet-1c/hopcroft/new/include
2
3       EXTRNS = /net/piglet/piglet-1c/hopcroft/error/error.o\
4       /net/piglet/piglet-1c/hopcroft/new/pict/pict.o \
5       /net/piglet/piglet-1c/hopcroft/lists/lists.o
6
7       ARGS_MODULE = /net/piglet/piglet-1c/hopcroft/new/ScanArgs/args.o
8
9       SOURCES = Makefile diff2.c dmain.c l2Norm2.c match.c matchparallel.c single.c
10      EXTRNSOURCES = /net/piglet/piglet-1c/hopcroft/error/error.c \
11      /net/piglet/piglet-1c/hopcroft/new/pict/pict.c \
12      /net/piglet/piglet-1c/hopcroft/lists/lists.c
13
14
15      INCLUDE = /net/piglet/piglet-1c/hopcroft/new/include/
16      ARGS = $(INCLUDE)args.h
17      BASELINES = $(INCLUDE)baselines.h
18      BLOBIFY = $(INCLUDE)blobify.h
19      BOOLEAN = $(INCLUDE)boolean.h
20      BOXES = $(INCLUDE)boxes.h
21      CONTOUR = $(INCLUDE)newContour.h
22      DESCRIPTORS = $(INCLUDE)descriptors.h
23      DICT = $(INCLUDE)dict.h
24      DIFF = $(INCLUDE)diff.h
25      DIFF2 = $(INCLUDE)diff2.h
26      ERROR = $(INCLUDE)error.h
27      LINES = $(INCLUDE)lines.h
28      LISTS = $(INCLUDE)lists.h
29      MATCH = $(INCLUDE)match.h
30      MATCHPARALLEL = $(INCLUDE)matchparallel.h
31      MISC = $(INCLUDE)misc.h
32      MYLIB = $(INCLUDE)mylib.h
33      NEWMATCH = $(INCLUDE)newMatch.h
```

```
34  ORIENT = $(INCLUDE)orient.h
35  PICT = $(INCLUDE)pict.h
36  READ = $(INCLUDE)read.h
37  TYPES = $(INCLUDE)types.h
38
39  INCSOURCES = $(BASELINES) $(BLOBIFY) $(BOOLEAN) $(BOXES) $(CONTOUR) \
40  $(DICT) $(DIFF) $(DIFF2) $(LINES) $(LISTS) $(MATCH) $(MATCHPARALLEL) \
41  $(ORIENT) $(PICT) $(TYPES)
42
43  anomalies:   anomalies.o diff2.o newMatch.o ../main/dict.o
44          gcc anomalies.o diff2.o newMatch.o ../main/dict.o $(EXTRNS) -lm -o $@
45
46  descriptors:  descMain.o descriptors.o diff2.o newMatch.o newL2.o ../main/dict.o
47          gcc descMain.o descriptors.o diff2.o newMatch.o newL2.o ../main/dict.o ../lib/mylib.a
            -lm -o $@
48
49  drawBlobs:   drawBlobs.o ../main/dict.o
50          gcc drawBlobs.o ../main/dict.o ../lib/mylib.a -lm -o $@
51
52  compare:    diff2.o dmain.o newMatch.o ../main/dict.o
53          gcc dmain.o diff2.o newMatch.o ../main/dict.o \
54  $(EXTRNS) -lm -o $@
55
56  equiv: equiv.o descriptors.o diff2.o newMatch.o newL2.o ../main/dict.o
57          gcc equiv.o descriptors.o diff2.o newMatch.o newL2.o ../main/dict.o ../lib/mylib.a -lm
            -o $@
58
59  extract:     extract.o ../main/dict.o
60          gcc extract.o ../main/dict.o $(EXTRNS) -o $@
61
62  l2Norm:          l2Norm2.o ../main/dict.o
63          gcc l2Norm2.o ../main/dict.o $(EXTRNS) -lm -o $@
64
65  recogDesc:  recogDesc.o ../main/dict.o diff2.o newMatch.o newL2.o
66          gcc recogDesc.o ../main/dict.o diff2.o newMatch.o newL2.o ../lib/mylib.a -lm -o $@
67
68  resample:    resample.o ../main/dict.o
69          gcc resample.o ../main/dict.o $(EXTRNS) -lm -o $@
70
71  single:          single.o newMatch.o diff2.o newL2.o ../main/dict.o
72          gcc single.o newMatch.o diff2.o newL2.o ../main/dict.o ../lib/mylib.a -lm -o $@
73
74  sortMatrix:  sortMatrix.o
75          gcc sortMatrix.o $(EXTRNS) -o $@
76
77  printAll:    printIncludes printExtrns printCode
78
79  printCode:  $(SOURCES)
80          /usr/5bin/pr -n3 $(SOURCES) | lpr -PWeeklyWorldNews
81
82  printExtrns: $(EXTRNSOURCES)
83          /usr/5bin/pr -n3 $(EXTRNSOURCES) | lpr -PWeeklyWorldNews
84
85  printIncludes:    $(INCSOURCES)
86          /usr/5bin/pr -n3 $(INCSOURCES) | lpr -PWeeklyWorldNews
87
88  anomalies.o:      anomalies.c $(ERROR) $(TYPES) $(PICT) $(DICT) $(DIFF) $(MISC)
89          gcc $(CCFLAGS) anomalies.c
90
```

```
91    descriptors.o:       descriptors.c $(MYLIB) $(TYPES) $(DICT) $(DIFF) $(MISC) $(DESCRIPTORS)
92        gcc $(CCFLAGS) descriptors.c
93
94    descMain.o: descMain.c $(MYLIB) $(TYPES) $(DICT) $(DIFF) $(DESCRIPTORS)
95        gcc $(CCFLAGS) descMain.c
96
97    diff2.o: diff2.c $(BOOLEAN) $(TYPES) $(PICT) $(DIFF2) $(NEWMATCH)
98        gcc $(CCFLAGS) diff2.c
99
100   dmain.o: dmain.c $(BOOLEAN) $(PICT) $(DIFF)
101       gcc $(CCFLAGS) dmain.c
102
103   drawBlobs.o:      drawBlobs.c $(MYLIB) $(TYPES) $(DICT)
104       gcc $(CCFLAGS) drawBlobs.c
105
106   equiv.o:   equiv.c $(MYLIB) $(TYPES) $(DICT) $(DIFF) $(DESCRIPTORS)
107       gcc $(CCFLAGS) equiv.c
108
109   extract.o:    extract.c $(BOOLEAN) $(TYPES) $(DICT)
110       gcc $(CCFLAGS) extract.c
111
112   l2Norm2.o: l2Norm2.c $(BOOLEAN) $(TYPES) $(ERROR) $(DICT)
113       gcc $(CCFLAGS) l2Norm2.c
114
115   match.o: match.c $(BOOLEAN) $(TYPES) $(PICT) $(DIFF2) $(MATCH) $(MATCHPARALLEL)
116       gcc $(CCFLAGS) match.c
117
118   matchparallel.o: matchparallel.c $(BOOLEAN) $(TYPES) $(PICT) $(DIFF2) \
119       $(MATCH) $(MATCHPARALLEL)
120       gcc $(CCFLAGS) matchparallel.c
121
122   newL2.o:   newL2.c $(BOOLEAN) $(ERROR) $(TYPES) $(DICT)
123       gcc $(CCFLAGS) newL2.c
124
125   newMatch.o: newMatch.c $(ERROR) $(MISC) $(NEWMATCH) $(DICT) $(TYPES)
126       gcc $(CCFLAGS) newMatch.c
127
128   recogDesc.o:      recogDesc.c $(MYLIB) $(TYPES) $(DICT) $(DIFF)
129       gcc $(CCFLAGS) recogDesc.c
130
131   resample.o: resample.c $(BOOLEAN) $(TYPES) $(ERROR) $(DICT)
132       gcc $(CCFLAGS) resample.c
133
134   single.o:   single.c $(MYLIB) $(TYPES) $(DICT) $(DIFF) $(DIFF2) $(MATCH)
              $(MATCHPARALLEL)
135       gcc $(CCFLAGS) single.c
136
137   sortMatrix.o:     sortMatrix.c $(ERROR) $(PICT)
138       gcc $(CCFLAGS) sortMatrix.c
```

Jul 9 19:36 1991 anomalies.c

```
1    #include <stdio.h>
2    #include "error.h"
3    #include "types.h"
4    #include "pict.h"
5    #include "dict.h"
```

```
6    #include "diff.h"
7    #include "misc.h"
8
9    #define MAX_STRING_LEN (100)
10   #define MAX_DICTIONARIES (15)
11   #define MAX_WORDS (100)
12   #define MAX_ENTRIES (MAX_WORDS*MAX_WORDS)
13
14   typedef struct {
15    float score;
16    int x;
17    int y;
18   } *CompareTuple,CompareTupleBody;
19
20
21   int ReadInt(FILE *fp)
22   {
23    char s[MAX_STRING_LEN];
24    int x;
25
26    fgets(s,MAX_STRING_LEN,fp);
27    while (sscanf(s,"%d",&x)!=1)
28     fprintf(stderr,"ReadInt: integer expected - reenter.\n");
29    return x;
30   }
31
32   char *ReadString(FILE *fp)
33   {
34    char s[MAX_STRING_LEN];
35    char *endPtr;
36
37    fgets(s,MAX_STRING_LEN,fp);
38    endPtr = strchr(s,'\n');
39    if (endPtr != NULL)
40     *endPtr = '\0';
41    return strdup(s);
42   }
43
44   int TupleLessThan(CompareTuple *x,CompareTuple *y)
45   {
46    if ((*x)->score == (*y)->score)
47     return 0;
48    else if ((*x)->score < (*y)->score)
49     return -1;
50    else
51     return 1;
52   }
53
54   int CountAnomalies(Dictionary d1, Dictionary d2,char *dName1,char *dName2,char
     **words,FILE *outfp)
55   {
56    CompareTupleBody scoreBodies[MAX_ENTRIES];
57    CompareTuple scores[MAX_ENTRIES];
58    Picture pict;
59    int x,y,i,j;
60    int anomalies;
61
62    pict = CompareDictionaries(d1,d2);
63
64    for (y=0,i=0;y<pict->height;++y)
```

```
65        for (x=0;x<pict->width;++x) {
66          CompareTuple temp;
67  /*      temp = (CompareTuple)calloc(1,sizeof(CompareTupleBody));
68          if (temp==NULL)
69             DoError("%s: cannot allocate space.\n",argv[0]);
70  */
71          temp = scoreBodies+i;
72          temp->score = *((float *)(pict->data)+x+y*pict->width);
73          temp->x = x;
74          temp->y = y;
75          scores[i] = temp;
76          ++i;
77        }
78      qsort(scores,i,sizeof(CompareTuple),TupleLessThan);
79      for (j=0,anomalies=0;j<d1->numberOfEntries;++j)
80        if (scores[j]->x != scores[j]->y) {
81          fprintf(outfp,"%s:%s  %s:%s\n",dName1,words[scores[j]->x],
82                          dName2,words[scores[j]->y]);
83          ++anomalies;
84        }
85
86      free_pict(pict);
87      return anomalies;
88    }
89
90    void main(int argc,char **argv)
91    {
92      char *outFile, *listFile;
93      int numberOfDictionaries;
94      Dictionary dictionaries[MAX_DICTIONARIES];
95      char *names[MAX_DICTIONARIES];
96      char *words[MAX_WORDS];
97      int numberOfWords;
98      FILE *listfp,*outfp;
99      int anomalies[MAX_DICTIONARIES][MAX_DICTIONARIES];
100     int i,x,y;
101
102     if (argc != 3)
103       DoError("Usage: %s listfile outfile.\n",argv[0]);
104     listFile = argv[1];
105     outFile = argv[2];
106
107     if ((listfp = fopen(listFile,"r"))==NULL)
108       DoError("Error opening file %s.\n",listFile);
109
110     /* Read in the number of words in each dictionary */
111     numberOfWords = ReadInt(listfp);
112     if (numberOfWords > MAX_WORDS)
113       DoError("%s: too many words.\n",argv[0]);
114
115     /* Read in the words */
116     for (i=0;i<numberOfWords;++i) {
117       words[i] = ReadString(listfp);
118     }
119
120     /* Read in the number of dictionaries */
121     numberOfDictionaries = ReadInt(listfp);
122     if (numberOfDictionaries > MAX_DICTIONARIES)
123       DoError("%s: too many dicitionaries.\n",argv[0]);
124
```

```
125     /* Read in the dictionaries and their names */
126     for (i=0;i<numberOfDictionaries;++i) {
127       names[i] = ReadString(listfp);
128       dictionaries[i] = ReadDictionary(names[i]);
129     }
130
131     /* Check to see that all dictionaries have the same number of shapes as the specified number
        of words. */
132     for (i=1;i<numberOfDictionaries;++i)
133       if (dictionaries[i]->numberOfEntries != numberOfWords)
134         DoError("Dictionary %s has wrong number of entries.\n",names[i]);
135
136     /* Write the results */
137     if ((outfp = fopen(outFile,"w"))==NULL)
138       DoError("Error opening %s for output.\n",outFile);
139     fprintf(outfp,"Words:\n");
140     for (i=0;i<numberOfWords;++i)
141       fprintf(outfp,"%d: %s\n",i,words[i]);
142     fprintf(outfp,"\n");
143     fprintf(outfp,"Dictionaries:\n");
144     for (i=0;i<numberOfDictionaries;++i)
145       fprintf(outfp,"%d: %s\n",i,names[i]);
146     fprintf(outfp,"\n");
147
148     /* Fill in the anomaly counts */
149     for (y=0;y<numberOfDictionaries;++y)
150       for (x=0;x<numberOfDictionaries;++x) {
151         anomalies[y][x] =
        CountAnomalies(dictionaries[y],dictionaries[x],names[y],names[x],words,outfp);
152         printf("(%d,%d): %d\n",x,y,anomalies[y][x]);
153       }
154
155     fprintf(outfp,"\n\n");
156     fprintf(outfp,"      ");
157     for (x = 0; x < numberOfDictionaries; x++)
158       fprintf(outfp,"%7d ",x);
159     fprintf(outfp, "\n");
160     for (y=0;y<numberOfDictionaries;++y) {
161       fprintf(outfp, " %3d ", y);
162       for (x=0;x<numberOfDictionaries;++x)
163         fprintf(outfp,"%7d ",anomalies[y][x]);
164       fprintf(outfp, "\n");
165     }
166     fclose(outfp);
167
168   }

Jul 31 17:14 1991 descMain.c

1     #include <stdio.h>
2     #include "mylib.h"
3     #include "types.h"
4     #include "dict.h"
5     #include "diff.h"
6     #include "descriptors.h"
7
8     void PrintDescriptors(Dictionary models,char *modelName,char **wordNames,
9                     int numberOfFonts,Dictionary fonts[],
10                    char **fontNames,int numberOfWords,
11                    DiffDescriptor dd)
```

```
12    {
13      int modelIndex,fontIndex;
14      int starCount,correctCount;
15      Descriptor thisDescriptor;
16      int lineCount;
17
18      printf("\f\n");
19      PrintWords(wordNames,numberOfWords);
20      lineCount = 0;
21      starCount = 0;
22      correctCount = 0;
23      for (modelIndex=0;modelIndex<numberOfWords;++modelIndex) {
24        printf("%s %s\n",modelName,wordNames[modelIndex]);
25        ++lineCount;
26        for (fontIndex=0;fontIndex<numberOfFonts;++fontIndex) {
27          thisDescriptor =
      ComputeDescriptor(modelIndex,models,fonts[fontIndex],numberOfWords,dd);
28          printf(" ");
29          PrintField(fontNames[fontIndex],20);
30          PrintDescriptor(thisDescriptor,&starCount,&correctCount);
31          printf("\n");
32          ++lineCount;
33        }
34        if (lineCount>30) {
35          printf("\f\n");
36          PrintWords(wordNames,numberOfWords);
37          lineCount = 0;
38        }
39      }
40      fprintf(stdout,"There were %d mismatches ",starCount-
      numberOfWords*numberOfFonts);
41      fprintf(stdout,"better than %d correct matches. (%6.2f%)\n",
42            numberOfWords*numberOfFonts,
43            (float)(numberOfWords*numberOfFonts)/(float)starCount);
44      fprintf(stdout,"There were %d correctly matched words out of %d. (%6.2f%)\n",
45            correctCount,numberOfWords*numberOfFonts,
46            (float)correctCount/(float)numberOfWords/numberOfFonts);
47    }
48
49    void main(int argc,char **argv)
50    {
51      char *listFile;
52      Dictionary models;
53      char *modelName;
54      int numberOfFonts;
55      Dictionary fonts[MAX_FONTS];
56      char *fontNames[MAX_FONTS];
57      char *wordNames[MAX_WORDS];
58      int numberOfWords;
59      float centerWeight;
60      int normalBandWidth;
61      BOOLEAN
      lengthNormalize,useL2,slopeConstrain,warp,topToBottomOption,hillToValleyOption;
62      BOOLEAN separate;
63      float topToBottom,hillToValleyLocal;
64      FILE *listfp;
65      int i,x,y;
66      DiffDescriptorBody dd;
67
68      centerWeight = 1.0;
```

```
69      normalBandWidth = 20;
70      topToBottom = 1.0;
71      hillToValleyLocal = 1.0;
72      DefArg("%s","listFile",&listFile);
73      DefOption("-L2","-L2",&useL2);
74      DefOption("-slopeConstrain %f","-slopeConstrain <center weight>",
75              &slopeConstrain,&centerWeight);
76      DefOption("-warp %f %d","-warp <center weight> <band width>",
77              &warp,&centerWeight,&normalBandWidth);
78      DefOption("-separate","-separate",&separate);
79      DefOption("-normalize","-normalize",&lengthNormalize);
80      DefOption("-topToBottom %f","-topToBottom
        <ratio>",&topToBottomOption,&topToBottom);
81      DefOption("-hillToValley %f","-hillToValley
        <ratio>",&hillToValleyOption,&hillToValleyLocal);
82      ScanArgs(argc,argv);
83
84      if ((listfp = fopen(listFile,"r"))==NULL)
85        DoError("Error opening file %s.\n",listFile);
86
87      /* Read in the number of words in each dictionary */
88      numberOfWords = ReadInt(listfp);
89      if (numberOfWords > MAX_WORDS)
90        DoError("%s: too many words.\n",argv[0]);
91
92      /* Read in the words */
93      for (i=0;i<numberOfWords;++i) {
94        wordNames[i] = ReadString(listfp);
95        }
96
97      /* Read in the model dictionary */
98      modelName = ReadString(listfp);
99      models = ReadDictionary(modelName);
100
101     /* Read in the number of dictionaries */
102     numberOfFonts = ReadInt(listfp);
103     if (numberOfFonts > MAX_FONTS)
104       DoError("%s: too many dictionaries.\n",argv[0]);
105
106     /* Read in the dictionaries and their names */
107     for (i=0;i<numberOfFonts;++i) {
108       fontNames[i] = ReadString(listfp);
109       fonts[i] = ReadDictionary(fontNames[i]);
110       }
111
112     /* Check to see that all dictionaries have the same number of shapes as the specified number
        of words. */
113     for (i=1;i<numberOfFonts;++i)
114       if (fonts[i]->numberOfEntries < numberOfWords)
115         DoError("Dictionary %s has too few entries.\n",fontNames[i]);
116     if (models->numberOfEntries < numberOfWords)
117       DoError("Model dictionary has too few of entries.\n",NULL);
118
119
120     if (useL2) {
121       fprintf(stdout,"Using L2 on length normalized shapes.\n");
122       dd.diffType = L2;
123       }
124     else if (slopeConstrain) {
125       fprintf(stdout,"Using dynamic time warping with slope contrained to [0.5,2].\n");
```

```
126        dd.diffType = CONSTRAINED;
127        dd.separate = separate;
128        if (separate)
129          fprintf(stdout,"Top and bottom warped separately.\n");
130        else
131          fprintf(stdout,"Top and bottom warped together.\n");
132      }
133      else {
134        fprintf(stdout,"Using dynamic time warping with bandwidth %d.\n",normalBandWidth);
135        dd.diffType = WARP;
136        dd.bandWidth = normalBandWidth;
137        dd.separate = separate;
138        if (separate)
139          fprintf(stdout,"Top and bottom warped separately.\n");
140        else
141          fprintf(stdout,"Top and bottom warped together.\n");
142      }
143      if (!useL2) {
144        fprintf(stdout,"Center weight = %f.\n",centerWeight);
145        dd.centerWeight = centerWeight;
146        if (lengthNormalize) {
147          dd.lengthNormalize = TRUE;
148          fprintf(stdout,"Scores normalized by signal length.\n");
149        }
150        else
151          dd.lengthNormalize = FALSE;
152      }
153      dd.hillToValley = hillToValleyLocal;
154      dd.topToBottom = topToBottom;
155      dd.pathFP = NULL;
156
157      fprintf(stdout,"Words:\n");
158      for (i=0;i<numberOfWords;++i)
159        fprintf(stdout,"%d: %s\n",i,wordNames[i]);
160      fprintf(stdout,"\n");
161      fprintf(stdout,"Model font is %s.\n",modelName);
162      fprintf(stdout,"Fonts:\n");
163      for (i=0;i<numberOfFonts;++i)
164        fprintf(stdout,"%d: %s\n",i,fontNames[i]);
165      fprintf(stdout,"\n");
166
167      PrintDescriptors(models,modelName,wordNames,numberOfFonts,fonts,fontNames,numberOfWords,&dd);
168    }
```

Jul 26 13:48 1991 descriptors.c

```
1    #include <stdio.h>
2    #include "mylib.h"
3    #include "types.h"
4    #include "dict.h"
5    #include "diff.h"
6    #include "misc.h"
7    #include "descriptors.h"
8
9    typedef struct {
```

```
10      float score;
11      int word;
12    } *CompareTuple,CompareTupleBody;
13
14    int TupleLessThan(CompareTuple x,CompareTuple y)
15    {
16     if (x->score == y->score)
17       return 0;
18     else if (x->score < y->score)
19       return -1;
20     else
21       return 1;
22    }
23
24    int CompareDescriptorElements(Descriptor x,Descriptor y)
25    {
26     if (*x == *y)
27       return 0;
28     else if (*x < *y)
29       return -1;
30     else
31       return 1;
32    }
33
34    Descriptor ComputeDescriptor(int modelIndex,Dictionary models,Dictionary thisFont,int numberOfWords,
35                     DiffDescriptor dd)
36    {
37     DescriptorElement descriptor[MAX_WORDS+1];
38     CompareTupleBody results[MAX_WORDS];
39     int i;
40
41     for (i=0;i<numberOfWords;++i) {
42       results[i].score = DiffPair(*(models->outlines+modelIndex),*(thisFont->outlines+i),dd);
43       results[i].word = i;
44     }
45     qsort(results,thisFont->numberOfEntries,sizeof(CompareTupleBody),TupleLessThan);
46     for (i=0;i<numberOfWords;++i) {
47       descriptor[i] = results[i].word+1;  /* Descriptor values are one greater than word indices */
48       if (results[i].word == modelIndex) {
49         ++i;
50         break;
51       }
52     }
53     descriptor[i] = '\0';
54     qsort(descriptor,i,sizeof(DescriptorElement),CompareDescriptorElements);
55     return (Descriptor)strdup((char *)descriptor);
56    }
57
58    void PrintField(char *s,int w)
59    {
60     int i,l;
61     printf("%s",s);
62     l = w-strlen(s);
63     for (i=0;i<l;++i)
64       printf(" ");
65    }
66
```

```
67      void PrintDescriptor(Descriptor d,int *starCount,int *correctCount)
68      {
69       int i=1;        /* Descriptor values are one greater than word indices */
70       int temp;
71       temp = *starCount;
72       if (*d == '\0') {
73        printf("*");
74        ++*starCount;
75       }
76       while (*d != '\0') {
77        while (i++ < *d)
78         printf(" ");
79        printf("*");
80        ++*starCount;
81        d++;
82       }
83       if (*starCount-temp==1)
84        ++*correctCount;
85      }
86
87      void PrintWords(char **words,int numberOfWords)
88      {
89       int lengths[MAX_WORDS];
90       int i,j;
91       int maxLength = 0;
92
93       maxLength = 0;
94       for (i=0;i<numberOfWords; ++i) {
95        lengths[i] = strlen(words[i]);
96        if (lengths[i] > maxLength)
97          maxLength = lengths[i];
98       }
99
100      for (j=0;j<maxLength; ++j) {
101       printf("          ");
102       for (i=0;i<numberOfWords; ++i)
103        if (j<lengths[i])
104           printf("%c",*(words[i]+j));
105        else
106           printf(" ");
107       printf("\n");
108      }
109     }
110
111
```

Jul 31 17:11 1991 diff2.c

```
1       #include <stdio.h>
2       #include "boolean.h"
3       #include "types.h"
4       #include "error.h"
5       #include "pict.h"
6       #include "dict.h"
7       #include "diff.h"
8       #include "newMatch.h"
9
```

```
10
11      extern double fabs(double);
12
13      /* Dynamic programming version of DiffPair */
14      inline float DiffPair(OutlinePair one, OutlinePair two,
15                      DiffDescriptor dd)
16      {
17       hillToValley = dd->hillToValley;
18       if ((dd->separate)&&(dd->pathFP!=NULL))
19        DoError("DiffPair: separate cannot be used with pathfile option.\n",NULL);
20       switch (dd->diffType) {
21       case CONSTRAINED:
22        if (dd->pathFP != NULL)
23         return SlopeCMatchAndPath(one->top,one->bottom,one->numberOfLegs,
24                          two->top,two->bottom,two->numberOfLegs,
25                          dd->centerWeight,dd->lengthNormalize,dd->topToBottom,
26                          dd->pathFP);
27        else
28         if (dd->separate)
29          return
            SepSlopeCMatch(one->top,one->numberOfLegs,two->top,two->numberOfLegs,
30                        dd->centerWeight,dd->lengthNormalize)*dd->topToBottom +
31
            SepSlopeCMatch(one->bottom,one->numberOfLegs,two->bottom,two->numberOfLegs,
32                        dd->centerWeight,dd->lengthNormalize);
33         else
34          return SlopeCMatch(one->top,one->bottom,one->numberOfLegs,
35                        two->top,two->bottom,two->numberOfLegs,
36                        dd->centerWeight,dd->lengthNormalize,dd->topToBottom);
37        break;
38       case L2:
39        if (dd->pathFP != NULL)
40         DoError("DiffPair: L2 does not support path computation.\n",NULL);
41        else
42         return L2Compare(one,two,dd->topToBottom);
43        break;
44       case WARP:
45        if (dd->pathFP != NULL)
46         return NewMatchAndPath(one->top,one->bottom,one->numberOfLegs,
47                          two->top,two->bottom,two->numberOfLegs,
48                          dd->centerWeight,dd->lengthNormalize,dd->bandWidth,
49                          dd->topToBottom,
50                          dd->pathFP);
51        else
52         if (dd->separate)
53          return SepMatch(one->top,one->numberOfLegs,two->top,two->numberOfLegs,
54
                        dd->centerWeight,dd->lengthNormalize,dd->bandWidth)*dd->topToBottom +
55
            SepMatch(one->bottom,one->numberOfLegs,two->bottom,two->numberOfLegs,
56                        dd->centerWeight,dd->lengthNormalize,dd->bandWidth);
57         else
58          return
            NewMatch(one->top,one->bottom,one->numberOfLegs,two->top,two->bottom,
            two->numberOfLegs,
59                        dd->centerWeight,dd->lengthNormalize,dd->bandWidth,
60                        dd->topToBottom);
61        break;
```

```
62        default:
63          DoError("DiffPair: internal error.\n",NULL);
64        }
65      }
66
67      #ifdef foo
68      inline float DiffPairAndPath(OutlinePair one, OutlinePair two,
69                         float centerWeight,BOOLEAN lengthNormalize,int
                           normalBandWidth,
70                         char *filename,BOOLEAN doPath)
71      {
72        FILE *fp;
73        float score;
74        if ((fp=fopen(filename,"w"))==NULL)
75          DoError("DiffPairAndMatch: error opening output file %s.\n",filename);
76        score = NewMatchAndPath(one->top,one->bottom,one->numberOfLegs,
77                         two->top,two->bottom,two->numberOfLegs,
78                         centerWeight,lengthNormalize,normalBandWidth,
79                         fp,doPath);
80        fclose(fp);
81        return score;
82      }
83      #endif
84
85      BOOLEAN IsSymmetric(Picture pict)
86      {
87        int x,y;
88        float maxDiff = 0;
89        for (y=0;y<pict->height;++y)
90          for (x=0;x<pict->width;++x) {
91            float temp =  fabs (*((float *)(pict->data)+pict->width*y+x) -
92                           *((float *)(pict->data)+pict->width*x+y));
93            if (temp > maxDiff)
94                maxDiff = temp;
95          }
96        fprintf(stderr,"maxDiff = %f.\n",maxDiff);
97        if (maxDiff > 0.01)
98          return FALSE;
99        return TRUE;
100     }
101
102     /* Given the names of two dictionary files, compute the squared difference
103      * between every pair of shapes in the cross product of the dictionaries.
104      * The result is a matrix printed to stdout. The width and height are
105      * followed by the matrix entries in row major order. The output is in
106      * ascii to facilitate reading by a Symbolics. */
107     Picture CompareDictionaries(Dictionary dict1, Dictionary dict2,DiffDescriptor dd)
108     {
109       Picture pict;
110       int x,y;
111       pict = new_pict(dict2->numberOfEntries,
112                    dict1->numberOfEntries,
113                    32);
114
115       for (y=0;y<pict->height;++y)
116         for (x=0;x<pict->width;++x) {
117           /* for output files when printing and match */
118           printf("---> (%d,%d) <---\n",y,x);
119           *((float *)(pict->data)+pict->width*y+x) =
120               DiffPair(*(dict1->outlines+y),
```

```
121                 *(dict2->outlines+x),
122                 dd);
123         }
124     if (!IsSymmetric(pict))
125       fprintf(stderr,"Matrix is not symmetric.\n");
126     return pict;
127   }
128
129   void WritePictureAsAscii(Picture pict,char *filename,
130                 char *info1, char *info2)
131   {
132     FILE *fp;
133     int x,y;
134     int count;
135
136     if ((fp = fopen(filename,"w"))==NULL)
137       DoError("WritePictureAsAscii: error opening output file\n",NULL);
138     fprintf(fp,"%s\n",info1);
139     fprintf(fp,"%s\n",info2);
140     fprintf(fp,"#\n");
141     fprintf(fp,"%d\n%d\n",pict->width,pict->height);
142     fprintf(fp, "%3s ", "");
143     for (x = 0; x < pict->width; x++)
144       fprintf(fp,"%7d ", x);
145     fprintf(fp, "\n");
146     for (y=0;y<pict->height; ++y) {
147       fprintf(fp, " %3d ", y);
148       count = 1;
149       for (x=0;x<pict->width; ++x) {
150         fprintf(fp,"%7.3f ",*(((float *)pict->data)++));
151   /*    if ((pict->width > 10) && (!((count++)%10)))
152           fprintf(fp,"\n");
153   */  }
154       fprintf(fp, "\n");
155     }
156     fclose(fp);
157   }
```

Jul 22 15:21 1991  dmain.c

```
1     #include <stdio.h>
2     #include <math.h>
3     #include <values.h>
4     #include "boolean.h"
5     #include "types.h"
6     #include "pict.h"
7     #include "dict.h"
8     #include "diff.h"
9     #include "match.h"
10    #include "matchparallel.h"
11
12
13    void main(int argc,char **argv)
14    {
15      Picture pict;
16      char *infile1,*infile2,*outfile,*format;
```

```
17      Dictionary dict1,dict2;
18
19      if (argc != 5) {
20        printf("Usage:\n");
21        printf("  %s infile1 infile2 outfile format\n",argv[0]);
22        printf("  where format is either ascii or pict.\n");
23        exit(-1);
24      }
25
26      infile1 = argv[1];
27      infile2 = argv[2];
28      outfile = argv[3];
29      format = argv[4];
30
31      dict1 = ReadDictionary(infile1);
32      dict2 = ReadDictionary(infile2);
33      pict = CompareDictionaries(dict1,dict2,1,TRUE,20,FALSE);
34      if (!strcmp(format,"pict"))
35        write_pict(outfile,pict);
36      else
37        WritePictureAsAscii(pict,outfile,dict1->infoString,dict2->infoString);
38      }
```

Aug 15 20:20 1991 drawBlobs.c

```
1       #include <stdio.h>
2       #include "mylib.h"
3       #include "types.h"
4       #include "dict.h"
5
6       #define WIDTH (800)
7       #define H_MARGIN (20)
8       #define V_MARGIN (60)
9       #define H_SPACING (20)
10      #define V_SPACING (150) /* Must be greater than 2*X_HEIGHT */
11      #define X_HEIGHT (17)
12
13      extern int irint(double);
14
15      void DrawVLine(Picture pict,int x,int yt,int yb)
16      {
17        int i;
18        for (i=yt;i<yb;++i)
19          WritePixel(pict,x,i,1);
20      }
21
22      void DrawOutline(Picture pict,OutlinePair o,int x,int y)
23      {
24        int i,top,bottom;
25        for (i=0;i<o->numberOfLegs;++i) {
26          top = irint(-*(o->top+i)*X_HEIGHT);
27          bottom = irint(*(o->bottom+i)*X_HEIGHT+X_HEIGHT);
28          DrawVLine(pict,i+x,top+y,bottom+y);
29        }
30      }
31
32      int main(int argc,char **argv)
```

```
33      {
34       char *infile,*outfile;
35       Dictionary dict;
36       Picture pict;
37       int i,totalLegs,totalLines;
38       int x,y,newX;
39
40       DefArg("%s %s","infile outfile",&infile,&outfile);
41       ScanArgs(argc,argv);
42
43       dict = ReadDictionary(infile);
44
45       for (i=0,totalLegs=H_MARGIN,totalLines=V_MARGIN;i<dict->numberOfEntries;++i) {
46        OutlinePair thisOutline = *(dict->outlines+i);
47        totalLegs += thisOutline->numberOfLegs + H_SPACING;
48        if (totalLegs > WIDTH) {
49         totalLines += V_SPACING;
50         totalLegs = H_MARGIN + thisOutline->numberOfLegs + H_SPACING;
51         if (totalLegs > WIDTH)
52             DoError("%s: Shape is too wide.\n",argv[0]);
53        }
54       }
55
56       pict = new_pict(WIDTH,totalLines+V_MARGIN*2,1);
57
58       for (i=0,x=H_MARGIN,y=V_MARGIN;i<dict->numberOfEntries;++i) {
59        OutlinePair thisOutline = *(dict->outlines+i);
60
61        newX = x + thisOutline->numberOfLegs + H_SPACING;
62        if (newX > WIDTH) {
63         newX = H_MARGIN+thisOutline->numberOfLegs+H_SPACING;
64         x = H_MARGIN;
65         y += V_SPACING;
66        }
67
68        DrawOutline(pict,*(dict->outlines+i),x,y);
69
70        x = newX;
71       }
72
73       write_pict(outfile,pict);
74      }
```

Jul 26 16:47 1991 equiv.c

```
1       #include <stdio.h>
2       #include "mylib.h"
3       #include "types.h"
4       #include "dict.h"
5       #include "diff.h"
6       #include "descriptors.h"
7
8       void PrintEquivalenceClasses(int numberOfWords,char **wordNames,
9                                   int numberOfFonts,Dictionary fonts[],char **fontNames,
10                                  DiffDescriptor dd)
11      {
```

```
12      Descriptor descriptors[MAX_FONTS*MAX_FONTS];
13      int matchesWord[MAX_WORDS];
14      int word,font1,font2,i;
15      int totalDifferent,totalWords;
16      int numberOfPairs;
17
18      for (word=0;word<numberOfWords;++word) {
19       for (font1=0,numberOfPairs=0;font1<numberOfFonts;++font1)
20        for (font2=0;font2<font1;++font2)
21            descriptors[numberOfPairs++] = ComputeDescriptor(word,fonts[font1],
22                                              fonts[font2],numberOfWords,dd);
23       for (i=0;i<numberOfWords;++i)
24          matchesWord[i] = 0;
25       for (i=0;i<numberOfPairs;++i) {
26          Descriptor p;
27          p = descriptors[i];
28          while (*p!='\0')
29              matchesWord[*p++ - 1]++;
30       }
31       for (i=0,totalDifferent=0,totalWords=0;i<numberOfWords;++i) {
32          if (matchesWord[i])
33              ++totalDifferent;
34          totalWords += matchesWord[i];
35       }
36       printf("%20s:\t\t%6d %6.2f %6d %6.2f\n",wordNames[word],totalWords,
37              (float)totalWords/numberOfPairs,totalDifferent,
38              (float)totalDifferent/(float)totalWords*numberOfPairs);
39       fprintf(stderr,"%20s:\t\t%6d %6.2f %6d %6.2f\n",wordNames[word],totalWords,
40              (float)totalWords/numberOfPairs,totalDifferent,
41              (float)totalDifferent/(float)totalWords*numberOfPairs);
42      }
43     }
44
45
46     void main(int argc,char **argv)
47     {
48      char *listFile;
49      int numberOfFonts;
50      Dictionary fonts[MAX_FONTS];
51      char *fontNames[MAX_FONTS];
52      char *wordNames[MAX_WORDS];
53      int numberOfWords;
54      float centerWeight;
55      int normalBandWidth;
56      BOOLEAN lengthNormalize,useL2,slopeConstrain,warp,topToBottomOption,hillToValleyOption;
57      float topToBottom,hillToValleyLocal;
58      FILE *listfp;
59      int i,x,y;
60      DiffDescriptorBody dd;
61
62      centerWeight = 1.0;
63      normalBandWidth = 20;
64      topToBottom = 1.0;
65      hillToValleyLocal = 1.0;
66      DefArg("%s","listFile",&listFile);
67      DefOption("-L2","-L2",&useL2);
68      DefOption("-slopeConstrain %f","-slopeConstrain <center weight>",
69              &slopeConstrain,&centerWeight);
```

```
70      DefOption("-warp %f %d","-warp <center weight> <band width>",
71              &warp,&centerWeight,&normalBandWidth);
72      DefOption("-normalize","-normalize",&lengthNormalize);
73      DefOption("-topToBottom %f","-topToBottom
        <ratio>",&topToBottomOption,&topToBottom);
74      DefOption("-hillToValley %f","-hillToValley
        <ratio>",&hillToValleyOption,&hillToValleyLocal);
75      ScanArgs(argc,argv);
76
77      if ((listfp = fopen(listFile,"r"))==NULL)
78        DoError("Error opening file %s.\n",listFile);
79
80      /* Read in the number of words in each dictionary */
81      numberOfWords = ReadInt(listfp);
82      if (numberOfWords > MAX_WORDS)
83        DoError("%s: too many words.\n",argv[0]);
84
85      /* Read in the words */
86      for (i=0;i<numberOfWords;++i) {
87        wordNames[i] = ReadString(listfp);
88      }
89
90      /* Read in the number of dictionaries */
91      numberOfFonts = ReadInt(listfp);
92      if (numberOfFonts > MAX_FONTS)
93        DoError("%s: too many dictionaries.\n",argv[0]);
94
95      /* Read in the dictionaries and their names */
96      for (i=0;i<numberOfFonts;++i) {
97        fontNames[i] = ReadString(listfp);
98        fonts[i] = ReadDictionary(fontNames[i]);
99      }
100
101     /* Check to see that all dictionaries have the same number of shapes as the specified number
        of words. */
102     for (i=1;i<numberOfFonts;++i)
103       if (fonts[i]->numberOfEntries < numberOfWords)
104         DoError("Dictionary %s has too few entries.\n",fontNames[i]);
105
106     if (useL2) {
107       printf("Using L2 on length normalized shapes.\n");
108       dd.diffType = L2;
109     }
110     else if (slopeConstrain) {
111       printf("Using dynamic time warping with slope contrained to [0.5,2].\n");
112       dd.diffType = CONSTRAINED;
113     }
114     else {
115       printf("Using dynamic time warping with bandwidth %d.\n",normalBandWidth);
116       dd.diffType = WARP;
117       dd.bandWidth = normalBandWidth;
118     }
119     if (!useL2) {
120       printf("Center weight = %f.\n",centerWeight);
121       dd.centerWeight = centerWeight;
122       if (lengthNormalize) {
123         dd.lengthNormalize = TRUE;
124         printf("Scores normalized by signal length.\n");
125       }
126       else
```

```
127        dd.lengthNormalize = FALSE;
128      }
129      dd.hillToValley = hillToValleyLocal;
130      dd.topToBottom = topToBottom;
131      dd.pathFP = NULL;
132
133      printf("Fonts:\n");
134      for (i=0;i<numberOfFonts;++i)
135        printf("%d: %s\n",i,fontNames[i]);
136      printf("\n");
137
138
         PrintEquivalenceClasses(numberOfWords,wordNames,numberOfFonts,fonts,fontNames,&dd);
139    }
140
141
142
143
144
145
146
```

Jul 3 14:31 1991 extract.c

```
1      #include <stdio.h>
2      #include <math.h>
3      #include <values.h>
4      #include "boolean.h"
5      #include "types.h"
6      #include "dict.h"
7
8      #define MAX_STRING_LEN 100
9      int ReadInt(FILE *fp)
10     {
11       char s[MAX_STRING_LEN];
12       int x;
13
14       fgets(s,MAX_STRING_LEN,fp);
15       while (sscanf(s,"%d",&x)!=1)
16         fprintf(stderr,"ReadInt: integer expected - reenter.\n");
17       return x;
18     }
19
20     void main(int argc,char **argv)
21     {
22       char *infile,*listFile,*outfile;
23       Dictionary dict1,dict2;
24       int i;
25       int numberOfEntries;
26       FILE *fp;
27
28       if (argc != 4) {
29         printf("Usage:\n");
30         printf("  %s infile listfile outfile\n",argv[0]);
31         exit(-1);
32       }
33
```

```
34      infile = argv[1];
35      listFile = argv[2];
36      outfile = argv[3];
37
38      dict1 = ReadDictionary(infile);
39
40      if ((fp=fopen(listFile,"r"))==NULL)
41        DoError("%s: error reading list file.\n",argv[0]);
42
43      numberOfEntries = ReadInt(fp);
44      if (numberOfEntries < 0)
45        DoError("%s: list file must have a positive number of elements.\n",argv[0]);
46      printf("Copying %d shapes.\n",numberOfEntries);
47
48      dict2 = NewDict(numberOfEntries);
49
50      dict2->infoString = dict1->infoString;
51      for (i=0;i<numberOfEntries;++i) {
52        int shape;
53        shape = ReadInt(fp);
54        if ((shape<0)||(shape>=dict1->numberOfEntries))
55          DoError("%s: bad shape index.\n",argv[0]);
56        *(dict2->outlines+i) = *(dict1->outlines+shape);
57        *(dict2->rawOutlines+i) = *(dict1->rawOutlines+shape);
58      }
59      fclose(fp);
60      WriteDictionary(dict2,outfile);
61
62    }
```

Jun 14 16:12 1991 l2Norm.c

```
1     #include <stdio.h>
2     #include <values.h>
3     #include <string.h>
4     #include "boolean.h"
5     #include "types.h"
6     #include "error.h"
7     #include "dict.h"
8
9     float L2Norm(OutlinePair signal, int startOffset,
10               OutlinePair model)
11    {
12      float *top1,*top2,*bottom1,*bottom2;
13      int i,overlap;
14      float sum;
15      float temp;
16
17      if ((startOffset < 0) ||
18         (startOffset + model->numberOfLegs > signal->numberOfLegs))
19        DoError("L2Norm: the model must overlap the signal.\n",NULL);
20
21      top1 = signal->top+startOffset;
22      top2 = model->top;
23      bottom1 = signal->bottom+startOffset;
24      bottom2 = model->bottom;
25
```

```
26      overlap = signal->numberOfLegs - startOffset;
27      if (overlap > model->numberOfLegs)
28        overlap = model->numberOfLegs;
29
30      for (i=0,sum=0;i<overlap; ++i) {
31        temp = *top1++ - *top2++;
32        sum += temp * temp;
33        temp = *bottom1++ - *bottom2++;
34        sum += temp * temp;
35      }
36
37      return sum;
38    }
39
40    OutlinePair LookupShape(char c, Dictionary models)
41    {
42    /* dictionary file has the following order:
43      ABCDEFGHIJKLMNOPQRSTUVWXYZ
44      abcdefghijklmnopqrstuvwxyz
45      0123456789
46      ,.
47    */
48      int shapeIndex;
49      if ((c>='a'&&c<='z'))
50        shapeIndex = c-'a';
51      else if (c == ',')
52        shapeIndex = 26;
53      else if (c == '.')
54        shapeIndex = 27;
55      else
56        DoError("LookupShape: have no shape one of the characters.\n",NULL);
57      return *(models->outlines+shapeIndex);
58    }
59
60
61    #define MAX_STRING_LENGTH 30
62    #define MAX_SHIFT 10
63    #define MAX_OVERLAP 5
64    float L2CompareWithString(OutlinePair signal, char *string,
65                              Dictionary models)
66    {
67      float *costMatrix;
68      int *pathMatrix;
69      int numberOfChars;
70      int letterIndex, startOffset;
71      float *cursor;
72      int left;
73      int right;
74      OutlinePair modelShapes[MAX_STRING_LENGTH];
75      char *charCursor;
76      float minValue;
77      float temp;
78      int i,oldLeft,oldRight,minIndex;;
79
80    /* Make sure input string is not too long. */
81      numberOfChars = strlen(string);
82      if (numberOfChars >= MAX_STRING_LENGTH)
83        DoError("L2CompareWithString: string is too long.\n",NULL);
84
```

```
85      /* Allocate space for dynamic programming array. */
86      /* For now, be a space hog. */
87       costMatrix = (float *)calloc(signal->numberOfLegs*numberOfChars,
88                            sizeof(float));
89       pathMatrix = (int *)calloc(signal->numberOfLegs*numberOfChars,
90                            sizeof(int));
91       if ((costMatrix == NULL)||(pathMatrix == NULL))
92         DoError("L2CompareWithString: cannot allocate space.\n",NULL);
93
94      /* Lookup the shapes corresponding to the characters in the string. */
95       charCursor = string;
96       for (i=0;i<numberOfChars;++i)
97         modelShapes[i]=LookupShape(*charCursor++,models);
98
99      /* Since the cost matrix is larger than the region containing valid
100      * alignments, first fill in the array with large costs. Later, some
101      * of these will be overwritten. */
102      cursor = costMatrix;
103      for (i=0;i<signal->numberOfLegs*numberOfChars; ++i)
104        *cursor++ = MAXFLOAT;
105
106     /* Fill in leftmost column */
107      left = 0;
108      right = MAX_SHIFT;
109      for (startOffset=left;startOffset<right; ++startOffset)
110       if (startOffset + modelShapes[0]->numberOfLegs <=
111           signal->numberOfLegs)
112        *(costMatrix+startOffset*numberOfChars) =
113           L2Norm(signal, startOffset, modelShapes[0]);
114
115     /* Now do the rest of the columns */
116      for (letterIndex = 1; letterIndex < numberOfChars; ++letterIndex) {
117       oldLeft = left;
118       oldRight = right;
119       left += modelShapes[letterIndex-1]->numberOfLegs;
120       right += modelShapes[letterIndex-1]->numberOfLegs + MAX_SHIFT;
121       for (startOffset=left;startOffset<right; ++startOffset) {
122        if (startOffset + modelShapes[letterIndex]->numberOfLegs <=
123            signal->numberOfLegs) {
124         temp = L2Norm(signal, startOffset, modelShapes[letterIndex]);
125
126     /* This could be made quite a bit faster since for each start offset,
127      * we just add an element to the set we are minimizing over. */
128         minValue = MAXFLOAT;
129     /* *(costMatrix+oldLeft*numberOfChars+letterIndex-1); */
130         minIndex = oldLeft;
131         for (i=oldLeft;(i<oldRight)&&(i<startOffset); ++i) {
132          float temp2;
133          temp2 = *(costMatrix+i*numberOfChars+letterIndex-1);
134          if (temp2 < minValue) {
135           minIndex = i;
136           minValue = temp2;
137          }
138         }
139         *(costMatrix+startOffset*numberOfChars+letterIndex) =
140            minValue + temp;
141         *(pathMatrix+startOffset*numberOfChars+letterIndex) =
142            minIndex;
143        } /* End of if */
144
```

```
145        } /* for startOffset */
146      } /* for letterIndex */
147
148      /* Now that all the costs have been filled in, find the cheapest */
149      if (right-1+modelShapes[numberOfChars-1]->numberOfLegs+MAX_SHIFT <
150          signal->numberOfLegs)
151      /* In this case, the chain of letter shapes does not span the signal. */
152        minValue = MAXFLOAT;
153      else {
154        minValue = MAXFLOAT;
155        minIndex = left;
156        for (i=left;(i<right)&&(i<signal->numberOfLegs);++i) {
157          float temp2;
158          temp2 = *(costMatrix+i*numberOfChars+numberOfChars-1);
159          if (temp2 < minValue) {
160             minIndex = i;
161             minValue = temp2;
162          }
163        }
164      }
165
166      free(costMatrix);
167      free(pathMatrix);
168      return minValue;
169    }
170
171    void PrintPath(int *pm, int width, int height, int index)
172    {
173      int i;
174      for (i=width-1;i>=0;--i) {
175        printf("%d ",index);
176        index = *(pm+index*width+i);
177      }
178      printf("\n");
179    }
180
181    void PrintMatrix(float *m,int width, int height)
182    {
183      int i;
184      int j;
185      for (i=0;i<height;++i) {
186        printf("%d: ",i);
187        for (j=0;j<width;++j)
188          printf("%6.2e ",*m++);
189        printf("\n");
190      }
191    }
192
193    typedef struct CTuple {
194      int index;
195      float value;
196    } CompareTuple;
197
198    int TupleLessThan(CompareTuple *t1, CompareTuple *t2)
199    {
200      return t1->value > t2->value;
201    }
202
203    void L2CompareDictToString(Dictionary unknownDict,
```

```
204                          char *string,
205                          Dictionary modelDict,
206                          BOOLEAN isBatch)
207   {
208     CompareTuple *results;
209     int i;
210
211     if ((results = (CompareTuple *)calloc(unknownDict->numberOfEntries,
212                                sizeof(CompareTuple))) ==
213       NULL)
214       DoError("L2CompareDictToString: cannot allocate space.\n",NULL);
215
216     for (i=0;i<unknownDict->numberOfEntries;++i) {
217       (*(results+i)).index = i;
218       (*(results+i)).value = L2CompareWithString(*(unknownDict->outlines+i),
219                                  string,
220                                  modelDict);
221     }
222
223     qsort(results,
224           unknownDict->numberOfEntries,
225           sizeof(CompareTuple),
226           TupleLessThan);
227
228     if (isBatch) {
229       printf("%d(%f)\n",(*results).index,(*results).value);
230     }
231     else {
232       printf("\n");
233       for (i=0;(i<5)&&(i<unknownDict->numberOfEntries);++i)
234         printf("%d: %f\n",(*(results+i)).index,(*(results+i)).value);
235       printf("\n");
236     }
237
238     free(results);
239   }
240
241   void main(int argc,char **argv)
242   {
243     char *unknowns,*models;
244     char s[MAX_STRING_LENGTH+1];
245     Dictionary unknownDict, modelDict;
246     int selection;
247     char *crPointer;
248     BOOLEAN done = FALSE;
249     BOOLEAN batch;
250     char *words;
251
252     if (argc != 3 && argc != 4) {
253       printf("Usage:\n");
254       printf(" %s <unknowns> <alphabet> [<batch wordlist>]\n",argv[0]);
255       printf(" If the batch file is not specified, the program runs\n");
256       printf(" in interactive mode.\n");
257       exit(-1);
258     }
259
260     unknowns = argv[1];
261     models = argv[2];
262     if (argc == 4) {
263       batch = TRUE;
```

```
264         words = argv[3];
265       } else
266         batch = FALSE;
267
268       unknownDict = ReadDictionary(unknowns);
269       modelDict = ReadDictionary(models);
270
271       if (batch) {
272         FILE *fp;
273         if ((fp = fopen(words,"r"))==NULL)
274           DoError("l2Norm: can't open input file %s.\n",words);
275         while (!done) {
276           fgets(s,MAX_STRING_LENGTH,fp);
277           if ((s[0] == '\0') || (s[0] == '\n'))
278               done = TRUE;
279           else {
280               crPointer = strchr(s,'\n');
281               if (crPointer != NULL)
282                 *crPointer = '\0';
283               printf("%s: ",s);
284               L2CompareDictToString(unknownDict,s,modelDict,TRUE);
285           }
286         }
287       }
288       else {
289         while (!done) {
290           printf("Enter a word to search for: ");
291           fgets(s,MAX_STRING_LENGTH,stdin);
292           if ((s[0] == '\0') || (s[0] == '\n'))
293               done = TRUE;
294           else {
295               crPointer = strchr(s,'\n');
296               if (crPointer != NULL)
297                 *crPointer = '\0';
298               printf("Comparing shape %s to the image\n",s);
299               L2CompareDictToString(unknownDict,s,modelDict,FALSE);
300           }
301         }
302       }
303     }
304
```

Jun 18 17:00 1991 l2Norm2.c

```
1     #include <stdio.h>
2     #include <values.h>
3     #include <string.h>
4     #include "boolean.h"
5     #include "types.h"
6     #include "error.h"
7     #include "dict.h"
8
9     #define MAX_STRING_LENGTH 30
10    #define MAX_SIGNAL_LENGTH 300
11    #define MAX_SHIFT 10
12
13    #define MIN(a,b) ((a)<(b)?(a):(b))
```

```
14      #define MAX(a,b) ((a)>(b)?(a):(b))
15
16      typedef struct {
17        int numberOfSymbols;
18        int signalLength;
19        float *costs;
20      } *CorrelationSet,CorrelationSetBody;
21
22      CorrelationSet NewCorrelationSet(int numberOfSymbols,int signalLength)
23      {
24        CorrelationSet temp;
25        if ((temp = (CorrelationSet)calloc(1,sizeof(CorrelationSetBody))) = =NULL)
26          DoError("NewCorrelationSet: cannot allocate space.\n",NULL);
27        temp->numberOfSymbols = numberOfSymbols;
28        temp->signalLength = signalLength;
29        if ((temp->costs = (float *)calloc(numberOfSymbols*signalLength,sizeof(float))) = =NULL)
30          DoError("NewCorrelationSet: cannot allocate space.\n",NULL);
31        return temp;
32      }
33
34      #ifdef foo
35      float CorrelationValue(CorrelationSet c,int symbol,int offset)
36      {
37        return *(c->costs + symbol*c->signalLength + offset);
38      }
39
40      void SetCorrelationValue(CorrelationSet c,int symbol,int offset,float value)
41      {
42        *(c->costs+symbol*c->signalLength+offset) = value;
43      }
44      #endif
45      #define CorrelationValue(c,s,o) (*((c)->costs+(s)*(c)->signalLength+(o)))
46      #define SetCorrelationValue(c,s,o,v) (*((c)->costs+(s)*(c)->signalLength+(o))=(v))
47
48      int CorrelationSetSize(CorrelationSet c)
49      {
50        return c->numberOfSymbols;
51      }
52
53      int CorrelationSetWidth(CorrelationSet c)
54      {
55        return c->signalLength;
56      }
57
58      void PrintCorrelation(CorrelationSet c,int character)
59      {
60        int i;
61
62        for (i=0;i<c->signalLength;++i) {
63          printf("%d:%6.2f\n",i,*(c->costs+character*c->signalLength+i));
64        }
65        printf("\n");
66      }
67
68      float L2Norm(OutlinePair signal, int startOffset,
69                   OutlinePair model)
70      {
71        float *top1,*top2,*bottom1,*bottom2;
72        int i,overlap;
73        float sum;
```

```
74      float temp;
75
76      if ((startOffset < 0) ||
77         (startOffset + model->numberOfLegs > signal->numberOfLegs))
78        DoError("L2Norm: the model must overlap the signal.\n",NULL);
79
80      top1 = signal->top+startOffset;
81      top2 = model->top;
82      bottom1 = signal->bottom+startOffset;
83      bottom2 = model->bottom;
84
85      overlap = signal->numberOfLegs - startOffset;
86      if (overlap > model->numberOfLegs)
87        overlap = model->numberOfLegs;
88
89      for (i=0,sum=0;i<overlap;++i){
90        temp = *top1++ - *top2++;
91        sum += temp * temp;
92        temp = *bottom1++ - *bottom2++;
93        sum += temp * temp;
94      }
95
96      return sum;
97    }
98
99    CorrelationSet PreProcessSignalWithChars(OutlinePair signal,Dictionary charDict)
100   {
101     CorrelationSet cSet;
102     int thisChar,offset;
103     OutlinePair charSignal;
104
105     cSet = NewCorrelationSet(charDict->numberOfEntries,signal->numberOfLegs);
106
107     for (thisChar = 0; thisChar < charDict->numberOfEntries; ++thisChar) {
108       charSignal = *(charDict->outlines+thisChar);
109       for (offset = 0; offset < signal->numberOfLegs-charSignal->numberOfLegs+1 ;
             ++offset)
110         SetCorrelationValue(cSet,thisChar,offset,L2Norm(signal,offset,charSignal));
111     }
112     return cSet;
113   }
114
115   CorrelationSet *PreProcessDictionaryWithChars(Dictionary signalDict,Dictionary charDict)
116   {
117     CorrelationSet *correlationSets;
118     int thisWord;
119
120     correlationSets = (CorrelationSet
          *)calloc(signalDict->numberOfEntries,sizeof(CorrelationSet));
121     if (correlationSets == NULL)
122       DoError("PreProcessDicitonary: cannot allocate space.\n",NULL);
123     for (thisWord = 0; thisWord < signalDict->numberOfEntries; ++thisWord) {
124       *(correlationSets+thisWord) =
          PreProcessSignalWithChars(*(signalDict->outlines+thisWord),charDict);
125       printf("%d ",thisWord);
126     }
127     return correlationSets;
128   }
129
130   CorrelationSet PreProcessSignalWithBlanks(OutlinePair signal)
```

```
131    {
132     CorrelationSet cSet;
133     int blankWidth,offset;
134     int numberOfLegs = signal->numberOfLegs;
135
136     cSet = NewCorrelationSet(MAX_SHIFT,numberOfLegs);
137
138     for (offset = 0; offset < numberOfLegs; ++offset) {
139      SetCorrelationValue(cSet,0,offset,0);
140     }
141     for (offset = 0; offset < numberOfLegs; ++offset) {
142      float top,bottom;
143      top = *(signal->top+offset);
144      bottom = *(signal->bottom+offset);
145      SetCorrelationValue(cSet,1,offset,top*top+bottom*bottom);
146     }
147     for (blankWidth = 2; blankWidth < MAX_SHIFT; ++blankWidth) {
148      for (offset = 0; offset < numberOfLegs-blankWidth+1; ++offset) {
149       float top,bottom,temp;
150       top = *(signal->top+offset+blankWidth-1);
151       bottom = *(signal->bottom+offset+blankWidth-1);
152       temp = top*top+bottom*bottom+CorrelationValue(cSet,blankWidth-1,offset);
153       SetCorrelationValue(cSet,blankWidth,offset,temp);
154      }
155     }
156     return cSet;
157    }
158
159    CorrelationSet *PreProcessDictionaryWithBlanks(Dictionary signalDict)
160    {
161     CorrelationSet *correlations;
162     int thisWord;
163
164     correlations = (CorrelationSet *)calloc(signalDict->numberOfEntries,sizeof(CorrelationSet));
165
166     for (thisWord = 0; thisWord < signalDict->numberOfEntries; ++thisWord) {
167      *(correlations+thisWord) = PreProcessSignalWithBlanks(*(signalDict->outlines+thisWord));
168      printf("%d ",thisWord);
169     }
170     return correlations;
171    }
172
173    int LookupShapeIndex(char c, Dictionary models)
174    {
175    /* dictionary file has the following order:
176     ABCDEFGHIJKLMNOPQRSTUVWXYZ
177     abcdefghijklmnopqrstuvwxyz
178     0123456789
179     ,.
180    */
181     int shapeIndex;
182     if ((c>='a'&&c<='z'))
183      shapeIndex = c-'a';
184     else if (c == ',')
185      shapeIndex = 26;
186     else if (c == '.')
187      shapeIndex = 27;
188     else
```

```
189       DoError("LookupShape: have no shape one of the characters.\n",NULL);
190       return shapeIndex;
191     }
192
193
194     float L2CompareWithString(int signalIndex,
195                               char *string,
196                               CorrelationSet charCorrelations,
197                               CorrelationSet blankCorrelations,
198                               Dictionary signalDict,
199                               Dictionary models)
200     {
201     /* Allocate space for dynamic programming array. */
202     /* For now, be a space hog. */
203       float costMatrix[MAX_SIGNAL_LENGTH][MAX_STRING_LENGTH];
204       int pathMatrix[MAX_SIGNAL_LENGTH][MAX_STRING_LENGTH];
205       char *charCursor;
206       OutlinePair modelShapes[MAX_STRING_LENGTH];
207       int modelIndices[MAX_STRING_LENGTH];
208       int numberOfChars;
209
210       int letterIndex, startOffset;
211       int left,right;
212       int searchLeft,searchRight,rightEdge;
213       float minValue;
214       float temp;
215       int i,oldLeft,oldRight,minIndex;
216       int signalLength;
217
218       signalLength = (*(signalDict->outlines+signalIndex))->numberOfLegs;
219
220     /* Make sure input string is not too long. */
221       numberOfChars = strlen(string);
222       if (numberOfChars >= MAX_STRING_LENGTH)
223         DoError("L2CompareWithString: string is too long.\n",NULL);
224
225     /* Make sure signal is not too long. */
226       if (signalLength >= MAX_SIGNAL_LENGTH)
227         DoError("L2CompareWithString: signal is too long.\n",NULL);
228
229     /* Lookup the indices of the signals corresponding to the characters in the string. */
230       charCursor = string;
231       for (i=0;i<numberOfChars;++i) {
232         modelIndices[i] = LookupShapeIndex(*charCursor++,models);
233         modelShapes[i] = *(models->outlines+modelIndices[i]);
234       }
235
236     /* Since the cost matrix is larger than the region containing valid
237      * alignments, first fill in the array with large costs. Later, some
238      * of these will be overwritten. */
239     /* WARNING: does MAXFLOAT + smallFloat == MAXFLOAT or does it roll? */
240       {
241       float *cursor;
242       cursor = &(costMatrix[0][0]);
243       for (i=0;i<MAX_SIGNAL_LENGTH*MAX_STRING_LENGTH;++i)
244         *cursor++ = MAXFLOAT;
245       }
246
247     /* Fill in leftmost column */
248       left = 0;
```

```
249     right = MIN(MAX_SHIFT,signalLength-modelShapes[0]->numberOfLegs);
250     for (startOffset=left;startOffset<right;++startOffset)
251       costMatrix[startOffset][0] = CorrelationValue(blankCorrelations,startOffset,startOffset)
        +
252                  CorrelationValue(charCorrelations,modelIndices[0],startOffset);
253
254     /* Now do the rest of the columns */
255     for (letterIndex = 1; letterIndex < numberOfChars; ++letterIndex) {
256       oldLeft = left;
257       oldRight = right;
258       left += modelShapes[letterIndex-1]->numberOfLegs;
259     /* If string of characters is too long for this signal, abort by returning a large cost. */
260       if (left>=signalLength)
261         return MAXFLOAT;
262       right += modelShapes[letterIndex-1]->numberOfLegs + MAX_SHIFT;
263       right = MIN(right,signalLength-modelShapes[letterIndex]->numberOfLegs+1);
264
265       for (startOffset=left;startOffset<right;++startOffset) {
266         temp = CorrelationValue(charCorrelations,modelIndices[letterIndex],startOffset);
267
268     /* This could be made quite a bit faster since for each start offset,
269      * we just add an element to the set we are minimizing over. */
270
271         searchLeft = startOffset-modelShapes[letterIndex-1]->numberOfLegs-MAX_SHIFT;
272         searchLeft = MAX(searchLeft,oldLeft);
273         rightEdge = searchLeft+modelShapes[letterIndex-1]->numberOfLegs;
274         searchRight = startOffset-modelShapes[letterIndex-1]->numberOfLegs;
275         searchRight = MIN(searchRight,oldRight);
276
277         minIndex = searchLeft;
278         minValue = costMatrix[searchLeft][letterIndex-1] +
279             CorrelationValue(blankCorrelations,startOffset-rightEdge,rightEdge);
280
281         for (i=searchLeft;i<searchRight;++i,++rightEdge) {
282           float temp;
283           temp = costMatrix[i][letterIndex-1] +
284             CorrelationValue(blankCorrelations,startOffset-rightEdge,rightEdge);
285           if (temp < minValue) {
286             minIndex = i;
287             minValue = temp;
288           }
289         }
290
291         costMatrix[startOffset][letterIndex] = minValue+temp;
292         pathMatrix[startOffset][letterIndex] = minIndex;
293       } /* for startOffset */
294     } /* for letterIndex */
295
296
297     /* fill in the costs for blanks at the end of the word */
298     rightEdge = left+modelShapes[letterIndex-1]->numberOfLegs;
299     for (startOffset=left;startOffset<right;++startOffset,++rightEdge) {
300       if (rightEdge+MAX_SHIFT >= signalLength) {
301         costMatrix[startOffset][letterIndex-1] +=
302           CorrelationValue(blankCorrelations,signalLength-1-rightEdge,rightEdge);
303       }
304       else {
305       /* this chain of letters does not span the word */
306         costMatrix[startOffset][letterIndex-1] = MAXFLOAT;
307       }
```

```
308      }
309
310      /* keep minIndex for debugging pruposes */
311       minIndex = left;
312       minValue = costMatrix[left][letterIndex-1];
313       for (i=left;i<right;++i) {
314        float temp;
315        temp = costMatrix[i][letterIndex-1];
316        if (temp < minValue) {
317         minIndex = i;
318         minValue = temp;
319        }
320       }
321
322       return minValue;
323      }
324
325      void PrintPath(int *pm, int width, int height, int index)
326      {
327       int i;
328       for (i=width-1;i>=0;--i) {
329        printf("%d ",index);
330        index = *(pm+index*width+i);
331       }
332       printf("\n");
333      }
334
335      void PrintMatrix(float *m,int width, int height)
336      {
337       int i;
338       int j;
339       for (i=0;i<height;++i) {
340        printf("%d: ",i);
341        for (j=0;j<width;++j)
342         printf("%6.2e ",*m++);
343        printf("\n");
344       }
345      }
346
347      typedef struct CTuple {
348       int index;
349       float value;
350      } CompareTuple;
351
352      int TupleLessThan(CompareTuple *t1, CompareTuple *t2)
353      {
354       return t1->value > t2->value;
355      }
356
357      void L2CompareDictToString(char *string,
358                         CorrelationSet *charCorrelations,
359                         CorrelationSet *blankCorrelations,
360                         Dictionary signalDict,
361                         Dictionary modelDict,
362                         BOOLEAN isBatch)
363      {
364       CompareTuple *results;
365       int i;
366
```

```
367     if ((results = (CompareTuple *)calloc(signalDict->numberOfEntries,
368                                    sizeof(CompareTuple))) ==
369       NULL)
370       DoError("L2CompareDictToString: cannot allocate space.\n",NULL);
371
372     for (i=0;i<signalDict->numberOfEntries;++i) {
373      (*(results+i)).index = i;
374      (*(results+i)).value = L2CompareWithString(i,string,
375                                     *(charCorrelations+i),
376                                     *(blankCorrelations+i),
377                                     signalDict,
378                                     modelDict);
379     }
380
381     qsort(results,
382          signalDict->numberOfEntries,
383          sizeof(CompareTuple),
384          TupleLessThan);
385
386     if (isBatch) {
387      printf("%d(%f)\n",(*results).index,(*results).value);
388     }
389     else {
390      printf("\n");
391      for (i=0;(i<5)&&(i<signalDict->numberOfEntries);++i)
392        printf("%d: %f\n",(*(results+i)).index,(*(results+i)).value);
393      printf("\n");
394     }
395
396     free(results);
397     }
398
399     void PrintDictStats(Dictionary dict)
400     {
401      int i,sum=0;
402      printf("Dictionary has %d entries.\n",dict->numberOfEntries);
403      for (i=0;i<dict->numberOfEntries;++i)
404        sum += (*(dict->outlines+i))->numberOfLegs;
405      printf("The total length of the shape contours is %d pixels.\n",sum);
406     }
407
408     void main(int argc,char **argv)
409     {
410      char *unknowns,*models;
411      char s[MAX_STRING_LENGTH+1];
412      Dictionary unknownDict, modelDict;
413      int selection;
414      char *crPointer;
415      BOOLEAN done = FALSE;
416      BOOLEAN batch;
417      char *words;
418      CorrelationSet *charCorrelations;
419      CorrelationSet *blankCorrelations;
420
421      if (argc != 3 && argc != 4) {
422       printf("Usage:\n");
423       printf(" %s <unknowns> <alphabet> [<batch wordlist>]\n",argv[0]);
424       printf(" If the batch file is not specified, the program runs\n");
425       printf(" in interactive mode.\n");
426       exit(-1);
```

```
427        }
428
429        unknowns = argv[1];
430        models = argv[2];
431        if (argc == 4) {
432         batch = TRUE;
433         words = argv[3];
434        } else
435         batch = FALSE;
436
437        unknownDict = ReadDictionary(unknowns);
438        modelDict = ReadDictionary(models);
439
440        PrintDictStats(unknownDict);
441        printf("Preprocessing...\n");
442        charCorrelations = PreProcessDictionaryWithChars(unknownDict,modelDict);
443        blankCorrelations = PreProcessDictionaryWithBlanks(unknownDict);
444        printf("done.\n");
445
446        if (batch) {
447         FILE *fp;
448         if ((fp = fopen(words,"r")) == NULL)
449          DoError("l2Norm: can't open input file %s.\n",words);
450         while (!done) {
451          fgets(s,MAX_STRING_LENGTH,fp);
452          if ((s[0] == '\0') || (s[0] == '\n'))
453             done = TRUE;
454          else {
455              crPointer = strchr(s,'\n');
456              if (crPointer != NULL)
457               *crPointer = '\0';
458              printf("%s: ",s);
459
              L2CompareDictToString(s,charCorrelations,blankCorrelations,unknownDict,modelDict,TRUE);
460          }
461         }
462        }
463        else {
464         while (!done) {
465          printf("Enter a word to search for: ");
466          fgets(s,MAX_STRING_LENGTH,stdin);
467          if ((s[0] == '\0') || (s[0] == '\n'))
468             done = TRUE;
469          else {
470              crPointer = strchr(s,'\n');
471              if (crPointer != NULL)
472               *crPointer = '\0';
473              printf("Comparing shape %s to the image\n",s);
474
              L2CompareDictToString(s,charCorrelations,blankCorrelations,unknownDict,modelDict,FALSE);
475          }
476         }
477        }
478       }
479
```

```
Jan 15 21:32 1991  match.c

1       /*
2        * match.c
3        * align 2 sequences
4        *
5        * run as: match seq1 seq2
6        *
7        */
8
9       /*
10       * TO DO: 1) don't compute over parts of array outside of constraints
11       *        2) distance score for top and bottom paths
12       */
13
14      #include <stdio.h>
15      #include <math.h>
16
17      #include "boolean.h"
18      #include "types.h"
19      #include "error.h"
20      #include "pict.h"
21      #include "dict.h"
22      #include "diff.h"
23      #include "diff2.h"
24      #include "match.h"
25
26      #ifndef MAXLINE
27      #define MAXLINE 256
28      #endif
29
30      #ifndef MAXNAME
31      #define MAXNAME 128
32      #endif
33
34      #ifndef TRUE
35      #define TRUE 1
36      #endif
37
38      #ifndef FALSE
39      #define FALSE 0
40      #endif
41
42      int matchcntr = 1; /* used for writing out set number of matches */
43
44      /*
45      void
46      main(argc,argv)
47      int argc;
48      char *argv[];
49      {
50      */
51       /*
52        * read in multiple parameter files, write out selected fields as shorts
53        */
54      /*
55       int i,j;
56       int seqlength;
```

```
57      float matchvecs();
58
59      float test[MAXSEQLENGTH];
60      float ref[MAXSEQLENGTH];
61    */
62    /*
63     * read in args
64     */
65    /*
66     debug = FALSE;
67
68     for (;argc > 1 && (argv[1][0] == '-'); argc--, argv++)
69       {
70        switch (argv[1][1])
71           {
72           case 'd':
73             debug = TRUE;
74             break;
75           case 'h':
76             horweight = (float)atoi(&argv[1][2]);
77             break;
78           case 'v':
79             verweight = (float)atoi(&argv[1][2]);
80             break;
81           case 'x':
82             diagweight = (float)atoi(&argv[1][2]);
83             break;
84           default:
85             printf ("match: unknown switch %s.\n", argv[1]);
86             exit (1);
87           }
88       }
89
90     if (argc != 1)
91       {
92        printf ("Usage: match [-b<begsamp>-d(debug) -e<endsamp>\n");
93        printf ("argc: %d\n", argc);
94        exit (1);
95       }
96    */
97    /* debugging */
98    /* for (i = 0; i < 5; i++)
99      test[i] = (float)i;
100     for (i = 5; i < 10; i++)
101      test[i] = (float)(.5 * (i - 4) + 5);
102     for (i = 0; i < 5; i++)
103      ref[i] = 1.5 * i;
104     matchvecs(test, 10, ref, 5);
105
106    }
107    */
108
109    /*
110    float DPDiffPair(OutlinePair one, OutlinePair two)
111    {
112     if (one == two){
113      printf("matches\n");
114      return(0.0);
115     }
116     else {
```

```
117        printf("no match\n");
118        return(1.0);
119      }
120    }
121    */
122
123    float DPDiffPair(OutlinePair one, OutlinePair two)
124      /*
125       * question, should top and bottom distance be forced to be computed together?
126       * use another distance score to check how far off the two are?
127       */
128
129    {
130      float topscore;
131      float bottomscore;
132
133      if (debug) printf("top: ");
134      topscore = matchvecs(one->top, one->numberOfLegs,
135                    two->top, two->numberOfLegs);
136      if (debug) printf(" bottom: ");
137      bottomscore = matchvecs(one->bottom, one->numberOfLegs,
138                    two->bottom, two->numberOfLegs);
139      return (topscore + bottomscore);
140    }
141
142    float matchvecs(float *Vec1, int lenVec1, float *Vec2, int lenVec2)
143       /*
144        * Computes the best path between one and two.
145        * Allows 2/1 expansion/compression
146        */
147    {
148      float dist, mindist, hor, vert, diag;
149      float bestscore;
150      int i1, i2;
151      int xdir, ydir;
152
153      elt *array[MAXSEQLENGTH][MAXSEQLENGTH];
154      elt *aelt;
155
156      /* initialize array */
157
158      for (i1 = 0; i1 < lenVec1; i1++) {
159       for (i2 = 0; i2 < lenVec2; i2++) {
160         array[i1][i2] = (elt *) malloc(sizeof (elt));
161         if (array[i1][i2] == NULL) {
162             fprintf(stderr,
163                  "Sorry, not enough space to malloc array elts in pl_matchvecs\n BYE!");
164             exit(1);
165         }
166       }
167      }
168
169      /*
170       * compute match
171       */
172      /* initialize */
173      aelt = array[0][0];
174      aelt->cost = sq_distance(Vec1[0], Vec2[0]);
175      aelt->xptr = 0;
176      aelt->yptr = 0;
```

```
177    /* bottom row */
178    i2 = 0;
179    for (i1 = 1; i1 < lenVec1; i1++) {
180      dist = sq_distance(Vec1[i1], Vec2[i2]);
181      aelt = array[i1][i2];
182      aelt->cost = array[i1 - 1][i2]->cost + horweight * dist;
183      aelt->xptr = -1;
184      aelt->yptr = 0;
185    }
186    /* left column */
187    i1 = 0;
188    for (i2 = 1; i2 < lenVec2; i2++) {
189      dist = sq_distance(Vec1[i1], Vec2[i2]);
190      aelt = array[i1][i2];
191      aelt->cost = array[i1][i2 - 1]->cost + verweight * dist;
192      aelt->xptr = 0;
193      aelt->yptr = -1;
194    }
195    /* middle */
196    for (i1 = 1; i1 < lenVec1; i1++) {
197     for (i2 = 1; i2 < lenVec2; i2++) {
198      dist = sq_distance(Vec1[i1], Vec2[i2]);
199      hor = array[i1 - 1][i2]->cost + horweight * dist;
200      xdir = -1;
201      ydir = 0;
202      mindist = hor;
203      vert = array[i1][i2 - 1]->cost + verweight * dist;
204      if (vert < mindist) {
205          xdir = 0;
206          ydir = -1;
207          mindist = vert;
208      }
209      diag = array[i1 - 1][i2 - 1]->cost + diagweight * dist;
210      if (diag < mindist) {
211          xdir = -1;
212          ydir = -1;
213          mindist = diag;
214      }
215      aelt = array[i1][i2];
216      aelt-> cost = mindist;
217      aelt-> xptr = xdir;
218      aelt-> yptr = ydir;
219     }
220    }
221
222    bestscore = best_score(array, lenVec1, lenVec2);
223    #ifdef foo
224     if (debug) {
225      print_best_path(array, lenVec1, lenVec2);
226    /*  print_array_costs(array, lenVec1, lenVec2);
227      print_array_dirs(array, lenVec1, lenVec2);
228    */
229     printf("best score: %f\n", bestscore);
230     }
231    #endif
232
233     for (i1 = 0; i1 < lenVec1; i1++) {
234      for (i2 = 0; i2 < lenVec2; i2++) {
235       free(array[i1][i2]);
236      }
```

```
237      }
238
239        return(bestscore);
240      }
241
242      float
243      sq_distance(float x1, float x2)
244      {
245        float dist;
246        float epsilon = .001;
247
248        /*
249         * quantization makes many values identical, use of epsilon encourages shortest path
250         */
251
252        dist = x1 - x2;
253        dist *= dist;
254        dist += epsilon;
255        return(dist);
256      }
257
258      /*
259      float parallel_distance(OutlinePair one, OutlinePair two, int ptr1, int ptr2)
260      {
261        float topdist, bottomdist;
262
263        topdist = one->top[ptr1] - two->top[ptr2];
264        topdist *= topdist;
265
266        bottomdist = one->bottom[ptr1] - two->bottom[ptr2];
267        bottomdist *= bottomdist;
268
269        return(topdist + bottomdist);
270      }
271      */
272
273      float
274      best_score (elt *array[][MAXSEQLENGTH], int lenVec1, int lenVec2)
275      {
276        /* assume all of Vec1 and Vec2 are used, so just take value at end */
277
278        return(array[lenVec1 - 1][lenVec2 - 1]->cost);
279      }
280
281      /*
282       * *********************
283       * debugging functions
284       */
285      #ifdef foo
286      void
287      print_best_path(elt *array[][MAXSEQLENGTH], int lenVec1, int lenVec2)
288      {
289        char path[MAXNAME];
290        int x, y;
291        elt *aelt;
292        FILE *ofp;
293
294        x = lenVec1 - 1;
295        y = lenVec2 - 1;
296
```

```
297       sprintf(path, "/net/piglet/piglet/speech/fchen/pics/paths/p%d.txt", FileCountY);
298
299       ofp = fopen (path, "a");
300       if(ofp == NULL)
301         printf("Cannot open output file %s.\n", path);
302
303       /* fprintf(ofp, " %3s %3s %6s\n", "x", "y", "cost");
304       */
305       while (x > 0 || y > 0) {
306         aelt = array[x][y];
307         fprintf(ofp, " %3d %3d %6.2f\n", x, y, aelt->cost);
308         x += aelt->xptr;
309         y += aelt->yptr;
310       }
311       /* fprintf(ofp, "\"match %d\n\n", matchcntr++);
312       */
313       fprintf(ofp, "\"match %d %d\n\n", FileCountX, FileCountY);
314       fclose(ofp);
315     }
316     #endif
317     static float sqr(float x)
318     {
319       return x*x;
320     }
321
322     void print_best_path(elt *array[][MAXSEQLENGTH], int lenVec1, int lenVec2,
323                          char *outFileName)
324     {
325       int x, y;
326       elt *aelt;
327       FILE *outFile;
328       float dist = 0;
329
330       x = lenVec1 - 1;
331       y = lenVec2 - 1;
332
333       if ((outFile = (FILE *)fopen(outFileName,"w"))==NULL)
334         DoError("single: Cannot open output file %s.\n", outFileName);
335
336       while (x > 0 || y > 0) {
337         aelt = array[x][y];
338         fprintf(outFile, " %3d %3d %6.2f\n", x, y, aelt->cost);
339         dist += sqrt(sqr(aelt->xptr)+sqr(aelt->yptr));
340         x += aelt->xptr;
341         y += aelt->yptr;
342       }
343       fclose(outFile);
344       printf("distance = %f\n",dist);
345     }
346
347
348     void
349     print_array_costs(elt *array[][MAXSEQLENGTH], int lenVec1, int lenVec2)
350     {
351
352       int x, y;
353
354       for (y = 0; y < lenVec2; y++){
355         for (x = 0; x < lenVec1; x++){
356           printf("%7.2f ", array[x][y]->cost);
```

```
357        }
358        printf("\n");
359      }
360    }
361
362    void
363    print_array_dirs(elt *array[][MAXSEQLENGTH], int lenVec1, int lenVec2)
364    {
365
366      int x, y;
367
368      for (y = 0; y < lenVec2; y++){
369        for (x = 0; x < lenVec1; x++){
370          printf("%2d:%2d  ", array[x][y]->xptr, array[x][y]->yptr);
371        }
372        printf("\n");
373      }
374    }
```

Jul 7 14:28 1991 matchparallel.c

```
1      /*
2       * matchparallel.c
3       * align 2 sequences
4       *
5       * dependent on match.c
6       */
7
8      /*
9       * TO DO: 1) don't compute over parts of array outside of constraints
10      *
11      */
12
13     #include <stdio.h>
14     #include <math.h>
15     #include "boolean.h"
16     #include "types.h"
17     #include "error.h"
18     #include "pict.h"
19     #include "dict.h"
20     #include "diff.h"
21     #include "diff2.h"
22     #include "match.h"
23     #include "matchparallel.h"
24
25     #ifndef MAXLINE
26     #define MAXLINE 256
27     #endif
28
29     #ifndef MAXNAME
30     #define MAXNAME 128
31     #endif
32
33     #ifndef TRUE
34     #define TRUE 1
35     #endif
```

```
36
37    #ifndef FALSE
38    #define FALSE 0
39    #endif
40
41    #ifndef max
42    #define max(a,b) ((a) > (b) ? (a) : (b))
43    #endif
44
45    #ifndef min
46    #define min(a,b) ((a) < (b) ? (a) : (b))
47    #endif
48
49    /*
50     * *******************
51     * parallel match with full search
52     * *******************
53     */
54
55    float pl_DPDiffPair(OutlinePair one, OutlinePair two, char *pathFile)
56      /*
57       * question, should top and bottom distance be forced to be computed together?
58       * use another distance score to check how far off the two are?
59       */
60
61    {
62      float score;
63
64      score = pl_matchvecs(one->top, one->bottom, one->numberOfLegs,
65                    two->top, two->bottom, two->numberOfLegs,
66                    pathFile);
67      return (score);
68    }
69
70    float pl_matchvecs(float *Vec1t, float *Vec1b, int lenVec1,
71                    float *Vec2t, float *Vec2b, int lenVec2,
72                    char *pathFile)
73      /*
74       * Computes the best path between one and two.
75       * Allows 2/1 expansion/compression
76       */
77    {
78      float dist, mindist, hor, vert, diag;
79      float bestscore;
80      int i1, i2;
81      int xdir, ydir;
82
83      elt *array[MAXSEQLENGTH][MAXSEQLENGTH];
84      elt *aelt;
85
86      /* initialize array */
87
88      for (i1 = 0; i1 < lenVec1; i1++) {
89      for (i2 = 0; i2 < lenVec2; i2++) {
90        array[i1][i2] = (elt *) malloc(sizeof (elt));
91        if (array[i1][i2] == NULL) {
92            fprintf(stderr,
93                    "Sorry, not enough space to malloc array elts in pl_matchvecs\n BYE!");
94            exit(1);
95        }
```

```
96        }
97      }
98
99      /*
100      * compute match
101      */
102     /* initialize */
103     aelt = array[0][0];
104     aelt->cost = sq_distance(Vec1t[0], Vec2t[0]) + sq_distance(Vec1b[0], Vec2b[0]);
105     aelt->xptr = 0;
106     aelt->yptr = 0;
107     /* bottom row */
108     i2 = 0;
109     for (i1 = 1; i1 < lenVec1; i1++) {
110       dist = sq_distance(Vec1t[i1], Vec2t[i2]) + sq_distance(Vec1b[i1], Vec2b[i2]);
111       aelt = array[i1][i2];
112       aelt->cost = array[i1 - 1][i2]->cost + horweight * dist;
113       aelt->xptr = -1;
114       aelt->yptr = 0;
115     }
116     /* left column */
117     i1 = 0;
118     for (i2 = 1; i2 < lenVec2; i2++) {
119       dist = sq_distance(Vec1t[i1], Vec2t[i2]) + sq_distance(Vec1b[i1], Vec2b[i2]);
120       aelt = array[i1][i2];
121       aelt->cost = array[i1][i2 - 1]->cost + verweight * dist;
122       aelt->xptr = 0;
123       aelt->yptr = -1;
124     }
125     /* middle */
126     for (i1 = i; i1 < lenVec1; i1++) {
127      for (i2 = 1; i2 < lenVec2; i2++) {
128       dist = sq_distance(Vec1t[i1], Vec2t[i2]) + sq_distance(Vec1b[i1], Vec2b[i2]);
129       hor = array[i1 - 1][i2]->cost + horweight * dist;
130       xdir = -1;
131       ydir = 0;
132       mindist = hor;
133       vert = array[i1][i2 - 1]->cost + verweight * dist;
134       if (vert < mindist) {
135           xdir = 0;
136           ydir = -1;
137           mindist = vert;
138       }
139       diag = array[i1 - 1][i2 - 1]->cost + diagweight * dist;
140       if (diag < mindist) {
141           xdir = -1;
142           ydir = -1;
143           mindist = diag;
144       }
145       aelt = array[i1][i2];
146       aelt-> cost = mindist;
147       aelt-> xptr = xdir;
148       aelt-> yptr = ydir;
149      }
150     }
151
152     bestscore = best_score(array, lenVec1, lenVec2);
153     if (pathFile)
154      print_best_path(array, lenVec1, lenVec2, pathFile);
155
```

```
      for (i1 = 0; i1 < lenVec1; i1++) {
       for (i2 = 0; i2 < lenVec2; i2++) {
         free(array[i1][i2]);
       }
      } return(bestscore);
     }

/*
      * *********************
      * faster parallel match
      * not optimal because warp is limited to swath of width "bw"
      * *********************
      */ float faster_pl_DPDiffPair(OutlinePair one, OutlinePair two, char *pathFile)
      /*
       * question, should top and bottom distance be forced to be computed together?
       * use another distance score to check how far off the two are?
       */

{
       float score;

score = faster_pl_matchvecs(one->top, one->bottom, one->numberOfLegs,
                         two->top, two->bottom, two->numberOfLegs,
                           pathFile);
       return (score);
     } float faster_pl_matchvecs(float *Vec1t, float *Vec1b, int lenVec1,
                         float *Vec2t, float *Vec2b, int lenVec2,
                         char *pathFile)
        /*
         * Computes the best path between one and two.
         * Allows 2/1 expansion/compression only within a band
         */
     {
       float dist, mindist, hor, vert, diag;
       float bestscore;
       float ratio;
       int i1, i2;
       int xdir, ydir;
       int beg, end, center;
       int b;              /* pointer to border */
       int border;              /* width of border on right side of swath */ elt *array[MAXSEQLENGTH][MAXSEQLENGTH];
       elt *aelt;

float infinity = 1.0e30;
       int bw = 20;

ratio = (float)lenVec1/ (float)lenVec2;
       border = (int) (ratio + .999999);
     /* if (debug)
       printf("ratio: %f\n", ratio);
     */ /* initialize array */
```

```
218     for (i1 = 0; i1 < lenVec1; i1++) {
219       for (i2 = 0; i2 < lenVec2; i2++) {
220         array[i1][i2] = (elt *) malloc(sizeof (elt));
221         if (array[i1][i2] == NULL) {
222             fprintf(stderr,
223                     "Sorry, not enough space to malloc array elts in pl_matchvecs\n BYE!");
224             exit(1);
225         }
226       }
227     }
228
229     /*
230      * compute match
231      */
232     /* initialize */
233     aelt = array[0][0];
234     aelt->cost = sq_distance(Vec1t[0], Vec2t[0]) + sq_distance(Vec1b[0], Vec2b[0]);
235     aelt->xptr = 0;
236     aelt->yptr = 0;
237     /* bottom row */
238     i2 = 0;
239     end = bw + border + 1;
240     for (i1 = 1; i1 < end; i1++) {
241       dist = sq_distance(Vec1t[i1], Vec2t[i2]) + sq_distance(Vec1b[i1], Vec2b[i2]);
242       aelt = array[i1][i2];
243       aelt->cost = array[i1 - 1][i2]->cost + horweight * dist;
244       aelt->xptr = -1;
245       aelt->yptr = 0;
246     }
247     /*
248      * swath
249      *
250      * set the elt before beg and at end to infinity, then the compute distances normally
251      * for the row
252      */
253     for (i2 = 1; i2 < lenVec2; i2++) {
254       center = i2 * ratio;
255       beg = max(1, center - bw);
256       end = min(lenVec1, center + bw + 1);
257     /*  if (debug)
258         printf("center: %d, beg: %d, end: %d\n", center, beg, end);
259     */  /* beg */
260       aelt = array[beg - 1][i2];
261       aelt->xptr = 0;
262       aelt->yptr = -1;
263       if (beg == 1) {
264         dist = sq_distance(Vec1t[0], Vec2t[i2]) + sq_distance(Vec1b[0], Vec2b[i2]);
265         aelt->cost = array[0][i2 - 1]->cost + verweight * dist;
266       }
267       else {
268         aelt->cost = infinity;
269       }
270       /* end */
271     /*  if (end < lenVec1) {
272     */
273       for (b = end; b < min(end+border,lenVec1); b++) {
274     /*    if (debug)
275             printf("b: %d ", b);
276     */    aelt = array[b][i2];
277         aelt->cost = infinity;
```

```
278        aelt->xptr = -1;
279        aelt->yptr = 0;
280      }
281      for (i1 = beg; i1 < end; i1++) {
282        dist = sq_distance(Vec1t[i1], Vec2t[i2]) + sq_distance(Vec1b[i1], Vec2b[i2]);
283        hor = array[i1 - 1][i2]->cost + horweight * dist;
284        xdir = -1;
285        ydir = 0;
286        mindist = hor;
287        vert = array[i1][i2 - 1]->cost + verweight * dist;
288        if (vert < mindist) {
289          xdir = 0;
290          ydir = -1;
291          mindist = vert;
292        }
293        diag = array[i1 - 1][i2 - 1]->cost + diagweight * dist;
294        if (diag < mindist) {
295          xdir = -1;
296          ydir = -1;
297          mindist = diag;
298        }
299        aelt = array[i1][i2];
300        aelt -> cost = mindist;
301        aelt -> xptr = xdir;
302        aelt -> yptr = ydir;
303      }
304    }
305
306    bestscore = best_score(array, lenVec1, lenVec2);
307    if (pathFile)
308      print_best_path(array, lenVec1, lenVec2, pathFile);
309
310    for (i1 = 0; i1 < lenVec1; i1++) {
311     for (i2 = 0; i2 < lenVec2; i2++) {
312       free(array[i1][i2]);
313     }
314    }
315
316    return(bestscore);
317  }
318
319
320  /*
321   * *******************
322   * fastest parallel match
323   * warp limited to swath bw, plus no backtracking
324   * *******************
325   */
326
327  float simple_pl_DPDiffPair(OutlinePair one, OutlinePair two)
328    /*
329     * question, should top and bottom distance be forced to be computed together?
330     * use another distance score to check how far off the two are?
331     */
332
333  {
334    float score;
335
336    score = simple_pl_matchvecs(one->top, one->bottom, one->numberOfLegs,
337                                two->top, two->bottom, two->numberOfLegs);
```

```
338      return (score);
339    }
340
341    void PrintArrayRow(float *array,int width)
342    {
343      int i;
344      for (i=0;i<width; ++i)
345        printf("%2.2f ",*array++);
346      printf("\n");
347    }
348
349    void PrintArray(float *array,int height,int width,int signalWidth)
350    {
351      int i;
352      for (i=0;i<height; ++i) {
353        printf("%d: ",i);
354        PrintArrayRow(array+i*width,signalWidth);
355      }
356    }
357
358    float simple_pl_matchvecs(float *Vec1t, float *Vec1b, int lenVec1, float *Vec2t, float *Vec2b, int lenVec2)
359      /*
360       * Computes the best path between one and two within a band.
361       * Allows 2/1 expansion/compression only within a band.
362       */
363    {
364      float dist, mindist, hor, vert, diag;
365      float bestscore;
366      float ratio;
367      int i1, i2;
368      int xdir, ydir;
369      int beg, end, center;
370      int b;              /* pointer to border */
371      int border;         /* width of border on right side of swath */
372
373      float array[MAXSEQLENGTH][MAXSEQLENGTH];
374
375      float infinity = 1.0e30;
376      int bw = 20;
377
378      ratio = (float)lenVec1/ (float)lenVec2;
379      border = (int) (ratio + .999999);
380    /* if (debug)
381        printf("ratio: %f\n", ratio);
382    */ /* initialize array */
383
384
385      /*
386       * compute match
387       */
388      /* initialize */
389      array[0][0] = sq_distance(Vec1t[0], Vec2t[0]) + sq_distance(Vec1b[0], Vec2b[0]);
390
391      /* bottom row */
392      i2 = 0;
393      end = bw + border + 1;
394      for (i1 = 1; i1 < end; i1++) {
395        dist = sq_distance(Vec1t[i1], Vec2t[i2]) + sq_distance(Vec1b[i1], Vec2b[i2]);
396        array[i1][i2] = array[i1 - 1][i2] + horweight * dist;
```

```
397        }
398        /*
399         * swath
400         *
401         * set the elt before beg and at end to infinity, then the compute distances normally
402         * for the row
403         */
404        for (i2 = 1; i2 < lenVec2; i2++) {
405          center = i2 * ratio;
406          beg = max(1, center - bw);
407          end = min(lenVec1, center + bw + 1);
408        /*   if (debug)
409              printf("center: %d, beg: %d, end: %d\n", center, beg, end);
410        */  /* beg */
411          if (beg == 1) {
412            dist = sq_distance(Vec1t[0], Vec2t[i2]) + sq_distance(Vec1b[0], Vec2b[i2]);
413            array[beg - 1][i2] = array[0][i2 - 1] + verweight * dist;
414          }
415          else {
416            array[beg - 1][i2] = infinity;
417          }
418          /* end */
419          for (b = end; b < min(end+border,lenVec1); b++) {
420        /*   if (debug)
421              printf("b: %d ", b);
422        */
423            array[b][i2] = infinity;
424          }
425          for (i1 = beg; i1 < end; i1++) {
426            dist = sq_distance(Vec1t[i1], Vec2t[i2]) + sq_distance(Vec1b[i1], Vec2b[i2]);
427            hor = array[i1 - 1][i2] + horweight * dist;
428            mindist = hor;
429            vert = array[i1][i2 - 1] + verweight * dist;
430            if (vert < mindist) {
431              mindist = vert;
432            }
433            diag = array[i1 - 1][i2 - 1] + diagweight * dist;
434            if (diag < mindist) {
435              mindist = diag;
436            }
437            array[i1][i2] = mindist;
438          }
439        }
440
441        bestscore = array[lenVec1 - 1][lenVec2 - 1];
442        if (debug) {
443          printf("best score: %f\n", bestscore);
444        }
445
446        return(bestscore);
447      }
```

Jul 24 17:16 1991 newL2.c

```
1      #include <stdio.h>
2      #include <math.h>
```

```c
3      #include "boolean.h"
4      #include "types.h"
5      #include "error.h"
6      #include "dict.h"
7
8      #define NORMAL_LENGTH (100.0)
9      #define MAX_SLOPE (2.0)
10     #define BIG_NUM (10.0e20)
11
12     void ResampleOutlinePair(OutlinePair a,float newToOldFactor)
13     /* Resample an outline pair using linear interpolation. */
14     {
15      int newWidth,oldWidth,i;
16      int oldLeft,oldRight;
17      float oldCenter;
18      float *newX,*newTop,*newBottom;
19      float *xCursor,*topCursor,*bottomCursor;
20
21      oldWidth = a->numberOfLegs;
22      newWidth = irint(newToOldFactor*oldWidth);
23
24      newX = (float *)calloc(newWidth,sizeof(float));
25      newTop = (float *)calloc(newWidth,sizeof(float));
26      newBottom = (float *)calloc(newWidth,sizeof(float));
27      if ((newX==NULL)||(newTop==NULL)||(newBottom==NULL))
28       DoError("ResampleOutlinePair: cannot allocate space.\n",NULL);
29
30      xCursor = newX;
31      topCursor = newTop;
32      bottomCursor = newBottom;
33
34      for (i=0;i<newWidth;++i) {
35       oldCenter = i/(float)newWidth*(float)oldWidth;
36       oldLeft = irint(floor(oldCenter));
37       oldRight = irint(ceil(oldCenter));
38       if (oldLeft==oldRight) {
39        *xCursor++ = *(a->x+oldLeft);
40        *topCursor++ = *(a->top+oldLeft);
41        *bottomCursor++ = *(a->bottom+oldLeft);
42       }
43       else {
44        float slope;
45        slope = *(a->x+oldRight)-*(a->x+oldLeft);
46        *xCursor++ = *(a->x+oldLeft) + (oldCenter-oldLeft)*slope;
47        slope = *(a->top+oldRight)-*(a->top+oldLeft);
48        *topCursor++ = *(a->top+oldLeft) + (oldCenter-oldLeft)*slope;
49        slope = *(a->bottom+oldRight)-*(a->bottom+oldLeft);
50        *bottomCursor++ = *(a->bottom+oldLeft) + (oldCenter-oldLeft)*slope;
51       }
52      }
53
54      free(a->x);
55      free(a->top);
56      free(a->bottom);
57
58      a->x = newX;
59      a->top = newTop;
60      a->bottom = newBottom;
61      a->numberOfLegs = newWidth;
62     }
```

```
63
64      float L2Norm(OutlinePair signal, int startOffset,
65              OutlinePair model,float topToBottom)
66      {
67        float *top1,*top2,*bottom1,*bottom2;
68        int i,overlap;
69        float sum;
70        float temp;
71
72        if ((startOffset < 0) ||
73          (startOffset + model->numberOfLegs > signal->numberOfLegs))
74          DoError("L2Norm: the model must overlap the signal.\n",NULL);
75
76        top1 = signal->top+startOffset;
77        top2 = model->top;
78        bottom1 = signal->bottom+startOffset;
79        bottom2 = model->bottom;
80
81        overlap = signal->numberOfLegs - startOffset;
82        if (overlap > model->numberOfLegs)
83          overlap = model->numberOfLegs;
84
85        for (i=0,sum=0;i<overlap;++i) {
86          temp = *top1++ - *top2++;
87          sum += temp * temp * topToBottom;
88          temp = *bottom1++ - *bottom2++;
89          sum += temp * temp;
90        }
91
92        return sum;
93      }
94
95      float L2Compare(OutlinePair o1,OutlinePair o2,float topToBottom)
96      {
97        float slope = (float)o1->width/(float)o2->width;
98        if ((slope>MAX_SLOPE)||(1/slope>MAX_SLOPE))
99          return BIG_NUM;
100       if (o1->numberOfLegs != NORMAL_LENGTH)
101         ResampleOutlinePair(o1,NORMAL_LENGTH/o1->numberOfLegs);
102       if (o2->numberOfLegs != NORMAL_LENGTH)
103         ResampleOutlinePair(o2,NORMAL_LENGTH/o2->numberOfLegs);
104       return L2Norm(o1,0,o2,topToBottom);
105     }
106
```

Aug 14 20:54 1991 newMatch.c

```
1       #include <stdio.h>
2       #include "mylib.h"
3       #include "misc.h"
4       #include "types.h"
5       #include "dict.h"
6       #include "newMatch.h"
7
8       #define MAX_SIGNAL_LENGTH (800)
9       #define MAX_SLOPE (2.0)
10      #define BIG_NUM (10e20)
```

```
typedef enum {NONE,LEFT,DOWN,DOWNLEFT,D1L1,D2L1,D1L2} Direction;

extern double sqrt(double);
extern double cos(double);
extern double atan(double);
extern int irint(double);

/* Assumes that a represents the model and b represents the unknown.
 * Weights places where the model is lower than the unknown more than
 * cases where the model is higher than the unknown. The idea here is
 * that valleys can be filled in by bleeding together, but that noise
 * can rarely make a contour be too tall for extended periods.
 */
float hillToValley = 1.0;
inline float SquareDifference(float a,float b)
{
 float temp = a-b;
 if (temp<0)
   return temp*temp;
 else
   return temp*temp*hillToValley*hillToValley;
/*  return (a-b)*(a-b); */
} inline float FMax(float a,float b)
{
 if (a>b)
   return a;
 else
   return b;
} inline float FMin(float a,float b)
{
 if (a<b)
   return a;
 else
   return b;
} inline int IMax(int a,int b)
{
 if (a>b)
   return a;
 else
   return b;
} inline int IMin(int a,int b)
{
 if (a<b)
   return a;
 else
   return b;
} float NewMatch(float *a1,float *a2,int aLength,float *b1,float *b2,int bLength,
        float centerWeight,BOOLEAN lengthNormalize,int normalBandWidth,
         float topToBottom)
```

```
71    {
72      float costs0[MAX_SIGNAL_LENGTH+1];
73      float costs1[MAX_SIGNAL_LENGTH+1];
74      int i,j,start,end,bandWidth,shift;
75      int realStart,realEnd,center,oldEnd;
76      float slope,angle;
77      float *a1c,*a2c,*cd,*cl,*cdl,*dc;
78      float oldCost,b1v,b2v,returnVal;
79
80      if (aLength>MAX_SIGNAL_LENGTH||bLength>MAX_SIGNAL_LENGTH)
81        DoError("NewMatch: maximum signal length exceeded.\n",NULL);
82
83      slope = (float)aLength/(float)bLength;
84
85      if ((slope>MAX_SLOPE)||(1/slope>MAX_SLOPE)) {
86        return BIG_NUM;
87      }
88      angle = atan(slope);
89      bandWidth = irint(normalBandWidth/cos(angle));
90      center = 0;
91      realStart = center-bandWidth/2;
92      realEnd = realStart+bandWidth;
93      end = FMin(realEnd,aLength);
94
95      a1c = a1; /* a1 cursor */
96      a2c = a2; /* a2 cursor */
97      b1v = *b1; /* b1 value */
98      b2v = *b2; /* b2 value */
99      dc = costs0;
100     *dc++ = BIG_NUM;
101     oldCost = *dc++ =
        SquareDifference(*a1c++,b1v)*topToBottom+SquareDifference(*a2c++,b2v);
102
103     for (j=1;j<end;++j)
104       oldCost = *dc++ =
        oldCost+SquareDifference(*a1c++,b1v)*topToBottom+SquareDifference(*a2c++,b2v);
105
106     for (i=1;i<bLength;++i) {
107       /* Compute new center of band */
108       center = irint(slope*i);
109       realStart = center-bandWidth/2;
110       realEnd = realStart+bandWidth;
111       start = FMax(realStart,0);
112       oldEnd = end;
113       end = FMin(realEnd,aLength);
114       shift = end-oldEnd;
115
116       /* put large numbers where bands don't overlap */
117       for (j=0;j<shift;++j)
118         *dc++ = BIG_NUM;
119
120       a1c = a1+start; /* a1 cursor */
121       a2c = a2+start; /* a2 cursor */
122       b1v = *(b1+i); /* b1 value */
123       b2v = *(b2+i); /* b2 value */
124       if (i&1) {
125         cd = costs1+start-1+1; /* cursor down ??? What about -1??? */
126         cdl = costs0+start-1+1; /* cursor down left */
127         cl = costs0+start+1; /* cursor left */
128         dc = costs1+start+1; /* destination cursor */
```

```
129       }
130       else {
131         cd = costs0+start-1+1; /* cursor down */
132         cdl = costs1+start-1+1; /* cursor down left */
133         cl = costs1+start+1; /* cursor left */
134         dc = costs0+start+1; /* destination cursor */
135       }
136       *cd = BIG_NUM;
137       for (j=start;j<end; ++j) {
138         float down,left,downLeft,rest;
139         down = *cd++ + rest;
140         left = *cl++ + rest;
141         downLeft = *cdl++ + rest*centerWeight;
142         rest = SquareDifference(*a1c++,b1v)*topToBottom+
143             SquareDifference(*a2c++,b2v);
144         *dc++ = FMin(FMin(down,left),downLeft);
145       }
146     }
147
148     i--;
149     if (i&1)
150       dc = costs1+aLength-1+1;
151     else
152       dc = costs0+aLength-1+1;
153     returnVal = *dc;
154
155     if (lengthNormalize)
156       return returnVal/sqrt(aLength*aLength+bLength*bLength);
157     else
158       return returnVal;
159   }
160
161
162   float SepMatch(float *a1,int aLength,float *b1,int bLength,
163             float centerWeight,BOOLEAN lengthNormalize,int normalBandWidth)
164   {
165     float costs0[MAX_SIGNAL_LENGTH+1];
166     float costs1[MAX_SIGNAL_LENGTH+1];
167     int i,j,start,end,bandWidth,shift;
168     int realStart,realEnd,center,oldEnd;
169     float slope,angle;
170     float *a1c,*cd,*cl,*cdl,*dc;
171     float oldCost,b1v,returnVal;
172
173     if (aLength>MAX_SIGNAL_LENGTH||bLength>MAX_SIGNAL_LENGTH)
174       DoError("NewMatch: maximum signal length exceeded.\n",NULL);
175
176     slope = (float)aLength/(float)bLength;
177
178     if ((slope>MAX_SLOPE)||(1/slope>MAX_SLOPE)) {
179       return BIG_NUM;
180     }
181     angle = atan(slope);
182     bandWidth = irint(normalBandWidth/cos(angle));
183     center = 0;
184     realStart = center-bandWidth/2;
185     realEnd = realStart+bandWidth;
186     end = FMin(realEnd,aLength);
187
188     a1c = a1; /* a1 cursor */
```

```
189      b1v = *b1; /* b1 value */
190      dc = costs0;
191      *dc++ = BIG_NUM;
192      oldCost = *dc++ = SquareDifference(*a1c++,b1v);
193
194      for (j=1;j<end;++j)
195        oldCost = *dc++ = oldCost+SquareDifference(*a1c++,b1v);
196
197      .or (i=1;i<bLength;++i) {
198        /* Compute new center of band */
199        center = irint(slope*i);
200        realStart = center-bandWidth/2;
201        realEnd = realStart+bandWidth;
202        start = FMax(realStart,0);
203        oldEnd = end;
204        end = FMin(realEnd,aLength);
205        shift = end-oldEnd;
206
207        /* put large numbers where bands don't overlap */
208        for (j=0;j<shift;++j)
209          *dc++ = BIG_NUM;
210
211        a1c = a1+start; /* a1 cursor */
212        b1v = *(b1+i); /* b1 value */
213        if (i&1) {
214          cd = costs1+start-1+1; /* cursor down ??? What about -1??? */
215          cdl = costs0+start-1+1; /* cursor down left */
216          cl = costs0+start+1; /* cursor left */
217          dc = costs1+start+1; /* destination cursor */
218        }
219        else {
220          cd = costs0+start-1+1; /* cursor down */
221          cdl = costs1+start-1+1; /* cursor down left */
222          cl = costs1+start+1; /* cursor left */
223          dc = costs0+start+1; /* destination cursor */
224        }
225        *cd = BIG_NUM;
226        for (j=start;j<end;++j) {
227          float down,left,downLeft,rest;
228          down = *cd++ + rest;
229          left = *cl++ + rest;
230          downLeft = *cdl++ + rest*centerWeight;
231          rest = SquareDifference(*a1c++,b1v);
232          *dc++ = FMin(FMin(down,left),downLeft);
233        }
234      }
235
236      i--;
237      if (i&1)
238        dc = costs1+aLength-1+1;
239      else
240        dc = costs0+aLength-1+1;
241      returnVal = *dc;
242
243      if (lengthNormalize)
244        return returnVal/sqrt(aLength*aLength+bLength*bLength);
245      else
246        return returnVal;
247    }
248
```

```
249   #define WIDTH (800)
250   #define H_MARGIN (20)
251   #define V_MARGIN (40)
252   #define H_SPACING (20)
253   #define V_SPACING (100) /* Must be greater than 2*X_HEIGHT */
254   #define X_HEIGHT (17)
255   void DrawVLine(Picture pict,int x,int yt,int yb)
256   {
257    int i;
258    for (i=yt;i<yb;++i)
259     WritePixel(pict,x,i,1);
260   }
261
262   void DrawOutline(Picture pict,int numberOfLegs,float *tops,float *bottoms,int x,int y)
263   {
264    int i,top,bottom;
265    for (i=0;i<numberOfLegs;++i) {
266     top = irint(-*(tops+i)*X_HEIGHT);
267     bottom = irint(*(bottoms+i)*X_HEIGHT+X_HEIGHT);
268     DrawVLine(pict,i+x,top+y,bottom+y);
269    }
270   }
271
272   void PrintPath(float *a1,float *a2,int aLength,float *b1,float *b2,int bLength,
273              Direction path[MAX_SIGNAL_LENGTH][MAX_SIGNAL_LENGTH],int i,
274              float returnVal,
275              FILE *pathFP)
276   {
277    int x,y,j;
278    int length = 0;
279    int index = 0;
280    float newTop1[MAX_SIGNAL_LENGTH],newBottom1[MAX_SIGNAL_LENGTH];
281    float newTop2[MAX_SIGNAL_LENGTH],newBottom2[MAX_SIGNAL_LENGTH];
282
283    y = i;
284    x = aLength-1;
285    while (path[y][x]!=NONE) {
286     switch (path[y][x]) {
287     case DOWN:
288      x--;
289      break;
290     case LEFT:
291      y--;
292      break;
293     case D1L1:
294     case DOWNLEFT:
295      x--;
296      y--;
297      break;
298     case D2L1:
299      x-=2;
300      y--;
301      break;
302     case D1L2:
303      x--;
304      y-=2;
305      break;
306     default:
307      DoError("NewMatchAndPath: Internal error - bad case.\n",NULL);
308     }
```

```
309      ++length;
310     }
311
312     y = i;
313     x = aLength-1;
314     while (path[y][x]!=NONE) {
315      if (index>=MAX_SIGNAL_LENGTH)
316       DoError("NewMatchAddPath: warped signal is too long.\n",NULL);
317      newTop1[length-index] = a1[x];
318      newBottom1[length-index] = a2[x];
319      newTop2[length-index] = b1[y];
320      newBottom2[length-index] = b2[y];
321      switch (path[y][x]) {
322      case DOWN:
323       x--;
324       break;
325      case LEFT:
326       y--;
327       break;
328      case D1L1:
329      case DOWNLEFT:
330       x--;
331       y--;
332       break;
333      case D2L1:
334       x-=2;
335       y--;
336       break;
337      case D1L2:
338       x--;
339       y-=2;
340       break;
341      default:
342       DoError("NewMatchAndPath: Internal error - bad case.\n",NULL);
343      }
344      ++index;
345     }
346     if (index>=MAX_SIGNAL_LENGTH)
347      DoError("NewMatchAddPath: warped signal is too long.\n",NULL);
348     newTop1[length-index] = a1[x];
349     newBottom1[length-index] = a2[x];
350     newTop2[length-index] = b1[y];
351     newBottom2[length-index] = b2[y];
352     ++index;
353
354     for (j=0;j<index;++j)
355      fprintf(pathFP,"%d %f\n",j,newTop1[j]);
356     fprintf(pathFP,"\"top1\n\n");
357
358     for (j=0;j<index;++j)
359      fprintf(pathFP,"%d %f\n",j,newTop2[j]);
360     fprintf(pathFP,"\"top2\n\n");
361
362     for (j=0;j<index;++j)
363      fprintf(pathFP,"%d %f\n",j,-newBottom1[j]);
364     fprintf(pathFP,"\"bottom1\n\n");
365
366     for (j=0;j<index;++j)
367      fprintf(pathFP,"%d %f\n",j,-newBottom2[j]);
368     fprintf(pathFP,"\"bottom2\n\n");
```

```
369
370     {
371       Picture pict;
372       pict =
          new_pict(IMax(index,IMax(aLength,bLength))*2+H_SPACING+H_MARGIN*2,V_MARGIN*
          2+2*V_SPACING,1);
373       DrawOutline(pict,aLength,a1,a2,H_MARGIN,V_MARGIN);
374       DrawOutline(pict,bLength,b1,b2,H_MARGIN+aLength+H_SPACING,V_MARGIN);
375
376       DrawOutline(pict,index,newTop1,newBottom1,H_MARGIN,V_MARGIN+V_SPACING);
          DrawOutline(pict,index,newTop2,newBottom2,H_MARGIN+index+H_SPACING,V_MARGI
          N+V_SPACING);
378       DrawOutline(pict,index,newTop2,newBottom2,H_MARGIN,V_MARGIN+V_SPACING*2);
379       write_pict("out.pict",pict);
380     }
381
382     {
383       float checksum;
384       fprintf(pathFP,"%d %f\n",0,checksum);
385       for (j=0,checksum=0;j<index;++j) {
386         checksum+=SquareDifference(newTop1[j],newTop2[j])+
387           SquareDifference(newBottom1[j],newBottom2[j]);
388         fprintf(pathFP,"%d %f\n",j,checksum);
389       }
390       printf("checksum, score = %6.2f, %6.2f\n",checksum,returnVal);
391     }
392   }
393
394
395
396   float NewMatchAndPath(float *a1,float *a2,int aLength,float *b1,float *b2,int bLength,
397                 float centerWeight,BOOLEAN lengthNormalize,int normalBandWidth,
398                 float topToBottom,FILE *pathFP)
399   {
400     Direction path[MAX_SIGNAL_LENGTH][MAX_SIGNAL_LENGTH],*pc;
401     int x,y;
402     float costs0[MAX_SIGNAL_LENGTH+1];
403     float costs1[MAX_SIGNAL_LENGTH+1];
404     int i,j,start,end,bandWidth,shift;
405     int realStart,realEnd,center,oldEnd;
406     float slope,angle;
407     float *a1c,*a2c,*cd,*cl,*cdl,*dc;
408     float oldCost,b1v,b2v,returnVal;
409
410     if (aLength>MAX_SIGNAL_LENGTH||bLength>MAX_SIGNAL_LENGTH)
411       DoError("NewMatch: maximum signal length exceeded.\n",NULL);
412
413     slope = (float)aLength/(float)bLength;
414
415     if ((slope>MAX_SLOPE)||(1/slope>MAX_SLOPE)) {
416       return BIG_NUM;
417     }
418     angle = atan(slope);
419     bandWidth = irint(normalBandWidth/cos(angle));
420     center = 0;
421     realStart = center-bandWidth/2;
422     realEnd = realStart+bandWidth;
423     end = FMin(realEnd,aLength);
424
425     a1c = a1;  /* a1 cursor */
```

```
426      a2c = a2; /* a2 cursor */
427      b1v = *b1; /* b1 value */
428      b2v = *b2; /* b2 value */
429      dc = costs0;
430      pc = &(path[0][0]);
431      *dc++ = BIG_NUM;
432      oldCost = *dc++ =
         SquareDifference(*a1c++,b1v)*topToBottom+SquareDifference(*a2c++,b2v);
433      *pc++ = NONE;
434
435      for (j=1;j<end;++j) {
436        oldCost = *dc++ =
         oldCost+SquareDifference(*a1c++,b1v)*topToBottom+SquareDifference(*a2c++,b2v);
437        *pc++ = DOWN;
438      }
439
440  #ifdef foo
441      printf("%6d ",0);
442      for (j=0;j<end;++j)
443        printf("%6.2f ",costs0[j+1]);
444  #endif
445
446      for (i=1;i<bLength;++i) {
447        /* Compute new center of band */
448        center = irint(slope*i);
449        realStart = center-bandWidth/2;
450        realEnd = realStart+bandWidth;
451        start = FMax(realStart,0);
452        oldEnd = end;
453        end = FMin(realEnd,aLength);
454        shift = end-oldEnd;
455
456        /* put large numbers where bands don't overlap */
457        for (j=0;j<shift;++j) {
458  /*      printf("%6.2f ",BIG_NUM); */
459          *dc++ = BIG_NUM;
460        }
461  /*    printf("\n%6d ",i); */
462
463        a1c = a1+start; /* a1 cursor */
464        a2c = a2+start; /* a2 cursor */
465        b1v = *(b1+i); /* b1 value */
466        b2v = *(b2+i); /* b2 value */
467        pc = &(path[i][start]);
468        if (i&1) {
469          cd = costs1+start-1+1; /* cursor down ??? What about -1??? */
470          cdl = costs0+start-1+1; /* cursor down left */
471          cl = costs0+start+1; /* cursor left */
472          dc = costs1+start+1; /* destination cursor */
473        }
474        else {
475          cd = costs0+start-1+1; /* cursor down */
476          cdl = costs1+start-1+1; /* cursor down left */
477          cl = costs1+start+1; /* cursor left */
478          dc = costs0+start+1; /* destination cursor */
479        }
480        *cd = BIG_NUM;
481        for (j=start;j<end;++j) {
```

```
482         float down,left,downLeft,rest;
483         rest = SquareDifference(*a1c++,b1v)*topToBottom +
            SquareDifference(*a2c++,b2v);
484         down = *cd++ + rest;
485         left = *cl++ + rest;
486         downLeft = *cdl++ + rest*centerWeight;
487
488         if (down < left)
489             if (down < downLeft) {
490     /*      printf("%6.2f ",down);  */
491             *dc++ = down;
492             *pc++ = DOWN;
493             }
494             else {
495     /*      printf("%6.2f ",downLeft); */
496             *dc++ = downLeft;
497             *pc++ = DOWNLEFT;
498             }
499         else
500             if (downLeft < left) {
501     /*      printf("%6.2f ",downLeft); */
502             *dc++ = downLeft;
503             *pc++ = DOWNLEFT;
504             }
505             else {
506     /*      printf("%6.2f ",left); */
507             *dc++ = left;
508             *pc++ = LEFT;
509             }
510       }
511     }
512
513     i--;
514     if (i&1)
515       dc = costs1+aLength-1+1;
516     else
517       dc = costs0+aLength-1+1;
518     returnVal = *dc;
519
520   #ifdef foo
521     if (!doPath) {
522     y = i;
523     x = aLength-1;
524     while (path[y][x]!=NONE) {
525       switch (path[y][x]) {
526       case DOWN:
527           x--;
528           break;
529       case LEFT:
530           y--;
531           break;
532       case DOWNLEFT:
533           x--;
534           y--;
535           break;
536       default:
537           DoError("NewMatchAndPath: Internal error - bad case.\n",NULL);
538       }
539       fprintf(pathFP,"%d %d\n",x,y);
540     }
```

```
541        fprintf(pathFP,"%d %d\n",x,y);
542       }
543      else {}
544   #endif
545      PrintPath(a1,a2,aLength,b1,b2,bLength,path,i,returnVal,pathFP);
546
547      if (lengthNormalize)
548        return returnVal/sqrt(aLength*aLength+bLength*bLength);
549      else
550        return returnVal;
551    }
552
553
554    float SlopeCMatch(float *a1,float *a2,int aLength,float *b1,float *b2,int bLength,
555                     float centerWeight,BOOLEAN lengthNormalize,float topToBottom)
556    {
557      float costs0[MAX_SIGNAL_LENGTH+2];
558      float costs1[MAX_SIGNAL_LENGTH+2];
559      float costs2[MAX_SIGNAL_LENGTH+2];
560      float slope,minVal;
561      int i,j;
562      int bottom,top;
563      float *cd1l1,*cd2l1,*cd1l2;
564      float *a1c,*a2c,*cd,*cl,*cdl,*dc;
565      float b1v,b2v,returnVal;
566
567    /* printf("sc:\n"); */
568
569      if (aLength>MAX_SIGNAL_LENGTH||bLength>MAX_SIGNAL_LENGTH)
570        DoError("SlopeCMatch: maximum signal length exceeded.\n",NULL);
571
572      slope = (float)aLength/(float)bLength;
573      if ((slope>MAX_SLOPE)||(1/slope>MAX_SLOPE)) {
574        return BIG_NUM;
575      }
576
577      for (i=0;i<aLength+2;++i) {
578        costs2[i] = BIG_NUM;
579        costs1[i] = BIG_NUM;
580        costs0[i] = BIG_NUM;
581      }
582
583      costs0[2] = SquareDifference(*a1,*b1)*topToBottom+SquareDifference(*a2,*b2);
584
585      for (i=1;i<bLength;++i) {
586        bottom = IMax(i/2,2*i+aLength-2*bLength);
587        top = IMin(2*i,i/2+aLength-bLength/2)+1;
588
589        a1c = a1+bottom;  /* a1 cursor */
590        a2c = a2+bottom;  /* a2 cursor */
591        b1v = *(b1+i); /* b1 value */
592        b2v = *(b2+i); /* b2 value */
593
594        switch (i%3) {
595        case 0:
596          dc = costs0+bottom-2+2;
597          cd2l1 = costs2+bottom-2+2;
598          cd1l2 = costs1+bottom-1+2;
599          cd1l1 = costs2+bottom-1+2;
600          break;
```

```
601      case 1:
602        dc = costs1+bottom-2+2;
603        cd2l1 = costs0+bottom-2+2;
604        cd1l2 = costs2+bottom-1+2;
605        cd1l1 = costs0+bottom-1+2;
606        break;
607      case 2:
608        dc = costs2+bottom-2+2;
609        cd2l1 = costs1+bottom-2+2;
610        cd1l2 = costs0+bottom-1+2;
611        cd1l1 = costs1+bottom-1+2;
612        break;
613      }
614      *dc++ = BIG_NUM;
615      *dc++ = BIG_NUM;
616      for (j=bottom;j<top;++j) {
617        float d2l1,d1l2,d1l1,rest;
618        rest = SquareDifference(*a1c++,b1v)*topToBottom+
619          SquareDifference(*a2c++,b2v);
620        d1l1 = *cd1l1++ + rest*centerWeight;
621        d1l2 = *cd1l2++ + rest;
622        d2l1 = *cd2l1++ + rest;
623
624        *dc++ = FMin(FMin(d1l1,d2l1),d1l2);
625      }
626
627      switch (i%3) {
628      case 0:
629        dc = costs0;
630        break;
631      case 1:
632        dc = costs1;
633        break;
634      case 2:
635        dc = costs2;
636        break;
637      }
638
639 #ifdef foo
640      minVal = BIG_NUM;
641      printf("%6d: ",i);
642      for (j=0;j<aLength+2;++j) {
643        if (*dc <= minVal)
644          minVal = *dc;
645        if (*dc++ >= BIG_NUM)
646          printf(" ");
647        else
648          printf("*");
649      }
650      printf("   %6.2f\n",minVal);
651 #endif
652    }
653
654    --i;
655    switch (i%3) {
656    case 0:
657      dc = costs0;
658      break;
659    case 1:
660      dc = costs1;
```

```
661       break;
662     case 2:
663       dc = costs2;
664       break;
665     }
666     returnVal = *(dc+aLength-1+2);
667
668     if (lengthNormalize)
669       return returnVal/sqrt(aLength*aLength+bLength*bLength);
670     else
671       return returnVal;
672   }
673
674
675   float SepSlopeCMatch(float *a1,int aLength,float *b1,int bLength,
676                        float centerWeight,BOOLEAN lengthNormalize)
677   {
678     float costs0[MAX_SIGNAL_LENGTH+2];
679     float costs1[MAX_SIGNAL_LENGTH+2];
680     float costs2[MAX_SIGNAL_LENGTH+2];
681     float slope,minVal;
682     int i,j;
683     int bottom,top;
684     float *cd1l1,*cd2l1,*cd1l2;
685     float *a1c,*cd,*ci,*cdi,*dc;
686     float b1v,returnVal;
687
688     if (aLength>MAX_SIGNAL_LENGTH||bLength>MAX_SIGNAL_LENGTH)
689       DoError("SlopeCMatch: maximum signal length exceeded.\n",NULL);
690
691     slope = (float)aLength/(float)bLength;
692     if ((slope>MAX_SLOPE)||(1/slope>MAX_SLOPE)) {
693       return BIG_NUM;
694     }
695
696     for (i=0;i<aLength+2;++i) {
697       costs2[i] = BIG_NUM;
698       costs1[i] = BIG_NUM;
699       costs0[i] = BIG_NUM;
700     }
701
702     costs0[2] = SquareDifference(*a1,*b1);
703
704     for (i=1;i<bLength;++i) {
705       bottom = IMax(i/2,2*i+aLength-2*bLength);
706       top = IMin(2*i,i/2+aLength-bLength/2)+1;
707
708       a1c = a1+bottom; /* a1 cursor */
709       b1v = *(b1+i); /* b1 value */
710
711       switch (i%3) {
712       case 0:
713         dc = costs0+bottom-2+2;
714         cd2l1 = costs2+bottom-2+2;
715         cd1l2 = costs1+bottom-1+2;
716         cd1l1 = costs2+bottom-1+2;
717         break;
718       case 1:
719         dc = costs1+bottom-2+2;
720         cd2l1 = costs0+bottom-2+2;
```

```
721          cd1l2 = costs2+bottom-1+2;
722          cd1l1 = costs0+bottom-1+2;
723          break;
724        case 2:
725          dc = costs2+bottom-2+2;
726          cd2l1 = costs1+bottom-2+2;
727          cd1l2 = costs0+bottom-1+2;
728          cd1l1 = costs1+bottom-1+2;
729          break;
730        }
731        *dc++ = BIG_NUM;
732        *dc++ = BIG_NUM;
733        for (j=bottom;j<top;++j) {
734          float d2l1,d1l2,d1l1,rest;
735          rest = SquareDifference(*a1c++,b1v);
736          d1l1 = *cd1l1++ + rest*centerWeight;
737          d1l2 = *cd1l2++ + rest;
738          d2l1 = *cd2l1++ + rest;
739
740          *dc++ = FMin(FMin(d1l1,d2l1),d1l2);
741        }
742
743        switch (i%3) {
744        case 0:
745          dc = costs0;
746          break;
747        case 1:
748          dc = costs1;
749          break;
750        case 2:
751          dc = costs2;
752          break;
753        }
754      }
755
756      --i;
757      switch (i%3) {
758      case 0:
759        dc = costs0;
760        break;
761      case 1:
762        dc = costs1;
763        break;
764      case 2:
765        dc = costs2;
766        break;
767      }
768      returnVal = *(dc+aLength-1+2);
769
770      if (lengthNormalize)
771        return returnVal/sqrt(aLength*aLength+bLength*bLength);
772      else
773        return returnVal;
774    }
775
776
777    float SlopeCMatchAndPath(float *a1,float *a2,int aLength,float *b1,float *b2,int bLength,
778                  float centerWeight,BOOLEAN lengthNormalize,float topToBottom,
779                  FILE *pathFP)
780    {
```

```
781       Direction path[MAX_SIGNAL_LENGTH][MAX_SIGNAL_LENGTH],*pc;
782       float costs0[MAX_SIGNAL_LENGTH+2];
783       float costs1[MAX_SIGNAL_LENGTH+2];
784       float costs2[MAX_SIGNAL_LENGTH+2];
785       float slope,minVal;
786       int i,j;
787       int bottom,top;
788       float *cd1l1,*cd2l1,*cd1l2;
789       float *a1c,*a2c,*cd,*cl,*cdl,*dc;
790       float b1v,b2v,returnVal;
791
792       /* printf("sc:\n"); */
793
794       if (aLength>MAX_SIGNAL_LENGTH||bLength>MAX_SIGNAL_LENGTH)
795         DoError("SlopeCMatch: maximum signal length exceeded.\n",NULL);
796
797       slope = (float)aLength/(float)bLength;
798       if ((slope>MAX_SLOPE)||(1/slope>MAX_SLOPE)) {
799         return BIG_NUM;
800       }
801
802       for (i=0;i<aLength+2;++i) {
803         costs2[i] = BIG_NUM;
804         costs1[i] = BIG_NUM;
805         costs0[i] = BIG_NUM;
806       }
807
808       pc = &(path[0][0]);
809       *pc++ = NONE;
810       costs0[2] = SquareDifference(*a1,*b1)*topToBottom+SquareDifference(*a2,*b2);
811
812       for (i=1;i<bLength;++i) {
813         bottom = IMax(i/2,2*i+aLength-2*bLength);
814         top = IMin(2*i,i/2+aLength-bLength/2)+1;
815
816         a1c = a1+bottom; /* a1 cursor */
817         a2c = a2+bottom; /* a2 cursor */
818         b1v = *(b1+i); /* b1 value */
819         b2v = *(b2+i); /* b2 value */
820
821         switch (i%3) {
822         case 0:
823           dc = costs0+bottom-2+2;
824           cd2l1 = costs2+bottom-2+2;
825           cd1l2 = costs1+bottom-1+2;
826           cd1l1 = costs2+bottom-1+2;
827           break;
828         case 1:
829           dc = costs1+bottom-2+2;
830           cd2l1 = costs0+bottom-2+2;
831           cd1l2 = costs2+bottom-1+2;
832           cd1l1 = costs0+bottom-1+2;
833           break;
834         case 2:
835           dc = costs2+bottom-2+2;
836           cd2l1 = costs1+bottom-2+2;
837           cd1l2 = costs0+bottom-1+2;
838           cd1l1 = costs1+bottom-1+2;
839           break;
840         }
```

```
841      *dc++ = BIG_NUM;
842      *dc++ = BIG_NUM;
843      pc = &(path[i][bottom]);
844      for (j=bottom;j<top;++j) {
845       float d2l1,d1l2,d1l1,rest;
846
847       rest = SquareDifference(*a1c++,b1v)*topToBottom+
848           SquareDifference(*a2c++,b2v);
849       d1l1 = *cd1l1++ + rest*centerWeight;
850       d1l2 = *cd1l2++ + rest;
851       d2l1 = *cd2l1++ + rest;
852
853       if (d1l1<d1l2)
854          if (d1l1<d2l1) {
855            *dc++ = d1l1;
856            *pc++ = D1L1;
857          }
858          else {
859            *dc++ = d2l1;
860            *pc++ = D2L1;
861          }
862       else
863          if (d1l2<d2l1) {
864            *dc++ = d1l2;
865            *pc++ = D1L2;
866          }
867          else {
868            *dc++ = d2l1;
869            *pc++ = D2L1;
870          }
871      }
872
873      switch (i%3) {
874      case 0:
875       dc = costs0;
876       break;
877      case 1:
878       dc = costs1;
879       break;
880      case 2:
881       dc = costs2;
882       break;
883      }
884      minVal = BIG_NUM;
885      printf("%6d: ",i);
886      for (j=0;j<aLength+2;++j) {
887       if (*dc <= minVal)
888           minVal = *dc;
889       if (*dc++ >= BIG_NUM)
890           printf(" ");
891       else
892           printf("*");
893      }
894      printf("   %6.2f\n",minVal);
895     }
896
897     --i;
898     switch (i%3) {
899     case 0:
900       dc = costs0;
```

```
901         break;
902       case 1:
903         dc = costs1;
904         break;
905       case 2:
906         dc = costs2;
907         break;
908       }
909       returnVal = *(dc+aLength-1+2);
910
911       PrintPath(a1,a2,aLength,b1,b2,bLength,path,i,returnVal,pathFP);
912
913       if (lengthNormalize)
914         return returnVal/sqrt(aLength*aLength+bLength*bLength);
915       else
916         return returnVal;
917     }
918
```

Aug 2 02:29 1991 recogDesc.c

```
1       #include <stdio.h>
2       #include "mylib.h"
3       #include "types.h"
4       #include "dict.h"
5       #include "diff.h"
6
7       #define BIG_NUM (10e10)
8       #define MAX_WORDS (100)
9       #define MAX_FONTS (10)
10
11      extern double sqrt(double);
12
13      float CompareNumericDescriptors(float *a,float *b,int length)
14      {
15        int i;
16        float sum;
17        for (i=0,sum=0;i<length;++i) {
18         sum += (*a-*b)*(*a-*b);
19         ++a;
20         ++b;
21        }
22        return sqrt(sum);
23      }
24
25      float *ComputeNumericDescriptor(int modelIndex,Dictionary models,
26                          Dictionary *fonts,int numberOfFonts,int numberOfWords,
27                          DiffDescriptor dd,
28                          float *sd,float *avg)
29      {
30       float *d;
31       int i,j;
32       float temp;
33       float sumxx[MAX_WORDS];
34       float sdev[MAX_WORDS];
35       float sumsdev,sumscore;
36
```

```
37      if ((d = (float *)calloc(numberOfWords,sizeof(float))) == NULL)
38        DoError("ComputeNumericDescriptor: cannot allocate space.\n",NULL);
39      for (j=0;j<numberOfWords;++j)
40        sumxx[j]=0;
41      for (i=0;i<numberOfFonts;++i)
42        for (j=0;j<numberOfWords;++j) {
43          temp=DiffPair(*(models->outlines+modelIndex),*(fonts[i]->outlines+j),dd);
44          if (temp < BIG_NUM) {
45              d[j]+=temp;
46              sumxx[j]+=temp*temp;
47          }
48        }
49
50      if (numberOfFonts > 1) {
51        float sum,minsdev,maxsdev;
52        for (j=0;j<numberOfWords;++j)
53          sdev[j] = sqrt((numberOfFonts*sumxx[j]-d[j]*d[j])/numberOfFonts/(numberOfFonts-1));
54        for (j=0,sumsdev=0,sumscore=0;j<numberOfWords;++j) {
55          sumsdev += sdev[j];
56          sumscore += d[j];
57        }
58        *sd = sumsdev/numberOfWords;
59        *avg = sumscore/numberOfWords;
60      }
61
62      for (j=0;j<numberOfWords;++j)
63        d[j]/=numberOfFonts;
64
65      return d;
66    }
67
68    typedef struct {
69      float score;
70      int x;
71      int y;
72    } *CompareTuple,CompareTupleBody;
73
74    int TupleLessThan(CompareTuple *x,CompareTuple *y)
75    {
76      if ((*x)->score == (*y)->score)
77        return 0;
78      else if ((*x)->score < (*y)->score)
79        return -1;
80      else
81        return 1;
82    }
83
84
85    void DoDescriptors(Dictionary models,char *modelName,char **wordNames,
86                      int numberOfFonts,Dictionary *fonts,char **fontNames,
87                      int numberOfWords,DiffDescriptor dd)
88    {
89      float *descriptors[MAX_WORDS];
90      int classes[MAX_WORDS][MAX_WORDS];
91      float sdev[MAX_WORDS],avg[MAX_WORDS];
92      CompareTupleBody tuples[MAX_WORDS*MAX_WORDS];
93      CompareTuple scores[MAX_WORDS*MAX_WORDS];
94      int i,x,y,j;
95      int count;
96      /* float threshold = 0.22; */
```

```
 97      float threshold = 0.42;
 98
 99      for (i=0;i<numberOfWords;++i) {
100        descriptors[i] =
           ComputeNumericDescriptor(i,models,fonts,numberOfFonts,numberOfWords,dd,
101                                   sdev+i,avg+i);
102        fprintf(stdout,"%s: %6.4f %6.4f\n",wordNames[i],avg[i],sdev[i]);
103      }
104      fprintf(stdout,"\n\n");
105
106      for (y=0;y<numberOfWords;++y)
107        for (x=0;x<numberOfWords;++x)
108          classes[y][x] =
           (CompareNumericDescriptors(descriptors[y],descriptors[x],numberOfWords)
109                   < threshold);
110
111
112      #ifdef foo
113       for (y=0,i=0;y<numberOfWords;++y)
114        for (x=0;x<y;++x) {
115         CompareTuple temp;
116      /*
117         temp = (CompareTuple)calloc(1,sizeof(CompareTupleBody));
118         if (temp==NULL)
119             DoError(": cannot allocate space.\n",NULL);
120      */
121         temp = tuples+i;
122         temp->score =
           CompareNumericDescriptors(descriptors[y],descriptors[x],numberOfWords);
123         temp->x = x;
124         temp->y = y;
125         scores[i] = temp;
126         ++i;
127        }
128       qsort(scores,i,sizeof(CompareTuple),TupleLessThan);
129
130       for (j=0;j<i;++j)
131        fprintf(stdout,"(%s,%s):
           %f\n",wordNames[scores[j]->y],wordNames[scores[j]->x],scores[j]->score);
132      #endif
133
134      fprintf(stdout,"\n\n");
135      for (i=0;i<numberOfWords;++i) {
136       CompareTuple temp;
137       float *thisDesc;
138       float junk;
139       thisDesc =
           ComputeNumericDescriptor(i,models,&models,1,numberOfWords,dd,&junk,&junk);
140       for (j=0;j<numberOfWords;++j) {
141        temp = tuples+j;
142        temp->score = CompareNumericDescriptors(thisDesc,descriptors[j],numberOfWords);
143        temp->y = i;
144        temp->x = j;
145        scores[j] = temp;
146       }
147       qsort(scores,numberOfWords,sizeof(CompareTuple),TupleLessThan);
148
149       fprintf(stdout,"%s: ",wordNames[i]);
150       for (j=0;j<5&&j<numberOfWords;++j) {
151        fprintf(stdout,"%s ",wordNames[scores[j]->x]);
```

```
152        if (scores[j]->x = = i)
153            break;
154       }
155       if (scores[j]->x = = i)
156         fprintf(stdout,"\n");
157       else {
158         for (;j<numberOfWords; + +j)
159             if (scores[j]->x= =i)
160                break;
161         fprintf(stdout," (%d more)\n",j-5);
162       }
163
164       fprintf(stdout," ");
165       count = 0;
166       for (j=0;j<numberOfWords; + +j)
167         if (classes[scores[0]->x][j]) {
168             fprintf(stdout,"%s ",wordNames[j]);
169             + +count;
170             if (count > 5)
171                break;
172         }
173       if (j<numberOfWords) {
174         for (count=0;j<numberOfWords; + +j)
175             if (classes[scores[0]->x][j])
176                + +count;
177         fprintf(stdout," (% more)\n",count);
178       }
179       else
180         fprintf(stdout,"\n");
181
182       free(thisDesc);
183     }
184   }
185
186   void main(int argc,char **argv)
187   {
188     char *listFile;
189     Dictionary models;
190     char *modelName;
191     int numberOfFonts;
192     Dictionary fonts[MAX_FONTS];
193     char *fontNames[MAX_FONTS];
194     char *wordNames[MAX_WORDS];
195     int numberOfWords;
196     float centerWeight;
197     int normalBandWidth;
198     BOOLEAN
      lengthNormalize,useL2,slopeConstrain,warp,topToBottomOption,hillToValleyOption;
199     BOOLEAN separate;
200     float topToBottom,hillToValleyLocal;
201     FILE *listfp;
202     int i,x,y;
203     DiffDescriptorBody dd;
204
205     centerWeight = 1.0;
206     normalBandWidth = 20;
207     topToBottom = 1.0;
208     hillToValleyLocal = 1.0;
209     DefArg("%s","listFile",&listFile);
210     DefOption("-L2","-L2",&useL2);
211     DefOption("-slopeConstrain %f","-slopeConstrain <center weight>",
```

```
212                 &slopeConstrain,&centerWeight);
213         DefOption("-warp %f %d","-warp <center weight> <band width>",
214                 &warp,&centerWeight,&normalBandWidth);
215         DefOption("-separate","-separate",&separate);
216         DefOption("-normalize","-normalize",&lengthNormalize);
217         DefOption("-topToBottom %f","-topToBottom
            <ratio>",&topToBottomOption,&topToBottom);
218         DefOption("-hillToValley %f","-hillToValley
            <ratio>",&hillToValleyOption,&hillToValleyLocal);
219         ScanArgs(argc,argv);
220
221         if ((listfp = fopen(listFile,"r"))==NULL)
222             DoError("Error opening file %s.\n",listFile);
223
224         /* Read in the number of words in each dictionary */
225         numberOfWords = ReadInt(listfp);
226         if (numberOfWords > MAX_WORDS)
227             DoError("%s: too many words.\n",argv[0]);
228
229         /* Read in the words */
230         for (i=0;i<numberOfWords;++i) {
231             wordNames[i] = ReadString(listfp);
232         }
233
234         /* Read in the model dictionary */
235         modelName = ReadString(listfp);
236         models = ReadDictionary(modelName);
237
238         /* Read in the number of dictionaries */
239         numberOfFonts = ReadInt(listfp);
240         if (numberOfFonts > MAX_FONTS)
241             DoError("%s: too many dictionaries.\n",argv[0]);
242
243         /* Read in the dictionaries and their names */
244         for (i=0;i<numberOfFonts;++i) {
245             fontNames[i] = ReadString(listfp);
246             fonts[i] = ReadDictionary(fontNames[i]);
247         }
248
249         /* Check to see that all dictionaries have the same number of shapes as the specified number
            of words. */
250         for (i=1;i<numberOfFonts;++i)
251             if (fonts[i]->numberOfEntries < numberOfWords)
252                 DoError("Dictionary %s has too few entries.\n",fontNames[i]);
253         if (models->numberOfEntries < numberOfWords)
254             DoError("Model dictionary has too few of entries.\n",NULL);
255
256
257         if (useL2) {
258             fprintf(stdout,"Using L2 on length normalized shapes.\n");
259             dd.diffType = L2;
260         }
261         else if (slopeConstrain) {
262             fprintf(stdout,"Using dynamic time warping with slope contrained to [0.5,2].\n");
263             dd.diffType = CONSTRAINED;
264             dd.separate = separate;
265             if (separate)
266                 fprintf(stdout,"Top and bottom warped separately.\n");
267             else
268                 fprintf(stdout,"Top and bottom warped together.\n");
```

```
269       }
270       else {
271         fprintf(stdout,"Using dynamic time warping with bandwidth %d.\n",normalBandWidth);
272         dd.diffType = WARP;
273         dd.bandWidth = normalBandWidth;
274         dd.separate = separate;
275         if (separate)
276           fprintf(stdout,"Top and bottom warped separately.\n");
277         else
278           fprintf(stdout,"Top and bottom warped together.\n");
279       }
280       if (!useL2) {
281         fprintf(stdout,"Center weight = %f.\n",centerWeight);
282         dd.centerWeight = centerWeight;
283         if (lengthNormalize) {
284           dd.lengthNormalize = TRUE;
285           fprintf(stdout,"Scores normalized by signal length.\n");
286         }
287         else
288           dd.lengthNormalize = FALSE;
289       }
290       dd.hillToValley = hillToValleyLocal;
291       dd.topToBottom = topToBottom;
292       dd.pathFP = NULL;
293
294       fprintf(stdout,"Words:\n");
295       for (i=0;i<numberOfWords;++i)
296         fprintf(stdout,"%d: %s\n",i,wordNames[i]);
297       fprintf(stdout,"\n");
298       fprintf(stdout,"Model font is %s.\n",modelName);
299       fprintf(stdout,"Fonts:\n");
300       for (i=0;i<numberOfFonts;++i)
301         fprintf(stdout,"%d: %s\n",i,fontNames[i]);
302       fprintf(stdout,"\n");
303
304
          DoDescriptors(models,modelName,wordNames,numberOfFonts,fonts,fontNames,numberOfWords,&dd);
305     }
```

Jun 18 16:20 1991 resample.c

```
1       #include <stdio.h>
2       #include <values.h>
3       #include <string.h>
4       #include <floatingpoint.h>
5       #include "boolean.h"
6       #include "types.h"
7       #include "error.h"
8       #include "dict.h"
9
10      void Resample(OutlinePair signal,float factor)
11      {
12        int i,count;
13        float pivot;
14        float delFactor;
```

```
15      float *oldTop,*newTop;
16      float *oldBottom,*newBottom;
17      float *topSPtr,*topDPtr;
18      float *bottomSPtr,*bottomDPtr;
19
20      delFactor = 1.0 - factor;
21      for (i=0,count=0,pivot=0.0;i<signal->numberOfLegs;++i) {
22       if (pivot>=1.0) {
23        pivot -= 1.0;
24        pivot += delFactor;
25       }
26       else {
27        pivot += delFactor;
28        ++count;
29       }
30      }
31
32      newTop = (float *)calloc(count,sizeof(float));
33      newBottom = (float *)calloc(count,sizeof(float));
34      if ((newTop==NULL)||(newBottom==NULL))
35       DoError("Resample: cannot allocate space.\n",NULL);
36
37      oldTop = signal->top;
38      oldBottom = signal->bottom;
39
40      topSPtr = signal->top;
41      bottomSPtr = signal->bottom;
42      topDPtr = newTop;
43      bottomDPtr = newBottom;
44      for (i=0,pivot=0.0;i<signal->numberOfLegs;++i) {
45       if (pivot>=1.0) {
46        pivot -= 1.0;
47        pivot += delFactor;
48        ++topSPtr;
49        ++bottomSPtr;
50       }
51       else {
52        pivot += delFactor;
53        *topDPtr++ = *topSPtr++;
54        *bottomDPtr++ = *bottomSPtr++;
55       }
56      }
57
58      signal->top = newTop;
59      signal->bottom = newBottom;
60      signal->numberOfLegs = count;
61
62      free(oldTop);
63      free(oldBottom);
64     }
65
66     void main(int argc,char **argv)
67     {
68      char *inFile,*outFile;
69      float factor;
70      int i;
71      Dictionary dict;
72
73      if (argc != 4) {
74       fprintf(stderr,"Usage:\n");
```

```
75      fprintf(stderr," %s <input file> <output file> <compression factor>\n",argv[0]);
76      fprintf(stderr,"Compresses shapes horizontally.\n");
77      exit(-1);
78    }
79
80    if ((factor> = 1.0)||(factor<0.0))
81      DoError("%s: factor must be between 0 and 1.\n",argv[0]);
82
83    inFile = argv[1];
84    outFile = argv[2];
85    factor = atof(argv[3]);
86
87    dict = ReadDictionary(inFile);
88
89    for (i=0;i<dict->numberOfEntries; + +i)
90      Resample(*(dict->outlines+i),factor);
91
92    WriteDictionary(dict,outFile);
93  }
```

Jul 31 16:48 1991 sepMatch.c

```
1     #include <stdio.h>
2     #include "mylib.h"
3     #include "misc.h"
4
5     #define MAX_SIGNAL_LENGTH (800)
6     #define MAX_SLOPE (2.0)
7     #define BIG_NUM (10e20)
8
9     typedef enum {NONE,LEFT,DOWN,DOWNLEFT,D1L1,D2L1,D1L2} Direction;
10
11    extern double sqrt(double);
12    extern double cos(double);
13    extern double atan(double);
14    extern int irint(double);
15
16    /* Assumes that a represents the model and b represents the unknown.
17     * Weights places where the model is lower than the unknown more than
18     * cases where the model is higher than the unknown.  The idea here is
19     * that valleys can be filled in by bleeding together, but that noise
20     * can rarely make a contour be too tall for extended periods.
21     */
22    float hillToValley = 1.0;
23    inline float SquareDifference(float a,float b)
24    {
25      float temp = a-b;
26      if (temp<0)
27        return temp*temp;
28      else
29        return temp*temp*hillToValley*hillToValley;
30    /*  return (a-b)*(a-b); */
31    }
32
33    inline float FMax(float a,float b)
34    {
```

```
35      if (a>b)
36        return a;
37      else
38        return b;
39    }
40
41    inline float FMin(float a,float b)
42    {
43      if (a<b)
44        return a;
45      else
46        return b;
47    }
48
49    inline int IMax(int a,int b)
50    {
51      if (a>b)
52        return a;
53      else
54        return b;
55    }
56
57    inline int IMin(int a,int b)
58    {
59      if (a<b)
60        return a;
61      else
62        return b;
63    }
64
65    float NewMatch(float *a1,float *a2,int aLength,float *b1,float *b2,int bLength,
66              float centerWeight,BOOLEAN lengthNormalize,int normalBandWidth,
67              float topToBottom)
68    {
69      float costs0[MAX_SIGNAL_LENGTH+1];
70      float costs1[MAX_SIGNAL_LENGTH+1];
71      int i,j,start,end,bandWidth,shift;
72      int realStart,realEnd,center,oldEnd;
73      float slope,angle;
74      float *a1c,*a2c,*cd,*cl,*:dl,*dc;
75      float oldCost,b1v,b2v,returnVal;
76
77      if (aLength>MAX_SIGNAL_LENGTH||bLength>MAX_SIGNAL_LENGTH)
78        DoError("NewMatch: maximum signal length exceeded.\n",NULL);
79
80      slope = (float)aLength/(float)bLength;
81
82      if ((slope>MAX_SLOPE)||(1/slope>MAX_SLOPE)) {
83        return BIG_NUM;
84      }
85      angle = atan(slope);
86      bandWidth = irint(normalBandWidth/cos(angle));
87      center = 0;
88      realStart = center-bandWidth/2;
89      realEnd = realStart+bandWidth;
90      end = FMin(realEnd,aLength);
91
92      a1c = a1; /* a1 cursor */
93      a2c = a2; /* a2 cursor */
94      b1v = *b1; /* b1 value */
```

```
95      b2v = *b2; /* b2 value */
96      dc = costs0;
97      *dc++ = BIG_NUM;
98      oldCost = *dc++ =
        SquareDifference(*a1c++,b1v)*topToBottom+SquareDifference(*a2c++,b2v);
99
100     for (j=1;j<end;++j)
101       oldCost = *dc++ =
        oldCost+SquareDifference(*a1c++,b1v)*topToBottom+SquareDifference(*a2c++,b2v);
102
103     for (i=1;i<bLength;++i) {
104       /* Compute new center of band */
105       center = irint(slope*i);
106       realStart = center-bandWidth/2;
107       realEnd = realStart+bandWidth;
108       start = FMax(realStart,0);
109       oldEnd = end;
110       end = FMin(realEnd,aLength);
111       shift = end-oldEnd;
112
113       /* put large numbers where bands don't overlap */
114       for (j=0;j<shift;++j)
115         *dc++ = BIG_NUM;
116
117       a1c = a1+start; /* a1 cursor */
118       a2c = a2+start; /* a2 cursor */
119       b1v = *(b1+i); /* b1 value */
120       b2v = *(b2+i); /* b2 value */
121       if (i&1) {
122         cd = costs1+start-1+1; /* cursor down ??? What about -1??? */
123         cdl = costs0+start-1+1; /* cursor down left */
124         cl = costs0+start+1; /* cursor left */
125         dc = costs1+start+1; /* destination cursor */
126       }
127       else {
128         cd = costs0+start-1+1; /* cursor down */
129         cdl = costs1+start-1+1; /* cursor down left */
130         cl = costs1+start+1; /* cursor left */
131         dc = costs0+start+1; /* destination cursor */
132       }
133       *cd = BIG_NUM;
134       for (j=start;j<end;++j) {
135         float down,left,downLeft,rest;
136         down = *cd++ + rest;
137         left = *cl++ + rest;
138         downLeft = *cdl++ + rest*centerWeight;
139         rest = SquareDifference(*a1c++,b1v)*topToBottom+
140             SquareDifference(*a2c++,b2v);
141         *dc++ = FMin(FMin(down,left),downLeft);
142       }
143     }
144
145     i--;
146     if (i&1)
147       dc = costs1+aLength-1+1;
148     else
149       dc = costs0+aLength-1+1;
150     returnVal = *dc;
151
152     if (lengthNormalize)
```

```
153       return returnVal/sqrt(aLength*aLength+bLength*bLength);
154     else
155       return returnVal;
156   }
157
158
159   void PrintPath(float *a1,float *a2,int aLength,float *b1,float *b2,int bLength,
160              Direction path[MAX_SIGNAL_LENGTH][MAX_SIGNAL_LENGTH],int i,
161              float returnVal,
162              FILE *pathFP)
163   {
164     int x,y,j;
165     int length = 0;
166     int index = 0;
167     float newTop1[MAX_SIGNAL_LENGTH],newBottom1[MAX_SIGNAL_LENGTH];
168     float newTop2[MAX_SIGNAL_LENGTH],newBottom2[MAX_SIGNAL_LENGTH];
169
170     y = i;
171     x = aLength-1;
172     while (path[y][x]!=NONE) {
173      switch (path[y][x]) {
174      case DOWN:
175       x--;
176       break;
177      case LEFT:
178       y--;
179       break;
180      case D1L1:
181      case DOWNLEFT:
182       x--;
183       y--;
184       break;
185      case D2L1:
186       x-=2;
187       y--;
188       break;
189      case D1L2:
190       x--;
191       y-=2;
192       break;
193      default:
194       DoError("NewMatchAndPath: Internal error - bad case.\n",NULL);
195      }
196      ++length;
197     }
198
199     y = i;
200     x = aLength-1;
201     while (path[y][x]!=NONE) {
202      if (index>=MAX_SIGNAL_LENGTH)
203       DoError("NewMatchAddPath: warped signal is too long.\n",NULL);
204      newTop1[length-index] = a1[x];
205      newBottom1[length-index] = a2[x];
206      newTop2[length-index] = b1[y];
207      newBottom2[length-index] = b2[y];
208      switch (path[y][x]) {
209      case DOWN:
210       x--;
211       break;
212      case LEFT:
```

```
213         y--;
214         break;
215       case D1L1:
216       case DOWNLEFT:
217         x--;
218         y--;
219         break;
220       case D2L1:
221         x-=2;
222         y--;
223         break;
224       case D1L2:
225         x--;
226         y-=2;
227         break;
228       default:
229         DoError("NewMatchAndPath: Internal error - bad case.\n",NULL);
230       }
231       ++index;
232     }
233     if (index>=MAX_SIGNAL_LENGTH)
234       DoError("NewMatchAddPath: warped signal is too long.\n",NULL);
235     newTop1[length-index] = a1[x];
236     newBottom1[length-index] = a2[x];
237     newTop2[length-index] = b1[y];
238     newBottom2[length-index] = b2[y];
239     ++index;
240
241     for (j=0;j<index;++j)
242       fprintf(pathFP,"%d %f\n",j,newTop1[j]);
243     fprintf(pathFP,"\"top1\n\n");
244
245     for (j=0;j<index;++j)
246       fprintf(pathFP,"%d %f\n",j,newTop2[j]);
247     fprintf(pathFP,"\"top2\n\n");
248
249     for (j=0;j<index;++j)
250       fprintf(pathFP,"%d %f\n",j,-newBottom1[j]);
251     fprintf(pathFP,"\"bottom1\n\n");
252
253     for (j=0;j<index;++j)
254       fprintf(pathFP,"%d %f\n",j,-newBottom2[j]);
255     fprintf(pathFP,"\"bottom2\n\n");
256
257     {
258       float checksum;
259       fprintf(pathFP,"%d %f\n",0,checksum);
260       for (j=0,checksum=0;j<index;++j) {
261         checksum+=SquareDifference(newTop1[j],newTop2[j])+
262             SquareDifference(newBottom1[j],newBottom2[j]);
263         fprintf(pathFP,"%d %f\n",j,checksum);
264       }
265       printf("checksum, score = %6.2f, %6.2f\n",checksum,returnVal);
266     }
267   }
268
269
270
```

```
271   float NewMatchAndPath(float *a1,float *a2,int aLength,float *b1,float *b2,int bLength,
272                 float centerWeight,BOOLEAN lengthNormalize,int normalBandWidth,
273                 float topToBottom,FILE *pathFP)
274   {
275     Direction path[MAX_SIGNAL_LENGTH][MAX_SIGNAL_LENGTH],*pc;
276     int x,y;
277     float costs0[MAX_SIGNAL_LENGTH+1];
278     float costs1[MAX_SIGNAL_LENGTH+1];
279     int i,j,start,end,bandWidth,shift;
280     int realStart,realEnd,center,oldEnd;
281     float slope,angle;
282     float *a1c,*a2c,*cd,*cl,*cdl,*dc;
283     float oldCost,b1v,b2v,returnVal;
284
285     if (aLength>MAX_SIGNAL_LENGTH||bLength>MAX_SIGNAL_LENGTH)
286       DoError("NewMatch: maximum signal length exceeded.\n",NULL);
287
288     slope = (float)aLength/(float)bLength;
289
290     if ((slope>MAX_SLOPE)||(1/slope>MAX_SLOPE)) {
291       return BIG_NUM;
292     }
293     angle = atan(slope);
294     bandWidth = irint(normalBandWidth/cos(angle));
295     center = 0;
296     realStart = center-bandWidth/2;
297     realEnd = realStart+bandWidth;
298     end = FMin(realEnd,aLength);
299
300     a1c = a1;  /* a1 cursor */
301     a2c = a2;  /* a2 cursor */
302     b1v = *b1; /* b1 value */
303     b2v = *b2; /* b2 value */
304     dc = costs0;
305     pc = &(path[0][0]);
306     *dc++ = BIG_NUM;
307     oldCost = *dc++ =
   SquareDifference(*a1c++,b1v)*topToBottom+SquareDifference(*a2c++,b2v);
308     *pc++ = NONE;
309
310     for (j=1;j<end;++j) {
311       oldCost = *dc++ =
   oldCost+SquareDifference(*a1c++,b1v)*topToBottom+SquareDifference(*a2c++,b2v);
312       *pc++ = DOWN;
313     }
314
315   #ifdef foo
316     printf("%6d ",0);
317     for (j=0;j<end;++j)
318       printf("%6.2f ",costs0[j+1]);
319   #endif
320
321     for (i=1;i<bLength;++i) {
322       /* Compute new center of band */
323       center = irint(slope*i);
324       realStart = center-bandWidth/2;
325       realEnd = realStart+bandWidth;
326       start = FMax(realStart,0);
327       oldEnd = end;
328       end = FMin(realEnd,aLength);
```

```
329        shift = end-oldEnd;
330
331        /* put large numbers where bands don't overlap */
332        for (j=0;j<shift;++j){
333   /*      printf("%6.2f ",BIG_NUM); */
334          *dc++ = BIG_NUM;
335        }
336   /*   printf("\n%6d ",i); */
337
338        a1c = a1+start;  /* a1 cursor */
339        a2c = a2+start;  /* a2 cursor */
340        b1v = *(b1+i); /* b1 value */
341        b2v = *(b2+i); /* b2 value */
342        pc = &(path[i][start]);
343        if (i&1) {
344          cd = costs1+start-1+1;  /* cursor down ??? What about -1??? */
345          cdl = costs0+start-1+1; /* cursor down left */
346          cl = costs0+start+1;  /* cursor left */
347          dc = costs1+start+1;  /* destination cursor */
348        }
349        else {
350          cd = costs0+start-1+1;  /* cursor down */
351          cdl = costs1+start-1+1; /* cursor down left */
352          cl = costs1+start+1;  /* cursor left */
353          dc = costs0+start+1;  /* destination cursor */
354        }
355        *cd = BIG_NUM;
356        for (j=start;j<end;++j){
357          float down,left,downLeft,rest;
358          rest = SquareDifference(*a1c++,b1v)*topToBottom + SquareDifference(*a2c++,b2v);
359          down = *cd++ + rest;
360          left = *cl++ + rest;
361          downLeft = *cdl++ + rest*centerWeight;
362
363          if (down < left)
364            if (down < downLeft) {
365   /*         printf("%6.2f ",down); */
366              *dc++ = down;
367              *pc++ = DOWN;
368            }
369            else {
370   /*         printf("%6.2f ",downLeft); */
371              *dc++ = downLeft;
372              *pc++ = DOWNLEFT;
373            }
374          else
375            if (downLeft < left) {
376   /*         printf("%6.2f ",downLeft); */
377              *dc++ = downLeft;
378              *pc++ = DOWNLEFT;
379            }
380            else {
381   /*         printf("%6.2f ",left); */
382              *dc++ = left;
383              *pc++ = LEFT;
384            }
385        }
386      }
```

```
387
388       i--;
389       if (i&1)
390         dc = costs1+aLength-1+1;
391       else
392         dc = costs0+aLength-1+1;
393       returnVal = *dc;
394
395     #ifdef foo
396       if (!doPath) {
397         y = i;
398         x = aLength-1;
399         while (path[y][x]!=NONE) {
400           switch (path[y][x]) {
401           case DOWN:
402               x--;
403               break;
404           case LEFT:
405               y--;
406               break;
407           case DOWNLEFT:
408               x--;
409               y--;
410               break;
411           default:
412               DoError("NewMatchAndPath: Internal error - bad case.\n",NULL);
413           }
414           fprintf(pathFP,"%d %d\n",x,y);
415         }
416         fprintf(pathFP,"%d %d\n",x,y);
417       }
418       else {}
419     #endif
420       PrintPath(a1,a2,aLength,b1,b2,bLength,path,i,returnVal,pathFP);
421
422       if (lengthNormalize)
423         return returnVal/sqrt(aLength*aLength+bLength*bLength);
424       else
425         return returnVal;
426     }
427
428
429     float SlopeCMatch(float *a1,float *a2,int aLength,float *b1,float *b2,int bLength,
430                 float centerWeight,BOOLEAN lengthNormalize,float topToBottom)
431     {
432       float costs0[MAX_SIGNAL_LENGTH+2];
433       float costs1[MAX_SIGNAL_LENGTH+2];
434       float costs2[MAX_SIGNAL_LENGTH+2];
435       float slope,minVal;
436       int i,j;
437       int bottom,top;
438       float *cd1l1,*cd2l1,*cd1l2;
439       float *a1c,*a2c,*cd,*cl,*cdl,*dc;
440       float b1v,b2v,returnVal;
441
442       /* printf("sc:\n"); */
443
444       if (aLength>MAX_SIGNAL_LENGTH||bLength>MAX_SIGNAL_LENGTH)
445         DoError("SlopeCMatch: maximum signal length exceeded.\n",NULL);
446
```

```
447    slope = (float)aLength/(float)bLength;
448    if ((slope>MAX_SLOPE)||(1/slope>MAX_SLOPE)) {
449     return BIG_NUM;
450    }
451
452    for (i=0;i<aLength+2;++i) {
453     costs2[i] = BIG_NUM;
454     costs1[i] = BIG_NUM;
455     costs0[i] = BIG_NUM;
456    }
457
458    costs0[2] = SquareDifference(*a1,*b1)*topToBottom+SquareDifference(*a2,*b2);
459
460    for (i=1;i<bLength;++i) {
461     bottom = IMax(i/2,2*i+aLength-2*bLength);
462     top = IMin(2*i,i/2+aLength-bLength/2)+1;
463
464     a1c = a1+bottom;  /* a1 cursor */
465     a2c = a2+bottom;  /* a2 cursor */
466     b1v = *(b1+i); /* b1 value */
467     b2v = *(b2+i); /* b2 value */
468
469     switch (i%3) {
470     case 0:
471      dc = costs0+bottom-2+2;
472      cd2l1 = costs2+bottom-2+2;
473      cd1l2 = costs1+bottom-1+2;
474      cd1l1 = costs2+bottom-1+2;
475      break;
476     case 1:
477      dc = costs1+bottom-2+2;
478      cd2l1 = costs0+bottom-2+2;
479      cd1l2 = costs2+bottom-1+2;
480      cd1l1 = costs0+bottom-1+2;
481      break;
482     case 2:
483      dc = costs2+bottom-2+2;
484      cd2l1 = costs1+bottom-2+2;
485      cd1l2 = costs0+bottom-1+2;
486      cd1l1 = costs1+bottom-1+2;
487      break;
488     }
489     *dc++ = BIG_NUM;
490     *dc++ = BIG_NUM;
491     for (j=bottom;j<top;++j) {
492      float d2l1,d1l2,d1l1,rest;
493      rest = SquareDifference(*a1c++,b1v)*topToBottom+
494         SquareDifference(*a2c++,b2v);
495      d1l1 = *cd1l1++ + rest*centerWeight;
496      d1l2 = *cd1l2++ + rest;
497      d2l1 = *cd2l1++ + rest;
498
499      *dc++ = FMin(FMin(d1l1,d2l1),d1l2);
500     }
501
502     switch (i%3) {
503     case 0:
504      dc = costs0;
505      break;
506     case 1:
```

```
507         dc = costs1;
508         break;
509       case 2:
510         dc = costs2;
511         break;
512       }
513
514   #ifdef foo
515       minVal = BIG_NUM;
516       printf("%6d: ",i);
517       for (j=0;j<aLength+2;++j) {
518        if (*dc <= minVal)
519           minVal = *dc;
520        if (*dc++ >= BIG_NUM)
521           printf(" ");
522        else
523           printf("*");
524       }
525       printf("   %6.2f\n",minVal);
526   #endif
527     }
528
529     --i;
530     switch (i%3) {
531     case 0:
532      dc = costs0;
533      break;
534     case 1:
535      dc = costs1;
536      break;
537     case 2:
538      dc = costs2;
539      break;
540     }
541     returnVal = *(dc+aLength-1+2);
542
543     if (lengthNormalize)
544      return returnVal/sqrt(aLength*aLength+bLength*bLength);
545     else
546      return returnVal;
547   }
548
549
550   float SlopeCMatchAndPath(float *a1,float *a2,int aLength,float *b1,float *b2,int bLength,
551                    float centerWeight,BOOLEAN lengthNormalize,float topToBottom,
552                    FILE *pathFP)
553   {
554    Direction path[MAX_SIGNAL_LENGTH][MAX_SIGNAL_LENGTH],*pc;
555    float costs0[MAX_SIGNAL_LENGTH+2];
556    float costs1[MAX_SIGNAL_LENGTH+2];
557    float costs2[MAX_SIGNAL_LENGTH+2];
558    float slope,minVal;
559    int i,j;
560    int bottom,top;
561    float *cd1l1,*cd2l1,*cd1l2;
562    float *a1c,*a2c,*cd,*cl,*cdl,*dc;
563    float b1v,b2v,returnVal;
564
565    /* printf("sc:\n"); */
566
```

```
567   if (aLength>MAX_SIGNAL_LENGTH||bLength>MAX_SIGNAL_LENGTH)
568     DoError("SlopeCMatch: maximum signal length exceeded.\n",NULL);
569
570   slope = (float)aLength/(float)bLength;
571   if ((slope>MAX_SLOPE)||(1/slope>MAX_SLOPE)) {
572     return BIG_NUM;
573   }
574
575   for (i=0;i<aLength+2;++i) {
576     costs2[i] = BIG_NUM;
577     costs1[i] = BIG_NUM;
578     costs0[i] = BIG_NUM;
579   }
580
581   pc = &(path[0][0]);
582   *pc++ = NONE;
583   costs0[2] = SquareDifference(*a1,*b1)*topToBottom+SquareDifference(*a2,*b2);
584
585   for (i=1;i<bLength;++i) {
586     bottom = IMax(i/2,2*i+aLength-2*bLength);
587     top = IMin(2*i,i/2+aLength-bLength/2)+1;
588
589     a1c = a1+bottom;  /* a1 cursor */
590     a2c = a2+bottom;  /* a2 cursor */
591     b1v = *(b1+i);    /* b1 value */
592     b2v = *(b2+i);    /* b2 value */
593
594     switch (i%3) {
595     case 0:
596       dc   = costs0+bottom-2+2;
597       cd2l1 = costs2+bottom-2+2;
598       cd1l2 = costs1+bottom-1+2;
599       cd1l1 = costs2+bottom-1+2;
600       break;
601     case 1:
602       dc   = costs1+bottom-2+2;
603       cd2l1 = costs0+bottom-2+2;
604       cd1l2 = costs2+bottom-1+2;
605       cd1l1 = costs0+bottom-1+2;
606       break;
607     case 2:
608       dc   = costs2+bottom-2+2;
609       cd2l1 = costs1+bottom-2+2;
610       cd1l2 = costs0+bottom-1+2;
611       cd1l1 = costs1+bottom-1+2;
612       break;
613     }
614     *dc++ = BIG_NUM;
615     *dc++ = BIG_NUM;
616     pc = &(path[i][bottom]);
617     for (j=bottom;j<top;++j) {
618       float d2l1,d1l2,d1l1,rest;
619
620       rest = SquareDifference(*a1c++,b1v)*topToBottom+
621           SquareDifference(*a2c++,b2v);
622       d1l1 = *cd1l1++ + rest*centerWeight;
623       d1l2 = *cd1l2++ + rest;
624       d2l1 = *cd2l1++ + rest;
625
```

```
626     if (d1l1<d1l2)
627         if (d1l1<d2l1) {
628             *dc++ = d1l1;
629             *pc++ = D1L1;
630         }
631         else {
632             *dc++ = d2l1;
633             *pc++ = D2L1;
634         }
635     else
636         if (d1l2<d2l1) {
637             *dc++ = d1l2;
638             *pc++ = D1L2;
639         }
640         else {
641             *dc++ = d2l1;
642             *pc++ = D2L1;
643         }
644 }
645
646 switch (i%3) {
647 case 0:
648     dc = costs0;
649     break;
650 case 1:
651     dc = costs1;
652     break;
653 case 2:
654     dc = costs2;
655     break;
656 }
657 minVal = BIG_NUM;
658 printf("%6d: ",i);
659 for (j=0;j<aLength+2;++j) {
660     if (*dc <= minVal)
661         minVal = *dc;
662     if (*dc++ >= BIG_NUM)
663         printf(" ");
664     else
665         printf("*");
666 }
667 printf("   %6.2f\n",minVal);
668 }
669
670 --i;
671 switch (i%3) {
672 case 0:
673     dc = costs0;
674     break;
675 case 1:
676     dc = costs1;
677     break;
678 case 2:
679     dc = costs2;
680     break;
681 }
682 returnVal = *(dc+aLength-1+2);
683
684 PrintPath(a1,a2,aLength,b1,b2,bLength,path,i,returnVal,pathFP);
685
```

```
686      if (lengthNormalize)
687        return returnVal/sqrt(aLength*aLength+bLength*bLength);
688      else
689        return returnVal;
690    }
691
```

Jul 31 17:14 1991 single.c

```
1      #include <stdio.h>
2      #include "mylib.h"
3      #include "types.h"
4      #include "dict.h"
5      #include "diff.h"
6      #include "match.h"
7      #include "matchparallel.h"
8
9      main(argc, argv)
10     int argc;
11     char *argv[];
12     {
13       char *dictFile1,*dictFile2,*outFile;
14       int shape1,shape2;
15       Dictionary dict1,dict2;
16       float score;
17       char *matchType;
18       float centerWeight,normalBandWidth,topToBottom,hillToValleyLocal;
19       DiffDescriptorBody dd;
20       FILE *pathFP;
21       BOOLEAN
         useL2,slopeConstrain,warp,lengthNormalize,topToBottomOption,hillToValleyOption;
22       BOOLEAN separate;
23
24       centerWeight = 1.0;
25       normalBandWidth = 20;
26       topToBottom = 1.0;
27       hillToValleyLocal = 1.0;
28       DefArg("%s %d %s %d %s","dict1 shape1 dict2 shape2 outfile",&dictFile1,&shape1,
29             &dictFile2,&shape2,&outFile);
30       DefOption("-L2","-L2",&useL2);
31       DefOption("-slopeConstrain %f","-slopeConstrain <center weight>",
32             &slopeConstrain,&centerWeight);
33       DefOption("-warp %f %f","-warp <center weight> <band width>",
34             &warp,&centerWeight,&normalBandWidth);
35       DefOption("-separate","-separate",&separate);
36       DefOption("-normalize","-normalize",&lengthNormalize);
37       DefOption("-topToBottom %f","-topToBottom
         <ratio>",&topToBottomOption,&topToBottom);
38       DefOption("-hillToValley %f","-hillToValley
         <ratio>",&hillToValleyOption,&hillToValleyLocal);
39       ScanArgs(argc,argv);
40
41       dict1 = ReadDictionary(dictFile1);
42       dict2 = ReadDictionary(dictFile2);
43
```

```
44        if ((shape1 >= dict1->numberOfEntries) || (shape1 < 0) ||
45           (shape2 >= dict2->numberOfEntries) || (shape2 < 0))
46          DoError("%s: bad shape number.\n",argv[0]);
47
48        if ((pathFP=fopen(outFile,"w"))==NULL)
49          DoError("single: error opening output file %s.\n",outFile);
50
51        if (useL2) {
52          fprintf(stdout,"Using L2 on length normalized shapes.\n");
53          dd.diffType = L2;
54        }
55        else if (slopeConstrain) {
56          fprintf(stdout,"Using dynamic time warping with slope contrained to [0.5,2].\n");
57          dd.diffType = CONSTRAINED;
58          dd.separate = separate;
59          if (separate)
60            fprintf(stdout,"Top and bottom warped separately.\n");
61          else
62            fprintf(stdout,"Top and bottom warped together.\n");
63        }
64        else {
65          fprintf(stdout,"Using dynamic time warping with bandwidth %d.\n",normalBandWidth);
66          dd.diffType = WARP;
67          dd.bandWidth = normalBandWidth;
68          dd.separate = separate;
69          if (separate)
70            fprintf(stdout,"Top and bottom warped separately.\n");
71          else
72            fprintf(stdout,"Top and bottom warped together.\n");
73        }
74        if (!useL2) {
75          fprintf(stdout,"Center weight = %f.\n",centerWeight);
76          dd.centerWeight = centerWeight;
77          if (lengthNormalize) {
78            dd.lengthNormalize = TRUE;
79            fprintf(stdout,"Scores normalized by signal length.\n");
80          }
81          else
82            dd.lengthNormalize = FALSE;
83        }
84        dd.hillToValley = hillToValleyLocal;
85        dd.topToBottom = topToBottom;
86        dd.pathFP = pathFP;
87        fprintf(stdout,"Top to bottom ratio = %6.2f.\n",topToBottom);
88        fprintf(stdout,"Hill to Valley ratio = %6.2f.\n",hillToValleyLocal);
89
90        score = DiffPair(*(dict1->outlines+shape1),
91                        *(dict2->outlines+shape2),
92                        &dd);
93
94        fclose(pathFP);
95
96        printf("Score = %f\n",score);
97      }
```

Jul 23 20:24 1991 slopeMatch.c

```
1       float SlopeConstrainedMatch(float *a1,float *a2,int aLength,
2                         float *b1,float *b2,int bLength,
3                         float maxSlope)
```

```
4       {
5         float costs[MAX_SIGNAL_LENGTH][MAX_SIGNAL_LENGTH];
6         char down[MAX_SIGNAL_LENGTH][MAX_SIGNAL_LENGTH];
7         char left[MAX_SIGNAL_LENGTH][MAX_SIGNAL_LENGTH];
8       }
```

Jul 12 14:36 1991 sortMatrix.c

```
1       #include <stdio.h>
2       #include "error.h"
3       #include "pict.h"
4
5       #define MAX_ENTRIES 5000
6
7       typedef struct {
8         float score;
9         int x;
10        int y;
11      } *CompareTuple,CompareTupleBody;
12
13      int TupleLessThan(CompareTuple *x,CompareTuple *y)
14      {
15        if ((*x)->score == (*y)->score)
16          return 0;
17        else if ((*x)->score < (*y)->score)
18          return -1;
19        else
20          return 1;
21      }
22
23      void PrintTuple(CompareTuple a,FILE *fp)
24      {
25        fprintf(fp,"(%d,%d): %f\n",a->x,a->y,a->score);
26      }
27
28      void main(int argc,char **argv)
29      {
30        Picture pict;
31        int i,j;
32        int x,y;
33        char *infile;
34        CompareTuple scores[MAX_ENTRIES];
35
36        if (argc != 2)
37          DoError("Usage: %s infile.\n",argv[0]);
38        infile = argv[1];
39
40        pict = load_pict(infile);
41        if (pict->width*pict->height > MAX_ENTRIES)
42          DoError("%s: matrix has too manyt entries.\n",argv[0]);
43
44        for (y=0,i=0;y<pict->height;++y)
45          for (x=0;x<pict->width;++x) {
46            CompareTuple temp;
47            temp = (CompareTuple)calloc(1,sizeof(CompareTupleBody));
48            if (temp==NULL)
49              DoError("%s: cannot allocate space.\n",argv[0]);
```

```
50        temp->score = *((float *)(pict->data)+x+y*pict->width);
51        temp->x = x;
52        temp->y = y;
53        scores[i] = temp;
54        ++i;
55      }
56    qsort(scores,i,sizeof(CompareTuple),TupleLessThan);
57    for (j=0;j<i;++j)
58      PrintTuple(scores[j],stdout);
59    }
60
```

Section D

Aug 26 17:54 1991 Makefile

```
1     CCFLAGS = -g -c -I/net/piglet/piglet-1c/hopcroft/new/include
2
3     OFUNS = blobify.o orient.o lines.o newBaselines.o newMain.o types.o \
4     newBlobify.o boxes.o newContour.o numbers.o fontNorm.o \
5     dict.o
6
7     ALPHAOFUNS = orient.o lines.o baselines.o newMain.o types.o \
8     blobify.o boxes.o newContour.o numbers.o alphaNorm.o \
9     dict.o
10
11
12    SOURCES = Makefile baselines.c blobify.c boxes.c dict.c dmain.c getAll.c\
13    getOutline.c lines.c newContour.c newDiff2.c newMain.c\
14    numbers.c orient.c overlay.c fontNorm.c testFine.c types.c
15
16    EXTRNS = /net/piglet/piglet-1c/hopcroft/error/error.o\
17    /net/piglet/piglet-1c/hopcroft/new/pict/pict.o \
18    /net/piglet/piglet-1c/hopcroft/lists/lists.o
19
20    INCLUDE = /net/piglet/piglet-1c/hopcroft/new/include/
21    MISC = $(INCLUDE)misc.h
22    BOOLEAN = $(INCLUDE)boolean.h
23    LINES = $(INCLUDE)lines.h
24    LISTS = $(INCLUDE)lists.h
25    PICT = $(INCLUDE)pict.h
26    TYPES = $(INCLUDE)types.h
27    MYLIB = $(INCLUDE)mylib.h
28    ORIENT = $(INCLUDE)orient.h
29    BASELINES = $(INCLUDE)baselines.h
30    BLOBIFY = $(INCLUDE)blobify.h
31    BOXES = $(INCLUDE)boxes.h
32    CONTOUR = $(INCLUDE)newContour.h
33    DIFF = $(INCLUDE)diff.h
34    DICT = $(INCLUDE)dict.n
35    ERROR = $(INCLUDE)error.h
36    FONTNORM = $(INCLUDE)fontNorm.h
37
38    orient:     $(OFUNS)
39        gcc $(OFUNS) $(HOME)/new/lib/mylib.a /usr/lib/debug/malloc.o -lm -o $@
40
```

```makefile
newBlobify: newBlobify.o
	gcc newBlobify.o ../lib/mylib.a -lm -o $@ makeAlphabet:	$(ALPHAOFUNS)
	gcc $(ALPHAOFUNS) /usr/lib/debug/malloc.o $(EXTRNS) -lm -o $@ overlay:	overlay.o
	gcc overlay.o $(EXTRNS) -o $@ testFine:	testFine.o lines.o guassian.o types.o
	gcc testFine.o lines.o guassian.o types.o $(EXTRNS) -lm -o $@ boxes:		boxes.o lines.o types.o
	gcc boxes.o lines.o types.o $(HOME)/new/lib/mylib.a -lm -o $@ getOutline:	dict.o getOutline.o
	gcc getOutline.o dict.o $(EXTRNS) -lm -o $@ getAll:		dict.o getAll.o
	gcc getAll.o dict.o $(EXTRNS) -lm -o $@ maxFilter:	maxFilter.o
	gcc maxFilter.o $(HOME)/new/lib/mylib.a -lm -o $@ myWc:	myWc.o
	gcc myWc.o $(EXTRNS) -o $@ printCode:	$(SOURCES)
	/usr/5bin/pr -n3 $(SOURCES) | lpr -PWeeklyWorldNews newBaselines.o:	newBaselines.c $(BOOLEAN) $(PICT) $(TYPES) $(LISTS) $(LINES)\
$(BASELINES)
	gcc $(CCFLAGS) newBaselines.c blobify.o:	blobify.c $(BOOLEAN) $(PICT) $(BLOBIFY)
	gcc $(CCFLAGS) blobify.c boxes.o:		boxes.c $(BOOLEAN) $(PICT) $(TYPES) $(BOXES)
	gcc $(CCFLAGS) boxes.c dict.o:			dict.c $(BOOLEAN) $(TYPES) $(ERROR) $(PICT) $(DICT)
	gcc $(CCFLAGS) dict.c dmain.o: dmain.c $(BOOLEAN) $(PICT) $(DIFF)
	gcc $(CCFLAGS) dmain.c getAll.o: getAll.c $(BOOLEAN) $(TYPES) $(PICT) $(DICT)
	gcc $(CCFLAGS) getAll.c getOutline.o: getOutline.c $(BOOLEAN) $(TYPES) $(PICT) $(DICT)
	gcc $(CCFLAGS) getOutline.c guassian.o:		guassian.c
	gcc $(CCFLAGS) guassian.c lines.o:	lines.c $(BOOLEAN) $(PICT) $(LINES)
	gcc $(CCFLAGS) lines.c maxFilter.o: maxFilter.c $(MYLIB)
	gcc $(CCFLAGS) maxFilter.c
```

```
101
102     myWc.o:         myWc.c $(BOOLEAN) $(ERROR)
103         gcc $(CCFLAGS) myWc.c
104
105     newBlobify.o:   newBlobify.c $(MYLIB) $(BLOBIFY)
106         gcc $(CCFLAGS) newBlobify.c
107
108     newContour.o:   newContour.c $(BOOLEAN) $(PICT) $(TYPES) $(LINES) \
109     $(LISTS) $(CONTOUR) $(FONTNORM)
110         gcc $(CCFLAGS) newContour.c
111
112     newDiff2.o: newDiff2.c $(BOOLEAN) $(TYPES) $(PICT) $(DIFF)
113         gcc $(CCFLAGS) newDiff2.c
114
115     newMain.o:      newMain.c $(BOOLEAN) $(PICT) $(LISTS) $(LINES) \
116     $(ORIENT) $(BASELINES) $(BLOBIFY) $(BOXES) $(CONTOUR) $(ORIENT)
117         gcc $(CCFLAGS) newMain.c
118
119     numbers.o:  numbers.c $(BOOLEAN) $(PICT) $(LINES)
120         gcc $(CCFLAGS) numbers.c
121
122     orient.o:   orient.c $(BOOLEAN) $(TYPES) $(PICT) $(ORIENT) $(LINES)
123         gcc $(CCFLAGS) orient.c
124
125     overlay.o:  overlay.c $(BOOLEAN) $(PICT)
126         gcc $(CCFLAGS) overlay.c
127
128     postproc.o: postproc.c $(BOOLEAN) $(TYPES) $(ERROR) $(PICT) $(DICT)
129         gcc $(CCFLAGS) postproc.c
130
131     alphaNorm.o: alphaNorm.c $(BOOLEAN) $(TYPES) $(ERROR) $(PICT) $(DICT) $(FONTNORM)
132         gcc $(CCFLAGS) alphaNorm.c
133
134     fontNorm.o: fontNorm.c $(BOOLEAN) $(TYPES) $(ERROR) $(PICT) $(DICT) $(FONTNORM)
135         gcc $(CCFLAGS) fontNorm.c
136
137     testFine.o: testFine.c
138         gcc $(CCFLAGS) testFine.c
139
140     types.o:        types.c $(TYPES) $(ERROR)
141         gcc $(CCFLAGS) types.c
142
```

Aug 5 15:45 1991 alphaNorm.c

```
1   #include <stdio.h>
2   #include <math.h>
3   #include "boolean.h"
4   #include "types.h"
5   #include "error.h"
6   #include "pict.h"
7   #include "dict.h"
8   #include "fontNorm.h"
9
10  /* This file is just like fontNorm.c, but assumes that the input is data for an alphabet
    dictionary.
```

```
11    * This data is
12    *
13    * a-z
14    *
15    * A-Z
16    *
17    * 0-9
18    *
19    * |!@#$%^&*()+\-={}[];:/<>?
20    *
21    * '`"-
22    *
23    * _,.
24    *
25    * The x height will be measured from the x(23).  The ascender height will be measured
26    * from the l(11).
27    */
28
29   #define X_HEIGHT_SHAPE 23
30   #define ASC_HEIGHT_SHAPE 11
31
32   extern double ceil(double);
33   extern int rint(double);
34
35
36   #define UP 0
37   #define DOWN 1
38   typedef int Direction;
39
40   extern Picture thePict;
41
42   void StoreRawOutlinePair(Dictionary dict, int dictEntry,
43                       Box box,int *bothX,int *topY, int *baseY,
44                       int numberOfLegs)
45   {
46     RawOutlinePair temp;
47     int i;
48     int *xCursor,*topCursor,*bottomCursor;
49
50     temp = (RawOutlinePair)calloc(1,sizeof(RawOutlinePairBody));
51     if (temp == NULL)
52       DoError("StoreRawOutlinePair: cannot allocate space\n",NULL);
53
54     temp->box = box;
55     temp->numberOfLegs = numberOfLegs;
56
57     temp->x = (int *)calloc(temp->numberOfLegs,sizeof(int));
58     temp->top = (int *)calloc(temp->numberOfLegs,sizeof(int));
59     temp->bottom = (int *)calloc(temp->numberOfLegs,sizeof(int));
60     if ((temp->x == NULL) ||
61        (temp->top == NULL) ||
62        (temp->bottom == NULL))
63       DoError("StoreRawOutlinePair: cannot allocate space\n",NULL);
64
65     xCursor = temp->x;
66     topCursor = temp->top;
67     bottomCursor = temp->bottom;
68
69     for (i=0;i<numberOfLegs;++i) {
70       *xCursor++ = *bothX++;
```

```
71        *topCursor++ = *topY++;
72        *bottomCursor++ = *baseY++;
73       }
74       *(dict->rawOutlines+dictEntry) = temp;
75    }
76
77    int RawOutlineWidth(RawOutlinePair a,int middleLine)
78    {
79      int i,numberOfLegs,right,left;
80      int *topCursor,*bottomCursor;
81      int topValue,bottomValue;
82
83      numberOfLegs = a->numberOfLegs;
84
85      topCursor = a->top;
86      bottomCursor = a->bottom;
87      for (i=0;i<numberOfLegs;++i) {
88       topValue = *topCursor++;
89       bottomValue = *bottomCursor++;
90
91       if (topValue != HIT_THE_BOX) {
92         topValue = middleLine - topValue;
93         if (topValue<0)
94            topValue = 0;
95       }
96       else
97        topValue = 0;
98
99       if (bottomValue != HIT_THE_BOX) {
100        bottomValue = bottomValue - middleLine;
101        if (bottomValue < 0)
102           bottomValue = 0;
103      }
104      else
105       bottomValue = 0;
106
107      if ((bottomValue != 0)||(topValue != 0))
108        break;
109     }
110     left = i;
111
112     topCursor = a->top+numberOfLegs-1;
113     bottomCursor = a->bottom+numberOfLegs-1;
114     for (i=numberOfLegs-1;i>=0;--i) {
115      topValue = *topCursor--;
116      bottomValue = *bottomCursor--;
117
118      if (topValue != HIT_THE_BOX) {
119        topValue = middleLine - topValue;
120        if (topValue<0)
121           topValue = 0;
122      }
123      else
124       topValue = 0;
125
126      if (bottomValue != HIT_THE_BOX) {
127        bottomValue = bottomValue - middleLine;
128        if (bottomValue < 0)
129           bottomValue = 0;
130      }
```

```
131       else bottomValue = 0;
132
133      if ((topValue != 0)||(bottomValue !=0))
134        break;
135    }
136    right = i+1;
137
138    return right-left;
139  }
140
141  void ResampleOutlinePair(OutlinePair a,float newToOldFactor)
142  /* Resample an outline pair using linear interpolation. */
143  {
144    int newWidth,oldWidth,i;
145    int oldLeft,oldRight;
146    float oldCenter;
147    float *newX,*newTop,*newBottom;
148    float *xCursor,*topCursor,*bottomCursor;
149
150    oldWidth = a->numberOfLegs;
151    newWidth = irint(newToOldFactor*oldWidth);
152
153    newX = (float *)calloc(newWidth,sizeof(float));
154    newTop = (float *)calloc(newWidth,sizeof(float));
155    newBottom = (float *)calloc(newWidth,sizeof(float));
156    if ((newX==NULL)||(newTop==NULL)||(newBottom==NULL))
157      DoError("ResampleOutlinePair: cannot allocate space.\n",NULL);
158
159    xCursor = newX;
160    topCursor = newTop;
161    bottomCursor = newBottom;
162
163    for (i=0;i<newWidth;++i) {
164      oldCenter = i/(float)newWidth*(float)oldWidth;
165      oldLeft = irint(floor(oldCenter));
166      oldRight = irint(ceil(oldCenter));
167      if (oldLeft==oldRight) {
168        *xCursor++ = *(a->x+oldLeft);
169        *topCursor++ = *(a->top+oldLeft);
170        *bottomCursor++ = *(a->bottom+oldLeft);
171      }
172      else {
173        float slope;
174        slope = *(a->x+oldRight)-*(a->x+oldLeft);
175        *xCursor++ = *(a->x+oldLeft) + (oldCenter-oldLeft)*slope;
176        slope = *(a->top+oldRight)-*(a->top+oldLeft);
177        *topCursor++ = *(a->top+oldLeft) + (oldCenter-oldLeft)*slope;
178        slope = *(a->bottom+oldRight)-*(a->bottom+oldLeft);
179        *bottomCursor++ = *(a->bottom+oldLeft) + (oldCenter-oldLeft)*slope;
180      }
181    }
182
183    free(a->x);
184    free(a->top);
185    free(a->bottom);
186
187    a->x = newX;
188    a->top = newTop;
189    a->bottom = newBottom;
190    a->numberOfLegs = newWidth;
```

```
191    }
192
193    void StoreOutlinePair(Dictionary dict, int dictEntry,
194                          int middleLine,int fontXHeight,
195                          int ascenderHeight)
196    /* This routine normalizes the raw outline pair stored in dict at dictEntry using the following
197     * operations:
198     * 1) For the top contour, shi.. so that the middle line is at y=0 and negate so that the
199     *    higher points are greater than 0. For the bottom, shift so that middle line is at y=0,
200     *    but don't flip. Thus, lower points have y coordinates greater than 0.
201     *    Consider points whose value is HIT_THE_BOX to be at y=0. These correspond to gaps
202     *    between the letters.
203     * 2) Compress top and bottom y coordinates by 1/fontXHeight so that the coordinates at the
204     *    distance of the fontXHeight have value 1. Note that 1 is an arbitrary number. It is
205     *    unlikely that a signal will have parts that are the x height above the center line
206     *    anyway.
207     *    FOR TOP CONTOUR,
208     *    IF HEIGHT IS GREATER THAN XHEIGHT, SCALE DIFFERENCE BY 1.5/ASCENDER_HEIGHT.
209     *    ELSE SCALE DIFFERENCE BY 1/XHEIGHT.
210     *    FOR BOTTOM CONTOUR,
211     *    SCALE BY 1.5/ASCENDER_HEIGHT.
212     * 3) Compress the x coordinates by the same factor as in step 2. Note that this does not
213     *    actually resample the contour. NOW DO THIS WITH RESAMPLE. USE SCALE FACTOR OF
214     *    20/XHEIGHT.
215     * 4) Remove left and right ends of the contour that have y values of zero. This is so the
216     *    contour starts where the word starts, rather than at the edge of its bouding box.
217     * 5) Resample the contour to stretch by firstFontXwidth/fontxWidth. KILL THIS OPERATION.
218     */
219    {
220      RawOutlinePair raw;
221      OutlinePair temp;
222      int i,numberOfLegs;
223      int y;
224      int offset;

225      int *xSCursor,*topSCursor,*bottomSCursor;
226      float *xDCursor,*topDCursor,*bottomDCursor;
227      float *xCursor,*topCursor,*bottomCursor;
228      int left,right;
229      float foffset;
230
231      raw = *(dict->rawOutlines+dictEntry);
232
233      temp = (OutlinePair)calloc(1,sizeof(OutlinePairBody));
234      if (temp == NULL)
235        DoError("StoreOutlinePair: cannot allocate space\n",NULL);
236
237      temp->x = (float *)calloc(raw->numberOfLegs,sizeof(float));
238      temp->top = (float *)calloc(raw->numberOfLegs,sizeof(float));
239      temp->bottom = (float *)calloc(raw->numberOfLegs,sizeof(float));
240      if ((temp->x == NULL) ||
241          (temp->top == NULL) ||
242          (temp->bottom == NULL))
243        DoError("StoreOutlinePair: cannot allocate space\n",NULL);
244
245      temp->box = raw->box;
246      temp->blackoutHeight = 0;
247      temp->numberOfLegs = raw->numberOfLegs;
```

```
248      offset = temp->offset = *(raw->x);
249      temp->width = *(raw->x+raw->numberOfLegs-1) - temp->offset;
250
251      xDCursor = temp->x;
252      topDCursor = temp->top;
253      bottomDCursor = temp->bottom;
254      xSCursor = raw->x;
255      topSCursor = raw->top;
256      bottomSCursor = raw->bottom;
257
258      numberOfLegs = raw->numberOfLegs;
259      for (i=0;i<numberOfLegs;++i) {
260   /*    *xDCursor++ = (float)(*xSCursor++ - offset)/fontXHeight; */
261       if (*topSCursor==HIT_THE_BOX) {
262        y = 0;
263        topSCursor++;
264       }
265       else {
266        y = middleLine - *topSCursor++;
267        if (y<0)
268            y = 0;
269       }
270       if (y>fontXHeight/2)
271        *topDCursor++ = (float)y *1.5 / ascenderHeight;
272       else
273        *topDCursor++ = (float)y / fontXHeight;
274
275       if (*bottomSCursor==HIT_THE_BOX) {
276        y = 0;
277        bottomSCursor++;
278       }
279       else {
280        y = *bottomSCursor++ - middleLine;
281        if (y<0)
282            y = 0;
283       }
284       if (y>fontXHeight/2)
285        *bottomDCursor++ = (float)y / fontXHeight;
286       else
287        *bottomDCursor++ = (float)y *1.5 / ascenderHeight;
288      }
289
290   /* Now try to remove parts of the contour on to the left and right of the
291    * word shape that are at height 0 */
292
293   /* Find left edge */
294      topDCursor = temp->top;
295      bottomDCursor = temp->bottom;
296      for (i=0;i<numberOfLegs;++i) {
297       if ((*topDCursor++ != 0)||(*bottomDCursor++!=0))
298        break;
299      }
300      left = i;
301
302   /* Find right edge */
303      topDCursor = temp->top+numberOfLegs-1;
304      bottomDCursor = temp->bottom+numberOfLegs-1;
305      for (i=numberOfLegs-1;i>=0;--i) {
306       if ((*topDCursor-- != 0)||(*bottomDCursor-- !=0))
307        break;
```

```
308      }
309      right = i+1;
310
311      /* Clip the ends of the contour at left and right */
312      xDCursor = temp->x;
313      topDCursor = temp->top;
314      bottomDCursor = temp->bottom;
315      xCursor = temp->x+left;
316      topCursor = temp->top+left;
317      bottomCursor = temp->bottom+left;
318      foffset = *xSCursor;
319      for (i=left;i<right;++i) {
320        *xDCursor++ = *xCursor++ - foffset;
321        *topDCursor++ = *topCursor++;
322        *bottomDCursor++ = *bottomCursor++;
323      }
324      temp->numberOfLegs = right-left;
325
326      *(dict->outlines+dictEntry) = temp;
327      ResampleOutlinePair(*(dict->outlines+dictEntry),(float)20/(float)fontXHeight);
328    }
329
330    static int lineSpacing;
331    int OrderOutlinePair(OutlinePair *o1,OutlinePair *o2)
332    {
333      int yDistance;
334      int xDistance;
335      yDistance = (*o1)->box->pageY - (*o2)->box->pageY;
336      if (yDistance<lineSpacing && yDistance > -lineSpacing) {
337        xDistance = (*o1)->box->pageX - (*o2)->box->pageX;
338        return xDistance;
339      }
340      return yDistance;
341    }
342
343    void SortDictionary(Dictionary dict)
344    {
345      lineSpacing = 20;
346      qsort(dict->rawOutlines,dict->numberOfEntries,sizeof(RawOutlinePair),
347          OrderOutlinePair);
348    }
349
350    /* WARNING - assumes at least on entry is not equal to HIT_THE_BOX */
351    float MaxTopValue(RawOutlinePair o)
352    {
353      int i;
354      float maxValue;
355      maxValue = *(o->top);
356      for (i=0;i<o->numberOfLegs;++i)
357        if (*(o->top+i)>maxValue && (*o->top+i)!=HIT_THE_BOX)
358          maxValue = *(o->top+i);
359      return maxValue;
360    }
361
362    /* WARNING - assumes at least on entry is not equal to HIT_THE_BOX */
363    float MinTopValue(RawOutlinePair o)
364    {
365      int i;
366      float minValue;
367      minValue = *(o->top);
```

```
368      for (i=0;i<o->numberOfLegs;++i)
369       if (*(o->top+i)<minValue && (*o->top+i)!=HIT_THE_BOX)
370        minValue = *(o->top+i);
371      return minValue;
372    }
373
374    #define HIST_SIZE 100
375    void HistogramMax(int *data,int dataLength,int offset,int sign,int *histogram)
376    {
377     int i,bin;
378
379     if (sign>0) {
380      int maxValue;
381
382      maxValue = *data;
383      for (i=0;i<dataLength;++i)
384       if (data[i]!=HIT_THE_BOX) {
385          maxValue = data[i];
386          break;
387       }
388      for (;i<dataLength;++i)
389       if (data[i]!=HIT_THE_BOX && data[i]>maxValue)
390          maxValue = data[i];
391      if (maxValue != HIT_THE_BOX) {
392       bin = maxValue-offset;
393       if ((bin>=0)&&(bin<HIST_SIZE))
394          histogram[bin]++;
395      }
396     }
397     else {
398      int minValue;
399      minValue = *data;
400      for (i=0;i<dataLength;++i)
401       if (data[i]!=HIT_THE_BOX) {
402          minValue = data[i];
403          break;
404       }
405      for (;i<dataLength;++i)
406       if (data[i]!=HIT_THE_BOX && data[i]<minValue)
407          minValue = data[i];
408      if (minValue != HIT_THE_BOX) {
409       bin = minValue-offset;
410       if ((bin>=0)&&(bin<HIST_SIZE))
411          histogram[bin]++;
412      }
413     }
414    }
415
416    void Histogram(int *data,int dataLength, int offset, int *histogram)
417    {
418     int i,bin;
419
420     for (i=0;i<dataLength;++i) {
421      if (*data != HIT_THE_BOX) {
422       bin = *data-offset;
423       if ((bin>=0)&&(bin<HIST_SIZE))
424          histogram[bin]++;
425      }
426      data++;
427     }
```

```
428      }
429
430      int MaxBin(int *histogram)
431      {
432       int i;
433       int maxValue;
434       int maxIndex;
435
436       maxValue = histogram[0];
437       maxIndex = 0;
438       for (i=0;i<HIST_SIZE;++i)
439        if (histogram[i]>maxValue) {
440         maxValue = histogram[i];
441         maxIndex = i;
442        }
443       return maxIndex;
444      }
445
446      int MaxBinAbove(int *histogram,int line)
447      {
448       int i;
449       int maxValue;
450       int maxIndex;
451       int top,bottom;
452
453       for (i=0;i<HIST_SIZE;++i)
454        if (histogram[i] != 0)
455         break;
456
457       top = i;
458       bottom = (line+top)/2;
459
460       maxValue = histogram[top];
461       maxIndex = top;
462       for (i=top;i<=bottom;++i)
463        if (histogram[i]>maxValue) {
464         maxValue = histogram[i];
465         maxIndex = i;
466        }
467       return maxIndex;
468      }
469
470      void DrawTexLines(Picture thePict,Dictionary dict,int topLine,int bottomLine)
471      {
472       int maxLength;
473       int halfWidth;
474       int x,y;
475       float x2,x3,y2,y3;
476       float angle;
477
478       angle = (*(dict->rawOutlines))->box->angle;
479       maxLength = thePict->width+thePict->height;
480       halfWidth = thePict->width / 2;
481       x = topLine * -sin(angle) + halfWidth * cos(angle);
482       y = topLine * cos(angle) + halfWidth * sin(angle);
483       x2 = x+maxLength*cos(angle);
484       y2 = y+maxLength*sin(angle);
485       x3 = x-maxLength*cos(angle);
486       y3 = y-maxLength*sin(angle);
487       DrawLine(thePict,x,y,(int)x2,(int)y2,5);
488       DrawLine(thePict,x,y,(int)x3,(int)y3,5);
```

```
489
490      x = bottomLine * -sin(angle) + halfWidth * cos(angle);
491      y = bottomLine * cos(angle) + halfWidth * sin(angle);
492      x2 = x+maxLength*cos(angle);
493      y2 = y+maxLength*sin(angle);
494      x3 = x-maxLength*cos(angle);
495      y3 = y-maxLength*sin(angle);
496      DrawLine(thePict,x,y,(int)x2,(int)y2,5);
497      DrawLine(thePict,x,y,(int)x3,(int)y3,5);
498    }
499
500    void PageStatistics(Dictionary dict,char *fileName)
501    /* WARNING - this must be run before PostProcess since PostProcess changes the raw
502     * shape data. */
503    {
504      int index;
505      int temp;
506      int i,startIndex,firstY,minY,endIndex,shape;
507      int tops[HIST_SIZE];
508      int bottoms[HIST_SIZE];
509      int ascenders[HIST_SIZE];
510      int descenders[HIST_SIZE];
511      int middleLine,topLine,bottomLine,ascenderLine,descenderLine;
512      int ascenderHeight,descenderHeight,lineNumber;
513      int fontXHeight,fontXWidth,xIndex;
514      RawOutlinePair thisShape;
515      FILE *fp;
516      BOOLEAN haveFirstFontXWidth = FALSE;
517      int firstFontXWidth;
518
519      if ((fp=fopen(fileName,"w"))==NULL)
520        DoError("PageStatistics: error opening output file %s.\n",fileName);
521
522      SortDictionary(dict);
523
524      index = 0;
525      lineNumber = 0;
526      while (index < dict->numberOfEntries) {
527        startIndex = index;
528        firstY = (*(dict->rawOutlines + index))->box->pageY;
529        minY = firstY;
530        while ( (*(dict->rawOutlines+index))->box->pageY - firstY < 20 &&
531              (*(dict->rawOutlines+index))->box->pageY - firstY > -20) {
532          if ( minY > ( (*(dict->rawOutlines+index))->box->pageY ))
533            minY = (*(dict->rawOutlines+index))->box->pageY;
534          ++index;
535          if (index == dict->numberOfEntries)
536            break;
537        }
538        endIndex = index;
539
540
541        /* shapes from start index through endindex are all on */
542        /* the same text line */
543        /* minY has the top of the highest box on the line. */
544
545        /* Find the base and toplines by taking the mode of the heights of the
546         * valleys of the bottom contours and the peaks of the top contours */
547        for (i=0;i<HIST_SIZE;i++) {
```

```
548         bottoms[i]=0;
549       }
550
551       for (shape=startIndex;shape<endIndex; ++shape) {
552         thisShape = *(dict->rawOutlines+shape);
553         Histogram(thisShape->bottom,thisShape->numberOfLegs,minY,bottoms);
554       }
555       bottomLine = MaxBin(bottoms)+minY;
556       if (X_HEIGHT_SHAPE>=startIndex&&X_HEIGHT_SHAPE<endIndex) {
557         topLine = MinTopValue(*(dict->rawOutlines+X_HEIGHT_SHAPE));
558         fontXHeight = bottomLine - topLine;
559       }
560       if (ASC_HEIGHT_SHAPE>=startIndex&&ASC_HEIGHT_SHAPE<endIndex) {
561         ascenderLine = MinTopValue(*(dict->rawOutlines+ASC_HEIGHT_SHAPE));
562         ascenderHeight = bottomLine - ascenderLine;
563       }
564       middleLine = bottomLine-fontXHeight/2;
565       topLine = bottomLine-fontXHeight;
566
567       if (thePict)
568         DrawTextLines(thePict,dict,topLine,bottomLine);
569
570
571       fprintf(fp,"%d: %d %d %2.6f\n",lineNumber,fontXHeight,ascenderHeight,
572               (float)ascenderHeight/(float)fontXHeight);
573
574       for (shape=startIndex;shape<endIndex; ++shape)
575         StoreOutlinePair(dict,shape,middleLine,fontXHeight,ascenderHeight);
576
577       ++lineNumber;
578     } /* Do another line of text */
579     fclose(fp);
580   }
```

Aug 21 19:50 1991 baselines.c

```
1     #include <stdio.h>
2     #include <values.h>
3     #include <math.h>
4     #include "boolean.h"
5     #include "pict.h"
6     #include "types.h"
7     #include "lists.h"
8     #include "lines.h"
9     #include "baselines.h"
10
11    extern double sqrt(double);
12    extern int irint(double);
13
14    /*inline*/ int NewReadPixel(UCHAR *base,int width,float x,float y)
15    {
16      int xi;
17      int yi;
18      UCHAR mask;
19
20      xi = irint(x);
21      yi = irint(y);
```

```
22      mask = 0x80 >> (xi & 0x7);
23      return *(base+yi*width+(xi>>3)) & mask;
24    }
25
26    void NewCountLine1Bit(Picture pict,int x1,int y1,int x2,int y2,int *black,int *blackEdge)
27    {
28      float x,y;
29      float xinc,yinc;
30      float xupinc,yupinc;
31      float den;
32      int b,be;
33      int width,ucharWidth,height;
34      UCHAR *data;
35
36      width = pict->width;
37      ucharWidth = pict->uchar_width;
38      height = pict->height;
39      data = pict->data;
40
41      den = sqrt((y2-y1)*(y2-y1)+(x2-x1)*(x2-x1));
42      xinc = (x2-x1)/den;
43      yinc = (y2-y1)/den;
44      xupinc = -yinc;
45      yupinc = xinc;
46      x = x1;
47      y = y1;
48
49      b=0;
50      be=0;
51
52      while (x<width&&x>=0&&y<height&&y>=0) {
53        ++b;
54        if (NewReadPixel(data,ucharWidth,x,y)) {
55          if (!(NewReadPixel(data,ucharWidth,x+xupinc,y+yupinc) &&
56              NewReadPixel(data,ucharWidth,x-xupinc,y-yupinc)))

57            ++be;
58        }
59        x += xinc;
60        y += yinc;
61
62      }
63      *black = b;
64      *blackEdge = be;
65    }
66
67
68    #define MIN_BLACK 5
69    float NewCountLine(Picture pict,int x1,int y1,int x2,int y2)
70    {
71      int black,blackEdge;
72      black = 0;
73      blackEdge = 0;
74      NewCountLine1Bit(pict,x1,y1,x2,y2,&black,&blackEdge);
75      NewCountLine1Bit(pict,x1,y1,x1-(x2-x1),y1-(y2-y1),&black,&blackEdge);
76      if (black < MIN_BLACK)
77        return 0;
78      else
79        return (float)blackEdge/black;
80    }
```

```
 81
 82    static float x2offset;
 83    static float y2offset;
 84    static int projectIndex;
 85    static float *projection;
 86    static int *coordx;
 87    static int *coordy;
 88    BOOLEAN BaseLinePiston(Picture pict, int x, int y, BOOLEAN test, UCHAR color)
 89    {
 90      if (test) {
 91    /*   if (!(projectIndex%10))
 92        DrawLine(pict,x,y,(int)(x+x2offset),(int)(y+y2offset),0xff); */
 93    /*   WritePixel(pict,x,y,0xff); */
 94        projection[projectIndex] = NewCountLine(pict,x,y,(int)(x+x2offset),
 95                                    (int)(y+y2offset));
 96        coordx[projectIndex] = x;
 97        coordy[projectIndex++] = y;
 98        return test;
 99      } else
100        return test;
101    }
102
103    static int lastX;
104    static int lastY;
105    BOOLEAN EndPointPiston(Picture pict, int x, int y, BOOLEAN test, UCHAR color)
106    {
107      if (test) {
108        lastX = x;
109        lastY = y;
110      }
111      return test;
112    }
113
114    void EndPoints(Picture pict,double angle,int *tx, int *ty,int *bx, int *by)
115    {
116      int xc,yc;
117      int maxLength;
118      float normal;
119      float x2,y2,x3,y3;
120
121      /* Make normal to text point in quadrants I and II */
122      /* Assume 0 <= angle < 2*M_PI */
123      normal = fmod(angle + M_PI/2,2*M_PI);
124      if (normal > M_PI)
125        normal -= M_PI;
126
127      xc = pict->width/2;
128      yc = pict->height/2;
129
130      maxLength = pict->width+pict->height;
131      x2 = xc+maxLength*cos(normal);     /* At bottom of picture */
132      y2 = yc+maxLength*sin(normal);
133      x3 = xc-maxLength*cos(normal);     /* At top of picture */
134      y3 = yc-maxLength*sin(normal);
135
136      LineEngine(pict,xc,yc,(int)x2,(int)y2,0,EndPointPiston);
137      *bx = lastX;
138      *by = lastY;
139      LineEngine(pict,xc,yc,(int)x3,(int)y3,0,EndPointPiston);
140      *tx = lastX;
```

```
141       *ty = lastY;
142     }
143
144     double distance(int x1,int y1,int x2,int y2)
145     {
146       return sqrt((double)((x1-x2)*(x1-x2)+(y1-y2)*(y1-y2)));
147     }
148
149     #define BASE_PERCENTILE 0.20
150     #define MIN_LINE_HEIGHT_FRACTION 0.50
151     List BaseLines(Picture pict,double angle,char *plotFile)
152     #ifdef foo
153     ,int *count,
154                 int **returnCoordx, int **returnCoordy)
155     #endif
156     {
157       float *topProjection;
158       int *topCoordx,*topCoordy;
159       int *finalCoordx,*finalCoordy,*finalIndex;
160       int topIndex,bottomIndex;
161       int topCount,botCount,finalCount;
162       int maxLength;
163       int xc,yc;
164       float x2,y2,x3,y3;
165       float maxValue,lastValue;
166       int i,j;
167       float baseThresh;
168       int topX,topY,bottomX,bottomY;
169       BOOLEAN onTextLine;
170       List xList,yList,result;
171       double totalDistance,averageDistance;
172       FILE *outfile;
173
174       printf("angle = %3.3f\n",angle);
175
176       maxLength = pict->width+pict->height;
177
178       topProjection = (float *)calloc(maxLength,sizeof(float));
179       topCoordx = (int *)calloc(maxLength,sizeof(int));
180       topCoordy = (int *)calloc(maxLength,sizeof(int));
181       finalCoordx = (int *)calloc(maxLength,sizeof(int));
182       finalCoordy = (int *)calloc(maxLength,sizeof(int));
183       finalIndex = (int *)calloc(maxLength,sizeof(int));
184
185       if ((topProjection = = NULL)||
186          (topCoordx = = NULL)||
187          (topCoordy = = NULL)||
188          (finalIndex = = NULL) ||
189          (finalCoordx = = NULL) ||
190          (finalCoordy = = NULL)) {
191       printf("BaseLines: cannot allocate memory\n");
192       exit(-1);
193       }
194
195       EndPoints(pict,angle,&topX,&topY,&bottomX,&bottomY);
196
197       printf("Main Line: (%d,%d)-(%d,%d)\n",topX,topY,bottomX,bottomY);
198       /* DrawLine(pict,topX,topY,bottomX,bottomY,0xff); */
199
```

```
200    x2offset = maxLength*cos(angle);
201    y2offset = maxLength*sin(angle);
202    projectIndex = 0;
203    projection = topProjection;
204    coordx = topCoordx;
205    coordy = topCoordy;
206    LineEngine(pict,topX,topY,bottomX,bottomY,0,BaseLinePiston);
207    topCount = projectIndex;
208
209    maxValue = topProjection[0];
210    for (i=0;i<topCount;++i) {
211     if (topProjection[i]>maxValue)
212       maxValue = topProjection[i];
213    }
214
215    baseThresh = maxValue*BASE_PERCENTILE;
216    printf("baseThresh = %3.3f\n",baseThresh);
218    /* Plot the baseline contour if requested */
219    if (plotFile!=NULL) {
220     printf("Opening baselines plot file\n");
221     if ((outfile = fopen(plotFile,"w"))==NULL) {
222      printf("Error opening baseline plot file.\n");
223      exit(-1);
224     }
225     for (i=0;i<topCount;++i)
226      fprintf(outfile,"%d %f\n",i,topProjection[i]);
227     fprintf(outfile,"\"Projection\n\n");
228     fprintf(outfile,
229       "0 %f\n%d %f%\n\"Baseline Threshold\n",
230        baseThresh,topCount,baseThresh);
231    }
232
233    finalCount=0;
234    lastValue = topProjection[topCount-1];
235    onTextLine = FALSE;
236    for (i=1;i<topCount;++i) {
237     if (onTextLine) {
238      if (lastValue>baseThresh && topProjection[i]<=baseThresh) {
239          finalCoordx[finalCount] = topCoordx[i];
240          finalCoordy[finalCount] = topCoordy[i];
241        finalIndex[finalCount] = i;
242          finalCount++;
243          onTextLine = FALSE;
244      }
245     } else {
246      if (lastValue<=baseThresh && topProjection[i]>baseThresh) {
247          finalCoordx[finalCount] = topCoordx[i];
248          finalCoordy[finalCount] = topCoordy[i];
249        finalIndex[finalCount] = i;
250          finalCount++;
251          onTextLine = TRUE;
252      }
253     }
254
255     lastValue = topProjection[i];
256    }
257    if (finalCount&1)
258     --finalCount;           /* Only take an even number of lines */
259    for (totalDistance=0,i=0,j=0;i<finalCount;i+=2) {
```

```
260      topX = finalCoordx[i];
261      topY = finalCoordy[i];
262      bottomX = finalCoordx[i+1];
263      bottomY = finalCoordy[i+1];
264      totalDistance += distance(topX,topY,bottomX,bottomY);
265      j+=2;
266    }
267    averageDistance = totalDistance / (finalCount/2)*MIN_LINE_HEIGHT_FRACTION;
268    for (i=0,j=0;i<finalCount;i+=2) {
269      topX = finalCoordx[i];
270      topY = finalCoordy[i];
271      topIndex = finalIndex[i];
272      bottomX = finalCoordx[i+1];
273      bottomY = finalCoordy[i+1];
274      bottomIndex = finalIndex[i+1];
275      finalCoordx[j] = topX;
276      finalCoordy[j] = topY;
277      finalIndex[j] = topIndex;
278      finalCoordx[j+1] = bottomX;
279      finalCoordy[j+1] = bottomY;
280      finalIndex[j+1] = bottomIndex;
281      if (distance(topX,topY,bottomX,bottomY)>averageDistance)
282        j+=2;
283    }
284  #ifdef foo
285    *count = j;
286    *returnCoordx = finalCoordx;
287    *returnCoordy = finalCoordy;
288  #endif
289    result = nil;
290    for (i=j-1;i>=0;--i) {
291      push(MakePoint(finalCoordx[i],finalCoordy[i]),result);
292    }
293
294    if (plotFile != NULL) {
295      fprintf(outfile,"\n0 %f\n",-baseThresh);
296      for (i=0;i<j;i+=2) {
297         fprintf(outfile,"%d %f\n%d %f\n%d %f\n%d %f\n",
298               finalIndex[i],-baseThresh,
299               finalIndex[i],-2*baseThresh,
300               finalIndex[i+1],-2*baseThresh,
301               finalIndex[i+1],-baseThresh);
302      }
303      fprintf(outfile,"\"Baselines");
304      fclose(outfile);
305      printf("Done writing baseline plot file.\n");
306    }
307
308    return result;
309  }
310
311  void DrawBaseLines(Picture pict, List pointList, double angle)
312  #ifdef foo
313  int count,int *coordx,int *coordy,double angle)
314  #endif
315  {
316    int maxLength;
317    float x2,y2,x3,y3;
318    int x,y;
319    Point temp;
```

```
320        maxLength = pict->width+pict->height;
321        while (!endp(pointList)) {
322         temp = pop(pointList);
323         x = temp->x;
324         y = temp->y;
325         x2 = x+maxLength*cos(angle);
326         y2 = y+maxLength*sin(angle);
327         x3 = x-maxLength*cos(angle);
328         y3 = y-maxLength*sin(angle);
329         DrawLine(pict,x,y,(int)x2,(int)y2,0xff);
330         DrawLine(pict,x,y,(int)x3,(int)y3,0xff);
331        }
332       }
```

Jul 1 13:44 1991 blobify.c

```
1       #include <stdio.h>
2       #include <math.h>
3       #include "boolean.h"
4       #include "pict.h"
5       #include "blobify.h"
6
7       static UCHAR bitmasks[] = {0x80,0x40,0x20,0x10,0x8,0x4,0x2,0x1};
8
9       Picture Blobify(Picture old,int half_mask_size,double threshold)
10      {
11       Picture new;
12       int x,y;
13       int tval;
14       int left,right,top,bottom;
15       int width;
16       int *counters;
17       int *countptr;
18       int mask_size;
19       UCHAR *xptr,*xyptr;
20       int *leftptr;
21       int *rightptr;
22       UCHAR *topptr;
23       UCHAR *bottomptr;
24       int uchar_width;
25      /* UCHAR bitmask;*/
26       int count;
27       int inside;
28       int thold;
29      /* Added the following for speedup hack 1/14/91 */
30       UCHAR bitMask;
31       UCHAR *newCursor;
32       UCHAR newValue;
33       UCHAR topPixels;
34       UCHAR bottomPixels;
35
36
37       mask_size = 2 * half_mask_size + 1;
38      /* uchar_width = ROUND8(old->width) >> 3; */
39       uchar_width = old->uchar_width;
40
41       left = half_mask_size;
42       right = old->width - half_mask_size - 1;
```

```
43
44        top = half_mask_size;
45        bottom = old->height - half_mask_size -1;
46
47
48        tval = floor(4*half_mask_size*half_mask_size*threshold);
49        new = new_pict(old->width,old->height,old->depth);
50
51        counters = (int *)calloc(old->width,sizeof(int));
52
53        width = old->width;
54        countptr = counters;
55        xptr = old->data;
56        bitMask = 0x80;
57        for (x=0;x<width;++x) {
58   /*   bitmask = bitmasks[x%8]; */
59         xyptr = xptr;
60         for (count=0,y=0;y<mask_size;++y) {
61          if (*xyptr & bitMask)
62              ++count;
63          xyptr += uchar_width;
64         }
65         *(countptr++) = count;
66   /*   if (x%8 == 7)
67    *      ++xptr; */
68         if (bitMask == 0x01) {
69          bitMask = 0x80;
70          ++xptr;
71         }
72         else
73          bitMask = bitMask >> 1;
74        }
75
76        for (y=top;y<=bottom;++y) {
77         countptr = counters;
78         for (inside=0,x=0;x<mask_size;++x)
79          inside += *countptr++;
80
81         leftptr = counters;
82         rightptr = counters + mask_size;
83         newCursor = new->data+y*uchar_width+(left>>3);
84         bitMask = bitmasks[left%8];
85         newValue = 0;
86         for (x=left;x<=right;++x) {
87          if (inside>tval)
88              /* set pixel */
89              newValue |= bitMask;
90   /*      *(new->data+y*uchar_width+(x>>3)) |= bitmasks[x%8]; */
91          if (bitMask == 0x01) {
92              bitMask = 0x80;
93              *newCursor++ = newValue;
94              newValue = 0;
95          }
96          else
97              bitMask = bitMask >> 1;
98          inside += *rightptr++;
99          inside -= *leftptr++;
100        }
101        if (bitMask != 0x80) {
102         *newCursor = newValue;
```

```
103        }
104
105        topptr = old->data+(y-half_mask_size)*uchar_width;
106        bottomptr = topptr + mask_size*uchar_width;
107        countptr = counters;
108        bitMask = 0x01;
109        for (x=0;x<width;++x) {
110  /*     bitmask = bitmasks[x%8]; */
111          if (bitMask == 0x01) {
112             topPixels = *topptr++;
113             bottomPixels = *bottomptr++;
114             bitMask = 0x80;
115          }
116          else
117             bitMask = bitMask >> 1;
118          if (topPixels & bitMask) {
119              if (!(bottomPixels & bitMask))
120                 --(*countptr);
121          }
122          else if (bottomPixels & bitMask)
123              ++(*countptr);
124
125          ++countptr;
126        }
127      }
128
129      return new;
130    }
131
132    #ifdef foo
133    void main(argc,argv)
134    int argc;
135    char **argv;
136    {
137      char *infile,*outfile;
138      Picture old,new;
139      int half_mask_size;
140      float threshold;
141
142      malloc_debug(2);
143
144      if (argc != 5) {
145        printf("Usage: %s infile outfile half_mask_size threshold\n",argv[0]);
146        exit(0);
147      }
148      infile = argv[1];
149      outfile = argv[2];
150      half_mask_size = atoi(argv[3]);
151      threshold = atof(argv[4]);
152
153      printf("Loading %s...",infile);
154      old = load_pict(infile);
155      new = components(old,half_mask_size,threshold);
156      write_pict(outfile,new);
157
158    }
159    #endif
160
```

Aug 26 18:10 1991 boxes.c

```c
1    #include <stdio.h>
2    #include <values.h>
3    #include <math.h>
4    #include "boolean.h"
5    #include "pict.h"
6    #include "types.h"
7    #include "lists.h"
8
9    extern int irint(double);
10
11   #define MAX_QUEUE_SIZE 10000
12   #define BLACK 1
13   #define WHITE 0
14
15   #define ABS(a) ((a)<0?-(a):(a))
16
17   typedef Point PointArray;
18
19   typedef struct {
20     PointBody ulc,lrc;
21   } MinMaxBox;
22
23   typedef struct {
24     PointBody xwitness,ywitness;
25   } WitnessBox;
26
27   typedef struct {
28     PointArray data;
29     int first,last;
30     int size;
31   } QueueBody,*Queue;
32
33   Queue MakeQueue(size)
34   int size;
35   {
36    Queue q;
37    if ((q=(Queue)calloc(1,sizeof(QueueBody)))==NULL) {
38      printf("Cannot alloc space for queue body\n");
39      exit(0);
40    }
41    if ((q->data=(PointArray)calloc(size,sizeof(PointBody)))==NULL) {
42      printf("Cannot allocate space for queue array\n");
43      exit(0);
44    }
45    q->first=q->last=0;
46    q->size=size;
47    return q;
48   }
49
50   void InsertPoint(x,y,q)
51   int x,y;
52   Queue q;
53   {
54    q->data[q->last].x=x;
55    q->data[q->last].y=y;
56    q->last=(q->last+1)%q->size;
57    if (q->last==q->first) {
58      printf("Maximum q size exceeded\n");
```

```
59        exit(0);
60      }
61    }
62
63    void GetFirst(x,y,q)
64    int *x,*y;
65    Queue q;
66    {
67     if (q->first==q->last) {
68       printf("Error: tried top pop empty queue\n");
69       exit(0);
70     }
71     *x=q->data[q->first].x;
72     *y=q->data[q->first].y;
73     q->first=(q->first+1)%q->size;
74    }
75
76    BOOLEAN Empty(q)
77    Queue q;
78    {
79     return q->first==q->last;
80    }
81
82    void InsertBlackNeighbors(Picture pict,int x,int y,Queue queue)
83    {
84     if (ReadPixel(pict,x+1,y)) {
85       WritePixel(pict,x+1,y,WHITE);
86       InsertPoint(x+1,y,queue);
87     }
88     if (ReadPixel(pict,x-1,y)) {
89       WritePixel(pict,x-1,y,WHITE);
90       InsertPoint(x-1,y,queue);
91     }
92     if (ReadPixel(pict,x,y+1)) {
93       WritePixel(pict,x,y+1,WHITE);
94       InsertPoint(x,y+1,queue);
95     }
96     if (ReadPixel(pict,x,y-1)) {
97       WritePixel(pict,x,y-1,WHITE);
98       InsertPoint(x,y-1,queue);
99     }
100   }
101
102   void PointFromTheta(theta,x,y)
103   float theta;
104   float *x,*y;
105   {
106    *x = cos(theta);
107    *y = sin(theta);
108   }
109
110   void Normal(x,y,nx,ny)
111   float x,y;
112   float *nx,*ny;
113   {
114    *nx = -y;
115    *ny = x;
116   }
117
118   int DotFl(fx,fy,ix,iy)
```

```
119     float fx,fy;
120     int ix,iy;
121     {
122       return irint(fx*ix+fy*iy);
123     }
124
125     static float pox,poy,pnx,pny;
126
127     void MinMax(boundingBox,oldFrameBox,px,py)
128     MinMaxBox *boundingBox;
129     WitnessBox *oldFrameBox;
130     int px,py;
131     {
132     /* IGNORE THETA FOR THE TIME BEING */
133      if (boundingBox->lrc.x < DotFl(pox,poy,px,py)) {
134        boundingBox->lrc.x = DotFl(pox,poy,px,py);
135      }
136      if (boundingBox->lrc.y < DotFl(pnx,pny,px,py)) {
137        boundingBox->lrc.y = DotFl(pnx,pny,px,py);
138      }
139      if (boundingBox->ulc.x > DotFl(pox,poy,px,py)) {
140        boundingBox->ulc.x = DotFl(pox,poy,px,py);
141        oldFrameBox->xwitness.x = px;
142        oldFrameBox->xwitness.y = py;
143      }
144      if (boundingBox->ulc.y > DotFl(pnx,pny,px,py)) {
145        boundingBox->ulc.y = DotFl(pnx,pny,px,py);
146        oldFrameBox->ywitness.x = px;
147        oldFrameBox->ywitness.y = py;
148      }
149     }
150
151     /* Set the pixels on the border of the image to the color WHITE so that
152      * the paint routine need never worry about going off the edge of the
153      * image. */
154     void FramePicture(pict)
155     Picture pict;
156     {
157      int i;
158      for (i=0;i<pict->height;++i) {
159       WritePixel(pict,0,i,WHITE);
160       WritePixel(pict,pict->width-1,i,WHITE);
161      }
162      for (i=0;i<pict->width;++i) {
163       WritePixel(pict,i,0,WHITE);
164       WritePixel(pict,i,pict->height-1,WHITE);
165      }
166     }
167
168     /*
169      * Given as input a thresholded image, find the borders of the connected
170      * components. Assumes image is thresholded to 0 and 1.
171      */
172     void PaintComponent(pict,x,y,queue,boundingBox,oldFrameBox)
173     Picture pict;
174     int x,y;
175     Queue queue;
176     MinMaxBox *boundingBox;
177     WitnessBox *oldFrameBox;
178     {
179      boundingBox->ulc.x = boundingBox->lrc.x = DotFl(pox,poy,x,y);
```

```
180      boundingBox->ulc.y = boundingBox->lrc.y = DotFl(pnx,pny,x,y);
181      oldFrameBox->xwitness.x = oldFrameBox->ywitness.x = x;
182      oldFrameBox->xwitness.y = oldFrameBox->ywitness.y = y;
183
184      InsertPoint(x,y,queue);
185      WritePixel(pict,x,y,WHITE);
186      /* printf("Queue status: %s\n",(Empty(queue))?"empty":"not empty"); */
187      while (!Empty(queue)) {
188        GetFirst(&x,&y,queue);
189        MinMax(boundingBox,oldFrameBox,x,y);
190        InsertBlackNeighbors(pict,x,y,queue);
191      }
192    }
193
194    int iabs(int x)
195    {
196      if (x<0)
197        return -x;
198      else
199        return x;
200    }
201
202    BOOLEAN PointInBounds(Picture pict,int x,int y)
203    {
204      return x>=0 && x<pict->width && y>=0 && y<pict->height;
205    }
206
207
208    BOOLEAN BoxInBounds(Picture pict,int x, int y, int width, int height,
209                       double angle)
210    {
211      int rightX,rightY,downX,downY;
212      rightX = width*cos(angle);
213      rightY = width*sin(angle);
214      downX = height*cos(angle+M_PI/2);
215      downY = height*sin(angle+M_PI/2);
216      return (PointInBounds(pict,x,y) &&
217             PointInBounds(pict,x+rightX,y+rightY) &&
218             PointInBounds(pict,x+rightX+downX,y+rightY+downY) &&
219             PointInBounds(pict,x+downX,y+downY));
220    }
221
222    void GetCorner(WitnessBox *box,int *ulcx,int *ulcy)
223    {
224      double c2;
225      c2 = (-pny*(box->ywitness.x-box->xwitness.x) +
226           pnx*(box->ywitness.y-box->xwitness.y) ) /
227           (pox*pny - pnx*poy);
228      *ulcx = c2*pox+box->ywitness.x;
229      *ulcy = c2*poy+box->ywitness.y;
230    }
231
232    List FindBorders(Picture pict,double theta)
233    {
234      int x,y;
235      int ulcx,ulcy;
236      Queue queue;
237      MinMaxBox boundingBox;
238      WitnessBox oldFrameBox;
239      List boxList;
240      int width,height;
```

```
241
242      queue = MakeQueue(MAX_QUEUE_SIZE);
243
244      PointFromTheta(theta,&pox,&poy);
245      Normal(pox,poy,&pnx,&pny);
246
247      printf("Framing picture\n");
248      FramePicture(pict);          /* Put a "visited" color border
249                                    * around the image */
250      boxList = nil;
251      for (y=1;y<pict->height-1;++y)
252       for (x=1;x<pict->width-1;++x)
253         if (ReadPixel(pict,x,y)) {
254   /*      printf("Found component at (%d,%d)\n",x,y); */
255           PaintComponent(pict,x,y,queue,&boundingBox,&oldFrameBox);
256   /*      printf("Making box: %d %d %d %d\n",
257              oldFrameBox.ulc.x,
258              oldFrameBox.ulc.y,
259              oldFrameBox.lrc.x,
260              oldFrameBox.lrc.y);
261   */
262           GetCorner(&oldFrameBox,&ulcx,&ulcy);
263           width = boundingBox.lrc.x-boundingBox.ulc.x;
264           height = boundingBox.lrc.y-boundingBox.ulc.y;
265   /*      if (iabs(height)>10) */
266           if (BoxInBounds(pict,ulcx,ulcy,
267                     width,height,theta))
268             push(MakeBox(ulcx,ulcy,
269                     width,height,theta),
270                boxList);
271         }
272      printf("Found %d boxes completely on the page\n",ListLength(boxList));
273      return boxList;
274     }
275
276    void DrawBox(Picture pict,Box box)
277    {
278     int rightX,rightY,downX,downY;
279     rightX = box->width*cos(box->angle);
280     rightY = box->width*sin(box->angle);
281     downX = box->height*cos(box->angle+M_PI/2);
282     downY = box->height*sin(box->angle+M_PI/2);
283   /* printf("DrawBox: %d %d %d %d\n",box->x,box->y,box->width<,box->height); */
284     DrawLine(pict,box->x,box->y,box->x+rightX,box->y+rightY,0xff);
285     DrawLine(pict,box->x+rightX,box->y+rightY,
286          box->x+rightX+downX,box->y+rightY+downY,0xff);
287     DrawLine(pict,box->x+rightX+downX,box->y+rightY+downY,
288          box->x+downX,box->y+downY,0xff);
289     DrawLine(pict,box->x+downX,box->y+downY,box->x,box->y,0xff);
290    }
291
292    void DrawColorBox(Picture pict,Box box,int color)
293    {
294     int rightX,rightY,downX,downY;
295     rightX = box->width*cos(box->angle);
296     rightY = box->width*sin(box->angle);
297     downX = box->height*cos(box->angle+M_PI/2);
298     downY = box->height*sin(box->angle+M_PI/2);
299   /* printf("DrawBox: %d %d %d %d\n",box->x,box->y,box->width<,box->height); */
300     DrawLine(pict,box->x,box->y,box->x+rightX,box->y+rightY,color);
301     DrawLine(pict,box->x+rightX,box->y+rightY,
```

```
302                box->x+rightX+downX,box->y+rightY+downY,color);
303           DrawLine(pict,box->x+rightX+downX,box->y+rightY+downY,
304                box->x+downX,box->y+downY,color);
305           DrawLine(pict,box->x+downX,box->y+downY,box->x,box->y,color);
306         }
307
308
309         void DrawBoxList(Picture pict,List boxList)
310         {
311           while (!endp(boxList)) {
312             DrawBox(pict,(Box)pop(boxList));
313           }
314         }
315
316
317         #ifdef TRYMAIN
318         /* WARNING - be sure to replace the height check in FindBorders */
319         #endif
320         void main(argc,argv)
321         int argc;
322         char **argv;
323         {
324           char *infileName,*outfileName;
325           List boxList;
326           int width,height;
327           float theta;
328           Picture pict,finalPict;
329           FILE *outfile;
330
331           if (argc != 4) {
332             printf("Usage: %s infile outfile page_orientation\n",argv[0]);
333             exit(0);
334           }
335           infileName = argv[1];
336           outfileName = argv[2];
337           theta = atof(argv[3]);
338
339           printf("Loading %s...",infileName);
340           pict = load_pict(infileName);
341
342           printf("\nFinding boxes.\n");
343
344           finalPict = new_pict(pict->width,pict->height,pict->depth);
345           /* CopyPicture(finalPict,pict); */
346           boxList = FindBorders(pict,theta);
347
348           DrawBoxList(finalPict,boxList);
349           write_pict(outfileName,finalPict);
350         }
```

Jan 16 15:52 1991  dict.c

```
1      #include <stdio.h>
2      #include "boolean.h"
3      #include "types.h"
4      #include "error.h"
5      #include "pict.h"
6      #include "dict.h"
7
```

```
8    void WriteOutlinePair(OutlinePair o, FILE *fp)
9    {
10     fwrite(o->box,sizeof(BoxBody),1,fp);
11     fwrite(&(o->blackoutHeight),sizeof(float),1,fp);
12     fwrite(&(o->numberOfLegs),sizeof(int),1,fp);
13     fwrite(&(o->offset),sizeof(int),1,fp);
14     fwrite(&(o->width),sizeof(int),1,fp);
15
16     fwrite(o->x,sizeof(float),o->numberOfLegs,fp);
17     fwrite(o->top,sizeof(float),o->numberOfLegs,fp);
18     fwrite(o->bottom,sizeof(float),o->numberOfLegs,fp);
19   }
20
21   void WriteDictionary(Dictionary dict, char *filename)
22   {
23     FILE *fp;
24     int temp;
25     int i;
26     if ((fp=fopen(filename,"w"))==NULL)
27       DoError("WriteDictionary: Error opening output file.\n",NULL);
28     temp = 1234567;
29     fwrite(&temp,sizeof(int),1,fp);
30     fwrite(&(dict->numberOfEntries),sizeof(int),1,fp);
31
32     if (dict->infoString == NULL) {
33       temp = 0;
34       fwrite(&temp,sizeof(int),1,fp);
35     }
36     else{
37       temp = strlen(dict->infoString)+1;
38       fwrite(&temp,sizeof(int),1,fp);
39       fwrite(dict->infoString,sizeof(char),temp,fp);
40     }
41
42     for (i=0;i<dict->numberOfEntries;++i)
43       WriteOutlinePair(*(dict->outlines+i),fp);
44     fclose(fp);
45   }
46
47
48   /* Reads a Box from a binary stream. the type Box is defined in box.h */
49   Box ReadBox(FILE *fp)
50   {
51     Box temp;
52     temp = (Box)calloc(1,sizeof(BoxBody));
53     if (temp==NULL)
54       DoError("ReadBox: cannot allocate space\n",NULL);
55     if (fread(temp,sizeof(BoxBody),1,fp)!=1)
56       DoError("ReadBox: error reading bounding box\n",NULL);
57     return temp;
58   }
59
60   /* Reads an OutlinePair from a binary stream. The format of an OutlinePair
61    * follows:
62    *  BoxBody - shape bounding box
63    *  float   - blackout bar height
64    *  int     - number of legs in the contour
65    *  int     - x coordinate of left edge of contour
66    *  int     - width in pixels of edge contour
67    *  float[numberOfLegs] - x coordinates of contours
68    *  float[numberOfLegs] - y coordinates of top contour
```

```
69      *   float[numberOfLegs] - y coordinates of bototm contour
70      */
71     OutlinePair ReadOutlinePair(FILE *fp)
72     {
73      OutlinePair temp;
74      temp = (OutlinePair)calloc(1,sizeof(OutlinePairBody));
75      if (temp = = NULL)
76       DoError("ReadOutlinePair: cannot allocate space\n",NULL);
77      temp->box = ReadBox(fp);
78
79      if (fread(&(temp->blackoutHeight),sizeof(float),1,fp)! = 1)
80       DoError("ReadOutlinePair: error reading blackoutHeight\n",NULL);
81
82      if (fread(&(temp->numberOfLegs),sizeof(int),1,fp)! = 1)
83       DoError("ReadOutlinePair: error reading length\n",NULL);
84
85      if (fread(&(temp->offset),sizeof(int),1,fp)! = 1)
86       DoError("ReadOutlinePair: error reading offset\n",NULL);
87      if (fread(&(temp->width),sizeof(int),1,fp)! = 1)
88       DoError("ReadOutlinePair: error reading width\n",NULL);
89
90      temp->x = (float *)calloc(temp->numberOfLegs,sizeof(float));
91      if (temp->x = = NULL)
92       DoError("ReadOutlinePair: cannot allocate space\n",NULL);
93      if (fread(temp->x,
94            sizeof(float),temp->numberOfLegs,fp)! = temp->numberOfLegs)
95       DoError("ReadOutlinePair: error reading x coords\n",NULL);
96
97      temp->top = (float *)calloc(temp->numberOfLegs,sizeof(float));
98      if (temp->top = = NULL)
99       DoError("ReadOutlinePair: cannot allocate space\n",NULL);
100     if (fread(temp->top,sizeof(float),
101            temp->numberOfLegs,fp)! = temp->numberOfLegs)
102      DoError("ReadOutlinePair: error reading topY coords\n",NULL);
103
104     temp->bottom = (float *)calloc(temp->numberOfLegs,sizeof(float));
105     if (temp->bottom = = NULL)
106      DoError("ReadOutlinePair: cannot allocate space\n",NULL);
107     if (fread(temp->bottom,
108            sizeof(float),temp->numberOfLegs,fp)! = temp->numberOfLegs)
109      DoError("ReadOutlinePair: error reading bottomY coords\n",NULL);
110
111     return temp;
112    }
113
114    /* Create a new Dictionary structure with space allocated for the
115     * entries. */
116    Dictionary NewDict(int numberOfEntries)
117    {
118     Dictionary temp;
119     temp = (Dictionary)calloc(1,sizeof(DictionaryBody));
120     if (temp = = NULL)
121      DoError("NewDict: cannot allocate space\n",NULL);
122     temp->numberOfEntries = numberOfEntries;
123     temp->infoString = NULL;
124     temp->rawOutlines = (RawOutlinePair *)calloc(numberOfEntries,
125                               sizeof(RawOutlinePair));
126     temp->outlines = (OutlinePair *)calloc(numberOfEntries,
127                              sizeof(OutlinePair));
128     if ((temp->outlines = = NULL)||(temp->rawOutlines = = NULL))
129      DoError("NewDict: cannot allocate space\n",NULL);
```

```
130        return temp;
131      }
132
133      /* Read a dictionary from a binary format file. The file organization
134       * follows:
135       *  int     - number of entries in the dictionary
136       *  OutlinePair[numberOfEntries] - outlines of each shape in the dictionary
137       * When a dictionary is read in, the shapes are sorted such that they fall
138       * in the order of words on textlines. */
139      Dictionary ReadDictionary(char *filename)
140      {
141        FILE *fp;
142        Dictionary dict;
143        int i;
144        int temp;
145        int infoStringLength;
146        int numberOfEntries;
147        int magicNumber;
148
149        if ((fp=fopen(filename,"r"))==NULL)
150          DoError("Error opening input file\n",NULL);
151
152        if (fread(&magicNumber,sizeof(int),1,fp)!=1)
153          DoError("Error reading dictionary\n",NULL);
154        if (magicNumber != 1234567)
155          DoError("ReadDictionary: input file %s is not a dictionary file.\n",
156              filename);
157
158        if (fread(&numberOfEntries,sizeof(int),1,fp)!=1)
159          DoError("Error reading dictionary\n",NULL);
160        dict = NewDict(numberOfEntries);
161
162        if (fread(&infoStringLength,sizeof(int),1,fp)!=1)
163          DoError("Error reading dictionary\n",NULL);
164        if (infoStringLength) {
165          if ((dict->infoString = (char *)calloc(infoStringLength,sizeof(char))) ==
166              NULL)
167            DoError("ReadDictionary: cannot allocate space for info string.\n",NULL);
168          fread(dict->infoString,infoStringLength,sizeof(char),fp);
169          *(dict->infoString+infoStringLength-1) = '\0';  /* Set last char to 0 just in case */
170        }
171
172        for (i=0;i<numberOfEntries; ++i)
173          *(dict->outlines+i) = ReadOutlinePair(fp);
174        fclose(fp);
175        return dict;
176      }
177
178      char *ArgListToString(int argc, char **argv)
179      {
180        int i;
181        int totalLength;
182        char *theString;
183        char *destCursor,*srcCursor;
184
185        for (i=0,totalLength=0;i<argc; ++i)
186          totalLength += strlen(argv[i]) + 1;  /* Room for each arg and one space */
187        totalLength++;                         /* Room for thee EOS character */
188
189        if ((theString = (char *)calloc(totalLength,sizeof(char)))==NULL)
190          DoError("ArgListToString: cannot allocatee space.\n",NULL);
```

```
191
192       for (i=0,destCursor=theString;i<argc;++i) {
193        srcCursor = argv[i];
194        while (*srcCursor != '\0')
195         *destCursor++ = *srcCursor++;
196        *destCursor++ = ' ';
197       }
198       *destCursor = '\0';
199
200       return theString;
201      }
```

Jan 11 17:06 1991 dmain.c

```
1       #include <stdio.h>
2       #include <math.h>
3       #include <values.h>
4       #include "boolean.h"
5       #include "types.h"
6       #include "pict.h"
7       #include "diff.h"
8
9
10      void main(int argc,char **argv)
11      {
12       Picture pict;
13       char *infile1,*infile2,*outfile;
14
15       if (argc != 4) {
16        printf("Usage:\n");
17        printf(" %s infile1 infile2 outfile\n",argv[0]);
18        exit(-1);
19       }
20
21       infile1 = argv[1];
22       infile2 = argv[2];
23       outfile = argv[3];
24       pict = CompareDictionaries(infile1,infile2);
25       WritePictureAsAscii(pict,outfile);
26      }
```

Jun 21 15:54 1991 fft.c

```
1       /* Copyright 1991 by Michael Hopcroft.
2        * Right is hearby granted to Xerox Corporation to make use of this
3        * code free of charge. */
4       #include <stdio.h>
5       #include <math.h>
6       #include "fft.h"
7
8       /* Applies bit reversal permutation matrix to array a. length must be a power
9        * of 2. */
10      void BitReverse(float *a, int n)
11      {
12       int i,j,k;
13       float temp;
```

```
14
15      j=1;
16      for (i=1;i<n;++i) {
17       if (i<j) {
18        temp = a[i-1];
19        a[i-1] = a[j-1];
20        a[j-1] = temp;
21       }
22       k=n/2;
23       while (k<j) {
24        j = j-k;
25        k = k/2;
26       }
27       j = j+k;
28      }
29     }
30
31     #define TWOPI (M_PI*2)
32
33     void fft(float *real,float *imag,int logn,int mode)
34     {
35      int n;
36      int j,top,i,id,bottom;
37      int stage,subpartLength;
38      float tempr,tempi,temp2r,temp2i,ar,ai,wr,wi,angle;
39
40      n = irint(exp2((double)logn));
41
42      for (stage=1, subpartLength = n;
43        stage<=logn;
44        ++stage, subpartLength/=2) {
45       angle = TWOPI/subpartLength;
46       ar = 1.0;
47       ai = 0.0;
48       if (mode == REVERSE) {
49        wr = cos(angle);
50        wi = sin(angle);
51       } else {
52        wr = cos(angle);
53        wi = -sin(angle);
54       }
55       for (j=0;j<subpartLength/2;++j) {      /* for each offset in a part */
56        for (top=j;top<n;top+=subpartLength) {  /* for each part */
57          bottom = top+subpartLength/2;
58          tempr = real[bottom];           /* temp = x[id] */
59          tempi = imag[bottom];
60          real[bottom] = real[top]-real[bottom]; /* x[id] = x[i] - x[id] */
61          imag[bottom] = imag[top]-imag[bottom];
62          temp2r = real[bottom]*ar-imag[bottom]*ai; /* temp2 = x[id]*a */
63          temp2i = real[bottom]*ai+imag[bottom]*ar;
64          real[bottom] = temp2r;          /* x[id] = temp2 */
65          imag[bottom] = temp2i;
66          real[top] += tempr;            /* x[i] +=temp */
67          imag[top] += tempi;
68        }
69        temp2r = ar*wr-ai*wi;           /* a *= w */
70        temp2i = ai*wr+ar*wi;
71        ar = temp2r;
72        ai = temp2i;
73       }
74      }
```

```
75      BitReverse(real,n);
76      BitReverse(imag,n);
77
78      #ifdef foo
79       if (mode = = MAGNITUDE)
80        for (i=0;i<n;++i)
81         real[i] = sqrt(real[i]*real[i]+imag[i]*imag[i]);
82      #endif
83
84       if (mode = = MAGNITUDE)
85        for (i=0;i<n;++i)
86         real[i] = sqrt(real[i]*real[i]+imag[i]*imag[i]);
87      }
88
89      #ifdef TRYMAIN
90      void main(int argc,char **argv)
91      {
92      #define POWER 8
93      #define LENGTH 256
94       float real[LENGTH];
95       float imag[LENGTH];
96       int i;
97      #ifdef foo
98       for (i=0;i<LENGTH;++i){
99        if (i<LENGTH/2)
100        real[i] = 1.0;
101       else
102        real[i] = 0.0;
103       imag[i] = 0.0;
104      }
105     #endif
106
107      for (i=0;i<LENGTH;++i) {
108       real[i] = sin(8*TWOPI*i/(LENGTH-1));
109       imag[i] = 0.0;
110      }
111      fft(real,imag,POWER,MAGNITUDE);
112      for (i=0;i<LENGTH;++i)
113       printf("%d %f\n",i,real[i]);
114     }
115     #endif
116
```

Aug 15 21:19 1991 fontNorm.c

```
1       #include <stdio.h>
2       #include <math.h>
3       #include "boolean.h"
4       #include "types.h"
5       #include "error.h"
6       #include "pict.h"
7       #include "dict.h"
8       #include "fontNorm.h"
9
10
11      extern double ceil(double);
12      extern int irint(double);
13
14
```

```c
15   #define UP 0
16   #define DOWN 1
17   typedef int Direction;
18
19   extern Picture thePict;
20
21   void StoreRawOutlinePair(Dictionary dict, int dictEntry,
22                      Box box,int *bothX,int *topY, int *baseY,
23                      int numberOfLegs)
24   {
25    RawOutlinePair temp;
26    int i;
27    int *xCursor,*topCursor,*bottomCursor;
28
29    temp = (RawOutlinePair)calloc(1,sizeof(RawOutlinePairBody));
30    if (temp == NULL)
31     DoError("StoreRawOutlinePair: cannot allocate space\n",NULL);
32
33    temp->box = box;
34    temp->numberOfLegs = numberOfLegs;
35
36    temp->x = (int *)calloc(temp->numberOfLegs,sizeof(int));
37    temp->top = (int *)calloc(temp->numberOfLegs,sizeof(int));
38    temp->bottom = (int *)calloc(temp->numberOfLegs,sizeof(int));
39    if ((temp->x == NULL) ||
40      (temp->top == NULL) ||
41      (temp->bottom == NULL))
42     DoError("StoreRawOutlinePair: cannot allocate space\n",NULL);
43
44    xCursor = temp->x;
45    topCursor = temp->top;
46    bottomCursor = temp->bottom;
47
48    for (i=0;i<numberOfLegs;++i) {
49     *xCursor++ = *bothX++;
50     *topCursor++ = *topY++;
51     *bottomCursor++ = *baseY++;
52    }
53    *(dict->rawOutlines+dictEntry) = temp;
54   }
55
56   int RawOutlineWidth(RawOutlinePair a,int middleLine)
57   {
58    int i,numberOfLegs,right,left;
59    int *topCursor,*bottomCursor;
60    int topValue,bottomValue;
61
62    numberOfLegs = a->numberOfLegs;
63
64    topCursor = a->top;
65    bottomCursor = a->bottom;
66    for (i=0;i<numberOfLegs;++i) {
67     topValue = *topCursor++;
68     bottomValue = *bottomCursor++;
69
70     if (topValue != HIT_THE_BOX) {
71      topValue = middleLine - topValue;
72      if (topValue<0)
73          topValue = 0;
74     }
75     else
```

```
76        topValue = 0;
77
78        if (bottomValue != HIT_THE_BOX) {
79         bottomValue = bottomValue - middleLine;
80         if (bottomValue < 0)
81            bottomValue = 0;
82        }
83        else
84         bottomValue = 0;
85
86        if ((bottomValue != 0)||(topValue != 0))
87         break;
88       }
89       left = i;
90
91       topCursor = a->top+numberOfLegs-1;
92       bottomCursor = a->bottom+numberOfLegs-1;
93       for (i=numberOfLegs-1;i>=0;--i) {
94        topValue = *topCursor--;
95        bottomValue = *bottomCursor--;
96
97        if (topValue != HIT_THE_BOX) {
98         topValue = middleLine - topValue;
99         if (topValue<0)
100           topValue = 0;
101       }
102       else
103        topValue = 0;
104
105       if (bottomValue != HIT_THE_BOX) {
106        bottomValue = bottomValue - middleLine;
107        if (bottomValue < 0)
108           bottomValue = 0;
109       }
110       else bottomValue = 0;
111
112       if ((topValue != 0)||(bottomValue !=0))
113        break;
114      }
115      right = i+1;
116
117      return right-left;
118     }
119
120     void ResampleOutlinePair(OutlinePair a,float newToOldFactor)
121     /* Resample an outline pair using linear interpolation. */
122     {
123      int newWidth,oldWidth,i;
124      int oldLeft,oldRight;
125      float oldCenter;
126      float *newX,*newTop,*newBottom;
127      float *xCursor,*topCursor,*bottomCursor;
128
129      oldWidth = a->numberOfLegs;
130      newWidth = irint(newToOldFactor*oldWidth);
131
132      newX = (float *)calloc(newWidth,sizeof(float));
133      newTop = (float *)calloc(newWidth,sizeof(float));
134      newBottom = (float *)calloc(newWidth,sizeof(float));
135      if ((newX==NULL)||(newTop==NULL)||(newBottom==NULL))
136       DoError("ResampleOutlinePair: cannot allocate space.\n",NULL);
```

```
137
138      xCursor = newX;
139      topCursor = newTop;
140      bottomCursor = newBottom;
141
142      for (i=0;i<newWidth;++i){
143       oldCenter = i/(float)newWidth*(float)oldWidth;
144       oldLeft = irint(floor(oldCenter));
145       oldRight = irint(ceil(oldCenter));
146       if (oldLeft==oldRight) {
147        *xCursor++ = *(a->x+oldLeft);
148        *topCursor++ = *(a->top+oldLeft);
149        *bottomCursor++ = *(a->bottom+oldLeft);
150       }
151       else {
152        float slope;
153        slope = *(a->x+oldRight)-*(a->x+oldLeft);
154        *xCursor++ = *(a->x+oldLeft) + (oldCenter-oldLeft)*slope;
155        slope = *(a->top+oldRight)-*(a->top+oldLeft);
156        *topCursor++ = *(a->top+oldLeft) + (oldCenter-oldLeft)*slope;
157        slope = *(a->bottom+oldRight)-*(a->bottom+oldLeft);
158        *bottomCursor++ = *(a->bottom+oldLeft) + (oldCenter-oldLeft)*slope;
159       }
160      }
161
162      free(a->x);
163      free(a->top);
164      free(a->bottom);
165
166      a->x = newX;
167      a->top = newTop;
168      a->bottom = newBottom;
169      a->numberOfLegs = newWidth;
170     }
171
172     void StoreOutlinePair(Dictionary dict, int dictEntry,
173                     int middleLine,int fontXHeight,
174                     int ascenderHeight,NormalizationDescriptor *nd)
175     /* This routine normalizes the raw outline pair stored in dict at dictEntry using the following
176      * operations:
177      * 1) For the top contour, shift so that the middle line is at y=0 and negate so that the
178      *    higher points are greater than 0. For the bottom, shift so that middle line is at y=0,
179      *    but don't flip. Thus, lower points have y coordinates greater than 0.
180      *    Consider points whose value is HIT_THE_BOX to be at y=0. These correspond to gaps
181      *    between the letters.
182      * 2) Compress top and bottom y coordinates by 1/fontXHeight so that the coordinates at the
183      *    distance of the fontXHeight have value 1. Note that 1 is an arbitrary number. It is
184      *    unlikely that a signal will have parts that are the x height above the center line
185      *    anyway.
186      *    FOR TOP CONTOUR,
187      *    IF HEIGHT IS GREATER THAN XHEIGHT, SCALE DIFFERENCE BY 1.5/ASCENDER_HEIGHT.
188      *    ELSE SCALE DIFFERENCE BY 1/XHEIGHT.
189      *    FOR BOTTOM CONTOUR,
190      *    SCALE BY 1.5/ASCENDER_HEIGHT.
191      * 3) Compress the x coordinates by the same factor as in step 2. Note that this does not
192      *    actually resample the contour. NOW DO THIS WITH RESAMPLE. USE SCALE FACTOR OF
193      *    20/XHEIGHT.
194      * 4) Remove left and right ends of the contour that have y values of zero. This is so the
195      *    contour starts where the word starts, rather than at the edge of its bouding box.
196      * 5) Resample the contour to stretch by firstFontXwidth/fontxWidth. KILL THIS OPERATION.
```

```
197      */
198      {
199        RawOutlinePair raw;
200        OutlinePair temp;
201        int i,numberOfLegs;
202        int y;
203        int offset;
204        int *xSCursor,*topSCursor,*bottomSCursor;
205        float *xDCursor,*topDCursor,*bottomDCursor;
206        float *xCursor,*topCursor,*bottomCursor;
207        int left,right;
208        float foffset;
209        float ascenderFactor,xHeightFactor,widthFactor;
210
211        raw = *(dict->rawOutlines+dictEntry);
212
213        temp = (OutlinePair)calloc(1,sizeof(OutlinePairBody));
214        if (temp == NULL)
215         DoError("StoreOutlinePair: cannot allocate space\n",NULL);
216
217        temp->x = (float *)calloc(raw->numberOfLegs,sizeof(float));
218        temp->top = (float *)calloc(raw->numberOfLegs,sizeof(float));
219        temp->bottom = (float *)calloc(raw->numberOfLegs,sizeof(float));
220        if ((temp->x == NULL) ||
221          (temp->top == NULL) ||
222          (temp->bottom == NULL))
223         DoError("StoreOutlinePair: cannot allocate space\n",NULL);
224
225        temp->box = raw->box;
226        temp->blackoutHeight = 0;
227        temp->numberOfLegs = raw->numberOfLegs;
228        offset = temp->offset = *(raw->x);
229        temp->width = *(raw->x+raw->numberOfLegs-1) - temp->offset;
230
231        xDCursor = temp->x;
232        topDCursor = temp->top;
233        bottomDCursor = temp->bottom;
234        xSCursor = raw->x;
235        topSCursor = raw->top;
236        bottomSCursor = raw->bottom;
237
238        ascenderFactor = 1.5/ascenderHeight;
239        xHeightFactor = 1.0/fontXHeight;
240        widthFactor = 20.0/fontXHeight;
241        if (nd->noXHeightNormalize) {
242          xHeightFactor = 1.0;
243          ascenderFactor = 1.0;
244        }
245        if (nd->noAscenderNormalize)
246          ascenderFactor = xHeightFactor;
247
248        numberOfLegs = raw->numberOfLegs;
249        for (i=0;i<numberOfLegs; ++i) {
250        if (*topSCursor==HIT_THE_BOX) {
251          y = 0;
252          topSCursor++;
253        }
254        else {
255          y = middleLine - *topSCursor++;
256          if (y<0)
257             y = 0;
```

```
258       }
259       if (y>fontXHeight/2) {
260         float temp1 = (float)y * ascenderFactor;
261         float temp2 = (float)fontXHeight/2 * xHeightFactor;
262         if (temp1<temp2)
263            *topDCursor++ = temp2;
264         else
265            *topDCursor++ = temp1;
266   /*
267         *topDCursor++ = (float)y * ascenderFactor;
268   */
269       }
270       else
271        *topDCursor++ = (float)y * xHeightFactor;
272
273       if (*bottomSCursor==HIT_THE_BOX) {
274         y = 0;
275         bottomSCursor++;
276       }
277       else {
278         y = *bottomSCursor++ - middleLine;
279         if (y<0)
280            y = 0;
281       }
282       if (y<fontXHeight/2)
283         *bottomDCursor++ = (float)y * xHeightFactor;
284       else {
285         float temp1 = (float)y * ascenderFactor;
286         float temp2 = (float)fontXHeight/2 * xHeightFactor;
287         if (temp1<temp2)
288            *bottomDCursor++ = temp2;
289         else
290            *bottomDCursor++ = temp1;
291   /*    *bottomDCursor++ = (float)y * ascenderFactor; */
292       }
293     }
294
295     /* Now try to remove parts of the contour on to the left and right of the
296      * word shape that are at height 0 */
297
298     /* Find left edge */
299     topDCursor = temp->top;
300     bottomDCursor = temp->bottom;
301     for (i=0;i<numberOfLegs;++i) {
302      if ((*topDCursor++ != 0)||(*bottomDCursor++!=0))
303       break;
304     }
305     left = i;
306
307     /* Find right edge */
308     topDCursor = temp->top+numberOfLegs-1;
309     bottomDCursor = temp->bottom+numberOfLegs-1;
310     for (i=numberOfLegs-1;i>=0;--i) {
311      if ((*topDCursor-- != 0)||(*bottomDCursor-- !=0))
312       break;
313     }
314     right = i+1;
315
316     /* Clip the ends of the contour at left and right */
317     xDCursor = temp->x;
318     topDCursor = temp->top;
```

```
319      bottomDCursor = temp->bottom;
320      xCursor = temp->x+left;
321      topCursor = temp->top+left;
322      bottomCursor = temp->bottom+left;
323      foffset = *xSCursor;
324      for (i=left;i<right;++i){
325        *xDCursor++ = *xCursor++ - foffset;
326        *topDCursor++ = *topCursor++;
327        *bottomDCursor++ = *bottomCursor++;
328      }
329      temp->numberOfLegs = right-left;
330
331      *(dict->outlines+dictEntry) = temp;
332      ResampleOutlinePair(*(dict->outlines+dictEntry),widthFactor);
333    }
334
335    static int lineSpacing;
336    int OrderOutlinePair(OutlinePair *o1,OutlinePair *o2)
337    {
338      int yDistance;
339      int xDistance;
340      yDistance = (*o1)->box->pageY - (*o2)->box->pageY;
341      if (yDistance<lineSpacing && yDistance > -lineSpacing) {
342        xDistance = (*o1)->box->pageX - (*o2)->box->pageX;
343        return xDistance;
344      }
345      return yDistance;
346    }
347
348    void SortDictionary(Dictionary dict)
349    {
350      lineSpacing = 20;
351      qsort(dict->rawOutlines,dict->numberOfEntries,sizeof(RawOutlinePair),
352           OrderOutlinePair);
353    }
354
355    #define HIST_SIZE 100
356    void HistogramMax(int *data,int dataLength,int offset,int sign,int *histogram)
357    {
358      int i,bin;
359
360      if (sign>0) {
361        int maxValue;
362
363        maxValue = *data;
364        for (i=0;i<dataLength;++i)
365          if (data[i]!=HIT_THE_BOX) {
366            maxValue = data[i];
367            break;
368          }
369        for (;i<dataLength;++i)
370          if (data[i]!=HIT_THE_BOX && data[i]>maxValue)
371            maxValue = data[i];
372        if (maxValue != HIT_THE_BOX) {
373          bin = maxValue-offset;
374          if ((bin>=0)&&(bin<HIST_SIZE))
375             histogram[bin]++;
376        }
377      }
378      else {
379        int minValue;
380        minValue = *data;
```

```
381      for (i=0;i<dataLength;++i)
382       if (data[i]!=HIT_THE_BOX) {
383          minValue = data[i];
384          break;
385       }
386      for (;i<dataLength;++i)
387       if (data[i]!=HIT_THE_BOX && data[i]<minValue)
388          minValue = data[i];
389      if (minValue != HIT_THE_BOX) {
390       bin = minValue-offset;
391       if ((bin>=0)&&(bin<HIST_SIZE))
392          histogram[bin]++;
393      }
394     }
395    }
396
397    void Histogram(int *data,int dataLength, int offset, int *histogram)
398    {
399     int i,bin;
400
401     for (i=0;i<dataLength;++i) {
402      if (*data != HIT_THE_BOX) {
403       bin = *data-offset;
404       if ((bin>=0)&&(bin<HIST_SIZE))
405          histogram[bin]++;
406      }
407      data++;
408     }
409    }
410
411    int MaxBin(int *histogram)
412    {
413     int i;
414     int maxValue;
415     int maxIndex;
416
417     maxValue = histogram[0];
418     maxIndex = 0;
419     for (i=0;i<HIST_SIZE;++i)
420      if (histogram[i]>maxValue) {
421       maxValue = histogram[i];
422       maxIndex = i;
423      }
424     return maxIndex;
425    }
426
427    int MaxBinAbove(int *histogram,int line)
428    {
429     int i;
430     int maxValue;
431     int maxIndex;
432     int top,bottom;
433
434     for (i=0;i<HIST_SIZE;++i)
435      if (histogram[i] != 0)
436       break;
437
438     top = i;
439     bottom = (line+top)/2;
440
441     maxValue = histogram[top];
```

```
442     maxIndex = top;
443     for (i=top;i< =bottom; + +i)
444       if (histogram[i]>maxValue) {
445         maxValue = histogram[i];
446         maxIndex = i;
447       }
448     return maxIndex;
449   }
450
451   void DrawTextLines(Picture thePict,Dictionary dict,int topLine,int bottomLine)
452   {
453     int maxLength;
454     int halfWidth;
455     int x,y;
456     float x2,x3,y2,y3;
457     float angle;
458
459     angle = (*(dict->rawOutlines))->box->angle;
460     maxLength = thePict->width+thePict->height;
461     halfWidth = thePict->width / 2;
462     x = topLine * -sin(angle) + halfWidth * cos(angle);
463     y = topLine * cos(angle) + halfWidth * sin(angle);
464     x2 = x+maxLength*cos(angle);
465     y2 = y+maxLength*sin(angle);
466     x3 = x-maxLength*cos(angle);
467     y3 = y-maxLength*sin(angle);
468     DrawLine(thePict,x,y,(int)x2,(int)y2,5);
469     DrawLine(thePict,x,y,(int)x3,(int)y3,5);
470
471     x = bottomLine * -sin(angle) + halfWidth * cos(angle);
472     y = bottomLine * cos(angle) + halfWidth * sin(angle,;
473     x2 = x+maxLength*cos(angle);
474     y2 = y+maxLength*sin(angle);
475     x3 = x-maxLength*cos(angle);
476     y3 = y-maxLength*sin(angle);
477     DrawLine(thePict,x,y,(int)x2,(int)y2,5);
478     DrawLine(thePict,x,y,(int)x3,(int)y3,5);
479   }
480
481   void PageStatistics(Dictionary dict,char *fileName,NormalizationDescriptor *nd)
482   /* WARNING - this must be run before PostProcess since PostProcess changes the raw
483    * shape data. */
484   {
485     int index;
486     int temp;
487     int i,startIndex,firstY,minY,endIndex,shape;
488     int tops[HIST_SIZE];
489     int bottoms[HIST_SIZE];
490     int ascenders[HIST_SIZE];
491     int descenders[HIST_SIZE];
492     int middleLine,topLine,bottomLine,ascenderLine,descenderLine;
493     int ascenderHeight,descenderHeight,lineNumber;
494     int fontXHeight,fontXWidth,xIndex;
495     RawOutlinePair thisShape;
496     FILE *fp;
497     BOOLEAN haveFirstFontXWidth = FALSE;
498     int firstFontXWidth;
499
500     if ((fp=fopen(fileName,"w"))= =NULL)
501       DoError("PageStatistics: error opening output file %s.\n",fileName);
502
```

```
503     SortDictionary(dict);
504
505       index = 0;
506     #ifdef foo
507       malloc_verify();
508     #endif
509       lineNumber = 0;
510       while (index < dict->numberOfEntries) {
511        startIndex = index;
512        firstY = (*(dict->rawOutlines+index))->box->pageY;
513        minY = firstY;
514        while ( (*(dict->rawOutlines+index))->box->pageY - firstY < 20 &&
515               (*(dict->rawOutlines+index))->box->pageY - firstY > -20) {
516         if ( minY > ( (*(dict->rawOutlines+index))->box->pageY ))
517            minY = (*(dict->rawOutlines+index))->box->pageY;
518         ++index;
519         if (index == dict->numberOfEntries)
520            break;
521        }
522        endIndex = index;
523
524     #ifdef foo
525        malloc_verify();
526     #endif
527
528        /* shapes from start index through endindex are all on */
529        /* the same text line */
530        /* minY has the top of the highest box on the line. */
531
532        /* Find the base and toplines by taking the mode of the heights of the
533         * valleys of the bottom contours and the peaks of the top contours */
534        for (i=0;i<HIST_SIZE;i++) {
535         tops[i]=0;
536         bottoms[i]=0;
537         ascenders[i]=0;
538         descenders[i]=0;
539        }
540
541        for (shape=startIndex;shape<endIndex;++shape) {
542         thisShape = *(dict->rawOutlines+shape);
543         Histogram(thisShape->top,thisShape->numberOfLegs,minY,tops);
544         Histogram(thisShape->bottom,thisShape->numberOfLegs,minY,bottoms);
545
546         HistogramMax(thisShape->top,thisShape->numberOfLegs,minY,-1,ascenders);
547         HistogramMax(thisShape->bottom,thisShape->numberOfLegs,minY,1,descenders);
548        }
549        topLine = MaxBin(tops)+minY;
550        bottomLine = MaxBin(bottoms)+minY;
551        ascenderLine = MaxBin(ascenders)+minY;
552        descenderLine = MaxBin(descenders)+minY;
553
554        if (thePict)
555         DrawTextLines(thePict,dict,topLine,bottomLine);
556     #ifdef foo
557        malloc_verify();
558     #endif
559
560        middleLine = (bottomLine+topLine)/2;
561        fontXHeight = bottomLine-topLine;
562        ascenderHeight = bottomLine-ascenderLine;
563        if ((float)ascenderHeight/(float)fontXHeight < 1.1) {
```

```
564        fprintf(stderr,"Bad ascender height on line %d.\n",lineNumber);
565        ascenderLine = MaxBinAbove(ascenders,ascenderLine-minY)+minY;
566        ascenderHeight = bottomLine-ascenderLine;
567        fprintf(stderr,"New ascender height = %d.\nNew xheight =
           %d.\n",ascenderHeight,fontXHeight);
568      }
569
570      fprintf(fp,"%d: %d %d %2.6f\n",lineNumber,fontXHeight,ascenderHeight,
571             (float)ascenderHeight/(float)fontXHeight);
572
573    #ifdef foo
574      /* Assume that the first shape in the image is the letter x.
575       * Use this shape to compute the fontXWidth value. */
576      if (lineNumber==0)
577        fontXWidth = RawOutlineWidth(*(dict->rawOutlines),middleLine);
578    #endif
579
580      ++lineNumber;
581      if (fontXHeight < 0) {
582       fprintf(stderr,"PageStatistics: negative fontXHeight in line %d.\n",lineNumber);
583       fontXHeight *= -1;
584      }
585      for (shape=startIndex;shape<endIndex;++shape)
586        StoreOutlinePair(dict,shape,middleLine,fontXHeight,ascenderHeight,nd);
587    } /* Do another line of text */
588    fclose(fp);
589  }
```

Jan 12 17:35 1991 getAll.c

```
1    #include <stdio.h>
2    #include <math.h>
3    #include <values.h>
4    #include "boolean.h"
5    #include "types.h"
6    #include "pict.h"
7    #include "dict.h"
8
9    #define MAX_STRING_LEN 256
10
11   void WriteShiftedAsciiOutline(FILE *fp, OutlinePair outline, float x, float y)
12   {
13    int i;
14    for (i=0;i<outline->numberOfLegs;++i)
15      fprintf(fp,"%f %f\n",i+x,*(outline->top+i)+y);
16    fprintf(fp,"\"top\n\n");
17
18    for (i=0;i<outline->numberOfLegs;++i)
19      fprintf(fp,"%f %f\n",i+x,y-(*(outline->bottom+i)));
20    fprintf(fp,"\"bottom\n\n");
21   }
22
23   void WriteOutlines(char *filename,Dictionary dict)
24   {
25    float maxWidth,maxHeight;
26    int i,j,count;
27    int width,height;
28    float x,y;
29    OutlinePair outline;
```

```
30      FILE *fp;
31      if ((fp = fopen(filename,"w"))= =NULL) {
32       printf("Error opening %s.",filename);
33       exit(-1);
34      }
35
36      maxWidth = 0;
37      maxHeight = 0;
38      for (i=0;i<dict->numberOfEntries;++i) {
39       outline = *(dict->outlines+i);
40       if (outline->numberOfLegs > maxWidth)
41         maxWidth = outline->numberOfLegs;
42       for (j=0;j<outline->numberOfLegs;++j) {
43        if (*(outline->bottom+j)>maxHeight)
44            maxHeight = *(outline->bottom+j)>maxHeight;
45        if (*(outline->top+j)>maxHeight)
46            maxHeight = *(outline->bottom+j)>maxHeight;
47       }
48      };
49
50      printf("maxWidth,maxHeight = %f,%f\n",maxWidth,maxHeight);
51
52      width = irint(sqrt((double)(dict->numberOfEntries)));
53      height = irint((double)(dict->numberOfEntries) / width);
54
55      printf("n,width,height = %d,%d,%d\n",dict->numberOfEntries,width,height);
56
57      for (i=0;i<height;++i)
58       for (j=0;j<width;++j) {
59        count = i*width+j;
60        if ((count < 16) && (count < dict->numberOfEntries)) {
61            x = j*maxWidth*1.5;
62         y = (height-i+1)*maxHeight*3;
63         printf("(%f,%f) ",x,y);
64            WriteShiftedAsciiOutline(fp,*(dict->outlines+count),x,y);
65       }
66      }
67      fclose(fp);
68     }
69
70
71     void main(int argc,char **argv)
72     {
73      char *infile,*outfile;
74      Dictionary dict;
75
76      if (argc != 3) {
77       printf("Usage:\n");
78       printf(" %s infile outfile\n",argv[0]);
79       exit(-1);
80      }
81
82      infile = argv[1];
83      outfile = argv[2];
84      dict = ReadDictionary(infile);
85
86      WriteOutlines(outfile,dict);
87
88      printf("\n");
89     }
90
91
```

Jul 8 14:25 1991 getOutline.c

```
1       #include <stdio.h>
2       #include <math.h>
3       #include <values.h>
4       #include <strings.h>
5       #include "boolean.h"
6       #include "types.h"
7       #include "pict.h"
8       #include "dict.h"
9
10      extern char *strchr(char *s,int c);
11
12      #define MAX_STRING_LEN 256
13
14      void WriteAsciiOutline(char *filename, OutlinePair outline)
15      {
16       FILE *fp;
17       int i;
18       if ((fp = fopen(filename,"w")) = =NULL) {
19        printf("Error opening %s.",filename);
20        exit(-1);
21       }
22       for (i=0;i<outline->numberOfLegs; + +i)
23        fprintf(fp,"%d %f\n",i,*(outline->top+i));
24       fprintf(fp,"\"top\n\n");
25
26       for (i=0;i<outline->numberOfLegs; + +i)
27        fprintf(fp,"%d %f\n",i,-(*(outline->bottom+i)));
28       fprintf(fp,"\"bottom\n\n");
29       fclose(fp);
30      }
31
32
33      void main(int argc,char **argv)
34      {
35       char *infile;
36       char s[MAX_STRING_LEN],outfile[MAX_STRING_LEN];
37       Dictionary dict;
38       int selection;
39       char *crPointer;
40       BOOLEAN done = FALSE;
41
42       if (argc != 2) {
43        printf("Usage:\n");
44        printf("  %s infile\n",argv[0]);
45        exit(-1);
46       }
47
48       infile = argv[1];
49       dict = ReadDictionary(infile);
50
51       while (!done) {
52        printf("Shape number [0..%d]: ",dict->numberOfEntries-1);
53        fgets(s,MAX_STRING_LEN,stdin);
54        if (sscanf(s,"%d",&selection) = = 1) {
55         if (selection<0 || selection> =dict->numberOfEntries)
56             printf("Shape numbers must be between 0 and %d, inclusive.\n",
57              dict->numberOfEntries-1);
58         else {
```

```
59              printf("Output file: ");
60              fgets(outfile,MAX_STRING_LEN,stdin);
61              crPointer = strchr(outfile,'\n');
62              if (crPointer != NULL)
63                *crPointer = '\0';
64              printf("Writing shape %d to file %s\n",selection,outfile);
65              WriteAsciiOutline(outfile,*(dict->outlines+selection));
66            }
67          }
68          else if ((s[0] == '\0') || (s[0] == '\n'))
69            done = TRUE;
70          else {
71            printf("Enter an integer to select a shape or a blank line\n");
72            printf("to quit.\n");
73          }
74        }
75      }
76
77

Jan 11 17:06 1991 guassian.c

1       #include <stdio.h>
2       #include <math.h>
3       #include <values.h>
4
5       float square(float x)
6       {
7         return x*x;
8       }
9
10      float gaussian(a, s, x)   /* return A*GAUSS(SIGMA, X) */
11      float a, s, x;
12      {
13        return (a*exp(-square(x/s)/2.0))/(s*sqrt(2.0*M_PI));
14      }
15
16      float *MakeMask(int halfMaskSize, float a)
17      {
18        int mask_size;
19        int x;
20        float s;
21        float *mask, sum;
22
23        mask_size = 2*halfMaskSize+1;
24        s = halfMaskSize/2;
25        mask = (float *) calloc(halfMaskSize+1, sizeof(float));
26        if (mask == NULL) {
27          printf("MakeMask: cannot allocate space\n");
28          exit(-1);
29        }
30
31        for (x = 0; x <= halfMaskSize; x++) {
32          mask[x] = gaussian(a, s, (float) x);
33      /*    printf("%e\n",mask[x]); */
34        }
35
36        for (sum = fabs(mask[0]), x = 1; x <= halfMaskSize; x++)
```

```
37        sum + = 2.0*fabs(mask[x]);
38
39       for (x = 0; x <= halfMaskSize; x++)
40         mask[x] /= sum;
41
42       return mask;
43     }
44
45     void Guass1DFloat(float *data, int n, int halfMaskSize)
46     {
47       float a;
48       float *mask;
49       float *newData;
50       float *leftPtr,*rightPtr;
51       float sum;
52       int i,j,left,right;
53
54       a=1;
55
56       if (n < halfMaskSize*2+1)
57         return;
58
59       newData = (float *)calloc(n,sizeof(float));
60       if (newData == NULL) {
61         printf("Guass1DFloat: cannot allocate space\n");
62         exit(-1);
63       }
64
65       mask = MakeMask(halfMaskSize,a);
66
67       for (i=halfMaskSize;i<n-halfMaskSize;++i) {
68         sum = *(data+i) * mask[0];
69         leftPtr = rightPtr = data+i;
70         for (j=1;j<halfMaskSize;++j)
71           sum += mask[j] * (*(--leftPtr) + *(++rightPtr));
72         newData[i] = sum;
73       }
74
75       for (i=0;i<halfMaskSize;++i) {
76         sum = data[i]*mask[0];
77         left = i;
78         right = i;
79         for (j=1;j<halfMaskSize;++j) {
80           if (--left < 0)
81              left += n;
82           if (++right >=n)
83              right -= n;
84           sum += mask[j] * ( data[left] + data[right] );
85         }
86         newData[i] = sum;
87       }
88
89       for (i=n-halfMaskSize;i<n;++i) {
90         sum = data[i]*mask[0];
91         left = i;
92         right = i;
93         for (j=1;j<halfMaskSize;++j) {
94           if (--left < 0)
95              left += n;
96           if (++right >=n)
97              right -= n;
```

```
98            sum += mask[j] * ( data[left] + data[right] );
99          }
100         newData[i] = sum;
101       }
102
103       leftPtr = data;
104       rightPtr = newData;
105       for (i=0;i<n;++i)
106         *leftPtr++ = *rightPtr++;
107       free(newData);
108     }
```

Aug 23 19:21 1991 lines.c

```
1      #include <stdio.h>
2      #include <values.h>
3      #include <math.h>
4      #include "boolean.h"
5      #include "pict.h"
6      #include "lines.h"
7
8      void LineEngine(Picture pict,
9                      int x1,
10                     int y1,
11                     int x2,
12                     int y2,
13                     UCHAR color,
14                     pistFunc PerPixel)
15     {
16       static int inside = 0;
17       int xinc,yinc;
18       int distance;
19       int left,right,top,bottom;
20
21       ++inside;
22       left = 0;
23       right = pict->width-1;
24       top = 0;
25       bottom = pict->height-1;
26       /* printf("Draw line: (%d,%d)-(%d,%d)\n",x1,y1,x2,y2); */
27       /* CASE VERTICAL */
28       yinc = y2 - y1;
29       xinc = x2 - x1;
30       if (xinc > 0) {
31        if (yinc > 0) {
32         /* Line goes up to the right */
33         if (yinc>xinc)
34            distance = -yinc;
35         else
36            distance = xinc;
37         while ((*PerPixel)(pict,x1,y1,
38                      ((x1 < x2) || (y1 < y2))&&(x1<=right)&&(y1<=bottom),
39                      color)) {
40            if (distance > 0) {
41            /* move right */
42            x1++;
43             distance -= yinc;
44           } else {
```

```
45          /* move up */
46          y1++;
47          distance += xinc;
48         }
49        }
50       } else {
51        if (-yinc>xinc)
52            distance = yinc;
53        else
54            distance = xinc;
55        while ((*PerPixel)(pict,x1,y1,
56                   ((x1 < x2) || (y1 > y2))&&(x1<=right)&&(y1>=top),
57                   color)) {
58          if (distance > 0) {
59          /* move right */
60          x1++;
61           distance += yinc;
62          } else {
63          /* move down */
64          y1--;
65           distance += xinc;
66          }
67        }
68       }
69      } else {
70       if (yinc > 0) {
71       /* Line goes up to the left */
72       if (yinc>-xinc)
73           distance = -yinc;
74       else
75           distance = -xinc;
76       while ((*PerPixel)(pict,x1,y1,
77                  ((x1 > x2) || (y1 < y2))&&(x1>=left)&&(y1<=bottom),
78                  color)) {
79         if (distance > 0) {
80         /* move left */
81         x1--;
82          distance -= yinc;
83         } else {
84         /* move up */
85         y1++;
86          distance -= xinc;
87         }
88       }
89      } else {
90       if (-yinc>-xinc)
91           distance = yinc;
92       else
93           distance = -xinc;
94       while ((*PerPixel)(pict,x1,y1,
95                  ((x1 > x2) || (y1 > y2))&&(x1>=left)&&(y1>=top),
96                  color)) {
97         if (distance > 0) {
98         /* move left */
99         x1--;
100         distance += yinc;
101        } else {
102        /* move down */
103        y1--;
104         distance -= xinc;
105        }
```

```
106        }
107       }
108     }
109     --inside;
110   }
111
112   BOOLEAN DrawPiston(Picture pict, int x, int y, BOOLEAN test, UCHAR color)
113   {
114     if (test)
115       WriteClippedPixel(pict,x,y,color);
116     return test;
117   }
118
119   static UCHAR bitmasks[] = { 0x80,0x40,0x20,0x10,0x8,0x4,0x2,0x1 };
120
121   void CountLine1Bit(Picture pict,
122                     int x1,
123                     int y1,
124                     int x2,
125                     int y2,
126                     int *totalSet,
127                     int *total)
128   {
129     static int inside = 0;
130     int xinc,yinc;
131     int distance;
132     int left,right,top,bottom;
133
134     int uchar_width;
135     UCHAR *cursor;
136     UCHAR mask;
137     int count = 0;
138     int pixels = 0;
139
140     ++inside;
141     left = 0;
142     right = pict->width-1;
143     top = 0;
144     bottom = pict->height-1;
145
146     if (pict->depth != 1)
147       DoError("CountLine1Bit: Only depth 1 is supported.\n",NULL);
148
149     uchar_width = pict->uchar_width;
150     cursor = pict->data+y1*uchar_width+(x1>>3);
151     mask = bitmasks[x1%8];
152
153     /* printf("Draw line: (%d,%d)-(%d,%d)\n",x1,y1,x2,y2); */
154     /* CASE VERTICAL */
155     yinc = y2 - y1;
156     xinc = x2 - x1;
157     if (xinc > 0) {
158      if (yinc > 0) {
159       /* Line goes up to the right */
160       if (yinc>xinc)
161           distance = -yinc;
162       else
163           distance = xinc;
164       while (((x1 < x2) || (y1 < y2))&&(x1<=right)&&(y1<=bottom)) {
165           if (*cursor & mask)
166             ++count;
```

```
167         ++pixels;
168         if (distance > 0) {
169         /* move right */
170         if (mask == 0x1) {
171           mask = 0x80;
172           ++cursor;
173         }
174         else
175           mask = mask >> 1;
176         x1++;
177         distance -= yinc;
178         } else {
179         /* move up */
180         cursor += uchar_width;
181         y1++;
182         distance += xinc;
183         }
184       }
185     } else {
186     if (-yinc>xinc)
187         distance = yinc;
188     else
189         distance = xinc;
190     while (((x1 < x2) || (y1 > y2))&&(x1<=right)&&(y1>=top)) {
191         if (*cursor & mask)
192         ++count;
193         ++pixels;
194         if (distance > 0) {
195         /* move right */
196         if (mask == 0x1) {
197           mask = 0x80;
198           ++cursor;
199         }
200         else
201           mask = mask >> 1;
202         x1++;
203         distance += yinc;
204         } else {
205         /* move down */
206       cursor -= uchar_width;
207         y1--;
208         distance += xinc;
209         }
210     }
211     }
212   } else {
213   if (yinc > 0) {
214   /* Line goes up to the left */
215   if (yinc>-xinc)
216       distance = -yinc;
217   else
218       distance = -xinc;
219   while (((x1 > x2) || (y1 < y2))&&(x1>=left)&&(y1<=bottom)) {
220       if (*cursor & mask)
221       ++count;
222       ++pixels;
223       if (distance > 0) {
224       /* move left */
225       if (mask == 0x80) {
226         mask = 0x1;
227         --cursor;
```

```
228            }
229          else
230            mask = mask << 1;
231          x1--;
232          distance -= yinc;
233        } else {
234          /* move up */
235          cursor += uchar_width;
236          y1++;
237          distance -= xinc;
238        }
239      }
240    } else {
241     if (-yinc>-xinc)
242         distance = yinc;
243     else
244         distance = -xinc;
245     while (((x1 > x2) || (y1 > y2))&&(x1>=left)&&(y1>=top)) {
246         if (*cursor & mask)
247           ++count;
248         ++pixels;
249         if (distance > 0) {
250          /* move left */
251          if (mask == 0x80) {
252            mask = 0x1;
253            --cursor;
254          }
255           else
256            mask = mask << 1;
257          x1--;
258          distance += yinc;
259        } else {
260          /* move down */
261          cursor -= uchar_width;
262          y1--;
263          distance -= xinc;
264        }
265      }
266     }
267    }
268    --inside;
269    *totalSet += count;
270    *total += pixels;
271  }
272
273  void DrawLine(Picture pict, int x1, int y1, int x2, int y2, UCHAR color)
274  {
275    LineEngine(pict,x1,y1,x2,y2,color,DrawPiston);
276  }
277
278  static int pixelCounter;
279  static int setCounter;
280  BOOLEAN CountPiston(Picture pict, int x, int y, BOOLEAN test, UCHAR color)
281  {
282    if (test) {
283      ++pixelCounter;
284      if (ReadPixel(pict,x,y))
285        ++setCounter;
286    }
287    return test;
288  }
```

```
289
290    #ifdef foo
291    float CountLine(Picture pict, int x1, int y1, int x2, int y2)
292    {
293      pixelCounter = 0;
294      setCounter = 0;
295      LineEngine(pict,x1,y1,x2,y2,0,CountPiston);
296      LineEngine(pict,x1,y1,x1-(x2-x1),y1-(y2-y1),0,CountPiston);
297      return (float)setCounter/pixelCounter;
298    }
299    #endif
300
301    float CountLine(Picture pict, int x1, int y1, int x2, int y2)
302    {
303      pixelCounter = 0;
304      setCounter = 0;
305      CountLine1Bit(pict,x1,y1,x2,y2,&setCounter,&pixelCounter);
306      CountLine1Bit(pict,x1,y1,x1-(x2-x1),y1-(y2-y1),&setCounter,&pixelCounter);
307      return (float)setCounter/pixelCounter;
308    }
309
310    static int startx;
311    static int starty;
312    static int endx;
313    static int endy;
314    BOOLEAN DistancePiston(Picture pict, int x, int y, BOOLEAN test, UCHAR color)
315    {
316      if (test) {
317       if (ReadPixel(pict,x,y)) {
318        if ((x==startx)&&(y==starty))
319           return test;
320        else {
321           endx = x;
322           endy = y;
323           return FALSE;
324        }
325       }
326       else
327        return test;
328      } else
329       return test;
330    }
331
332
333    int DistanceLine(Picture pict, int x1, int y1, int x2, int y2)
334    {
335      double dx,dy;
336      startx = x1;
337      starty = y1;
338      endx = x2;
339      endy = y2;
340      LineEngine(pict,x1,y1,x2,y2,0,DistancePiston);
341      dx = endx-x1;
342      dy = endy-y1;
343      return sqrt(dx*dx+dy*dy);
344    }
345
346
347    #ifdef TEST
348    void draw(pict)
349    Picture pict;
```

```
350     {
351       float angle;
352       float step;
353       float x1,y1,x2,y2;
354       float r1,r2;
355       int xc,yc;
356
357       xc = 320;
358       yc = 250;
359       r1 = 50;
360       r2 = 400;
361       step = M_PI*2/50;
362
363       for (angle = 0;angle < 2*M_PI; angle + = step) {
364         x1 = xc + r1*cos(angle);
365         y1 = yc + r1*sin(angle);
366         x2 = xc + r2*cos(angle);
367         y2 = yc + r2*sin(angle);
368         DrawLine(pict,(int)x1,(int)y1,(int)x2,(int)y2,0xff);
369         printf("%3.2f: %d %d\n",angle,
370                 CountLine(pict,(int)x1,(int)y1,(int)x2,(int)y2),
371                 DistanceLine(pict,(int)x1,(int)y1,(int)x2,(int)y2));
372       }
373     }
374
375     void main(argc,argv)
376     int argc;
377     char **argv;
378     {
379       char *outfile;
380       Picture pict;
381
382       if (argc != 2) {
383         printf("Usage: %s outfile\n",argv[0]);
384         exit(0);
385       }
386       outfile = argv[1];
387
388       pict = new_pict(640,500,1);
389
390       draw(pict);
391
392       write_pict(outfile,pict);
393       printf("done\n");
394     }
395     #endif
```

Aug 23 16:43 1991 maxFilter.c

```
1       #include <stdio.h>
2       #include "mylib.h"
3
4       extern int irint(double);
5
6       #define MAX_SIGNAL_LENGTH (10000)
7       #define MIN_MODE (5) /* MIN_MODE must be less than MAX_HIST_SIZE */
8       #define MAX_HIST_SIZE (500)
9       #define MAX_PEAKS (100)
```

```
10      #define BASE_PERCENTILE (0.5)
11      float data[MAX_SIGNAL_LENGTH];
12      int newSignal[MAX_SIGNAL_LENGTH];
13
14      int MaxOnInterval(int start,int end)
15      {
16       int i;
17       float maxValue = data[start];
18       int maxIndex = start;
19       for (i=start;i<end;++i)
20        if (data[i]>maxValue) {
21          maxValue = data[i];
22          maxIndex = i;
23        }
24       return maxIndex;
25      }
26
27      void main(int argc,char **argv)
28      {
29       char *infile,*outfile;
30       FILE *inFP,*outFP;
31       int signalLength;
32       float *cursor;
33       int foo;
34       int i;
35       int maskWidth = 10;
36       float maxValue;
37       int maxIndex,modeValue,modeIndex;
38       int h[MAX_HIST_SIZE];
39       int finalCount;
40       int finalIndex[MAX_PEAKS];
41       float baseThresh;
42       BOOLEAN upState;
43       float thisRatio,lastRatio;
44
45       DefArg("%s %s","infile outfile",&infile,&outfile);
46       ScanArgs(argc,argv);
47
48       if ((inFP=fopen(infile,"r"))==NULL)
49        DoError("Error opening file %s.\n",infile);
50
51       cursor = data;
52       while (fscanf(inFP,"%d %f\n",&foo,cursor++)==2)
53        if (cursor-data>MAX_SIGNAL_LENGTH)
54          DoError("Signal is too long.\n",NULL);
55       signalLength = cursor-data;
56
57       /* Compute the threhold for the black edge to black pixel ratio */
58       maxValue = data[0];
59       for (i=0;i<signalLength;++i) {
60        if (data[i]>maxValue)
61          maxValue = data[i];
62       }
63       baseThresh = maxValue*BASE_PERCENTILE;
64       printf("baseThresh = %3.3f\n",baseThresh);
65
66       /* Get the indices of the peaks taller than baseThresh */
67       finalCount = 0;
68       upState = TRUE;
69       for (i=0;i<signalLength;++i) {
70        thisRatio = data[i];
```

```
71        if (thisRatio < baseThresh)
72          thisRatio = 0;
73        if (upState) {
74         if (thisRatio < lastRatio) {
75             finalIndex[finalCount] = i;
76             finalCount++;
77             upState = FALSE;
78         }
79        }
80        else {
81         /* upState == FALSE */
82         if (thisRatio > lastRatio)
83             upState = TRUE;
84        }
85        lastRatio = thisRatio;
86        if (finalCount==MAX_PEAKS)
87          break;
88       }
89
90       /* Histogram the distances between adjacent peaks */
91       for (i=0;i<MAX_HIST_SIZE;h[i++]=0);
92       for (i=0;i<finalCount-1;++i) {
93        int d;
94        d = finalIndex[i+1]-finalIndex[i];
95        if (d<MAX_HIST_SIZE)
96          h[d]++;
97       }
98
99       /* Find the mode of the adjacent distances that is above MIN_MODE */
100       modeValue = h[MIN_MODE];
101       modeIndex = MIN_MODE;
102       for (i=MIN_MODE;i<MAX_HIST_SIZE;++i)
103        if (h[i]>modeValue) {
104          modeValue = h[i];
105          modeIndex = i;
106        }
107
108       /* Set the mask width to half of the most common spacing of largest peaks */
109       maskWidth = irint(modeIndex*0.80);
110       printf("maskWidth = %d.\n",maskWidth);
111
112       for (i=0;i<signalLength;newSignal[i++]=0);
113       for (i=0;i<signalLength-maskWidth;++i)
114        newSignal[MaxOnInterval(i,i+maskWidth)]++;
115
116       if ((outFP=fopen(outfile,"w"))==NULL)
117        DoError("Error opening file %s.\n",NULL);
118       for (i=0;i<signalLength;++i)
119        fprintf(outFP,"%d %d\n",i,newSignal[i]);
120       fclose(outFP);
121      }
122
123
124

Jun 19 21:22 1991  myWc.c

1      #include <stdio.h>
2      #include "boolean.h"
```

```
 3    #include "error.h"
 4
 5    typedef int State;
 6    #define WHITE_SPACE 0
 7    #define UNKNOWN_WORD 1
 8    #define ASCENDER_WORD 2
 9
10
11    #define MAX_STRING_LENGTH 200
12
13    BOOLEAN isWhite(char c)
14    {
15      return (c==' '||c=='\t'||c=='\0'||c=='\n');
16    }
17
18    BOOLEAN isAscender(char c)
19    {
20      return ((c=='b')||(c=='d')||(c=='f')||(c=='h')||(c=='i')||(c=='j')||(c=='k')||(c=='l')||
21         (c=='t')||((c>='A')&&(c<='Z'))||((c>='0')&&(c<='9'))||(c=='\'')||(c=='"'));
22    }
23
24    void main(int argc,char **argv)
25    {
26      char *filename;
27      FILE *fp;
28      char s[MAX_STRING_LENGTH+1];
29      char *ptr;
30      State state;
31      int wordsWithAscenders,wordsWithoutAscenders,words;
32
33      if (argc != 2) {
34        fprintf(stderr,"Usage:\n");
35        fprintf(stderr," %s <input file>\n");
36        exit(-1);
37      }
38
39      filename = argv[1];
40      if ((fp=fopen(filename,"r"))==NULL)
41        DoError("%s: cannot open input file.\n",filename);
42
43      wordsWithAscenders = 0;
44      wordsWithoutAscenders = 0;
45      words = 0;
46      fgets(s,MAX_STRING_LENGTH,fp);
47      while (!feof(fp)) {
48        ptr = s;
49        state = WHITE_SPACE;
50        while (*ptr != '\0') {
51          switch (state) {
52          case WHITE_SPACE:
53              if (isWhite(*ptr))
54                ++ptr;
55              else
56                state = UNKNOWN_WORD;
57            break;
58          case UNKNOWN_WORD:
59              if (isWhite(*ptr)) {
60                ++wordsWithoutAscenders;
61                ++words;
62                state = WHITE_SPACE;
63              }
```

```
64              if (isAscender(*ptr)) {
65                 ++wordsWithAscenders;
66                 ++words;
67                 ++ptr;
68                 state = ASCENDER_WORD;
69              }
70              else
71                 ++ptr;
72              break;
73           case ASCENDER_WORD:
74              if (isWhite(*ptr))
75                 state = WHITE_SPACE;
76              ++ptr;
77              break;
78           default:
79              DoError("myWc: internal error - bad state.\n",NULL);
80        } /* switch */
81     } /* while (*ptr ... */
82     fgets(s,MAX_STRING_LENGTH,fp);
83  } /* while (!eof ... */
84  printf("words: %d\n",words);
85  printf("words with ascenders: %d\n",wordsWithAscenders);
86  printf("words without ascenders: %d\n",wordsWithoutAscenders);
87  printf("word ascender/descender ratio: %6.2f\n",
88          (float)wordsWithAscenders/(float)wordsWithoutAscenders);
89  }
```

Aug 23 18:12 1991 newBaselines.c

```
1    #include <stdio.h>
2    #include <values.h>
3    #include <math.h>
4    #include "boolean.h"
5    #include "pict.h"
6    #include "types.h"
7    #include "lists.h"
8    #include "lines.h"
9    #include "baselines.h"
10
11   extern double sqrt(double);
12   extern int irint(double);
13
14   /*inline*/ int NewReadPixel(UCHAR *base,int width,float x,float y)
15   {
16     int xi;
17     int yi;
18     UCHAR mask;
19
20     xi = irint(x);
21     yi = irint(y);
22     mask = 0x80 >> (xi & 0x7);
23     return *(base+yi*width+(xi>>3)) & mask;
24   }
25
26   void NewCountLine1Bit(Picture pict,int x1,int y1,int x2,int y2,int *black,int *blackEdge)
27   {
28     float x,y;
29     float xinc,yinc;
30     float xupinc,yupinc;
```

```
31      float den;
32      int b,be;
33      int width,ucharWidth,height;
34      UCHAR *data;
35
36      width = pict->width;
37      ucharWidth = pict->uchar_width;
38      height = pict->height;
39      data = pict->data;
40
41      den = sqrt((y2-y1)*(y2-y1)+(x2-x1)*(x2-x1));
42      xinc = (x2-x1)/den;
43      yinc = (y2-y1)/den;
44      xupinc = -yinc;
45      yupinc = xinc;
46      x = x1;
47      y = y1;
48
49      b=0;
50      be=0;
51
52      while (x<width&&x>=0&&y<height&&y>=0) {
53        ++b;
54        if (NewReadPixel(data,ucharWidth,x,y)) {
55         if (!(NewReadPixel(data,ucharWidth,x+xupinc,y+yupinc) &&
56              NewReadPixel(data,ucharWidth,x-xupinc,y-yupinc)))
57           ++be;
58        }
59        x += xinc;
60        y += yinc;
61
62      }
63      *black = b;
64      *blackEdge = be;
65    }
66
67
68    #define MIN_BLACK 5
69    void NewCountLine(Picture pict,int x1,int y1,int x2,int y2,int *black,int *blackEdge)
70    {
71      *black = 0;
72      *blackEdge = 0;
73      NewCountLine1Bit(pict,x1,y1,x2,y2,black,blackEdge);
74      NewCountLine1Bit(pict,x1,y1,x1-(x2-x1),y1-(y2-y1),black,blackEdge);
75    }
76
77    static float x2offset;
78    static float y2offset;
79    static int projectIndex;
80    static int *blackPixels;
81    static int *blackEdgePixels;
82    static int *coordx;
83    static int *coordy;
84    BOOLEAN BaseLinePiston(Picture pict, int x, int y, BOOLEAN test, UCHAR color)
85    {
86      if (test) {
87        NewCountLine(pict,x,y,(int)(x+x2offset),(int)(y+y2offset),
88                  blackPixels+projectIndex,blackEdgePixels+projectIndex);
89        coordx[projectIndex] = x;
90        coordy[projectIndex++] = y;
91      return test;
```

```
92        } else
93          return test;
94        }
95
96      static int lastX;
97      static int lastY;
98      BOOLEAN EndPointPiston(Picture pict, int x, int y, BOOLEAN test, UCHAR color)
99      {
100       if (test) {
101         lastX = x;
102         lastY = y;
103       }
104       return test;
105     }
106
107     void EndPoints(Picture pict,double angle,int *tx, int *ty,int *bx, int *by)
108     {
109      int xc,yc;
110      int maxLength;
111      float normal;
112      float x2,y2,x3,y3;
113
114      /* Make normal to text point in quadrants I and II */
115      /* Assume 0 <= angle < 2*M_PI */
116      normal = fmod(angle + M_PI/2,2*M_PI);
117      if (normal > M_PI)
118        normal -= M_PI;
119
120      xc = pict->width/2;
121      yc = pict->height/2;
122
123      maxLength = pict->width+pict->height;
124      x2 = xc+maxLength*cos(normal);       /* At bottom of picture */
125      y2 = yc+maxLength*sin(normal);
126      x3 = xc-maxLength*cos(normal);       /* At top of picture */
127      y3 = yc-maxLength*sin(normal);
128
129      LineEngine(pict,xc,yc,(int)x2,(int)y2,0,EndPointPiston);
130      *bx = lastX;
131      *by = lastY;
132      LineEngine(pict,xc,yc,(int)x3,(int)y3,0,EndPointPiston);
133      *tx = lastX;
134      *ty = lastY;
135     }
136
137     double distance(int x1,int y1,int x2,int y2)
138     {
139      return sqrt((double)((x1-x2)*(x1-x2)+(y1-y2)*(y1-y2)));
140     }
141
142     FILE *PlotBaselineContour(char *plotFile,int topCount,
143                     float *ratios,int *newSignal,
144                     float baseThresh)
145     {
146      FILE *outfile;
147      int i;
148
149      printf("Opening baselines plot file\n");
150      if ((outfile = fopen(plotFile,"w"))==NULL) {
151       printf("Error opening baseline plot file.\n");
152       exit(-1);
```

```
153     }
154     for (i=0;i<topCount;++i)
155      fprintf(outfile,"%d %f\n",i,ratios[i]/baseThresh*5);
156     fprintf(outfile,"\"Ratio\n\n");
157     for (i=0;i<topCount;++i)
158      fprintf(outfile,"%d %d\n",i,newSignal[i]);
159     fprintf(outfile,"\"Projection\n\n");
160     fprintf(outfile,
161           "0 %f\n%d %f%\n\"Baseline Threshold\n",
162           baseThresh,topCount,baseThresh);
163     return outfile;
164    }
165
166    int MaxOnInterval(float *data,int start,int end)
167    {
168     int i;
169     float maxValue = data[start];
170     int maxIndex = start;
171     for (i=start;i<end;++i)
172      if (data[i]>maxValue) {
173        maxValue = data[i];
174        maxIndex = i;
175      }
176     return maxIndex;
177    }
178
179    #define BASE_PERCENTILE 0.50
180    #define MIN_LINE_HEIGHT_FRACTION 0.50
181    #define MIN_MODE (5) /* MIN_MODE must be less than MAX_HIST_SIZE */
182    #define MAX_HIST_SIZE (500)
183    #define MAX_BASELINES (300)
184    List BaseLines(Picture pict,double angle,char *plotFile)
185    {
186     float *topProjection;
187     int *topCoordx,*topCoordy;
188     int *finalCoordx,*finalCoordy,*finalIndex;
189     int topIndex,bottomIndex;
190     int topCount,botCount,finalCount;
191     int maxLength;
192     int xc,yc;
193     float x2,y2,x3,y3;
194     float maxValue,lastValue;
195     int i,j;
196     float baseThresh;
197     int topX,topY,bottomX,bottomY;
198     BOOLEAN onTextLine;
199     List xList,yList,result;
200     double totalDistance,averageDistance;
201     FILE *outfile;
202     int inside;
203     BOOLEAN upState;
204     float ratio,lastRatio,thisRatio;
205     float *ratios;
206     int *newSignal;
207     int halfMaskWidth = 10; /* for computing ratios */
208     int maxIndex,modeValue,modeIndex;
209     int h[MAX_HIST_SIZE];
210     int maskWidth; /* for max filter */
211
212     printf("angle = %3.3f\n",angle);
213
```

```
214    /* The longest ling though the picture will be shorter than maxLength */
215      maxLength = pict->width+pict->height;
216
217    /* Allocate space for the page projection values */
218      blackPixels = (int *)calloc(maxLength,sizeof(int));
219      blackEdgePixels = (int *)calloc(maxLength,sizeof(int));
220      ratios = (float *)calloc(maxLength,sizeof(float));
221      newSignal = (int *)calloc(maxLength,sizeof(int));
222      topCoordx = (int *)calloc(maxLength,sizeof(int));
223      topCoordy = (int *)calloc(maxLength,sizeof(int));
224      finalCoordx = (int *)calloc(maxLength,sizeof(int));
225      finalCoordy = (int *)calloc(maxLength,sizeof(int));
226      finalIndex = (int *)calloc(maxLength,sizeof(int));
227
228      if ((blackPixels = = NULL)||
229        (blackEdgePixels = = NULL)||
230        (ratios = = NULL)||
231        (newSignal= =NULL)||
232        (topCoordx = = NULL)||
233        (topCoordy = = NULL)||
234        (finalIndex = = NULL) ||
235        (finalCoordx = = NULL) ||
236        (finalCoordy = = NULL)) {
237      printf("BaseLines: cannot allocate memory\n");
238      exit(-1);
239      }
240
241    /* Compute the endpoints of a line through the center of the picture in the direction
242      * perpendicular to the text lines. This line will be used as the reference frame for
243      * computing projections. */
244      EndPoints(pict,angle,&topX,&topY,&bottomX,&bottomY);
245
246      printf("Main Line: (%d,%d)-(%d,%d)\n",topX,topY,bottomX,bottomY);
247    /* DrawLine(pict,topX,topY,bottomX,bottomY,0xff); */
248
249    /* Compute the projection of the image at each point along the line.
250      * topProjection will have the number of black pixels on a line and
251      * ratios will have the fraction of black pixels on a line that are
252      * the ends of vertical extents. */
253      x2offset = maxLength*cos(angle);
254      y2offset = maxLength*sin(angle);
255      projectIndex = 0;
256      coordx = topCoordx;
257      coordy = topCoordy;
258      LineEngine(pict,topX,topY,bottomX,bottomY,0,BaseLinePiston);
259      topCount = projectIndex;
260
261    /* Compute the ratios plot */
262      for (i=0;i<halfMaskWidth;++i)
263        ratios[i] = 0;
264      for (i=topCount-halfMaskWidth;i<topCount;++i)
265        ratios[i] = 0;
266      for (i=0,inside=0;i<halfMaskWidth*2+1;++i)
267        inside + = blackPixels[i];
268      for (i=halfMaskWidth;i<topCount-halfMaskWidth;++i) {
269        ratios[i] = (float)blackEdgePixels[i]/inside;
270        inside -= blackPixels[i-halfMaskWidth];
271        inside + = blackPixels[i+halfMaskWidth];
272      }
273
274    /* Compute the threhold for the black edge to black pixel ratio */
```

```
275      maxValue = ratios[0];
276      for (i=0;i<topCount;++i) {
277       if (ratios[i]>maxValue)
278         maxValue = ratios[i];
279      }
280
281      baseThresh = maxValue*BASE_PERCENTILE;
282      printf("baseThresh = %3.3f\n",baseThresh);
283
284      /* Get the coordinates of the baselines and toplines by finding peaks in the
285       * ratios projection. */
286      finalCount = 0;
287      upState = TRUE;
288      for (i=0;i<topCount;++i) {
289       thisRatio = ratios[i];
290       if (thisRatio < baseThresh)
291         thisRatio = 0;
292       if (upState) {
293        if (thisRatio < lastRatio) {
294             finalIndex[finalCount] = i;
295             finalCount++;
296             upState = FALSE;
297        }
298       }
299       else {
300        /* upState == FALSE */
301        if (thisRatio > lastRatio)
302             upState = TRUE;
303       }
304       lastRatio = thisRatio;
305       if (finalCount == MAX_BASELINES) {
306        fprintf(stderr,"Warning: found too many baselines.\n");
307        fprintf(stderr,"Ignoring remaining baselines.\n");
308        break;
309       }
310      }
311
312      /* Histogram the distances between adjacent peaks */
313      for (i=0;i<MAX_HIST_SIZE;h[i++]=0);
314      for (i=0;i<finalCount-1;++i) {
315       int d;
316       d = finalIndex[i+1]-finalIndex[i];
317       if (d<MAX_HIST_SIZE)
318        h[d]++;
319      }
320
321      /* Find the mode of the adjacent distances that is above MIN_MODE */
322      modeValue = h[MIN_MODE];
323      modeIndex = MIN_MODE;
324      for (i=MIN_MODE;i<MAX_HIST_SIZE;++i)
325       if (h[i]>modeValue) {
326        modeValue = h[i];
327        modeIndex = i;
328       }
329
330      /* Set the mask width to half of the most common spacing of largest peaks */
331      maskWidth = irint(modeIndex*0.80);
332      printf("maskWidth = %d.\n",maskWidth);
333
334      for (i=0;i<topCount;newSignal[i++]=0);
335      for (i=0;i<topCount-maskWidth;++i)
```

```
336        newSignal[MaxOnInterval(ratios,i,i+maskWidth)]++;
337
338      /* Plot the baseline contour if requested */
339       if (plotFile!=NULL)
340         outfile = PlotBaselineContour(plotFile,topCount,ratios,newSignal,baseThresh);
341
342      /* Pick off the new peaks */
343      /* Compute the threhold for the black edge to black pixel ratio */
344       maxValue = newSignal[0];
345       for (i=0;i<topCount;++i) {
346        if (newSignal[i]>maxValue)
347          maxValue = newSignal[i];
348       }
349
350       baseThresh = maxValue*0.80;
351       printf("baseThresh = %3.3f\n",baseThresh);
352
353      /* Get the coordinates of the baselines and toplines by finding peaks in the
354       * ratios projection. */
355       finalCount = 0;
356       upState = TRUE;
357       for (i=0;i<topCount;++i) {
358        thisRatio = newSignal[i];
359        if (thisRatio < baseThresh)
360          thisRatio = 0;
361        if (upState) {
362         if (thisRatio < lastRatio) {
363            finalCoordx[finalCount] = topCoordx[i];
364            finalCoordy[finalCount] = topCoordy[i];
365            finalIndex[finalCount] = i;
366            finalCount++;
367            upState = FALSE;
368         }
369        }
370        else {
371         /* upState == FALSE */
372         if (thisRatio > lastRatio)
373            upState = TRUE;
374        }
375        lastRatio = thisRatio;
376        if (finalCount == MAX_BASELINES) {
377          fprintf(stderr,"Warning: found too many baselines.\n");
378          fprintf(stderr,"Ignoring remaining baselines.\n");
379          break;
380        }
381       }
382
383
384     /* ------------------------------------------------------------ */
385
386      if (finalCount&1)
387        --finalCount;          /* Only take an even number of lines */
388      for (totalDistance=0,i=0,j=0;i<finalCount;i+=2) {
389       topX = finalCoordx[i];
390       topY = finalCoordy[i];
391       bottomX = finalCoordx[i+1];
392       bottomY = finalCoordy[i+1];
393       totalDistance += distance(topX,topY,bottomX,bottomY);
394       j+=2;
395      }
396      averageDistance = totalDistance / (finalCount/2)*MIN_LINE_HEIGHT_FRACTION;
```

```
397      for (i=0,j=0;i<finalCount;i+=2) {
398        topX = finalCoordx[i];
399        topY = finalCoordy[i];
400        topIndex = finalIndex[i];
401        bottomX = finalCoordx[i+1];
402        bottomY = finalCoordy[i+1];
403        bottomIndex = finalIndex[i+1];
404        finalCoordx[j] = topX;
405        finalCoordy[j] = topY;
406        finalIndex[j] = topIndex;
407        finalCoordx[j+1] = bottomX;
408        finalCoordy[j+1] = bottomY;
409        finalIndex[j+1] = bottomIndex;
410        if (distance(topX,topY,bottomX,bottomY)>averageDistance)
411          j+=2;
412      }
413    #ifdef foo
414      *count = j;
415      *returnCoordx = finalCoordx;
416      *returnCoordy = finalCoordy;
417    #endif
418      result = nil;
419      for (i=j-1;i>=0;--i) {
420        push(MakePoint(finalCoordx[i],finalCoordy[i]),result);
421      }
422
423      if (plotFile != NULL) {
424        fprintf(outfile,"\n0 %f\n",-baseThresh);
425        for (i=0;i<j;i+=2) {
426          fprintf(outfile,"%d %f\n%d %f\n%d %f\n%d %f\n",
427                  finalIndex[i],-baseThresh,
428                  finalIndex[i],-2*baseThresh,
429                  finalIndex[i+1],-2*baseThresh,
430                  finalIndex[i+1],-baseThresh);
431        }
432        fprintf(outfile,"\"Baselines");
433        fclose(outfile);
434        printf("Done writing baseline plot file.\n");
435      }
436
437      return result;
438    }
439
440    void DrawBaseLines(Picture pict, List pointList, double angle)
441    #ifdef foo
442    int count,int *coordx,int *coordy,double angle)
443    #endif
444    {
445      int maxLength;
446      float x2,y2,x3,y3;
447      int x,y;
448      Point temp;
449      maxLength = pict->width+pict->height;
450      while (!endp(pointList)) {
451        temp = pop(pointList);
452        x = temp->x;
453        y = temp->y;
454        x2 = x+maxLength*cos(angle);
455        y2 = y+maxLength*sin(angle);
456        x3 = x-maxLength*cos(angle);
457        y3 = y-maxLength*sin(angle);
```

```
458        DrawLine(pict,x,y,(int)x2,(int)y2,0xff);
459        DrawLine(pict,x,y,(int)x3,(int)y3,0xff);
460       }
461     }
```

Aug 25 19:48 1991 newBlobify.c

```
1     #include <stdio.h>
2     #include <math.h>
3     #include "mylib.h"
4     #include "blobify.h"
5
6
7     #define MAX_KERNAL_SIZE (40)
8
9     extern int irint(double);
10
11    static UCHAR bitmasks[] = {0x80,0x40,0x20,0x10,0x8,0x4,0x2,0x1};
12
13    UCHAR *address(Picture pict,float x,float y)
14    {
15      return pict->data+irint(y)*pict->uchar_width+(irint(x)>>3);
16    }
17
18    UCHAR mask(float x)
19    {
20      static masks[] = { 0x80,0x40,0x20,0x10,8,4,2,1};
21      return masks[irint(x)%8];
22    }
23
24    int X(float x)
25    {
26      return irint(x);
27    }
28
29    int Y(float y)
30    {
31      return irint(y);
32    }
33
34    Picture NewBlobify(Picture old,int halfMaskWidth,double threshold,double angle)
35    {
36      Picture new;
37
38      int index;
39      float x,y,xinc,yinc;
40      UCHAR *kernalPtr[MAX_KERNAL_SIZE],*kp[MAX_KERNAL_SIZE];
41      UCHAR kernalMask[MAX_KERNAL_SIZE],km[MAX_KERNAL_SIZE];
42      int kernalX[MAX_KERNAL_SIZE],kernalY[MAX_KERNAL_SIZE];
43      int kx[MAX_KERNAL_SIZE],ky[MAX_KERNAL_SIZE];
44      UCHAR kb[MAX_KERNAL_SIZE];
45      UCHAR *dest;
46      UCHAR dm;
47      int tval,i,j,k,inside;
48      int width,height,ucharWidth,maskWidth;
49
50      if (halfMaskWidth*2+1 > MAX_KERNAL_SIZE)
51        DoError("Blobify: mask is too large.\n",NULL);
52
```

```
53      tval = irint(threshold*(halfMaskWidth*2+1));
54
55      width = old->width;
56      height = old->height;
57      ucharWidth = old->uchar_width;
58
59      new = new_pict(width,height,1);
60
61      xinc = cos(angle);
62      yinc = sin(angle);
63      index = 0;
64      kernalPtr[index] = address(old,halfMaskWidth,halfMaskWidth);
65    /*
66      kernalX[index] = X(halfMaskWidth);
67      kernalY[index] = Y(halfMaskWidth);
68    */
69      kernalMask[index++] = mask(halfMaskWidth);
70      for (i=0,x=0,y=0;i<halfMaskWidth;++i) {
71       x+ =xinc;
72       y+ =yinc;
73       kernalPtr[index] = address(old,halfMaskWidth+x,halfMaskWidth+y);
74    /*
75       kernalX[index] = X(halfMaskWidth+x);
76       kernalY[index] = Y(halfMaskWidth+y);
77    */
78       kernalMask[index++] = mask(halfMaskWidth+x);
79       kernalPtr[index] = address(old,halfMaskWidth-x,halfMaskWidth-y);
80    /*
81       kernalX[index] = X(halfMaskWidth-x);
82       kernalY[index] = Y(halfMaskWidth-y);
83    */
84       kernalMask[index++] = mask(halfMaskWidth-x);
85      }
86
87      maskWidth = 2*halfMaskWidth+1;
88
89      for (j=0;j<height-maskWidth;++j) {
90       for (i=0;i<index;++i) {
91        kp[i] = kernalPtr[i]+j*ucharWidth;
92        km[i] = kernalMask[i];
93        kb[i] = *kp[i]++;
94    /*
95        kx[i] = kernalX[i];
96        ky[i] = kernalY[i]+j;
97    */
98       }
99       dest = new->data+(j+halfMaskWidth)*ucharWidth+(halfMaskWidth>>3);
100      dm = mask(halfMaskWidth);
101
102      for (k=0;k<width-maskWidth;++k) {
103       if (dm == 0) {
104          dm = 0x80;
105          dest++;
106       }
107       for (i=0,inside=0;i<index;++i) {
108          if (km[i] == 0) {
109            km[i] = 0x80;
110            kb[i] = *kp[i]++;
111          }
112    /*
113            printf("(%d,%d): %d - %x %x -> %x\n",kx[i],ky[i],kb[i]&km[i],kp[i]-1,km[i],kb[i]);
```

```
114              kx[i]++;
115       */
116              if (kb[i]&km[i])
117                ++inside;
118              km[i] >>= 1;
119           }
120       /*
121          printf("%d\n\n",inside);
122       */
123          if (inside > tval)
124              *dest |= dm;
125          dm >>= 1;
126        }
127
128      }
129
130      return new;
131
132    }
133
134    #ifdef TRYMAIN
135    void main(argc,argv)
136    int argc;
137    char **argv;
138    {
139     char *infile,*outfile;
140     Picture old,new;
141     int halfMaskSize;
142     float threshold;
143     float angle;
144
145     DefArg("%s %s %d %f %f","infile outfile halfMaskSize threshold angle",
146            &infile,&outfile,&halfMaskSize,&threshold,&angle);
147     ScanArgs(argc,argv);
148
149     printf("Loading %s...",infile);
150     old = load_pict(infile);
151     new = NewBlobify(old,halfMaskSize,threshold,angle);
152     write_pict(outfile,new);
153    }
154    #endif
```

Aug 15 06:41 1991  newContour.c

```
1     #include <stdio.h>
2     #include <values.h>
3     #include <math.h>
4     #include "boolean.h"
5     #include "types.h"
6     #include "pict.h"
7     #include "lines.h"
8     #include "lists.h"
9     #include "dict.h"
10    #include "diff.h"
11    #include "fontNorm.h"
12
13    extern Picture thePict; /* Picture used for annotated shapes */
14
15    /* The following are misc. definitionas and routines havine to do with
```

```
16        * vectors and coordinates. */
17
18        typedef struct {
19        double x;
20        double y;
21        } DPointBody,*DPoint;
22
23
24        static double Dot(DPoint a,DPoint b)
25        {
26        /* printf("Dot: (%lf,%lf)*(%lf,%lf) = %lf\n",a->x,a->y,b->x,b->y,a->x*b->x +
          a->y*b->y); */
27          return a->x*b->x + a->y*b->y;
28        }
29
30        static DPoint PolarToCartesian(double angle,double radius)
31        {
32          DPoint result = (DPoint)calloc(1,sizeof(DPointBody));
33          if (result = = NULL)
34            DoError("Dot: cannot allocate space\n");
35          result->x = cos(angle);
36          result->y = sin(angle);
37          return result;
38        }
39
40        static DPoint Normal(DPoint a)
41        {
42          DPoint result = (DPoint)calloc(1,sizeof(DPointBody));
43          if (result = = NULL)
44            DoError("Dot: cannot allocate space\n");
45          result->x = -a->y;
46          result->y = a->x;
47          return result;
48        }
49
50
51
52        /* This piston scans pict up and down from the top and bottom of the
53         * bounding box, looking for the highest and lowest pixels in the
54         * word. If thePict is not NULL, these pixels will be colored as 4
55         * in thePict. */
56        static int startX;
57        static int startY;
58        static double stopDistance;
59        static int lastY;
60        static BOOLEAN valid;
61        BOOLEAN TracePiston(Picture pict, int x, int y, BOOLEAN test, UCHAR color)
62        {
63          double distance;
64          if (test) {
65            distance = sqrt((double)(startX-x)*(startX-x)+(startY-y)*(startY-y));
66            if (distance<stopDistance) {
67        /*    lastY = stopDistance - distance; */
68            lastY = distance;
69
70            if (ReadPixel(pict,x,y)) {
71
72              if (thePict)
73                WritePixel(thePict,x,y,4);
74
75              valid = TRUE;
```

```
76            return FALSE;
77         } else {
78            valid = FALSE;
79            return test;
80         }
81       }
82       else {
83        if (thePict)
84            WritePixel(thePict,x,y,4);
85   #ifdef foo
86        lastY = distance; /**** Used to be 0 ****/
87   #endif
88        lastY = HIT_THE_BOX;
89        valid = FALSE;
90        return FALSE;
91       }
92     }
93     return test;
94   }
95
96
97   /* This piston moves from left to right across a bounding box, calling
98    * trace piston and saving its output in topY, baseY, and bothX. */
99   #define MAX_SHELL_LENGTH 400
100  static int numberOfLegs;
101  static int topY[MAX_SHELL_LENGTH];
102  static int baseY[MAX_SHELL_LENGTH];
103  static int bothX[MAX_SHELL_LENGTH];
104
105  static double leftDistance;
106  static DPoint lineVector;
107  static int downX;
108  static int downY;
109  static double boxTopDistance;
110  static double boxBaseDistance;
111  BOOLEAN ShellPiston(Picture pict, int x, int y, BOOLEAN test, UCHAR color)
112  {
113    int xDistance;
114    DPointBody thisPoint;
115    if (test) {
116     if (numberOfLegs >= MAX_SHELL_LENGTH)
117       return FALSE;
118     thisPoint.x = x;
119     thisPoint.y = y;
120     xDistance = Dot(&thisPoint,lineVector) - leftDistance;
121     stopDistance = boxTopDistance;
122     startX = x;
123     startY = y;
124     LineEngine(pict,x,y,x+downX,y+downY,0,TracePiston);
125     bothX[numberOfLegs] = xDistance;
126     if (valid)
127       topY[numberOfLegs] = lastY;
128     else
129       topY[numberOfLegs] = HIT_THE_BOX;
130
131     stopDistance = boxBaseDistance;
132     startX = x+downX;
133     startY = y+downY;
134     LineEngine(pict,x+downX,y+downY,x,y,0,TracePiston);
135     if (valid)
136       baseY[numberOfLegs] = lastY;
```

```
137      else
138        baseY[numberOfLegs] = HIT_THE_BOX;
139      numberOfLegs++;
140
141    }
142    return test;
143  }
144
145  /* This function, finds the upper and lower contours corresponding
146   * to a word within a bounding box. */
147  void MakeShell(Picture pict,Box box,
148                Dictionary dict, int dictEntry)
149  {
150    DPoint normalVector;
151    DPointBody temp;
152    double boxTop,boxBase;
153    int rightX,rightY;
154
155    lineVector = PolarToCartesian(box->angle,1);
156    normalVector = Normal(lineVector);
157    temp.x = box->x;
158    temp.y = box->y;
159    boxTop = Dot(&temp,normalVector);
160    box->pageY = irint(boxTop);
161    boxBase = boxTop + box->height;
162
163
164  /* CHANGE CHANGE CHANGE CHANGE CHANGE CHANGE CHANGE CHANGE CHANGE */
165    boxTopDistance = boxBase - boxTop;
166    boxBaseDistance = boxBase - boxTop;
167  /* CHANGE CHANGE CHANGE CHANGE CHANGE CHANGE CHANGE CHANGE CHANGE */
168
169    downX = box->height*cos(box->angle+M_PI/2);
170    downY = box->height*sin(box->angle+M_PI/2);
171
172    rightX = box->width*cos(box->angle);
173    rightY = box->width*sin(box->angle);
174
175    numberOfLegs = 0;
176    leftDistance = Dot(&temp,lineVector);
177    box->pageX = irint(leftDistance);
178  #ifdef foo
179    malloc_verify();
180  #endif
181    LineEngine(pict,box->x,box->y,
182            box->x+rightX,box->y+rightY,0,
183            ShellPiston);
184
185  /* CHANGE CHANGE CHANGE CHANGE CHANGE CHANGE CHANGE CHANGE CHANGE */
186    {
187      int i;
188      for (i=0;i<numberOfLegs;++i) {
189        if (*(topY+i)!=HIT_THE_BOX)
190          *(topY+i) += boxTop;
191        if (*(baseY+i)!=HIT_THE_BOX)
192          *(baseY+i) = boxBase - *(baseY+i);
193      }
194    }
195  /* CHANGE CHANGE CHANGE CHANGE CHANGE CHANGE CHANGE CHANGE CHANGE */
196
197  #ifdef foo
```

```
198        malloc_verify();
199    #endif
200        StoreRawOutlinePair(dict,dictEntry,box,bothX,topY,
201                    baseY,numberOfLegs);
202    }
203
204    BOOLEAN OnABaseLine(Box box,List baseLinePoints)
205    {
206      DPoint lineVector,normalVector;
207      DPointBody temp;
208      double boxTop,boxBase,top,base;
209      Point topPoint, basePoint;
210
211      lineVector = PolarToCartesian(box->angle,1);
212      normalVector = Normal(lineVector);
213      temp.x = box->x;
214      temp.y = box->y;
215      boxTop = Dot(normalVector,&temp);
216      boxBase = boxTop+box->height;
217
218      while (!endp(baseLinePoints)) {
219        topPoint = pop(baseLinePoints);
220        basePoint = pop(baseLinePoints);
221        temp.x = topPoint->x;
222        temp.y = topPoint->y;
223        top = Dot(normalVector,&temp);
224        temp.x = basePoint->x;
225        temp.y = basePoint->y;
226        base = Dot(normalVector,&temp);
227
228        if ((boxTop>=top && boxTop <= base) ||   /* box top is between */
229            (boxBase>=top && boxBase <= base) || /* box bottom is between */
230            (top >= boxTop && top <= boxBase))   /* both lines inside box */
231          return TRUE;
232      }
233      return FALSE;
234    }
235
236    BOOLEAN BoxToShell(Picture pict,Box box,List baseLinePoints,
237                    Dictionary dict,int dictEntry)
238    {
239      Point topPoint,bottomPoint;
240
241      if (OnABaseLine(box,baseLinePoints)) {
242        MakeShell(pict,box,dict,dictEntry);
243        return TRUE;
244      }
245      else
246        return FALSE;
247    }
248
249    #define MAX_SHAPES 1000
250    void BarBoxList(Picture pict,List boxList,List baseLinePoints,
251                    char *filename,char *infoString, NormalizationDescriptor *nd)
252    {
253      Dictionary dict;
254      int count = 0;
255      long int location;
256
257      dict = NewDict(MAX_SHAPES);
258      dict->infoString = infoString;
```

```
259
260      while (!endp(boxList)) {
261      #ifdef foo
262        if (BoxToShell(pict,
263                       (Box)pop(boxList),
264                       baseLinePoints,
265                       dict,
266                       count))
267          ++count;
268      #endif
269      /* Change 8/8/91
270       * All boxes are stored in the dictionary.
271       * The post processing stage in newFontNorm.c will weed out boxes */
272        MakeShell(pict,(Box)pop(boxList),dict,count);
273        ++count;
274      /* End of change 8/8/91 */
275        if (count>=MAX_SHAPES) {
276          printf("Maximum dictionary size exceeded.\n");
277          printf("Ignoring rest of shapes.\n");
278          break;
279        }
280      }
281      dict->numberOfEntries = count;
282      PageStatistics(dict,"statistics",nd);
283      /* PostProcess(dict); */
284      WriteDictionary(dict,filename);
285    }
286
```

Jan 11 17:07 1991 newDiff2.c

```
1      #include <stdio.h>
2      #include "boolean.h"
3      #include "types.h"
4      #include "error.h"
5      #include "pict.h"
6      #include "dict.h"
7      #include "diff.h"
8
9      /* Given the names of two dictionary files, compute the squared difference
10      * between every pair of shapes in the cross product of the dictionaries.
11      * The result is a matrix printed to stdout.  The width and height are
12      * followed by the matrix entries in row major order.  The output is in
13      * ascii to facilitate reading by a Symbolics. */
14     Picture CompareDictionaries(char *file1,char *file2)
15     {
16       Dictionary dict1,dict2;
17       Picture pict;
18       int x,y;
19       dict1 = ReadDictionary(file1); /* height */
20       dict2 = ReadDictionary(file2); /* width */
21       pict = new_pict(dict2->numberOfEntries,
22                       dict1->numberOfEntries,
23                       32);
24       for (y=0;y<pict->height;++y)
25         for (x=0;x<pict->width;++x) {
26           printf("(%d,%d) ",y,x);
27           *((float *)(pict->data)+pict->width*y+x) =
28              DiffPair(*(dict1->outlines+y),
```

```
29                   *(dict2->outlines+x));
30       }
31     return pict;
32   }
33
34   void WritePictureAsAscii(Picture pict,char *filename)
35   {
36     FILE *fp;
37     int x,y;
38     int count=1;
39     if ((fp = fopen(filename,"w"))==NULL)
40       DoError("WritePictureAsAscii: error opening output file\n",NULL);
41     fprintf(fp,"%d\n%d\n",pict->width,pict->height);
42     for (y=0;y<pict->height;++y)
43      for (x=0;x<pict->width;++x) {
44       fprintf(fp,"%f ",*(((float *)pict->data)++));
45       if (!((count++)%5))
46           fprintf(fp,"\n");
47      }
48     fprintf(fp,"\n");
49     fclose(fp);
50   }
```

Aug 26 17:20 1991 newMain.c

```
1      #include <stdio.h>
2      #include <values.h>
3      #include <math.h>
4      #include "misc.h"
5      #include "boolean.h"
6      #include "error.h"
7      #include "types.h"
8      #include "pict.h"
9      #include "lists.h"
10     #include "lines.h"
11     #include "orient.h"
12     #include "baselines.h"
13     #include "blobify.h"
14     #include "boxes.h"
15     #include "dict.h"
16     #include "diff.h"
17     #include "newContour.h"
18     #include "numbers.h"
19
20     #define TRY
21     #ifdef TRY
22     Picture thePict;
23     #endif
24
25     void DrawMiddleLines(Picture pict,List pointList, double angle)
26     {
27       int maxLength;
28       int xc,yc,xBot,xTop,yBot,yTop;
29       Point temp;
30       float x2,y2,x3,y3;
31       int i,len;
32       maxLength = pict->width+pict->height;
33       len = ListLength(pointList);
34       pop(pointList);
```

```
35        for (i=1;i<len-1;i+=2) {
36          temp = pop(pointList);
37          xTop = temp->x;
38          yTop = temp->y;
39          temp = pop(pointList);
40          xBot = temp->x;
41          yBot = temp->y;
42          xc = (xBot+xTop)/2;
43          yc = (yBot+yTop)/2;
44          x2 = xc+maxLength*cos(angle);
45          y2 = yc+maxLength*sin(angle);
46          x3 = xc-maxLength*cos(angle);
47          y3 = yc-maxLength*sin(angle);
48          DrawLine(pict,xc,yc,(int)x2,(int)y2,0);
49          DrawLine(pict,xc,yc,(int)x3,(int)y3,0);
50        }
51      }
52
53      void DrawBoxList(Picture pict,List boxList)
54      {
55        while (!endp(boxList)) {
56          DrawBox(pict,(Box)pop(boxList));
57        }
58      }
59
60      void LabelShapes(Picture pict,Dictionary dict)
61      {
62        int i;
63        Box box;
64
65        for (i=0;i<dict->numberOfEntries;++i) {
66          box = (*(dict->outlines+i))->box;
67          DrawColorBox(pict,box,3);
68          DrawNumber(pict,box->x,box->y,2,(float)box->height/2,i);
69        }
70      }
71
72      double FixAngle(double angle)
73      {
74        if (angle > M_PI/2 && angle < 1.5*M_PI)
75          return angle-M_PI;
76        else
77          return angle;
78      }
79
80      int ScanIntArg(int argc,char **argv,int index)
81      {
82        if (index<argc)
83          return atoi(argv[index]);
84        else
85          DoError("Expected an integer argument\n",NULL);
86      }
87
88      float ScanFloatArg(int argc,char **argv,int index)
89      {
90        if (index<argc)
91          return atof(argv[index]);
92        else
93          DoError("Expected a floating point argument\n",NULL);
94      }
95
```

```
96   char *ScanStringArg(int argc,char **argv,int index)
97   {
98    if (index<argc)
99      return argv[index];
100   else
101     DoError("Expected a string argument\n",NULL);
102  }
103
104  void main(argc,argv)
105  int argc;
106  char **argv;
107  {
108   char *infile;
109   int coarseDirections,coarseSamples,fineDirections,fineSamples;
110   Picture pict,newPict,finalPict;
111   float coarseAngle,mediumAngle,fineAngle;
112   float coarseError,mediumError,fineError;
113   List baselines,boxList;
114   int maskWidth;
115   float blobThreshold;
116   int i;
117   char *shapesFile, *drawBaselinesFile;
118   char *drawBoxesFile,*plotFile,*plotOrientFile;
119   char *drawColorBoxesFile,*drawBlobsFile;
120   char *flag;
121   BOOLEAN doOrientation,doBaselines,doBoxes,doShapes,drawBaselines,drawBoxes;
122   BOOLEAN plotBaselines,plotOrientation,drawColorBoxes,drawBlobs;
123   BOOLEAN
     noXHeightNorm,noAscenderNorm,dontOrientation,doBlobThreshold,doMaskWidth;
124   NormalizationDescriptor nd;
125
126   DefArg("%s","infile",&infile);
127   DefOption("-orientation %f","-orientation (page orientation in radians)",
128           &dontOrientation,&fineAngle);
129   DefOption("-findOrientation","-findOrientation",&doOrientation);
130   DefOption("-plotOrientation %s","-plotOrientation (file top plot xgraph format image
         to)",
131           &plotOrientation,&plotOrientFile);
132   DefOption("-maskWidth %d","-maskWidth (integer half mask width)",
133           &doMaskWidth,&maskWidth);
134   DefOption("-blobThreshold %f","-blobThreshold (float on/off threshold)",
135           &doBlobThreshold,&blobThreshold);
136   DefOption("-drawBlobs %s","-drawBlobs (file to output image
         to)",&drawBlobs,&drawBlobsFile);
137   DefOption("-drawBaselines %s","-drawBaselines (file to output image
         to)",&drawBaselines,
138           &drawBaselinesFile);
139   DefOption("-plotBaselines %s","-plotBaselines (file to plot xgrapgh format baselines to)",
140           &plotBaselines,&plotFile);
141   DefOption("-drawBoxes %s","-drawBoxes (file to output image
         to)",&drawBoxes,&drawBoxesFile);
142   DefOption("-shapeFunctions %s","-shapeFunctions (file to output shape functions to)",
143           &doShapes,&shapesFile);
144   DefOption("-annotatedShapes %s","-annotatedShapes (file to output image to)",
145           &drawColorBoxes,&drawColorBoxesFile);
146   DefOption("-noAscenderNorm","-noAscenderNorm",&noAscenderNorm);
147   DefOption("-noXHeightNorm","-noXHeightNorm",&noXHeightNorm);
148
149   i = 2;
150   coarseDirections = 72;
151   coarseSamples = 400;
```

```
152         fineDirections = 40;
153         fineSamples = 10;
154         maskWidth = 3;
155         blobThreshold = 0.01;
156
157         ScanArgs(argc,argv);
158         if (dontOrientation)
159          doOrientation = FALSE;
160
161         nd.noXHeightNormalize = noXHeightNorm;
162         nd.noAscenderNormalize = noAscenderNorm;
163
164         printf("Loading %s...\n",infile);
165         pict = load_pict(infile);
166         if (pict->depth != 1)
167          DoError("error: only depth 1 is supported\n",NULL);
168
169         if (drawBaselines || drawBoxes)
170          finalPict = new_pict(pict->width,pict->height,pict->depth);
171
172         if (doOrientation) {
173     #define NUMBER_OF_ANGLES 180
174     #define SAMPLES_PER_ANGLE 10
175     #define BIN_ERROR 4
176         printf("Finding coarse orientation.\n");
177         coarseAngle = NewFine(pict,SAMPLES_PER_ANGLE,NUMBER_OF_ANGLES,
178                        0,M_PI,NULL);
179         coarseError = (M_PI-0)/NUMBER_OF_ANGLES;
180         printf("Coarse angle: %f(%f)\n",coarseAngle,coarseAngle/M_PI*180);
181         printf("Coarse error: %f(%f)\n",coarseError,coarseError/M_PI*180);
182
183         mediumAngle = NewFine(pict,SAMPLES_PER_ANGLE,NUMBER_OF_ANGLES,
184                         coarseAngle-BIN_ERROR*coarseError,
185                         coarseAngle+BIN_ERROR*coarseError,
186                         NULL);
187         mediumError = 2*BIN_ERROR*coarseError/NUMBER_OF_ANGLES;
188         printf("Medium angle: %f(%f)\n",mediumAngle,mediumAngle/M_PI*180);
189         printf("Medium error: %f(%f)\n",mediumError,mediumError/M_PI*180);
190
191
192         fineAngle = NewFine(pict,SAMPLES_PER_ANGLE,NUMBER_OF_ANGLES,
193                       mediumAngle-15*mediumError,mediumAngle+15*mediumError,
194                       plot_ientFile);
195         fineError = 30*mediumError/NUMBER_OF_ANGLES;
196         fineAngle = FixAngle(fineAngle);
197         printf("Fine angle: %f(%f)\n",fineAngle,fineAngle/M_PI*180);
198         printf("Fine error: %f(%f)\n",fineError,fineError/M_PI*180);
199        }
200
201         printf("Adjusted angle: %lf\n",fineAngle);
202
203     #ifdef foo
204         printf("Finding baselines\n");
205         baselines = BaseLines(pict,fineAngle,plotBaselines?plotFile:NULL);
206
207         if (drawBaselines) {
208          CopyPicture(finalPict,pict);
209          DrawBaseLines(finalPict,baselines,fineAngle);
210          write_pict(drawBaselinesFile,finalPict);
211         }
212
```

```
213      printf("Blobifying\n");
214      newPict = Blobify(pict,maskWidth,blobThreshold);
215    #endif
216      printf("NewBlobify\n");
217      /* newPict = NewBlobify(pict,maskWidth,blobThreshold,fineAngle); */
218      newPict = Blobify(pict,maskWidth,blobThreshold);
219      printf("Finding baselines\n");
220      baselines = BaseLines(newPict,fineAngle,plotBaselines?plotFile:NULL);
221      if (drawBaselines) {
222        CopyPicture(finalPict,pict);
223        DrawBaseLines(finalPict,baselines,fineAngle);
224        write_pict(drawBaselinesFile,finalPict);
225      }
226
227
228      DrawMiddleLines(newPict,baselines,fineAngle);
229      if (drawBlobs)
230        write_pict(drawBlobsFile,newPict);
231      printf("Finding boxes\n");
232      boxList = FindBorders(newPict,fineAngle);
233
234      if (drawBoxes) {
235        CopyPicture(finalPict,pict);
236        DrawBoxList(finalPict,boxList);
237        write_pict(drawBoxesFile,finalPict);
238      }
239
240      if (doShapes) {
241        ColorMap cmap;
242        int x,y;
243
244        if (drawColorBoxes) {
245          thePict = new_pict(pict->width,pict->height,8);
246          cmap = NewColorMap(6);  /* black, white, and 16 colors */
247          WriteColorValue(cmap,0,0,128,0);    /* Olive */
248          WriteColorValue(cmap,1,0,0,0);      /* Black */
249          WriteColorValue(cmap,2,255,255,255);, /* White */
250          WriteColorValue(cmap,3,0,0,255);    /* Blue */
251          WriteColorValue(cmap,4,255,255,80); /* Yellow */
252          WriteColorValue(cmap,5,128,0,0);    /* Blood */
253          thePict->cmap = cmap;
254          for (y=0;y<pict->height;++y)
255            for (x=0;x<pict->width;++x)
256              WritePixel(thePict,x,y,ReadPixel(pict,x,y)?0:1);
257        }
258        else
259          thePict = NULL; /* Important */
260
261        printf("Tracing outlines\n");
262        BarBoxList(pict,boxList,baselines,shapesFile,ArgListToString(argc,argv),&nd);
263
264        if (drawColorBoxes) {
265          Dictionary dict;
266
267          dict = ReadDictionary(shapesFile);
268          LabelShapes(thePict,dict);
269          write_pict(drawColorBoxesFile,thePict);
270        }
271      }
272    }
```

Jan 11 17:07 1991 numbers.c

```c
1      #include "stdio.h"
2      #include "boolean.h"
3      #include "pict.h"
4      #include "lines.h"
5
6      static float localScale;
7      static int localColor;
8      static int localX;
9      static int localY;
10     static Picture localPict;
11
12     void DrawSegment(float y1,float x1,float y2,float x2)
13     {
14      DrawLine(localPict,irint(localX+x1*localScale),
15             irint(localY+y1*localScale),
16             irint(localX+x2*localScale),
17             irint(localY+y2*localScale),localColor);
18     }
19
20     void Draw0(Picture pict, int x, int y, int color,float scale)
21     {
22      localPict = pict;
23      localScale = scale;
24      localColor = color;
25      localX = x;
26      localY = y;
27      DrawSegment(0,0,0,1);
28      DrawSegment(1,0,1,1);
29      DrawSegment(0,0,1,0);
30      DrawSegment(0,1,1,1);
31     }
32
33     void Draw1(Picture pict, int x, int y, int color,float scale)
34     {
35      localPict = pict;
36      localScale = scale;
37      localColor = color;
38      localX = x;
39      localY = y;
40      DrawSegment(0,0.5,1,.5);
41     }
42
43     void Draw2(Picture pict, int x, int y, int color,float scale)
44     {
45      localPict = pict;
46      localScale = scale;
47      localColor = color;
48      localX = x;
49      localY = y;
50      DrawSegment(0,0,0,1);
51      DrawSegment(0,1,.5,1);
52      DrawSegment(.5,1,.5,0);
53      DrawSegment(.5,0,1,0);
54      DrawSegment(1,0,1,1);
55     }
56
57     void Draw3(Picture pict, int x, int y, int color,float scale)
58     {
```

```
59      localPict = pict;
60      localScale = scale;
61      localColor = color;
62      localX = x;
63      localY = y;
64      DrawSegment(0,0,0,1);
65      DrawSegment(0,1,1,1);
66      DrawSegment(1,0,1,1);
67      DrawSegment(.5,0,.5,1);
68    }
69
70    void Draw4(Picture pict, int x, int y, int color,float scale)
71    {
72      localPict = pict;
73      localScale = scale;
74      localColor = color;
75      localX = x;
76      localY = y;
77      DrawSegment(0,0,.5,0);
78      DrawSegment(0,1,1,1);
79      DrawSegment(.5,0,.5,1);
80    }
81
82    void Draw5(Picture pict, int x, int y, int color,float scale)
83    {
84      localPict = pict;
85      localScale = scale;
86      localColor = color;
87      localX = x;
88      localY = y;
89      DrawSegment(0,0,0,1);
90      DrawSegment(0,0,.5,0);
91      DrawSegment(.5,1,.5,0);
92      DrawSegment(.5,1,1,1);
93      DrawSegment(1,0,1,1);
94    }
95
96    void Draw6(Picture pict, int x, int y, int color,float scale)
97    {
98      localPict = pict;
99      localScale = scale;
100     localColor = color;
101     localX = x;
102     localY = y;
103     DrawSegment(0,0,0,1);
104     DrawSegment(0,0,1,0);
105     DrawSegment(.5,1,.5,0);
106     DrawSegment(.5,1,1,1);
107     DrawSegment(1,0,1,1);
108   }
109
110   void Draw7(Picture pict, int x, int y, int color,float scale)
111   {
112     localPict = pict;
113     localScale = scale;
114     localColor = color;
115     localX = x;
116     localY = y;
117     DrawSegment(0,0,0,1);
118     DrawSegment(0,1,1,1);
119   }
```

```
void Draw8(Picture pict, int x, int y, int color, float scale)
{
  localPict = pict;
  localScale = scale;
  localColor = color;
  localX = x;
  localY = y;
  DrawSegment(0,0,0,1);
  DrawSegment(0,0,1,0);
  DrawSegment(1,0,1,1);
  DrawSegment(.5,1,.5,0);
  DrawSegment(0,1,1,1);
} void Draw9(Picture pict, int x, int y, int color, float scale)
{
  localPict = pict;
  localScale = scale;
  localColor = color;
  localX = x;
  localY = y;
  DrawSegment(0,0,0,1);
  DrawSegment(.5,0,.5,1);
  DrawSegment(0,0,.5,0);
  DrawSegment(0,1,1,1);
} typedef void DrFct(Picture pict, int x, int y, int color, float scale);

DrFct *DrawFunctions[] = {Draw0,Draw1,Draw2,Draw3,Draw4,Draw5,Draw6,
                 Draw7,Draw8,Draw9};

void DrawNumeral(Picture pict, int x, int y, int color, float scale, int n)
{
  (*DrawFunctions[n])(pict,x,y,color,scale);
} void DrawNumber(Picture pict, int x, int y, int color, float scale, int n)
{
  char s[100];
  char *ptr;

sprintf(s,"%d",n);
  ptr = s;
  while (*ptr != '\0') {
   DrawNumeral(pict,x,y,color,scale,*ptr-'0');
   x += irint(scale*1.5);
   ptr++;
  }
} ifdef TRYMAIN
main()
{
 Picture pict;
 pict = new_pict(400,200,1);
 DrawNumber(pict,50,50,1,20,12345);
 DrawNumber(pict,50,100,1,10,67890);
  write_pict("junkfile.image",pict);
}
#endif
```

Jul 2 18:48 1991 orient.c

```c
1    #include <stdio.h>
2    #include <values.h>
3    #include <math.h>
4    #include "misc.h"
5    #include "boolean.h"
6    #include "pict.h"
7    #include "orient.h"
8    #include "lines.h"
9
10
11   #define ABS(x) (((x)<0)?-(x):(x))
12
13   extern long random();
14
15   int RandomCoordinate(int maxValue)
16   {
17     return (float)(random()&0xffff)*maxValue/0xffff;
18   }
19
20   void RandomEdgePixel(Picture pict,int *x, int *y)
21   {
22     while (TRUE) {
23       *x = RandomCoordinate(pict->width);
24       *y = RandomCoordinate(pict->height);
25       if (ReadPixel(pict,*x,*y))
26         if (!(ReadPixel(pict,*x+1,*y) &&
27               ReadPixel(pict,*x-1,*y) &&
28               ReadPixel(pict,*x,*y+1) &&
29               ReadPixel(pict,*x,*y-1) &&
30               ReadPixel(pict,*x+1,*y+1) &&
31               ReadPixel(pict,*x-1,*y-1) &&
32               ReadPixel(pict,*x+1,*y-1) &&
33               ReadPixel(pict,*x-1,*y+1)))
34           return;
35     }
36
37   }
38
39   /* #define SYMTHRESH 4 */
40   #define SYMTHRESH 0.17453278
41   BOOLEAN FindBestMin(float *distances, int coarseDirections, float step,
42                       float *orientation)
43   {
44     int i,j,minIndex,min2Index;
45     int orientationError;
46     float minValue,min2Value;
47     int maxBinError = irint(SYMTHRESH / step);
48
49     minIndex = 0;
50     minValue = distances[0];
51     for (i=0;i<coarseDirections;++i)
52       if (distances[i]<minValue) {
53         minValue = distances[i];
54         minIndex = i;
55       }
56     /* Now verify that there is another minima M_PI away */
57
58     min2Index = (minIndex+coarseDirections/4)%coarseDirections;
```

```
59      min2Value = distances[min2Index];
60      for (i=0,j=min2Index;i<coarseDirections/2;++i,j = (j+1)%coarseDirections)
61        if (distances[j]<min2Value) {
62          min2Value = distances[j];
63          min2Index = j;
64        }
65      orientationError = ABS((min2Index-minIndex)%coarseDirections) -
66        coarseDirections/2;
67      orientationError = ABS(orientationError);
68      if (orientationError<maxBinError) {
69        *orientation = minIndex*step;
70        return TRUE;
71      } else {
72        printf("Orientation error: %d %3.3f\n",orientationError,
73              orientationError*step/M_PI/2*360);
74        printf("%3.3f:%3.3f %3.3f:%3.3f\n",minIndex*step,minValue,
75              min2Index*step,min2Value);
76        return FALSE;
77      }
78    }
79
80    float Fine(Picture pict,int fineSamples, int fineDirections,
81              int coarseDirections, float coarseAngle, char *plotFile)
82    {
83      float coarseError;
84      int x,y;
85      float x2,y2;
86      int i,j;
87      float *counters;
88      float step,angle;
89      float maxAngle;
90      float maxValue;
91      float maxLength;
92      FILE *outfile;
93
94      counters = (float *)calloc(fineDirections,sizeof(float));
95      if (counters == NULL) {
96        printf("Fine: cannot allocate memory\n");
97        exit(-1);
98      }
99    /* coarseError = 2*(SYMTHRESH+1)*2*M_PI/coarseDirections; */
100     coarseError = 2*SYMTHRESH;
101     step = coarseError/fineDirections;
102     printf("fine: +/- %3.3f\n",fineDirections/2*step);
103
104     maxLength = sqrt((double)(pict->width*pict->width+
105                       pict->height*pict->height));
106     for (i=0;i<fineSamples;++i) {
107      RandomEdgePixel(pict,&x,&y);
108      angle = -fineDirections/2*step+coarseAngle;
109      for (j=0;j<fineDirections;++j,angle+=step) {
110        x2 = x + maxLength*cos(angle);
111        y2 = y + maxLength*sin(angle);
112        counters[j] += CountLine(pict,x,y,(int)x2,(int)y2);
113      }
114     }
115
116     angle = -fineDirections/2*step+coarseAngle;
117     maxAngle = angle;
118     maxValue = counters[0];
119     for (i=0;i<fineDirections;++i,angle += step) {
```

```
120       /*  printf("%3.3f: %3.3f\n",angle,counters[i]); */
121        if (counters[i]>maxValue) {
122          maxAngle = angle;
123          maxValue = counters[i];
124        }
125      }
126
127      /* Plot the orientation graph if requested */
128      angle = -fineDirections/2*step+coarseAngle;
129      if (angle < 0)
130        angle += 2*M_PI;
131      if (plotFile!=NULL) {
132       printf("Opening fine orientation plot file\n");
133       if ((outfile = fopen(plotFile,"a"))==NULL) {
134        printf("Error opening fine orientation plot file.\n");
135        exit(-1);
136       }
137       for (i=0;i<fineDirections; ++i, angle += step)
138        fprintf(outfile,"%f %f\n",fmod(angle,2*M_PI),counters[i]);
139       fprintf(outfile,"\"Fine Distances\n\n");
140       fclose(outfile);
141       printf("Done writing fine orientation plot file.\n");
142      }
143
144
145      return maxAngle;
146    }
147
148    float NewFine(Picture pict,int fineSamples, int fineDirections,
149              float angleStart,float angleEnd, char *plotFile)
150    {
151     int x,y;
152     float x2,y2;
153     int i,j;
154     float *counters;
155     float step,angle;
156     float maxAngle;
157     float maxValue;
158     float maxLength;
159     FILE *outfile;
160
161     counters = (float *)calloc(fineDirections,sizeof(float));
162     if (counters == NULL) {
163      printf("Fine: cannot allocate memory\n");
164      exit(-1);
165     }
166
167     step = ABS(angleEnd - angleStart)/fineDirections;
168
169     maxLength = sqrt((double)(pict->width*pict->width+
170                     pict->height*pict->height));
171     for (i=0;i<fineSamples; ++i) {
172      RandomEdgePixel(pict,&x,&y);
173      angle = angleStart;
174      for (j=0;j<fineDirections; ++j) {
175       angle = fmod(angle,2*M_PI);
176       x2 = x + maxLength*cos(angle);
177       y2 = y + maxLength*sin(angle);
178       counters[j] += CountLine(pict,x,y,(int)x2,(int)y2);
179       angle += step;
180      }
```

```
181        }
182
183        angle = angleStart;
184        maxAngle = angle;
185        maxValue = counters[0];
186        for (i=0;i<fineDirections;++i) {
187         angle = fmod(angle,2*M_PI);
188         if (counters[i]>maxValue) {
189          maxAngle = angle;
190          maxValue = counters[i];
191         }
192         angle += step;
193        }
194        printf("Orientation is at %f(%f)\n",maxAngle,maxAngle/2/M_PI*360);
195
196        /* Plot the orientation graph if requested */
197        if (plotFile) {
198         printf("Opening fine orientation plot file\n");
199         if ((outfile = fopen(plotFile,"w"))==NULL) {
200          printf("Error opening fine orientation plot file.\n");
201          exit(-1);
202         }
203         angle = angleStart;
204         for (i=0;i<fineDirections;++i) {
205          angle = fmod(angle,2*M_PI);
206          fprintf(outfile,"%f %f\n",angle,counters[i]);
207          angle += step;
208         }
209         fprintf(outfile,"\"Fine Distances\n\n");
210         fclose(outfile);
211         printf("Done writing fine orientation plot file.\n");
212        }
213        return maxAngle;
214       }
215
```

Jan 15 15:22 1991 overlay.c

```
1         #include <stdio.h>
2         #include <math.h>
3         #include "boolean.h"
4         #include "pict.h"
5
6         main(argc, argv)
7         int argc;
8         char *argv[];
9         {
10         char *inFile1,*inFile2,*outFile;
11         Picture pict1,pict2,finalPict;
12         ColorMap cmap;
13         int x,y;
14
15         if (argc != 4)
16         {
17          printf("\nUsage: %s infile1 infile2 outfile\n\n",
18                 argv[0]);
19          exit(0);
20         }
21
```

```
22      inFile1 = argv[1];    /* get args */
23      inFile2 = argv[2];
24      outFile = argv[3];
25
26      pict1 = load_pict(inFile1);
27      pict2 = load_pict(inFile2);
28      if ((pict1->depth != 1) || (pict2->depth != 1))
29        DoError("overlay: only depth 1 supported.\n",NULL);
30      if ((pict1->width != pict2->width)||(pict1->height != pict2->height))
31        DoError("overlay: images must be the same size\n",NULL);
32
33      finalPict = new_pict(pict1->width,pict1->height,8);
34      cmap = NewColorMap(3);
35      WriteColorValue(cmap,0,0,0,0);     /* Black */
36      WriteColorValue(cmap,1,0,128,0);   /* Olive */
37      WriteColorValue(cmap,2,0,255,0);   /* Green */
38      finalPict->cmap = cmap;
39
40      for (y=0;y<pict1->height;++y)
41       for (x=0;x<pict1->width;++x)
42        if (ReadPixel(pict1,x,y))
43            WritePixel(finalPict,x,y,2);
44        else if (ReadPixel(pict2,x,y))
45            WritePixel(finalPict,x,y,1);
46
47      write_pict(outFile,finalPict);
48      }
```

Jul 1 13:45 1991 pagestats.c

```
1       #include <stdio.h>
2       #include <math.h>
3       #include "boolean.h"
4       #include "types.h"
5       #include "error.h"
6       #include "pict.h"
7       #include "dict.h"
8
9       #define UP 0
10      #define DOWN 1
11      typedef int Direction;
12
13      extern Picture thePict;
14
15      void StoreRawOutlinePair(Dictionary dict, int dictEntry,
16                      Box box,int *bothX,int *topY, int *baseY,
17                      int numberOfLegs)
18      {
19       RawOutlinePair temp;
20       int i;
21       int *xCursor,*topCursor,*bottomCursor;
22
23       temp = (RawOutlinePair)calloc(1,sizeof(RawOutlinePairBody));
24       if (temp == NULL)
25         DoError("StoreRawOutlinePair: cannot allocate space\n",NULL);
26
27       temp->box = box;
28       temp->numberOfLegs = numberOfLegs;
29
```

```
30    temp->x = (int *)calloc(temp->numberOfLegs,sizeof(int));
31    temp->top = (int *)calloc(temp->numberOfLegs,sizeof(int));
32    temp->bottom = (int *)calloc(temp->numberOfLegs,sizeof(int));
33    if ((temp->x == NULL) ||
34       (temp->top == NULL) ||
35       (temp->bottom == NULL))
36       DoError("StoreRawOutlinePair: cannot allocate space\n",NULL);
37
38    xCursor = temp->x;
39    topCursor = temp->top;
40    bottomCursor = temp->bottom;
41
42    for (i=0;i<numberOfLegs;++i) {
43      *xCursor++ = *bothX++;
44      *topCursor++ = *topY++;
45      *bottomCursor++ = *baseY++;
46    }
47    *(dict->rawOutlines+dictEntry) = temp;
48  }
49
50  void StoreOutlinePair(Dictionary dict, int dictEntry,
51                  int middleLine,int fontXHeight)
52  {
53    RawOutlinePair raw;
54    OutlinePair temp;
55    int i,numberOfLegs;
56    int y;
57    int offset;
58    int *xSCursor,*topSCursor,*bottomSCursor;
59    float *xDCursor,*topDCursor,*bottomDCursor;
60    float *xCursor,*topCursor,*bottomCursor;
61    int left,right;
62    float foffset;
63
64    raw = *(dict->rawOutlines+dictEntry);
65
66    temp = (OutlinePair)calloc(1,sizeof(OutlinePairBody));
67    if (temp == NULL)
68       DoError("StoreOutlinePair: cannot allocate space\n",NULL);
69
70    temp->x = (float *)calloc(raw->numberOfLegs,sizeof(float));
71    temp->top = (float *)calloc(raw->numberOfLegs,sizeof(float));
72    temp->bottom = (float *)calloc(raw->numberOfLegs,sizeof(float));
73    if ((temp->x == NULL) ||
74       (temp->top == NULL) ||
75       (temp->bottom == NULL))
76       DoError("StoreOutlinePair: cannot allocate space\n",NULL);
77
78    temp->box = raw->box;
79    temp->blackoutHeight = 0;
80    temp->numberOfLegs = raw->numberOfLegs;
81    offset = temp->offset = *(raw->x);
82    temp->width = *(raw->x+raw->numberOfLegs-1) - temp->offset;
83
84    xDCursor = temp->x;
85    topDCursor = temp->top;
86    bottomDCursor = temp->bottom;
87    xSCursor = raw->x;
88    topSCursor = raw->top;
89    bottomSCursor = raw->bottom;
90
```

```
91      numberOfLegs = raw->numberOfLegs;
92      for (i=0;i<numberOfLegs;++i) {
93       *xDCursor++ = (float)(*xSCursor++ - offset)/fontXHeight;
94       y = middleLine - *topSCursor++;
95       if (y<0)
96         y = 0;
97       *topDCursor++ = (float)y / fontXHeight;
98       y = *bottomSCursor++ - middleLine;
99       if (y<0)
100        y = 0;
101      *bottomDCursor++ = (float)y / fontXHeight;
102     }
103
104     /* Now try to remove parts of the contour on to the left and right of the
105      * word shape that are at height 0 */
106
107     topDCursor = temp->top;
108     bottomDCursor = temp->bottom;
109     for (i=0;i<numberOfLegs;++i) {
110      if ((*topDCursor++ != 0)||(*bottomDCursor++!=0))
111        break;
112     }
113     left = i;
114
115     topDCursor = temp->top+numberOfLegs-1;
116     bottomDCursor = temp->bottom+numberOfLegs-1;
117     for (i=numberOfLegs-1;i>=0;--i) {
118      if ((*topDCursor-- != 0)||(*bottomDCursor-- != 0))
119        break;
120     }
121     right = i+1;
122
123     xDCursor = temp->x;
124     topDCursor = temp->top;
125     bottomDCursor = temp->bottom;
126     xCursor = temp->x+left;
127     topCursor = temp->top+left;
128     bottomCursor = temp->bottom+left;
129     foffset = *xSCursor;
130     for (i=left;i<right;++i) {
131      *xDCursor++ = *xCursor++ - foffset;
132      *topDCursor++ = *topCursor++;
133      *bottomDCursor++ = *bottomCursor++;
134     }
135     temp->numberOfLegs = right-left;
136
137     *(dict->outlines+dictEntry) = temp;
138    }
139
140    static int lineSpacing;
141    int OrderOutlinePair(OutlinePair *o1,OutlinePair *o2)
142    {
143     int yDistance;
144     int xDistance;
145     yDistance = (*o1)->box->pageY - (*o2)->box->pageY;
146     if (yDistance<lineSpacing && yDistance > -lineSpacing) {
147      xDistance = (*o1)->box->pageX - (*o2)->box->pageX;
148      return xDistance;
149     }
150     return yDistance;
151    }
```

```
152
153    void SortDictionary(Dictionary dict)
154    {
155      lineSpacing = 20;
156      qsort(dict->rawOutlines,dict->numberOfEntries,sizeof(RawOutlinePair),
157          OrderOutlinePair);
158    }
159
160    #define HIST_SIZE 100
161    void Histogram(int *data,int dataLength, int offset, int *histogram)
162    {
163     int i,bin;
164     for (i=0;i<dataLength;++i) {
165      bin = *data-offset;
166      if ((bin>=0)&&(bin<HIST_SIZE))
167        histogram[bin]++;
168      data++;
169     }
170    }
171
172    void HistogramPeaks(int *data,int dataLength, int offset, int *histogram)
173    {
174     int i,bin;
175     Direction direction;
176
177     if (*(data+1) < *data)
178      direction = UP;
179     else {
180      bin = *data-offset;
181      if ((bin>=0)&&(bin<HIST_SIZE))
182        histogram[bin]++;
183      direction = DOWN;
184     }
185     ++data;
186
187     for (i=1;i<dataLength-1;++i) {
188      if ((direction == UP) &&
189          (*data < *(data+1))) {
190       /* *data is a peak */
191       bin = *data-offset;
192       if ((bin>=0)&&(bin<HIST_SIZE))
193         histogram[bin]++;
194       direction = DOWN;
195      }
196      else if ((direction == DOWN) &&
197          (*data > *(data+1))) {
198       /* *data is a valley */
199       direction = UP;
200      }
201      ++data;
202     }/* for i */
203    }
204
205    void HistogramValleys(int *data,int dataLength, int offset, int *histogram)
206    {
207     int i,bin;
208     Direction direction;
209
210     if (*(data+1) > *data)
211      direction = UP;
212     else {
```

```
213      bin = *data-offset;
214      if ((bin>=0)&&(bin<HIST_SIZE))
215        histogram[bin]++;
216      direction = DOWN;
217    }
218    ++data;
219
220    for (i=1;i<dataLength-1;++i) {
221      if ((direction == UP) &&
222          (*data > *(data+1))) {
223        /* *data is a peak */
224        bin = *data-offset;
225        if ((bin>=0)&&(bin<HIST_SIZE))
226          histogram[bin]++;
227        direction = DOWN;
228      }
229      else if ((direction == DOWN) &&
230              (*data < *(data+1))) {
231        /* *data is a valley */
232        direction = UP;
233      }
234      ++data;
235    } /* for i */
236  }
237
238  int MaxBin(int *histogram)
239  {
240    int i;
241    int maxValue;
242    int maxIndex;
243
244    maxValue = histogram[0];
245    maxIndex = 0;
246    for (i=0;i<HIST_SIZE;++i)
247      if (histogram[i]>maxValue) {
248        maxValue = histogram[i];
249        maxIndex = i;
250      }
251    return maxIndex;
252  }
253
254  void PostProcess(Dictionary dict,
255  {
256    int index;
257    int temp;
258    int i,startIndex,firstY,minY,endIndex,shape;
259    int tops[HIST_SIZE];
260    int bottoms[HIST_SIZE];
261    int middleLine,topLine,bottomLine;
262    int fontXHeight;
263    RawOutlinePair thisShape;
264
265    SortDictionary(dict);
266
267    index = 0;
268  #ifdef foo
269    malloc_verify();
270  #endif
271    while (index < dict->numberOfEntries) {
272      startIndex = index;
273      firstY = (*(dict->rawOutlines+index))->box->pageY;
274      minY = firstY;
```

```
275      while ( (*(dict->rawOutlines+index))->box->pageY - firstY < 20 &&
276              (*(dict->rawOutlines+index))->box->pageY - firstY > -20) {
277        if ( minY > ( (*(dict->rawOutlines+index))->box->pageY ))
278           minY = (*(dict->rawOutlines+index))->box->pageY;
279        ++index;
280        if (index == dict->numberOfEntries)
281           break;
282      }
283      endIndex = index;
284
285  #ifdef foo
286      malloc_verify();
287  #endif
288
289      /* shapes from start index through endindex are all on */
290      /* the same text line */
291      /* minY has the top of the highest box on the line. */
292
293      /* Find the base and toplines by taking the mode of the heights of the
294       * valleys of the bottom contours and the peaks of the top contours */
295      for (i=0;i<HIST_SIZE;i++) {
296       tops[i]=0;
297       bottoms[i]=0;
298      }
299      for (shape=startIndex;shape<endIndex; ++shape) {
300        thisShape = *(dict->rawOutlines+shape);
301        Histogram(thisShape->top,thisShape->numberOfLegs,minY,tops);
302        Histogram(thisShape->bottom,thisShape->numberOfLegs,minY,bottoms);
303
304  #ifdef foo
305        HistogramPeaks(thisShape->top,thisShape->numberOfLegs,minY,tops);
306        HistogramValleys(thisShape->bottom,thisShape->numberOfLegs,minY,bottoms);
307  #endif
308       }
309      topLine = MaxBin(tops)+minY;
310      bottomLine = MaxBin(bottoms)+minY;
311
312      if(thePict) {
313       int maxLength;
314       int halfWidth;
315       int x,y;
316       float x2,x3,y2,y3;
317       float angle;
318
319       angle = (*(dict->rawOutlines))->box->angle;
320       maxLength = thePict->width+thePict->height;
321       halfWidth = thePict->width / 2;
322       x = topLine * -sin(angle) + halfWidth * cos(angle);
323       y = topLine * cos(angle) + halfWidth * sin(angle);
324       x2 = x+maxLength*cos(angle);
325       y2 = y+maxLength*sin(angle);
326       x3 = x-maxLength*cos(angle);
327       y3 = y-maxLength*sin(angle);
328       DrawLine(thePict,x,y,(int)x2,(int)y2,5);
329       DrawLine(thePict,x,y,(int)x3,(int)y3,5);
330
331       x = bottomLine * -sin(angle) + halfWidth * cos(angle);
332       y = bottomLine * cos(angle) + halfWidth * sin(angle);
333       x2 = x+maxLength*cos(angle);
334       y2 = y+maxLength*sin(angle);
335       x3 = x-maxLength*cos(angle);
```

```
336        y3 = y-maxLength*sin(angle);
337        DrawLine(thePict,x,y,(int)x2,(int)y2,5);
338        DrawLine(thePict,x,y,(int)x3,(int)y3,5);
339
340      }
341
342    #ifdef foo
343      malloc_verify();
344    #endif
345
346      middleLine = (bottomLine+topLine)/2;
347      fontXHeight = bottomLine-topLine;
348      /* Clip and normalize the contours */
349      for (shape=startIndex;shape<endIndex;++shape)
350        StoreOutlinePair(dict,shape,middleLine,fontXHeight);
351    } /* Do another line of text */
352  }
```

Jul 1 13:46 1991 postproc.c

```
1    #include <stdio.h>
2    #include <math.h>
3    #include "boolean.h"
4    #include "types.h"
5    #include "error.h"
6    #include "pict.h"
7    #include "dict.h"
8
9    #define UP 0
10   #define DOWN 1
11   typedef int Direction;
12
13   extern Picture thePict;
14
15   void StoreRawOutlinePair(Dictionary dict, int dictEntry,
16                   Box box,int *bothX,int *topY, int *baseY,
17                   int numberOfLegs)
18   {
19     RawOutlinePair temp;
20     int i;
21     int *xCursor,*topCursor,*bottomCursor;
22
23     temp = (RawOutlinePair)calloc(1,sizeof(RawOutlinePairBody));
24     if (temp == NULL)
25       DoError("StoreRawOutlinePair: cannot allocate space\n",NULL);
26
27     temp->box = box;
28     temp->numberOfLegs = numberOfLegs;
29
30     temp->x = (int *)calloc(temp->numberOfLegs,sizeof(int));
31     temp->top = (int *)calloc(temp->numberOfLegs,sizeof(int));
32     temp->bottom = (int *)calloc(temp->numberOfLegs,sizeof(int));
33     if ((temp->x == NULL) ||
34        (temp->top == NULL) ||
35        (temp->bottom == NULL))
36       DoError("StoreRawOutlinePair: cannot allocate space\n",NULL);
37
38     xCursor = temp->x;
39     topCursor = temp->top;
```

```
40        bottomCursor = temp->bottom;
41
42        for (i=0;i<numberOfLegs;++i) {
43         *xCursor++ = *bothX++;
44         *topCursor++ = *topY++;
45         *bottomCursor++ = *baseY++;
46        }
47        *(dict->rawOutlines+dictEntry) = temp;
48       }.
49
50       void StoreOutlinePair(Dictionary dict, int dictEntry,
51                       int middleLine,int fontXHeight)
52       {
53        RawOutlinePair raw;
54        OutlinePair temp;
55        int i,numberOfLegs;
56        int y;
57        int offset;
58        int *xSCursor,*topSCursor,*bottomSCursor;
59        float *xDCursor,*topDCursor,*bottomDCursor;
60        float *xCursor,*topCursor,*bottomCursor;
61        int left,right;
62        float foffset;
63
64        raw = *(dict->rawOutlines+dictEntry);
65
66        temp = (OutlinePair)calloc(1,sizeof(OutlinePairBody));
67        if (temp == NULL)
68          DoError("StoreOutlinePair: cannot allocate space\n",NULL);
69
70        temp->x = (float *)calloc(raw->numberOfLegs,sizeof(float));
71        temp->top = (float *)calloc(raw->numberOfLegs,sizeof(float));
72        temp->bottom = (float *)calloc(raw->numberOfLegs,sizeof(float));
73        if ((temp->x == NULL) ||
74           (temp->top == NULL) ||
75           (temp->bottom == NULL))
76          DoError("StoreOutlinePair: cannot allocate space\n",NULL);
77
78        temp->box = raw->box;
79        temp->blackoutHeight = 0;
80        temp->numberOfLegs = raw->numberOfLegs;
81        offset = temp->offset = *(raw->x);
82        temp->width = *(raw->x+raw->numberOfLegs-1) - temp->offset;
83
84        xDCursor = temp->x;
85        topDCursor = temp->top;
86        bottomDCursor = temp->bottom;
87        xSCursor = raw->x;
88        topSCursor = raw->top;
89        bottomSCursor = raw->bottom,
90
91        numberOfLegs = raw->numberOfLegs;
92        for (i=0;i<numberOfLegs;++i) {
93         *xDCursor++ = (float)(*xSCursor++ - offset)/fontXHeight;
94         y = middleLine - *topSCursor++;
95         if (y<0)
96           y = 0;
97         *topDCursor++ = (float)y / fontXHeight;
98         y = *bottomSCursor++ - middleLine;
99         if (y<0)
100          y = 0;
```

```
101       *bottomDCursor++ = (float)y / fontXHeight;
102     }
103
104     /* Now try to remove parts of the contour on to the left and right of the
105      * word shape that are at height 0 */
106
107     topDCursor = temp->top;
108     bottomDCursor = temp->bottom;
109     for (i=0;i<numberOfLegs;++i) {
110      if ((*topDCursor++ != 0)||(*bottomDCursor++!=0))
111        break;
112     }
113     left = i;
114
115     topDCursor = temp->top+numberOfLegs-1;
116     bottomDCursor = temp->bottom+numberOfLegs-1;
117     for (i=numberOfLegs-1;i>=0;--i) {
118      if ((*topDCursor-- != 0)||(*bottomDCursor-- !=0))
119        break;
120     }
121     right = i+1;
122
123     xDCursor = temp->x;
124     topDCursor = temp->top;
125     bottomDCursor = temp->bottom;
126     xCursor = temp->x+left;
127     topCursor = temp->top+left;
128     bottomCursor = temp->bottom+left;
129     foffset = *xSCursor;
130     for (i=left;i<right;++i) {
131       *xDCursor++ = *xCursor++ - foffset;
132       *topDCursor++ = *topCursor++;
133       *bottomDCursor++ = *bottomCursor++;
134     }
135     temp->numberOfLegs = right-left;
136
137     *(dict->outlines+dictEntry) = temp;
138   }
139
140   static int lineSpacing;
141   int OrderOutlinePair(OutlinePair *o1,OutlinePair *o2)
142   {
143    int yDistance;
144    int xDistance;
145    yDistance = (*o1)->box->pageY - (*o2)->box->pageY;
146    if (yDistance<lineSpacing && yDistance > -lineSpacing) {
147      xDistance = (*o1)->box->pageX - (*o2)->box->pageX;
148      return xDistance;
149    }
150    return yDistance;
151   }
152
153   void SortDictionary(Dictionary dict)
154   {
155    lineSpacing = 20;
156    qsort(dict->rawOutlines,dict->numberOfEntries,sizeof(RawOutlinePair),
157         OrderOutlinePair);
158   }
159
160   #define HIST_SIZE 100
161   void HistogramMax(int *data,int dataLength,int offset,int sign,int *histogram)
162   {
```

```
163      int i,bin;
164
165      if (sign>0) {
166       int maxValue;
167       maxValue = *data;
168       for (i=0;i<dataLength;++i)
169        if (data[i]>maxValue)
170            maxValue = data[i];
171       bin = maxValue-offset;
172       if ((bin>=0)&&(bin<HIST_SIZE))
173        histogram[bin]++;
174      }
175      else {
176       int minValue;
177       minValue = *data;
178       for (i=0;i<dataLength;++i)
179        if (data[i]<minValue)
180            minValue = data[i];
181       bin = minValue-offset;
182       if ((bin>=0)&&(bin<HIST_SIZE))
183        histogram[bin]++;
184      }
185     }
186
187     void Histogram(int *data,int dataLength, int offset, int *histogram)
188     {
189      int i,bin;
190
191      for (i=0;i<dataLength;++i) {
192       bin = *data-offset;
193       if ((bin>=0)&&(bin<HIST_SIZE))
194        histogram[bin]++;
195       data++;
196      }
197     }
198
199     void HistogramPeaks(int *data,int dataLength, int offset, int *histogram)
200     {
201      int i,bin;
202      Direction direction;
203
204      if (*(data+1) < *data)
205       direction = UP;
206      else {
207       bin = *data-offset;
208       if ((bin>=0)&&(bin<HIST_SIZE))
209        histogram[bin]++;
210       direction = DOWN;
211      }
212      ++data;
213
214      for (i=1;i<dataLength-1;++i) {
215       if ((direction == UP) &&
216           (*data < *(data+1))) {
217        /* *data is a peak */
218        bin = *data-offset;
219        if ((bin>=0)&&(bin<HIST_SIZE))
220            histogram[bin]++;
221        direction = DOWN;
222       }
223       else if ((direction == DOWN) &&
```

```
224            (*data > *(data+1))) {
225       /* *data is a valley */
226       direction = UP;
227      }
228      ++data;
229     } /* for i */
230    }
231
232    void HistogramValleys(int *data,int dataLength, int offset, int *histogram)
233    {
234     int i,bin;
235     Direction direction;
236
237     if (*(data+1) > *data)
238      direction = UP;
239     else {
240      bin = *data-offset;
241      if ((bin>=0)&&(bin<HIST_SIZE))
242       histogram[bin]++;
243      direction = DOWN;
244     }
245     ++data;
246
247     for (i=1;i<dataLength-1;++i) {
248      if ((direction == UP) &&
249           (*data > *(data+1))) {
250       /* *data is a peak */
251       bin = *data-offset;
252       if ((bin>=0)&&(bin<HIST_SIZE))
253          histogram[bin]++;
254       direction = DOWN;
255      }
256      else if ((direction == DOWN) &&
257            (*data < *(data+1))) {
258       /* *data is a valley */
259       direction = UP;
260      }
261      ++data;
262     } /* for i */
263    }
264
265    int MaxBin(int *histogram)
266    {
267     int i;
268     int maxValue;
269     int maxIndex;
270
271     maxValue = histogram[0];
272     maxIndex = 0;
273     for (i=0;i<HIST_SIZE;++i)
274      if (histogram[i]>maxValue) {
275       maxValue = histogram[i];
276       maxIndex = i;
277      }
278     return maxIndex;
279    }
280
281    void PostProcess(Dictionary dict)
282    {
283     int index;
284     int temp;
```

```
285      int i,startIndex,firstY,minY,endIndex,shape;
286      int tops[HIST_SIZE];
287      int bottoms[HIST_SIZE];
288      int middleLine,topLine,bottomLine;
289      int fontXHeight;
290      RawOutlinePair thisShape;
291
292      SortDictionary(dict);
293
294      index = 0;
295     #ifdef foo
296      malloc_verify();
297     #endif
298      while (index < dict->numberOfEntries) {
299       startIndex = index;
300       firstY = (*(dict->rawOutlines+index))->box->pageY;
301       minY = firstY;
302       while ( (*(dict->rawOutlines+index))->box->pageY - firstY < 20 &&
303            (*(dict->rawOutlines+index))->box->pageY - firstY > -20) {
304       if ( minY > ( (*(dict->rawOutlines+index))->box->pageY ))
305           minY = (*(dict->rawOutlines+index))->box->pageY;
306       ++index;
307       if (index == dict->numberOfEntries)
308           break;
309       }
310       endIndex = index;
311
312     #ifdef foo
313       malloc_verify();
314     #endif
315
316       /* shapes from start index through endindex are all on */
317       /* the same text line */
318       /* minY has the top of the highest box on the line. */
319
320       /* Find the base and toplines by taking the mode of the heights of the
321        * valleys of the bottom contours and the peaks of the top contours */
322       for (i=0;i<HIST_SIZE;i++) {
323        tops[i]=0;
324        bottoms[i]=0;
325       }
326       for (shape=startIndex;shape<endIndex;++shape) {
327        thisShape = *(dict->rawOutlines+shape);
328        Histogram(thisShape->top,thisShape->numberOfLegs,minY,tops);
329        Histogram(thisShape->bottom,thisShape->numberOfLegs,minY,bottoms);
330
331     #ifdef foo
332        HistogramPeaks(thisShape->top,thisShape->numberOfLegs,minY,tops);
333        HistogramValleys(thisShape->bottom,thisShape->numberOfLegs,minY,bottoms);
334     #endif
335       }
336       topLine = MaxBin(tops)+minY;
337       bottomLine = MaxBin(bottoms)+minY;
338
339       if (thePict) {
340        int maxLength;
341        int halfWidth;
342        int x,y;
343        float x2,x3,y2,y3;
344        float angle;
345
```

```
346       angle = (*(dict->rawOutlines))->box->angle;
347       maxLength = thePict->width+thePict->height;
348       halfWidth = thePict->width / 2;
349       x = topLine * -sin(angle) + halfWidth * cos(angle);
350       y = topLine * cos(angle) + halfWidth * sin(angle);
351       x2 = x+maxLength*cos(angle);
352       y2 = y+maxLength*sin(angle);
353       x3 = x-maxLength*cos(angle);
354       y3 = y-maxLength*sin(angle);
355       DrawLine(thePict,x,y,(int)x2,(int)y2,5);
356       DrawLine(thePict,x,y,(int)x3,(int)y3,5);
357
358       x = bottomLine * -sin(angle) + halfWidth * cos(angle);
359       y = bottomLine * cos(angle) + halfWidth * sin(angle);
360       x2 = x+maxLength*cos(angle);
361       y2 = y+maxLength*sin(angle);
362       x3 = x-maxLength*cos(angle);
363       y3 = y-maxLength*sin(angle);
364       DrawLine(thePict,x,y,(int)x2,(int)y2,5);
365       DrawLine(thePict,x,y,(int)x3,(int)y3,5);
366
367     }
368
369     #ifdef foo
370       malloc_verify();
371     #endif
372
373       middleLine = (bottomLine+topLine)/2;
374       fontXHeight = bottomLine-topLine;
375       /* Clip and normalize the contours */
376       for (shape=startIndex;shape<endIndex;++shape)
377         StoreOutlinePair(dict,shape,middleLine,fontXHeight);
378     } /* Do another line of text */
379   }
380
381   void PageStatistics(Dictionary dict,char *fileName)
382   /* WARNING - this must be run before PostProcess since PostProcess changes the raw
383    * shape data. */
384   {
385     int index;
386     int temp;
387     int i,startIndex,firstY,minY,endIndex,shape;
388     int tops[HIST_SIZE];
389     int bottoms[HIST_SIZE];
390     int ascenders[HIST_SIZE];
391     int descenders[HIST_SIZE];
392     int middleLine,topLine,bottomLine,ascenderLine,descenderLine;
393     int ascenderHeight,descenderHeight,lineNumber;
394     int fontXHeight;
395     RawOutlinePair thisShape;
396     FILE *fp;
397
398     if ((fp=fopen(fileName,"w"))==NULL)
399       DoError("PageStatistics: error opening output file %s.\n",fileName);
400
401     SortDictionary(dict);
402
403     index = 0;
404   #ifdef foo
405     malloc_verify();
406   #endif
```

```
407      lineNumber = 0;
408      while (index < dict->numberOfEntries) {
409       startIndex = index;
410       firstY = (*(dict->rawOutlines+index))->box->pageY;
411       minY = firstY;
412       while ( (*(dict->rawOutlines+index))->box->pageY - firstY < 20 &&
413            (*(dict->rawOutlines+index))->box->pageY - firstY > -20) {
414        if ( minY > ( (*(dict->rawOutlines+index))->box->pageY ))
415          minY = (*(dict->rawOutlines+index))->box->pageY;
416        ++index;
417        if (index == dict->numberOfEntries)
418           break;
419       }
420       endIndex = index;
421
422      #ifdef foo
423        malloc_verify();
424      #endif
425
426       /* shapes from start index through endindex are all on */
427       /* the same text line */
428       /* minY has the top of the highest box on the line. */
429
430       /* Find the base and toplines by taking the mode of the heights of the
431        * valleys of the bottom contours and the peaks of the top contours */
432       for (i=0;i<HIST_SIZE;i++) {
433        tops[i]=0;
434        bottoms[i]=0;
435        ascenders[i]=0;
436        descenders[i]=0;
437       }
438       for (shape=startIndex;shape<endIndex;++shape) {
439         thisShape = *(dict->rawOutlines+shape);
440         Histogram(thisShape->top,thisShape->numberOfLegs,minY,tops);
441         Histogram(thisShape->bottom,thisShape->numberOfLegs,minY,bottoms);
442
443         HistogramMax(thisShape->top,thisShape->numberOfLegs,minY,-1,ascenders);
444         HistogramMax(thisShape->bottom,thisShape->numberOfLegs,minY,1,descenders);
445       }
446       topLine = MaxBin(tops)+minY;
447       bottomLine = MaxBin(bottoms)+minY;
448       ascenderLine = MaxBin(ascenders)+minY;
449       descenderLine = MaxBin(descenders)+minY;
450
451      #ifdef foo
452        malloc_verify();
453      #endif
454
455       middleLine = (bottomLine+topLine)/2;
456       fontXHeight = bottomLine-topLine;
457
458       ascenderHeight = bottomLine-ascenderLine;
459       descenderHeight = descenderLine-bottomLine;
460       fprintf(fp,"%d: %d %d %d %2.6f\n",lineNumber,fontXHeight,ascenderHeight,descenderHeight,
461            (float)ascenderHeight/(float)fontXHeight);
462       ++lineNumber;
463      } /* Do another line of text */
464      fclose(fp);
465    }
```

Jul 10 13:17 1991 testFine.c

```c
1    #include <stdio.h>
2    #include <math.h>
3    #include "boolean.h"
4    #include "pict.h"
5    #include "lines.h"
6
7    #define ABS(x) (((x)<0)?(-(x)):(x))
8
9    extern long random();
10
11   int RandomCoordinate(int maxValue)
12   {
13     return (float)(random()&0xffff)*maxValue/0xffff;
14   }
15
16   void RandomEdgePixel(Picture pict,int *x, int *y)
17   {
18    while (TRUE) {
19     *x = RandomCoordinate(pict->width);
20     *y = RandomCoordinate(pict->height);
21     if (ReadPixel(pict,*x,*y))
22      if (!(ReadPixel(pict,*x+1,*y) &&
23            ReadPixel(pict,*x-1,*y) &&
24            ReadPixel(pict,*x,*y+1) &&
25            ReadPixel(pict,*x,*y-1) &&
26            ReadPixel(pict,*x+1,*y+1) &&
27            ReadPixel(pict,*x-1,*y-1) &&
28            ReadPixel(pict,*x+1,*y-1) &&
29            ReadPixel(pict,*x-1,*y+1)))
30         return;
31    }
32
33   }
34
35   float Fine(Picture pict,int fineSamples, int fineDirections,
36              float angleStart,float angleEnd, char *plotFile)
37   {
38    int x,y;
39    float x2,y2;
40    int i,j;
41    float *counters;
42    float step,angle;
43    float maxAngle;
44    float maxValue;
45    float maxLength;
46    FILE *outfile;
47
48    counters = (float *)calloc(fineDirections,sizeof(float));
49    if (counters == NULL) {
50     printf("Fine: cannot allocate memory\n");
51     exit(-1);
52    }
53
54    step = ABS(angleEnd - angleStart)/fineDirections;
55
56    maxLength = sqrt((double)(pict->width*pict->width+
57                              pict->height*pict->height));
58    for (i=0;i<fineSamples;++i) {
```

```
59        RandomEdgePixel(pict,&x,&y);
60        angle = angleStart;
61        for (j=0;j<fineDirections;++j) {
62         angle = fmod(angle,2*M_PI);
63         x2 = x + maxLength*cos(angle);
64         y2 = y + maxLength*sin(angle);
65         counters[j] += CountLine(pict,x,y,(int)x2,(int)y2);
66         angle += step;
67        }
68       }
69
70       angle = angleStart;
71       maxAngle = angle;
72       maxValue = counters[0];
73       for (i=0;i<fineDirections;++i) {
74        angle = fmod(angle,2*M_PI);
75        if (counters[i]>maxValue) {
76         maxAngle = angle;
77         maxValue = counters[i];
78        }
79        angle += step;
80       }
81       printf("Orientation is at %f(%f)\n",maxAngle,maxAngle/2/M_PI*360);
82
83       /* Plot the orientation graph if requested */
84       printf("Opening fine orientation plot file\n");
85       if ((outfile = fopen(plotFile,"w"))==NULL) {
86        printf("Error opening fine orientation plot file.\n");
87        exit(-1);
88       }
89       angle = angleStart;
90       for (i=0;i<fineDirections;++i) {
91        angle = fmod(angle,2*M_PI);
92        fprintf(outfile,"%f %f\n",angle,counters[i]);
93        angle += step;
94       }
95       fprintf(outfile,"\"Fine Distances\n\n");
96       fclose(outfile);
97       printf("Done writing fine orientation plot file.\n");
98       return maxAngle;
99      }
100
101     main(argc, argv)
102     int argc;
103     char *argv[];
104     {
105      char *inFileName,*coarseOutFileName,*fineOutFileName,*fine2OutFileName;
106      int fineDirections,fineSamples;
107      float coarseAngle,fineAngle,fineAngle2;
108      float firstSpacing,secondSpacing,thirdSpacing;
109      Picture pict;
110
111      if (argc != 7)
112      {
113       printf("\nUsage: %s infile coarsePlotFile finePlotFile\n",argv[0]);
114       printf("       finerPlotFile #directions #samples\n\n");
115
116       exit(0);
117      }
118
119      inFileName = argv[1];    /* get args */
```

```
120        coarseOutFileName = argv[2];
121        fineOutFileName = argv[3];
122        fine2OutFileName = argv[4];
123        fineDirections = atoi(argv[5]);
124        fineSamples = atoi(argv[6]);
125
126        pict = load_pict(inFileName);
127        coarseAngle = Fine(pict,fineSamples,fineDirections,
128                     0,M_PI,coarseOutFileName);
129        firstSpacing = (M_PI-0)/fineDirections;
130        printf("Coarse angle: %f(%f)\n",coarseAngle,coarseAngle/M_PI*180);
131        printf("Coarse spacing: %f(%f)\n",firstSpacing,firstSpacing/M_PI*180);
132
133        fineAngle = Fine(pict,fineSamples,fineDirections,
134                    coarseAngle-4*firstSpacing,coarseAngle+4*firstSpacing,
135                    fineOutFileName);
136        secondSpacing = 8*firstSpacing/fineDirections;
137        printf("Fine angle: %f(%f)\n",fineAngle,fineAngle/M_PI*180);
138        printf("Fine spacing: %f(%f)\n",secondSpacing,secondSpacing/M_PI*180);
139
140        fineAngle2 = Fine(pict,fineSamples,fineDirections,
141                     fineAngle-15*secondSpacing,fineAngle+15*secondSpacing,
142                     fine2OutFileName);
143        thirdSpacing = 30*secondSpacing/fineDirections;
144        printf("Finer angle: %f(%f)\n",fineAngle2,fineAngle2/M_PI*180);
145        printf("Finer spacing: %f(%f)\n",thirdSpacing,thirdSpacing/M_PI*180);
146     }
147
```

Aug 15 06:32 1991 types.c

```
1       #include "stdio.h"
2       #include "mylib.h"
3       #include "types.h"
4       #include "error.h"
5
6       Box MakeBox(int x,int y,int width,int height,double angle)
7       {
8        Box temp;
9        temp = (Box)calloc(1,sizeof(BoxBody));
10       if (temp = = NULL)
11        DoError("MakeBox: out of memory\n",NULL);
12       temp->x = x;
13       temp->y = y;
14       temp->width = width;
15       temp->height = height;
16       temp->angle = angle;
17       return temp;
18      }
19
20      Point MakePoint(int x,int y)
21      {
22       Point temp;
23       temp = (Point)calloc(1,sizeof(PointBody));
24       if (temp = =NULL)
25        DoError("MakePoint: out of memory\n",NULL);
26       temp->x = x;
27       temp->y = y;
```

```
28        return temp;
29      }
30
31
32
```

What is claimed is:

1. A method for determining a frequency of occurrence of significant word sequences in an undecoded electronic document text image, comprising the steps of:

segmenting the document image into word units;

determining at least one significant morphological image characteristic of selected word units in the document image;

identifying equivalence classes of the selected word units in the document image by clustering the ones of the selected word units with similar morphological image characteristics, each equivalence class being assigned a label;

equating the equivalence class labels to said selected word units arranged in the order in which the selected word units appear in the document image to form a master-sequence of equivalence class labels, said master-sequence including the equivalence class labels of the selected word units in the document image arranged in the order in which the selected word units appear in the document image, said master-sequence being comprised of sub-sequences;

evaluating said equivalence class label sub-sequences to determine the frequency of each equivalence class label sub-sequence, and outputting to an optical or electrical output device a list of significant phrases corresponding to the equivalence class label sub-sequences without having determined their content beyond the at least one significant morphological image characteristic.

2. The method of claim 1, wherein said step of identifying equivalence classes of selected word units comprises correlating word unit morphological image characteristics using a decision network.

3. The method of claim 1, wherein said step of identifying equivalence classes comprises comparing word unit shape representations of said selected word units.

4. The method of claim 3 wherein said word unit shape representations are determined by deriving at least one, one-dimensional signal characterizing the shape of the word unit.

5. The method of claim 3 wherein said word unit shape representations are determined by deriving an image function defining a boundary enclosing the selected word unit, and augmenting the image function so that an edge function representing edges of a character string detected within the boundary is defined over its entire domain by a single independent variable within the closed boundary, without individually detecting and/or identifying a character or characters making up the word unit.

6. The method of claim 1, wherein said step of determining at least one significant morphological image characteristic of said word units comprises determining a dimension, of said selected image units.

7. The method of claim 3 wherein said comparison of said word shape representations compares only length and height dimensions of said word shape representations.

8. A method of claim 1, wherein said step of determining at least one significant morphological image characteristic of said word units comprises determining a font of said selected word units.

9. The method of claim 1, wherein said step of determining at least one significant morphological image characteristic of said word units comprises determining a typeface of said selected word units.

10. The method of claim 1, wherein said step of determining at least one significant morphological image characteristic of said word units comprises determining a number of ascender elements of said selected word units.

11. The method of claim 1, wherein said step of determining at least one significant morphological image characteristic of said word units comprises determining a number of descender elements of said selected word units.

12. The method of claim 1, wherein said step of determining at least one significant morphological image characteristic of said word units comprises determining a pixel density of said selected word units.

13. The method of claim 1, wherein said step of determining at least one significant morphological image characteristic of said word units comprises determining a pixel cross-sectional characteristic of said selected word units.

14. The method of claim 1, wherein said step of determining at least one significant morphological image characteristic of said word units comprises determining a contour characteristic of said selected word units.

15. An apparatus for processing a digital image of text on a document to determine the frequency of word phrases in the text, comprising:

means for segmenting the digital image into word units;

means for determining at least one morphological characteristic of selected ones of said word units;

means for identifying equivalence classes of the selected word units in the document image by clustering the ones of the selected word units with similar morphological image characteristics, each equivalence class being assigned a label;

means for equating the equivalence class labels to said selected word units arranged in the order in which the selected word units appear in the document image to form a master-sequence of equivalence class labels, said master-sequence including the equivalence class labels of the selected word units in the document image arranged in the order in which the selected word units appears in the document image, said master-sequence being comprised of sub-sequences; and means for classifying said sub-sequences of equivalence class labels to determine the frequency of each equivalence class label sub-sequence; and an output device for producing an output responsive to the relative frequencies of occurrence of the selected equivalence class label sub-sequences which correspond to phrases, wherein informational content of the selected equivalence class label sub-sequences has not been determined beyond the at least one morphological image characteristic.

16. The apparatus of claim 15 wherein said morphological image characteristic determining means comprises means for deriving at least one, one-dimensional signal characterizing the shape of the word unit.

17. The apparatus of claim 15, wherein said morphological image characteristic determining means comprises means for deriving an image function defining a boundary enclosing the word unit, and augmenting the image function so that an edge function representing edges of a character string detected within the boundary is defined over its entire domain by a single independent variable within the closed boundary, without individually detecting and/or identifying the character or characters making up the word unit.

18. A method for determining a frequency of occurrence of significant word sequences in an undecoded electronic document text image, comprising the steps of:
   segmenting the document image into word units;
   determining at least one significant morphological image characteristic of selected word units in the document image;
   identifying equivalence classes of the selected word units in the document image by clustering the ones of the selected word units with similar morphological image characteristics, each equivalence class being assigned a label, said identifying step including comparing word unit shape representations of said selected word units, said word unit shape representations being determined by deriving an image function defining a boundary enclosing the selected word unit, and augmenting the image function so that an edge function representing edges of a character string detected within the boundary is defined over its entire domain by a single independent variable within the closed boundary, without individually detecting and/or identifying a character or characters making up the word unit;
   determining the sequences of equivalence class labels corresponding to all sequences of said selected word units arranged in the order in which the selected word units appear in the document image; and
   evaluating said equivalence class label sequences to determine the frequency of each equivalence class label sequence.

19. An apparatus for processing a digital image of text on a document to determine the frequency of word phrases in the text, comprising:
   means for segmenting the digital image into word units;
   means for determining at least one morphological characteristic of selected ones of said word units, said means for determining including means for deriving an image function defining a boundary enclosing the word unit, and augmenting the image function so that an edge function representing edges of a character string detected within the boundary is defined over its entire domain by a single independent variable within the closed boundary, without individually detecting and/or identifying the character or characters making up the word unit;
   means for identifying equivalence classes of the selected word units in the document image by clustering the ones of the selected word units with similar morphological image characteristics, each equivalence class being assigned a label;
   means for determining the sequences of equivalence class labels corresponding to all sequences of said selected word units arranged in the order in which the selected word units appear in the document image; and
   means for classifying said sequences of equivalence class labels to determine the frequency of each equivalence class label sequence; and
   an output device for producing an output responsive to the relative frequencies of occurrence of the selected equivalence class label sequences.

* * * * *